United States Patent
Ozdemir et al.

(10) Patent No.: US 11,131,619 B2
(45) Date of Patent: Sep. 28, 2021

(54) LOSS ENGINEERING TO IMPROVE SYSTEM FUNCTIONALITY AND OUTPUT

(71) Applicant: Washington University, St. Louis, MO (US)

(72) Inventors: Sahin Kaya Ozdemir, St. Louis, MO (US); Lan Yang, St. Louis, MO (US); Bo Peng, St. Louis, MO (US)

(73) Assignee: Washington University, St. Louis, MO (US)

( * ) Notice: Subject to any disclaimer, the term of this patent is extended or adjusted under 35 U.S.C. 154(b) by 638 days.

(21) Appl. No.: 15/981,228

(22) Filed: May 16, 2018

(65) Prior Publication Data

US 2018/0306696 A1    Oct. 25, 2018

Related U.S. Application Data

(63) Continuation of application No. 14/659,427, filed on Mar. 16, 2015, now abandoned, which is a
(Continued)

(51) Int. Cl.
*G01N 15/14*        (2006.01)
*G01N 21/77*        (2006.01)
*G01N 21/65*        (2006.01)

(52) U.S. Cl.
CPC ..... *G01N 15/1434* (2013.01); *G01N 21/7746* (2013.01); *G01N 2021/655* (2013.01); *Y10S 977/88* (2013.01)

(58) Field of Classification Search
CPC ........... G01N 15/1434; G01N 15/1436; G01N 15/1425; G01N 15/14; G01N 15/1429;
(Continued)

(56) References Cited

U.S. PATENT DOCUMENTS

| 4,827,143 | A | 5/1989 | Munakata et al. |
| 4,927,232 | A | 5/1990 | Griffiths |

(Continued)

FOREIGN PATENT DOCUMENTS

| WO | 2004062053 A2 | 7/2004 |
| WO | 2004070432 A2 | 8/2004 |
| WO | 2004070432 A3 | 7/2005 |

OTHER PUBLICATIONS

Anishchenko, V. S. et al., "Stochastic resonance in chaotic systems," J. Statistical Physics, 70(1-2): 183-196 (1993).
(Continued)

*Primary Examiner* — John R Lee
(74) *Attorney, Agent, or Firm* — Armstrong Teasdale LLP

(57) ABSTRACT

A system and method for engineering loss in a physical system by steering parameters of the physical system to the vicinity of an exceptional point is disclosed. In the vicinity of an exceptional point, localization of the fields helps to enhance any linear or nonlinear processes. As examples loss-induced transparency in the intracavity field intensities of coupled resonators, loss-induced suppression and enhancement of thermal nonlinearity in coupled resonators and loss-induced suppression and revival of Raman lasing in whispering-gallery-microcavities are demonstrated.

18 Claims, 56 Drawing Sheets

Related U.S. Application Data continuation-in-part of application No. 13/460,170, filed on Apr. 30, 2012, now Pat. No. 9,012,830, which is a continuation-in-part of application No. 12/966,785, filed on Dec. 13, 2010, now Pat. No. 8,704,155, said application No. 15/981,228 is a continuation of application No. 15/677,646, filed on Aug. 15, 2017, now abandoned, which is a continuation of application No. 14/897,863, filed as application No. PCT/US2014/041877 on Jun. 11, 2014, now Pat. No. 9,766,402, said application No. 15/981,228 is a continuation of application No. 15/185,369, filed on Jun. 17, 2016, now abandoned, and a continuation of application No. 15/430,426, filed on Feb. 10, 2017, now abandoned, and a continuation of application No. 15/801,823, filed on Nov. 2, 2017, now Pat. No. 10,782,289, which is a continuation of application No. 15/019,942, filed on Feb. 9, 2016, now abandoned.

(60) Provisional application No. 61/285,869, filed on Dec. 11, 2009, provisional application No. 61/834,113, filed on Jun. 12, 2013, provisional application No. 62/181,180, filed on Jun. 17, 2015, provisional application No. 62/293,746, filed on Feb. 10, 2016, provisional application No. 62/333,667, filed on May 9, 2016, provisional application No. 62/113,610, filed on Feb. 9, 2015.

(58) Field of Classification Search
CPC .... G01N 21/7746; G01N 21/62; G01N 21/63; G01N 21/65; G01N 2021/653; G01N 2021/655; G01N 2021/656; Y10S 977/88; Y10S 977/881; H01S 3/0627; H01S 3/06; H01S 3/05; H01S 3/1061; H01S 3/106; H01S 5/1071; H01S 5/1075; H01S 3/30; H01S 3/302; H01S 3/10
See application file for complete search history.

(56) References Cited

U.S. PATENT DOCUMENTS

| | | | |
|---|---|---|---|
| 5,026,141 A | 6/1991 | Griffiths |
| 5,084,614 A | 1/1992 | Berkner |
| 6,018,386 A | 1/2000 | Radun |
| 6,052,495 A | 4/2000 | Little et al. |
| 6,490,039 B2 | 12/2002 | Maleki et al. |
| 6,580,532 B1 | 6/2003 | Yao et al. |
| 6,580,851 B1 | 6/2003 | Vahala et al. |
| 6,603,560 B1 | 8/2003 | Islam |
| 6,668,006 B1 | 12/2003 | Margalit et al. |
| 6,751,377 B2 | 6/2004 | Baumann et al. |
| 6,781,690 B2 | 8/2004 | Armstrong et al. |
| 6,831,938 B1 | 12/2004 | Gunn, III |
| 6,871,025 B2 | 3/2005 | Maleki et al. |
| 6,891,997 B2 | 5/2005 | Sercel et al. |
| 6,970,619 B2 | 11/2005 | Baumann et al. |
| 6,987,914 B2 | 1/2006 | Savchenkov et al. |
| 7,005,653 B1 | 2/2006 | O'Connell et al. |
| 7,037,554 B2 | 5/2006 | Tao et al. |
| 7,085,452 B1 | 8/2006 | Lin et al. |
| 7,092,591 B2 | 8/2006 | Savchenkov et al. |
| 7,209,616 B2 | 4/2007 | Welker et al. |
| 7,218,803 B1 | 5/2007 | Sumetsky |
| 7,228,016 B2 | 6/2007 | Beausoleil |
| 7,233,711 B1 | 6/2007 | Beausoleil et al. |
| 7,236,664 B2 | 6/2007 | Martin et al. |
| 7,260,279 B2 | 8/2007 | Gunn et al. |
| 7,292,751 B2 | 11/2007 | Popovic |
| 7,352,468 B2 | 4/2008 | Tarsa |
| 7,376,169 B2 | 5/2008 | Henrichs |
| 7,460,746 B2 | 12/2008 | Maleki et al. |
| 7,474,810 B2 | 1/2009 | Bratkovski et al. |
| 7,480,425 B2 | 1/2009 | Gunn et al. |
| 7,528,959 B2 | 5/2009 | Novotny et al. |
| 7,545,843 B2 | 6/2009 | Armani et al. |
| 7,630,417 B1 | 12/2009 | Maleki et al. |
| 7,693,369 B2 | 4/2010 | Fan et al. |
| 7,738,522 B2 | 6/2010 | Henrichs |
| 7,769,071 B2 | 8/2010 | Vahala et al. |
| 7,781,217 B2 | 8/2010 | Armani et al. |
| 7,783,144 B2 | 8/2010 | Chigrinov et al. |
| 7,796,262 B1 | 9/2010 | Wang et al. |
| 7,869,470 B2 | 1/2011 | Wong et al. |
| 8,033,706 B1 | 10/2011 | Kelly et al. |
| 8,040,132 B2 | 10/2011 | Klein et al. |
| 8,072,606 B2 | 12/2011 | Chau et al. |
| 8,092,855 B2 | 1/2012 | Armani et al. |
| 8,094,359 B1 | 1/2012 | Matsko et al. |
| 8,111,722 B1 | 2/2012 | Maleki et al. |
| 8,180,421 B2 | 5/2012 | Phillips et al. |
| 8,208,502 B2 | 6/2012 | Srinivasan et al. |
| 8,349,275 B2 | 1/2013 | Wang et al. |
| 8,483,521 B2 | 7/2013 | Popovic |
| 8,493,560 B2 | 7/2013 | Shopova et al. |
| 8,704,155 B2 | 4/2014 | He et al. |
| 9,012,830 B2 | 4/2015 | Zhu et al. |
| 9,766,402 B2 | 9/2017 | Yang et al. |
| 2002/0018504 A1 | 2/2002 | Coldren |
| 2002/0031838 A1 | 3/2002 | Meinhart et al. |
| 2003/0181307 A1 | 9/2003 | Myers et al. |
| 2004/0008942 A1 | 1/2004 | Scheuer et al. |
| 2004/0160994 A1 | 8/2004 | Zhang |
| 2004/0247008 A1 | 12/2004 | Scheuer et al. |
| 2004/0263858 A1 | 12/2004 | Song et al. |
| 2004/0264901 A1 | 12/2004 | Tao et al. |
| 2005/0036151 A1 | 2/2005 | Gornick et al. |
| 2005/0073681 A1 | 4/2005 | Sevick-Muraca et al. |
| 2005/0117157 A1 | 6/2005 | Tarsa |
| 2005/0128488 A1 | 6/2005 | Yelin et al. |
| 2005/0128566 A1 | 6/2005 | Savchenkov et al. |
| 2005/0163185 A1 | 7/2005 | Vahala et al. |
| 2005/0168753 A1 | 8/2005 | Butt et al. |
| 2005/0207713 A1 | 9/2005 | Mazur et al. |
| 2006/0062508 A1 | 3/2006 | Guo et al. |
| 2006/0170931 A1 | 8/2006 | Guo et al. |
| 2006/0239617 A1 | 10/2006 | Montgomery et al. |
| 2007/0030492 A1 | 2/2007 | Novotny et al. |
| 2007/0071386 A1 | 3/2007 | Digonnet et al. |
| 2007/0114477 A1 | 5/2007 | Teraoka et al. |
| 2007/0154129 A1 | 7/2007 | Beausoleil et al. |
| 2007/0173718 A1 | 7/2007 | Richards-Kortum et al. |
| 2007/0206203 A1 | 9/2007 | Trainer |
| 2007/0237460 A1 | 10/2007 | Fan et al. |
| 2007/0258088 A1 | 11/2007 | Silberberg et al. |
| 2007/0269901 A1 | 11/2007 | Armani et al. |
| 2008/0204715 A1 | 8/2008 | Klehr et al. |
| 2008/0273828 A1 | 11/2008 | Montgomery et al. |
| 2008/0285606 A1 | 11/2008 | Kippenberg et al. |
| 2008/0285917 A1 | 11/2008 | Bratkovski et al. |
| 2009/0103099 A1 | 4/2009 | Debackere et al. |
| 2009/0136181 A1 | 5/2009 | Vollmer et al. |
| 2009/0156942 A1 | 6/2009 | Phillips et al. |
| 2009/0169162 A1 | 7/2009 | Kumkar et al. |
| 2009/0190877 A1 | 7/2009 | Wang et al. |
| 2009/0191657 A1 | 7/2009 | Yang et al. |
| 2009/0214755 A1 | 8/2009 | Armani et al. |
| 2009/0256136 A1 | 10/2009 | Tan et al. |
| 2009/0310140 A1 | 12/2009 | Smith et al. |
| 2009/0310902 A1 | 12/2009 | Smith et al. |
| 2010/0026300 A1 | 2/2010 | Klein et al. |
| 2010/0085573 A1 | 4/2010 | Lu et al. |
| 2010/0171958 A1 | 7/2010 | Chau et al. |
| 2010/0182607 A1 | 7/2010 | Chau et al. |
| 2010/0231903 A1 | 9/2010 | Sumetsky |
| 2010/0326200 A1 | 12/2010 | Sheverev et al. |
| 2011/0019186 A1 | 1/2011 | Himmelhaus et al. |
| 2011/0139970 A1 | 6/2011 | He et al. |
| 2011/0208031 A1 | 8/2011 | Wolfe et al. |
| 2011/0253897 A1 | 10/2011 | Saeedkia et al. |

(56) References Cited

U.S. PATENT DOCUMENTS

| | | |
|---|---|---|
| 2011/0253909 A1 | 10/2011 | Himmelhaus et al. |
| 2011/0267609 A1 | 11/2011 | Wu et al. |
| 2011/0277540 A1 | 11/2011 | Ioppolo et al. |
| 2011/0306854 A1 | 12/2011 | Arnold et al. |
| 2012/0065495 A1 | 3/2012 | Richards-Kortum et al. |
| 2012/0065521 A1 | 3/2012 | Richards-Kortum et al. |
| 2012/0177080 A1 | 7/2012 | Yang et al. |
| 2012/0194893 A1 | 8/2012 | Maleki et al. |
| 2012/0268731 A1 | 10/2012 | Zhu et al. |
| 2012/0308181 A1 | 12/2012 | Hafezi et al. |
| 2012/0321245 A1 | 12/2012 | Vahala et al. |
| 2013/0330839 A1 | 12/2013 | Suh et al. |
| 2014/0321485 A1 | 10/2014 | Seidel et al. |
| 2015/0285728 A1 | 10/2015 | Ozdemir et al. |
| 2015/0295379 A1 | 10/2015 | Ozdemir et al. |
| 2016/0266110 A1 | 9/2016 | Ozdemir et al. |
| 2016/0372885 A1* | 12/2016 | Yang ..................... H01S 5/1075 |
| 2018/0306696 A1* | 10/2018 | Ozdemir ............ G01N 21/7746 |

OTHER PUBLICATIONS

Arteaga, M.A. et al., "Experimental evidence of coherence resonance in a time-delayed bistable system," Physical Review Letters, 99(2): 023903.1 to 023903.4 (2007).

Armani, D.K. et al., "Ultra-high-Q toroid microcavity on a chip," Nature, 421(6926): 925-928 (2003).

Bakemeier, L. et al., "Route to chaos in optomechanics," Physical Review Letters, 114(1): 013601.1-013601.5 (2015).

Brambilla, G. et al, "Optical fiber nanowires and microwires: fabrication and applications," Advances in Optics and Photonics, 1(1): 107-161 (2009).

Brambilla, G. et al., "Optical manipulation of microspheres along a subwavelength optical wire," Optics Letters, 32(20): 3041-3043 (2007).

Brandstetter, M. et al., "Reversing the pump dependence of a laser at an exceptional point," Nature Communications, 5: 4034, 6 pages (2014).

Burg, T. P. et al., "Weighing of biomolecules, single cells and single nanoparticles in fluid," Nature, 446(7139): 1066-1069 (2007).

Cai, M. et al., "Highly Efficient Optical Power Transfer to Whispering-Gallery Modes by Use of a Symmetrical Dual-Coupling Configuration," Optics Letters, 25(4): 260-262 (2000).

Chantada, L. et al., "Optical resonances in microcylinders: response to perturbations for biosensing," Journal of the Optical Society of America B, 25(8): 1312-1321 (2008).

Colvin, V. L., "The ptential environmental impact of engineered nanomaterials," Nature Biotechnology, 21 (10): 1166-1170 (2003).

Dal Bosco, A.K. et al., "Delay-induced deterministic resonance of chaotic dynamics," Europhysics Letters, 101(2): 24001—p.1 to p. 5 (2013).

Forstner, S. et al., "Cavity Optomechanical Magnetometer," Physical Review Letters, 108(12): 120801 (2012).

Gammaitoni, L. et al., "Stochastic resonance in bistable systems," Physical Review Letters, 62(4): 349-352 (1989).

Gammaitoni, L. et al., "Stochastic Resonance," Reviews of Modern Physics, 70(1): 223-287 (1998).

Gang, H. et al., "Stochastic resonance without external periodic force," Physical Review Letters, 71(6): 807 (1993).

Gong, Z. R. et al., "Effective Hamiltonian approach to the Kerr nonlinearity in an optomechanical system," Physical Review A, 80(6B): 065801.1 to 065801.4 (2009).

Gorodetsky, M. L. et al., "Rayleigh scattering in high-Q microspheres," Journal of the Optical Society of America B, 17(6): 1051-1057 (2000).

Gucker, F. T. et al., "A photoelectronic instrument for counting and sizing aerosol particles," British Journal of Applied Physics, 5(S3): S138-S143 (1954).

He, L. et al., "Detecting single viruses and nanoparticles using whispering gallery microlasers," Nature Nanotechnology, 6: 428-432 (2011).

He, L. et al., "Scatterer induced mode splitting in poly(dimethylsiloxane) coated microresonators," Applied Physics Letters, 96(22): 221101 (2010).

He, L. et al., "Ultrasensitive detection of mode splitting in active optical microcavities," Physical Review A, 82(5): 053810-1 to 053810-4 (2010).

He, L. et al., "Whispering Gallery Mode Microresonators for Lasing and Single Nanoparticle Detection," Washington University in St. Louis, May 24, 2012.

Hering S. V. et al., "A Laminar-Flow, Water-Based Condensation Particle Counter (WCPC)," Aerosol Science and Technology, 39(7): 659-672 (2005).

Hoet, P. HM et al., "Nanoparticles—known and unknown health risks," Journal of Nanobiotechnology, 2(12): 15 pages (2004).

Hossein-Zadeh, M. et al., "Characterization of a radiation-pressure-driven micromechanical oscillator," Physical Review A, 74(2): 023813-1 to 023813-15 (2006).

Kim, W. et al., "Demonstration of mode splitting in an optical microcavity in aqueous environment," Applied Physics Letters, 97(7): 07111 (2010).

Knittel, J. et al., "Back-scatter based whispering gallery mode sensing," Scientific Reports, 3: 2974, DOI:10.1038/srep02974 (2013).

Lee, S-Y. "Geometrical phase imprinted on eigenfunctions near an exceptional point," Physical Review A, 82(6): 064101 (2010).

Lemarchand, A. et al., "Temperature-driven coherence resonance and stochastic resonance in a thermochemical system," Physical Review E, 89(2): 022916.1-022916.8 (2014).

Lindner, B. et al., "Analytical approach to the stochastic FitzHugh-Nagumo system and coherence resonance," Physical Review E, 60(6): 7270-7276 (1999).

Liu, Z. et al., "Coherence resonance in coupled chaotic oscillators," Physical Review Letters, 86(21): 4737-4740 (2001).

Masoller, C., "Noise-induced resonance in delayed feedback systems," Physical Review Letters, 88(3): 034102.1 to 034102.4 (2002).

Mazzei, A. et al., "Controlled Coupling of Counterpropagating Whispering-Gallery Modes by a Single Rayleigh Scatterer: A Classical Problem in a Quantum Optical Light," Physical Review Letters, 99(17): 173603-1 to 173603-4 (2007).

McNamara, B. et al., "Observation of stochastic resonance in a ring laser," Physical Review Letters, 60(25): 2626-2629 (1988).

Milner, V. et al., "Photon localization laser: low-threshold lasing in a random amplifying layered medium via wave localization," Physical Review Letters, 94(7): 073901 (2005).

Mitra, Anirban, et al., "Nano-optofluidic Detection of Single Viruses and Nanoparticles," ACS NANO, 4(3): 1305-1312 (2010).

Monifi, F. et al., "Encapsulation of a Fiber Taper Coupled Microtoroid Resonator in a Polymer Matrix," IEEE Photonics Technology Letters, 25(15): 1458-1461 (2013) and (arXiv:1304.6423v1, Apr. 23, 2013, 6 pages).

Monifi, F. et al., "A Robust and Tunable Add-Drop Filter Using Whispering Gallery Mode Microtorid Resonator,"IEEE, Journal of Lightwave Technology, 30(21): 3306-3315 (2012).

Monifi, F. et al., "Ultrasound sensing using a fiber coupled silica microtoroid resonator encapsulated in a polymer," Photonics Conference (IPC), IEEE, pp. 215-216 (2013).

Murugan, G.S. et al., "Optical Propulsion of Individual and Clutered Microspheres along Sub-Micron Optical Wires," Japanese Journal of Applied Physics, 47(8S1): 6716-6718 (2008).

Naik et al., "Towards single-molecule nanomechanical mass spectrometry," Nature Nanotechnology, 4(7): 445-450 (2009).

Neelen, R. C. et al., "Frequency splitting of the longitudinal modes of a ring dye laser due to backscattering," Journal of the Optical Society of America B, 8(5): 959-969 (1991).

Neiman, A. et al., "Coherence resonance at noisy precursors of bifurcations in nonlinear dynamical systems," Physical Review E, 56(1): 270-273 (1997).

Nie, S. et al., "Probing Single Molecules and Single Nanoparticles by Surface-Enhanced Raman Scattering," Science, 275(5303): 1102-1106 (1997).

Patolsky, F. et al., "Electrical detection of single viruses," PNAS, 101(3): 14017-14022 (2004).

Peng, B. et al., "Loss-induced suppression and revival of lasing," Science 346(6207): 328-332 (2014).

(56) References Cited

OTHER PUBLICATIONS

Pikovsky, A. S. et al., "Coherence resonance in a noise-driven excitable system," Physical Review Letters, 78(5): 775-778 (1997).

Rokhsari, H. et al., "Ultralow Loss, High Q, Four Port Resonant Couplers for Quantum Optics and Photonics," Physical Review Letters, 92(25): 253905-1 to 253905-4 (2004).

Saques, F. et al., "Spatiotemporal order out of noise," Reviews of Modem Physics, 79(3): 829-882 (2007).

Schmidt, B.S. et al., "Optofluidic trapping and transport on solid core waveguides within a microfluidic device," Optics Express 15(22): 14322-14334 (2007).

Sheu, F-W et al., "Using a slightly tapered optical fiber to attract and transport microparticles," Optics Express, 18(6): 5574-5579 (2010).

Shopova, S.I. et al., "Ultrasensitive nanoparticle detection using a portable whispering gallery mode biosensor driven by a periodically poled lithium-niobate frequency doubled distributed feedback laser", Review of Scientific Instruments, 81(10): 103110-1 to 103110-4 (2010).

Tureci, H. et al., "Theory of the spatial structure of nonlinear lasing modes," Physical Review A, 76(1): 013813-1 to 013813-4 (2007).

Tureci, H. et al., Strong Interactions I n Multimode Random Lasers,Science, 320(5876): 643-646 (2008).

Vahala, K J., "Optical microcavities," Nature, 424(6950): 839-846 (2003).

Villatoro J. et al., "Fast detection of hydrogen with nano fiber tapers coated with ultra thin palladium layers," Optics Express, 13(13): 5087-5092 (2005).

Vollmer F. et al., "Single virus, detection from the reactive shift of a whispering-gallery mode," PNAS, 105(52): 20701-20704 (2008).

Vollmer, F. et al., "Whispering-gallery-mode biosensing: label-free detection down to single molecules," Nature Methods, 5(7): 591-596 (2008).

Wang, S. et al., "Label-free imaging, detection, and mass measurement of single viruses by surface plasmon resonance," 107(37): 16028-16032 (2010).

Watts, M. R. et al., "Optical resonators: Microphotonic thermal imaging," Nature Photonics, 1(11): 632-634 (2007).

Weiss, D.S. et al., "Splitting of high-Q Mie modes induced by light backscattering in silica microspheres," Optics Letters, 20(18): 1835-1837 (1995).

White, I.M. et al., "Liquid-core optical ring-resonator sensors," Optics Letters, 31(9): 1319-1321 (2006).

Xie, Z. et al., "Pure optical photoacoustic microscopy," Optics Express, 19(10): 9027-9034 (2011).

Yalcin, A. et al., "Optical Sensing of Biomolecules Using Microring Resonators", IEEE Journal of Selected Topics in Quantum Electronics, 12(1): 148-155 (2006).

Yang, L. et al., "Erbium-doped and Raman microlasers on a silicon chip fabricated by the sol-gel process", Applied Physics Letters, 86 (9): 091114-1 to 091114-3 (2005).

Yang, Lan, "Fabrication and Characterization of Microlasers by the Sol-Gel Method," Doctoral Dissertation, submitted to the California Institute of Technology, Pasadena California, 148 pages (2005).

Yang, L. et al., "A 4-Hz Fundamental Linewidth on-chip Microlaser," InLasers and Electro-Optics, 2007. CLEO 2007. Conference on May 6, 2007 (pp. 1-2). IEEE.

Yao, J. et al., "Bandwidth-Turnable Add-Drop Filters Based on Micro-Electro-Mechanical-System Actuated Silicon Microtoroidal Resonators," Optics Letters, 34(17): 2557-2559 (2009).

Zhu, J. et al., "Controlled manipulation of mode splitting in an optical microcavity by two Rayleigh scatterers," Optics Express, 18(23): 23535-23543 (2010).

Zhu, J. et al., "Infrared light detection using a whispering-gallery-mode optical microcavity," Applied Physics Letters, 104(17): 171114 (2014).

Zhu, J. et al., "On-chip single nanoparticle detection and sizing by mode splitting in an ultrahigh-Q microresonator," Nature Photonics, 4(1): 46-49 (2010).

International Search Report and Written Opinion from Application No. PCT/US2014/041877 dated Apr. 23, 2015 (5 pages).

International Search Report and Written Opinion from Application No. PCT/US2016/017215 dated Jul. 25, 2016 (10 pages).

Non-Final Office Action issued in U.S. Appl. No. 15/185,369 dated Oct. 10, 2017 (8 pages).

\* cited by examiner

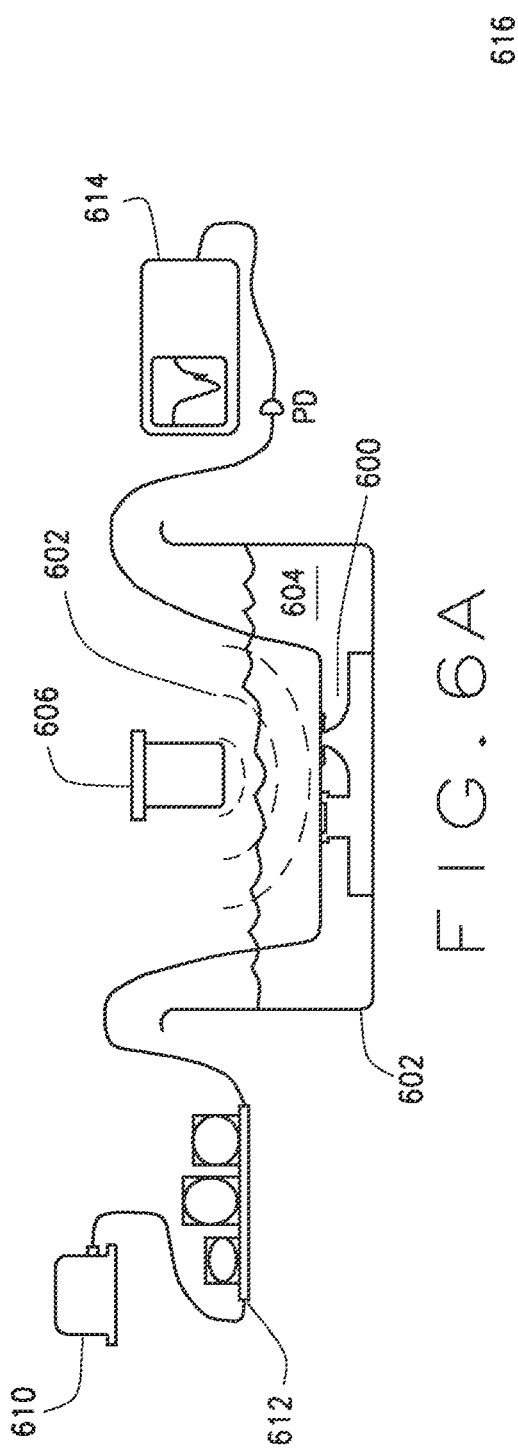
FIG. 6A
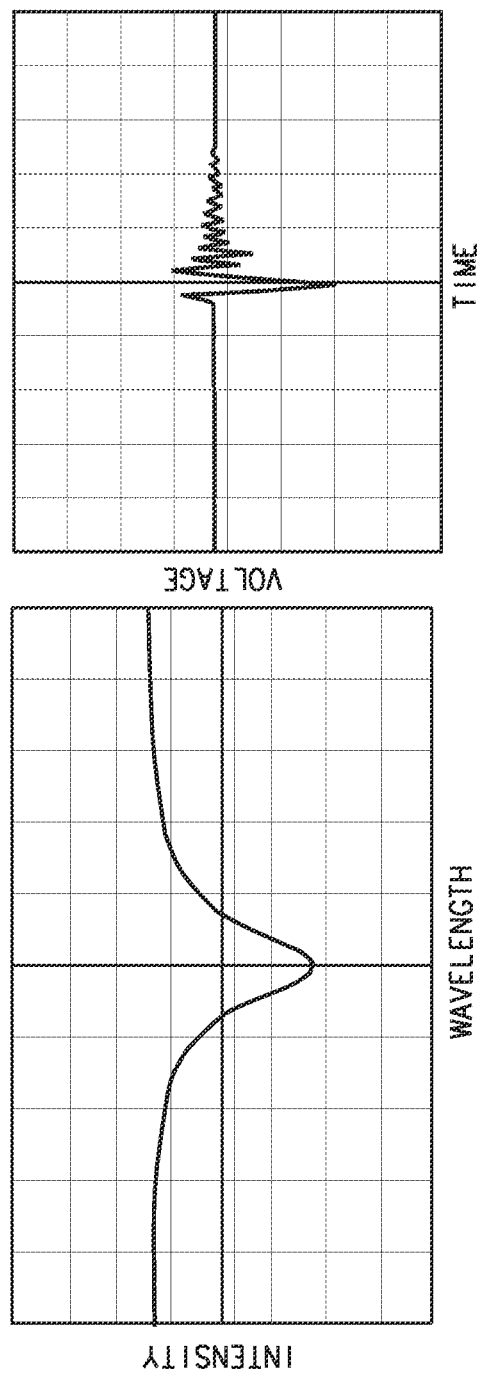
FIG. 6B
FIG. 6C

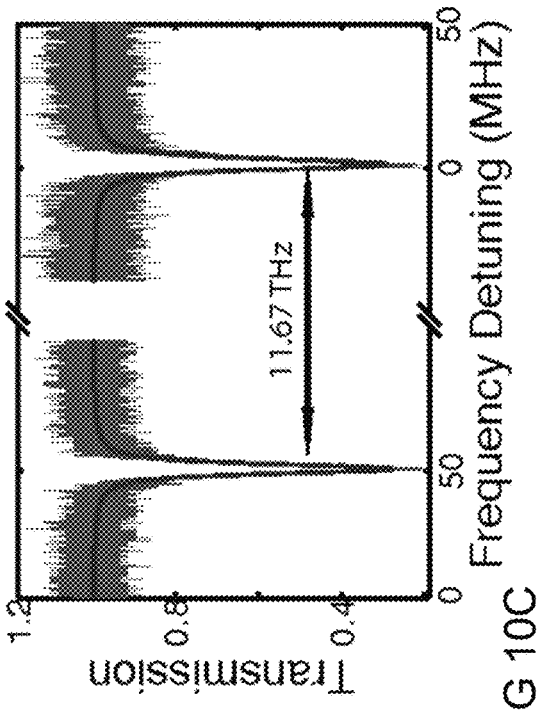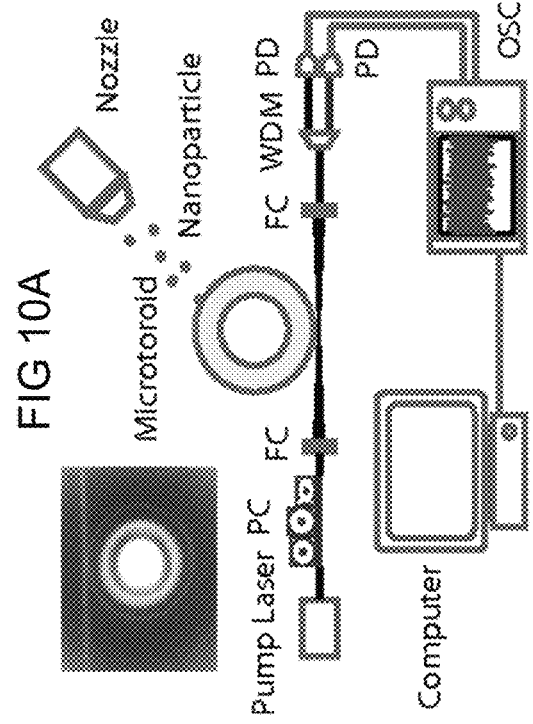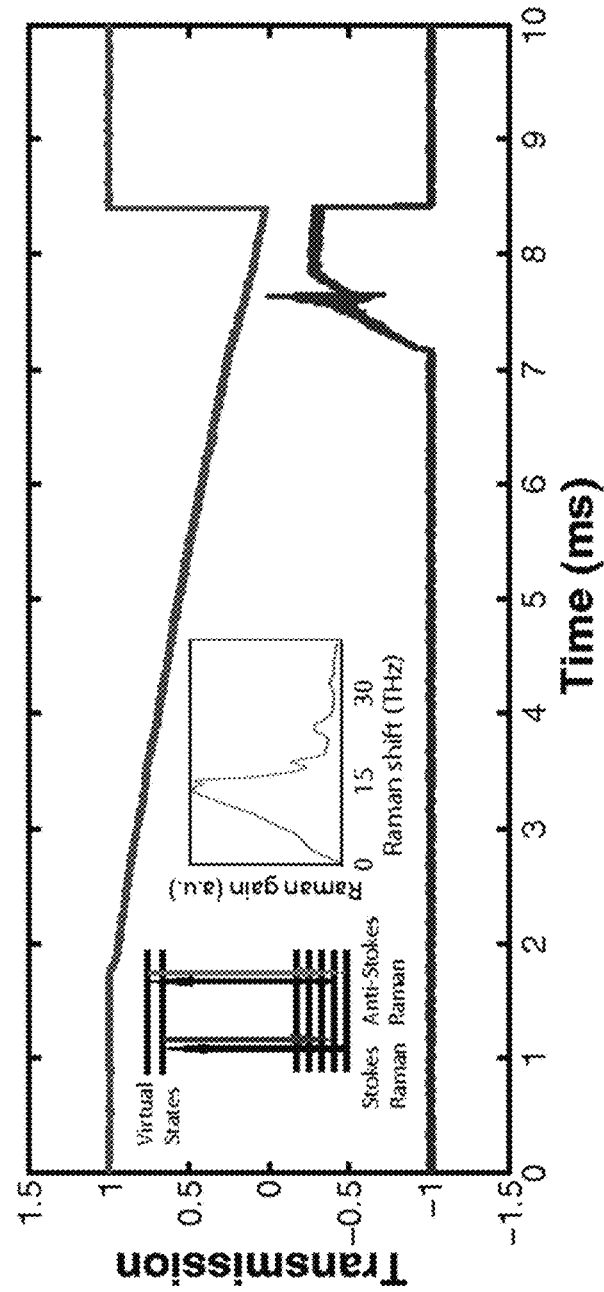

FIG. 13A
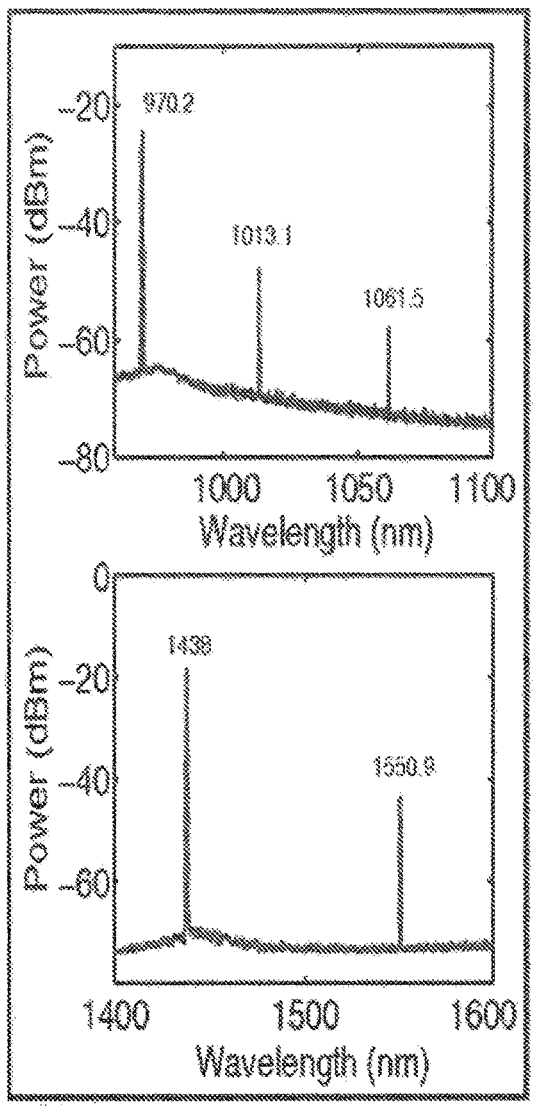
FIG. 13B
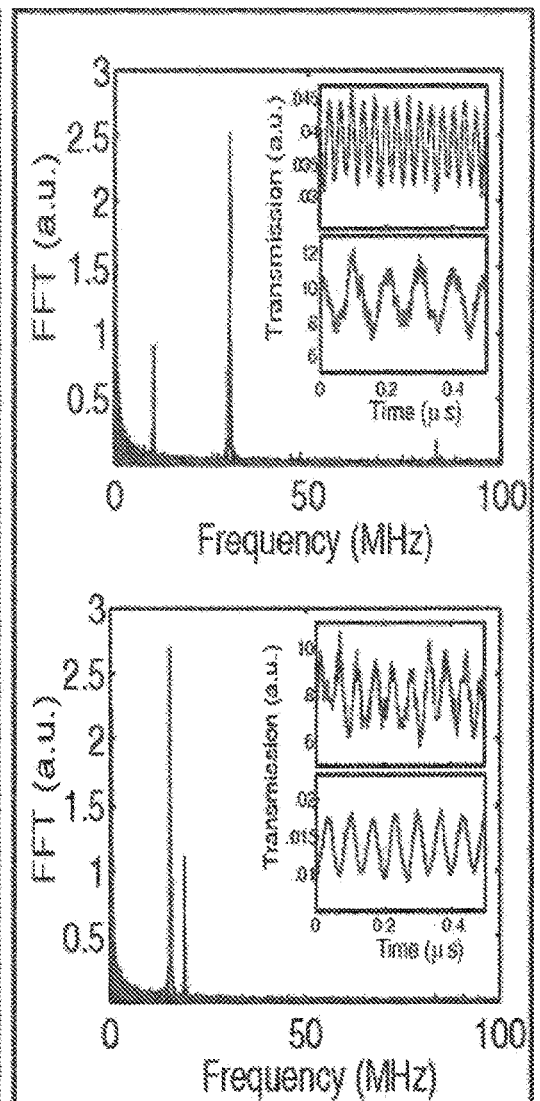
FIG. 13C
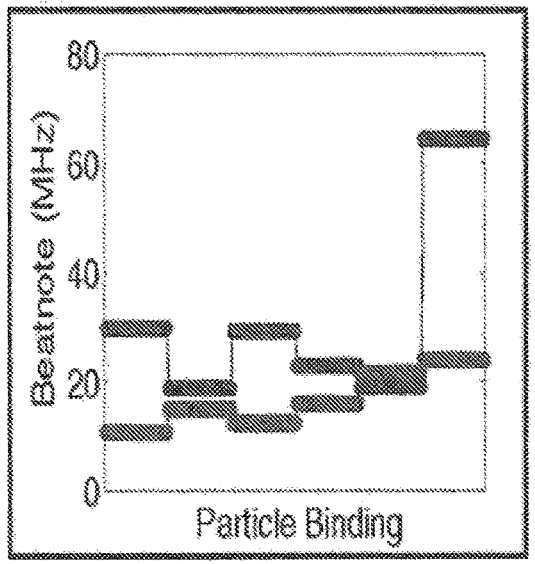
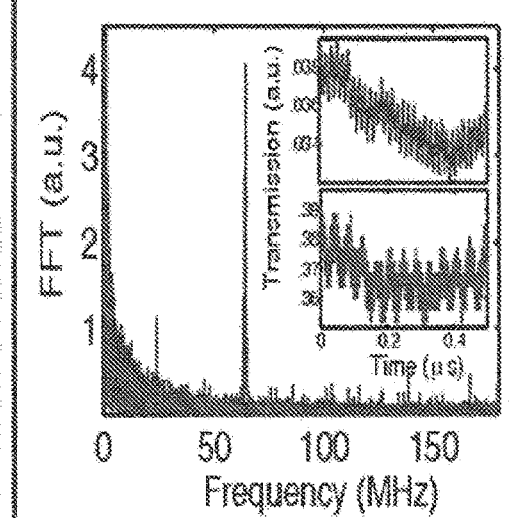

FIG. 18A
FIG. 18D
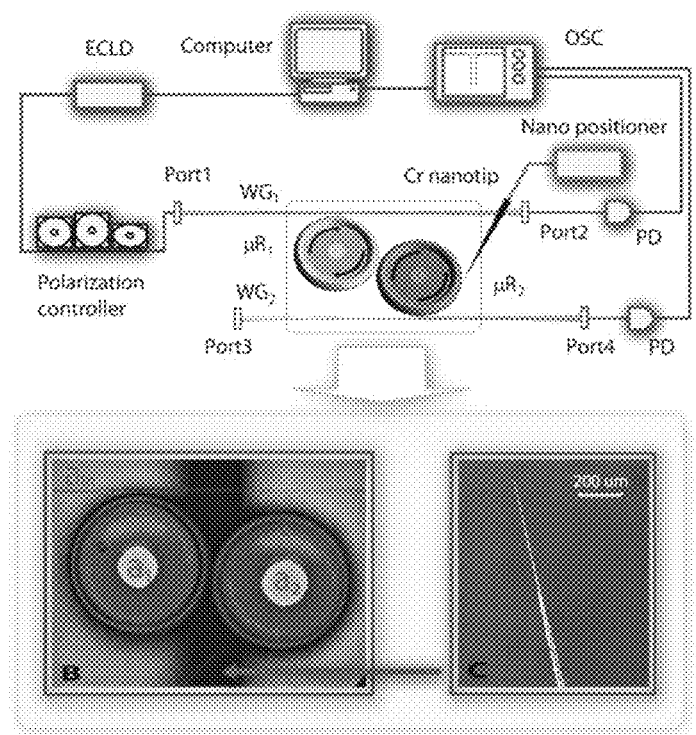
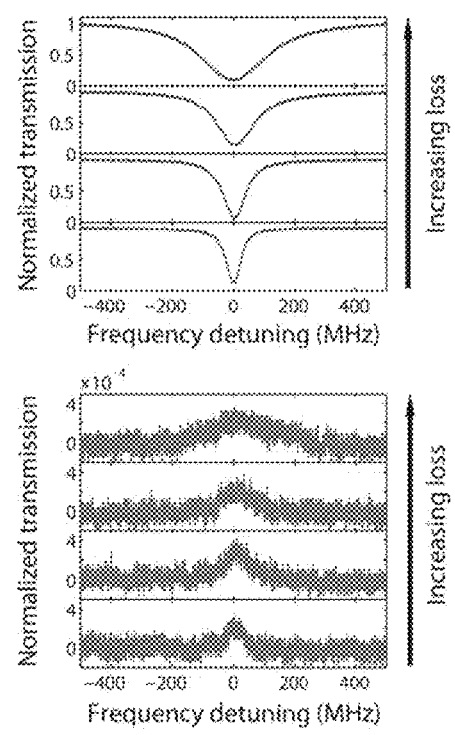
FIG. 18B        FIG. 18C
FIG. 18E

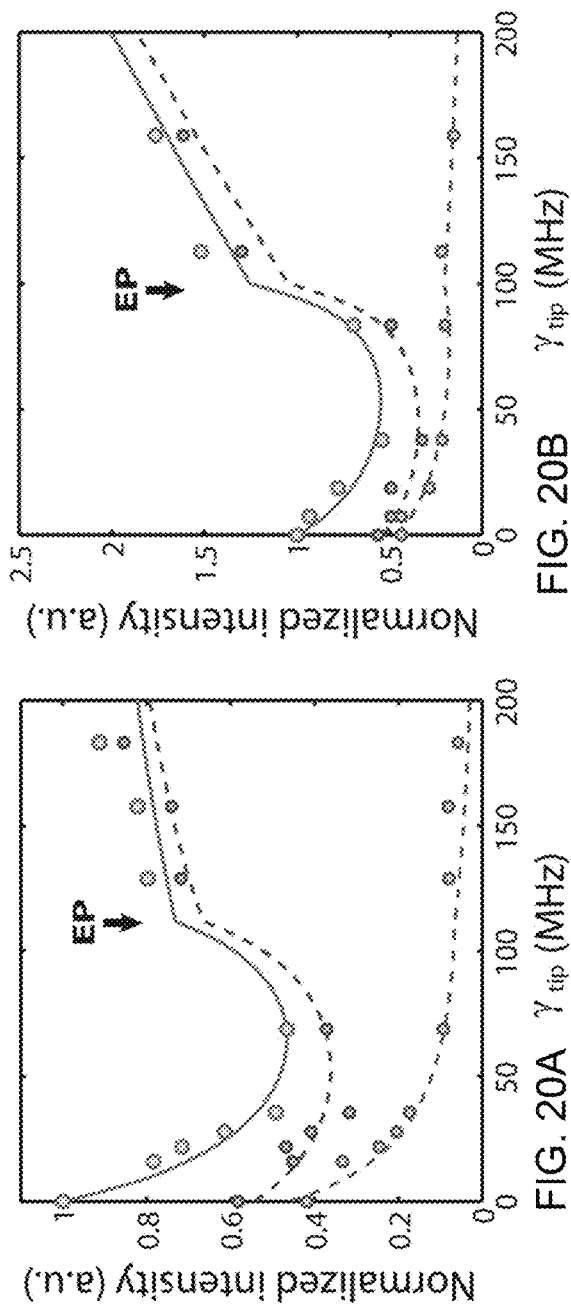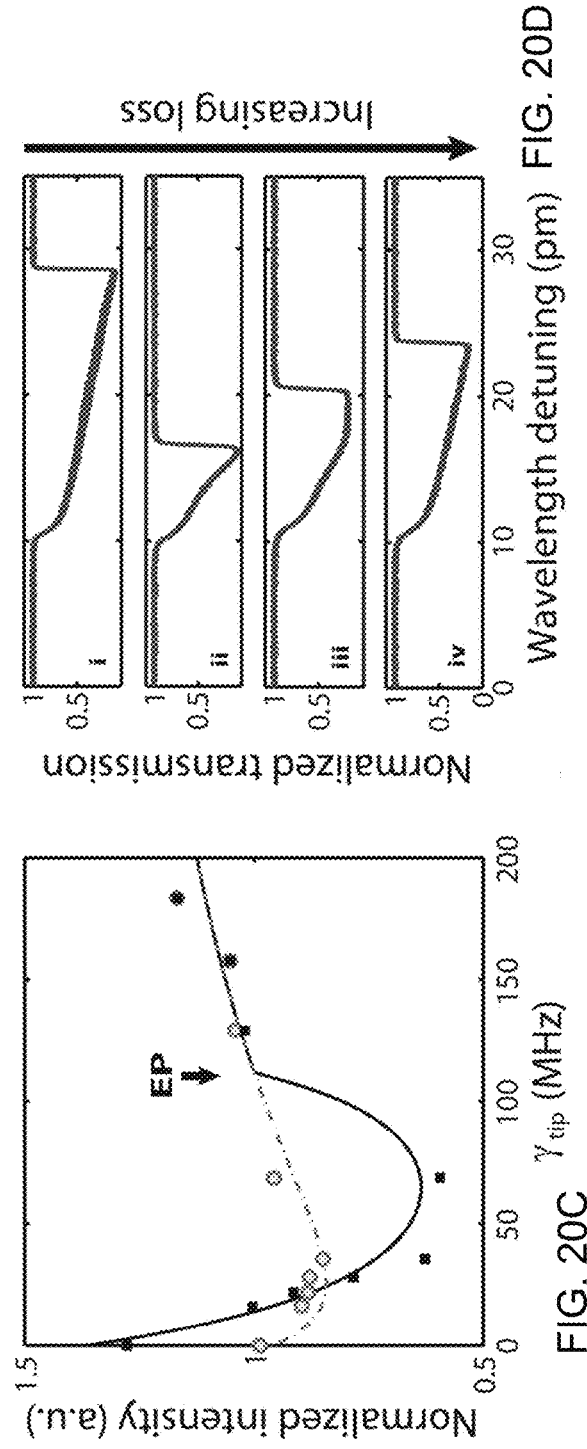
FIG. 20A  FIG. 20B  FIG. 20C  FIG. 20D

FIG. 23A
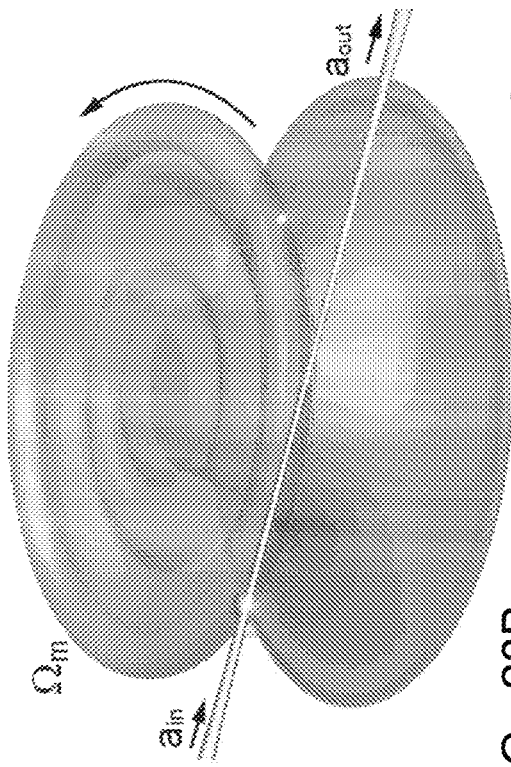
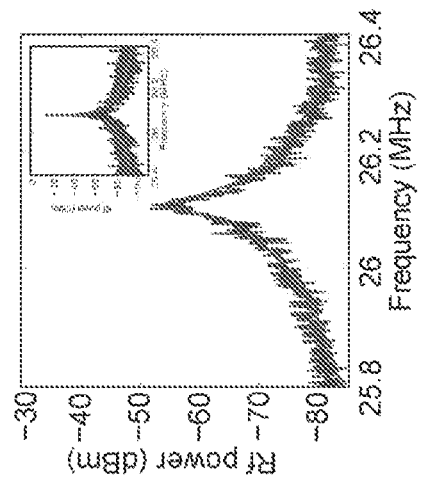
FIG. 23C
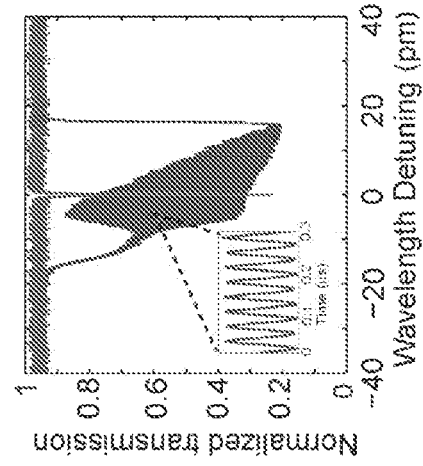
FIG. 23B

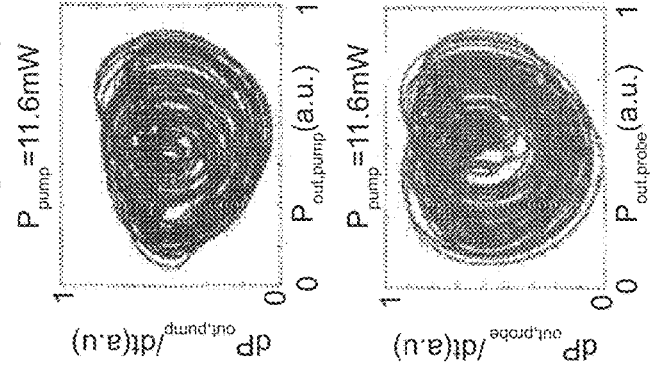
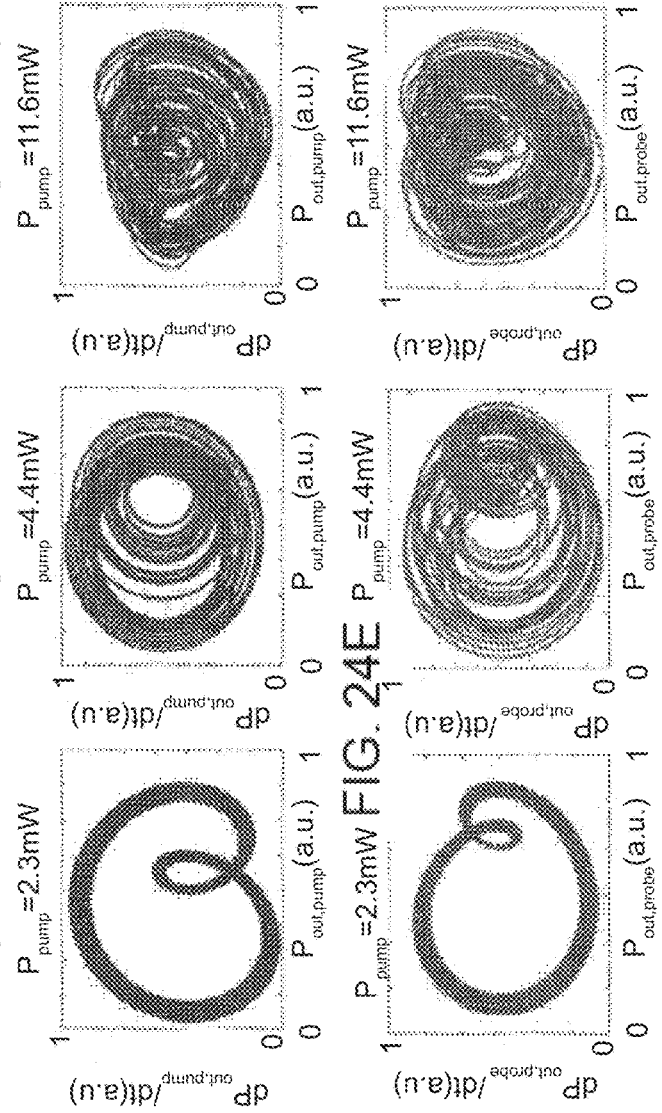
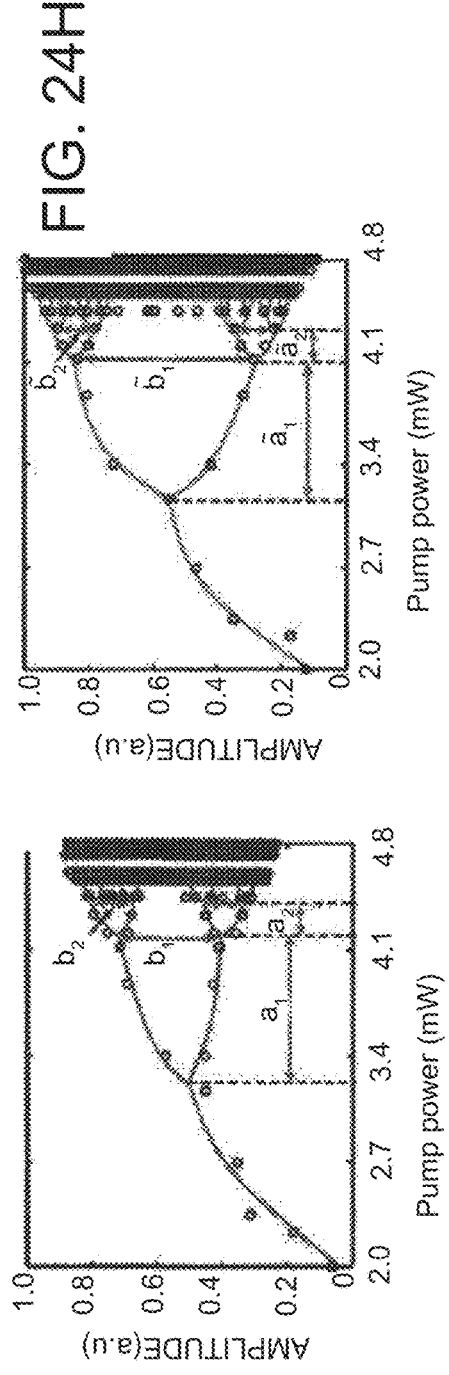
FIG. 24A  FIG. 24B  FIG. 24C
FIG. 24D  FIG. 24E  FIG. 24F
FIG. 24G
FIG. 24H

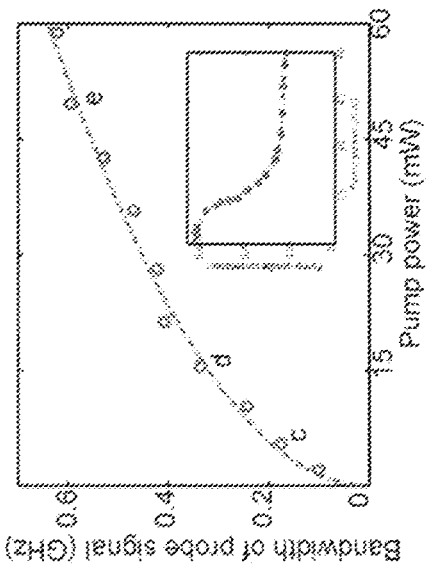
FIG. 25A
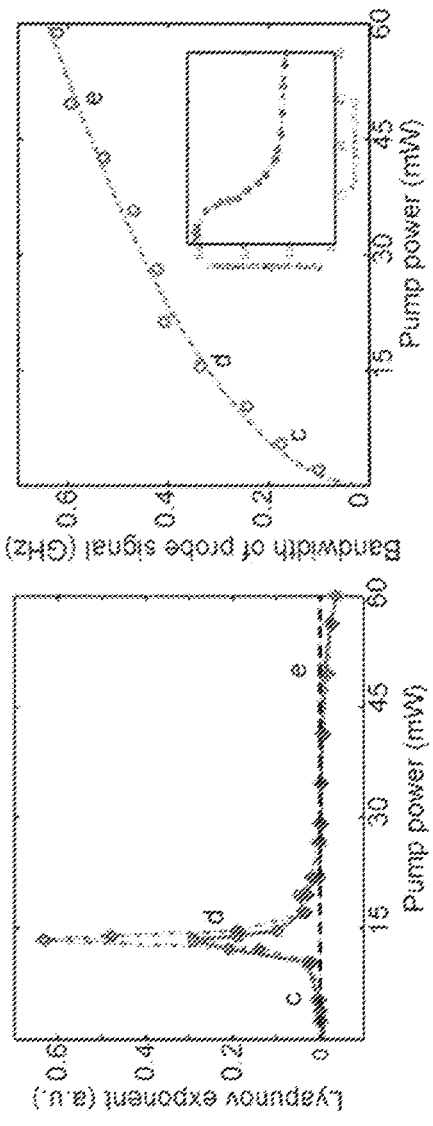
FIG. 25B
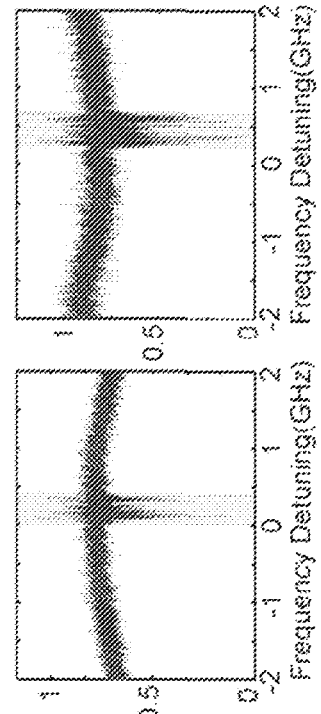
FIG. 25C
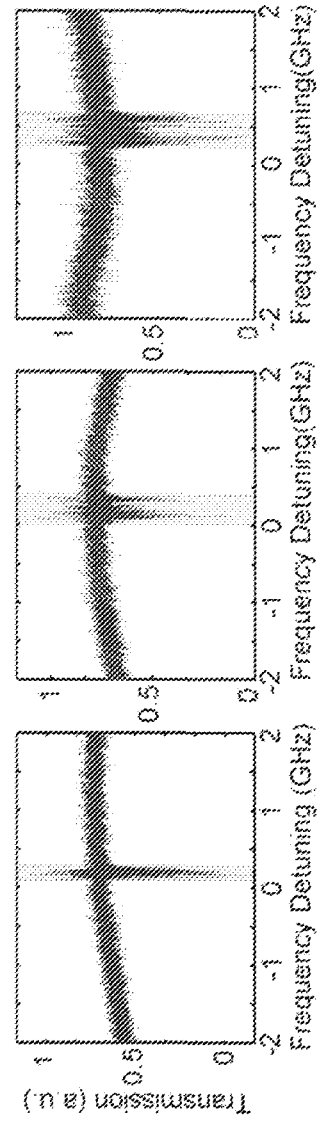
FIG. 25D
FIG. 25E

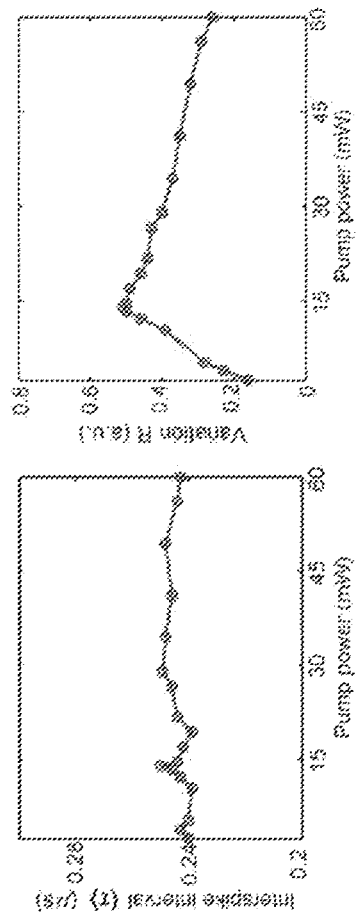
FIG. 34A
FIG. 34C
FIG. 34E
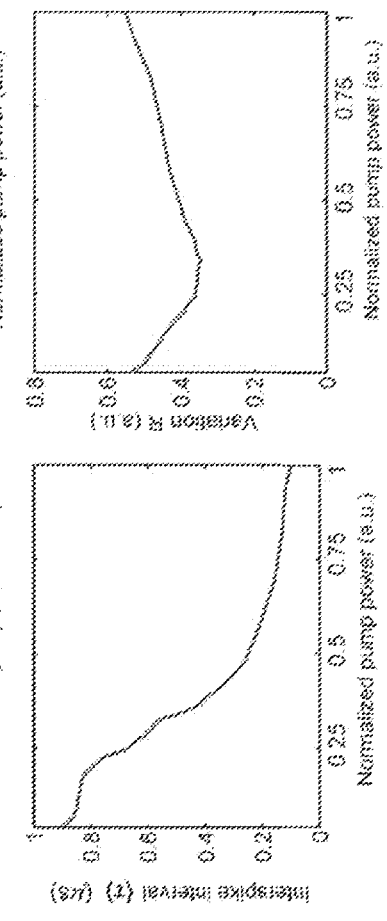
FIG. 34B
FIG. 34D
FIG. 34F

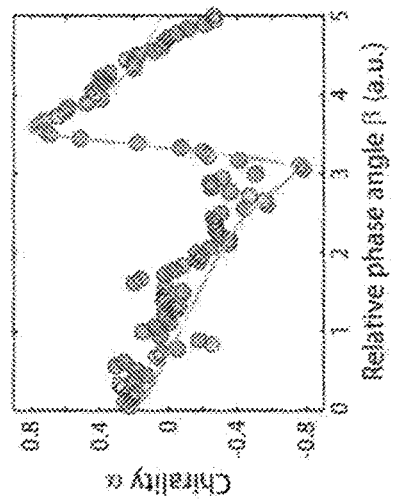
FIG. 37A
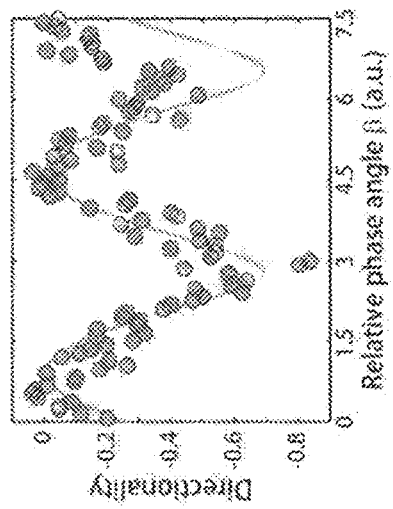
FIG. 37B
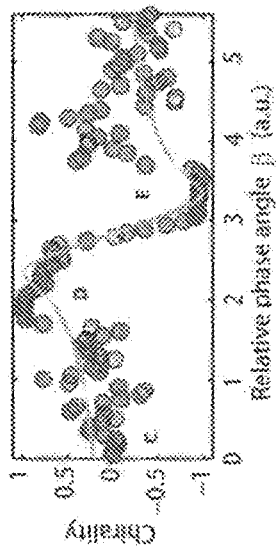
FIG. 38A
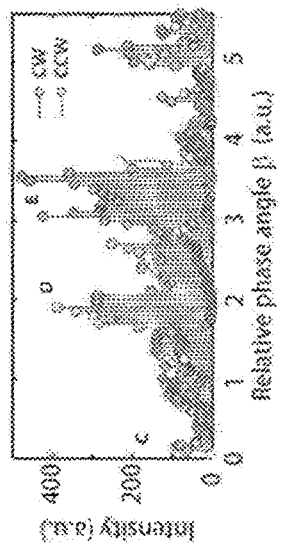
FIG. 38B
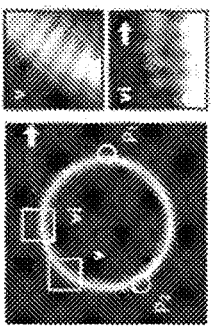
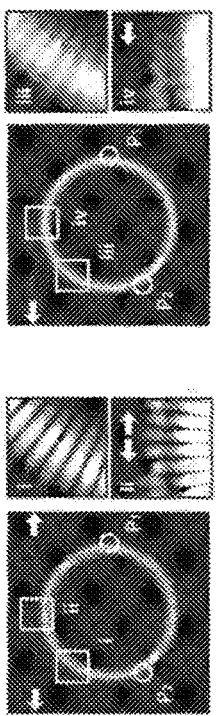
FIG. 38C FIG. 38D FIG. 38E

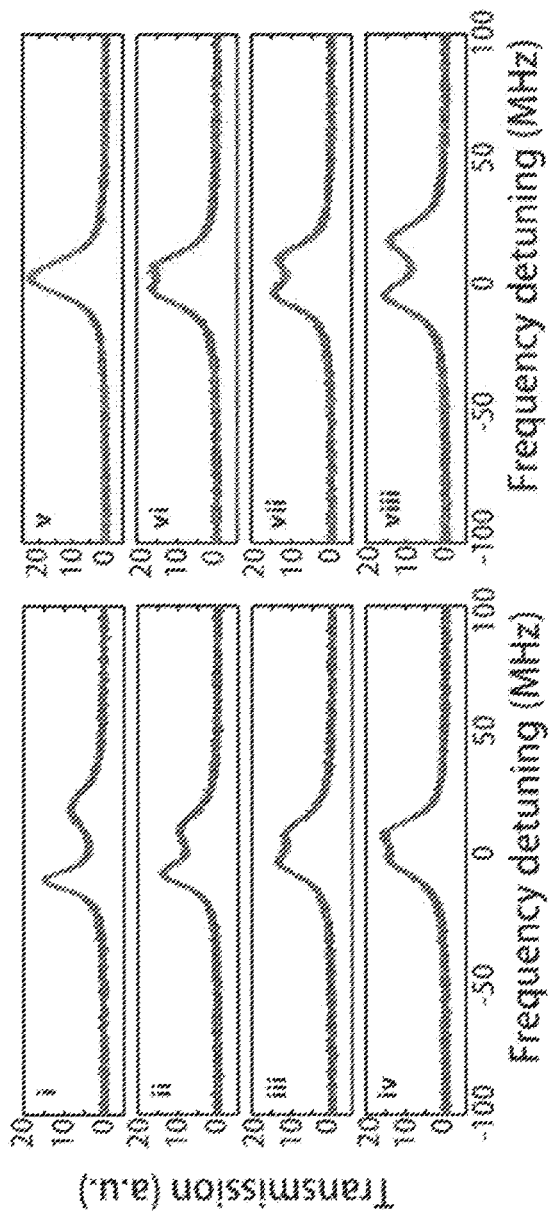

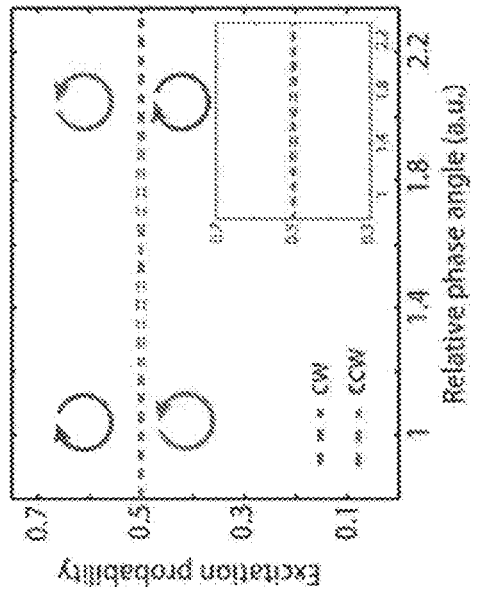
FIG. 44A
FIG. 44B
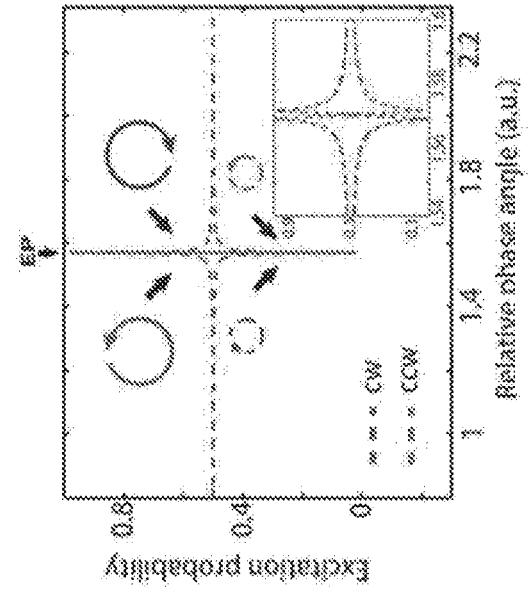
FIG. 44C
FIG. 44D

LOSS ENGINEERING TO IMPROVE SYSTEM FUNCTIONALITY AND OUTPUT

CROSS-REFERENCE TO RELATED APPLICATIONS

This application is a continuation of U.S. application Ser. No. 15/801,823 filed on Nov. 2, 2018, entitled MICRO-RESONATOR AND FIBER TAPER SENSOR SYSTEM. U.S. application Ser. No. 15/801,823 is a continuation of U.S. application Ser. No. 15/019,942 filed on Feb. 9, 2016, entitled MICRO-RESONATOR AND FIBER TAPER SENSOR SYSTEM. U.S. application Ser. No. 15/019,942 claims the benefit of U.S. Provisional Application No. 62/113,610, filed Feb. 9, 2015, entitled MICRORESONATOR AND FIBER TAPER BASED SENSOR SYSTEMS.

This application is also a continuation of U.S. application Ser. No. 14/659,427 filed on Mar. 16, 2015, entitled DETECTION OF NANO-SCALE PARTICLES WITH A SELF-REFERENCED AND SELF-HETERODYNED RAMAN MICRO-LASER. U.S. application Ser. No. 14/659,427 is a continuation-in-part of U.S. application Ser. No. 13/460,170 (now U.S. Pat. No. 9,012,830) filed Apr. 30, 2012, entitled SYSTEMS AND METHODS FOR PARTICLE DETECTION. U.S. application Ser. No. 13/460,170 is a continuation-in-part of U.S. application Ser. No. 12/966,785 (now U.S. Pat. No. 8,704,155) filed on Dec. 13, 2010, entitled NANOSCALE OBJECT DETECTION USING A WHISPERING GALLERY MODE RESONATOR. U.S. application Ser. No. 12/966,785 claims the benefit of U.S. Provisional Application No. 61/285,869 filed on Dec. 11, 2009, entitled NANOSCALE OBJECT DETECTION USING A WHISPERING GALLERY MODE RESONATOR.

This application is also a continuation of U.S. application Ser. No. 15/185,369 filed on Jun. 17, 2016, entitled LOSS ENGINEERING TO IMPROVE SYSTEM FUNCTIONALITY AND OUTPUT. U.S. application Ser. No. 15/185,369 claims the benefit of U.S. Provisional Application No. 62/181,180 filed Jun. 17, 2015, entitled LOSS ENGINEERING TO IMPROVE SYSTEM FUNCTIONALITY AND OUTPUT.

This application is also a continuation of U.S. application Ser. No. 15/430,426 filed Feb. 10, 2017, entitled OPTO-MECHANICAL SYSTEM AND METHOD HAVING CHAOS INDUCED STOCHASTIC RESONANCE AND OPTO-MECHANICALLY MEDIATED CHAOS TRANSFER. U.S. application Ser. No. 15/430,426 claims the benefit of U.S. Provisional Application No. 62/333,667 filed May 9, 2016, entitled OPTO-MECHANICAL SYSTEM AND METHOD HAVING CHAOS INDUCED STOCHASTIC RESONANCE AND OPTO-MECHANICALLY MEDIATED CHAOS TRANSFER and further claims the benefit of U.S. Provisional Patent Application No. 62/293,746, filed Feb. 10, 2016, entitled CHIRAL PHOTONICS AT EXCEPTIONAL POINTS.

This application is also a continuation of U.S. application Ser. No. 15/677,646 filed on Aug. 15, 2017, entitled TUNABLE ADD-DROP FILTER WITH AN ACTIVE RESONATOR. U.S. application Ser. No. 15/677,646 is a continuation of U.S. application Ser. No. 14/897,863 (now U.S. Pat. No. 9,766,402) filed Dec. 11, 2015, entitled TUNABLE ADD-DROP FILTER WITH AN ACTIVE RESONATOR. U.S. application Ser. No. 14/897,863 is a national stage application under 35 U.S.C. 371 of PCT Application No. PCT/US2014/041877 filed on Jun. 11, 2014, entitled TUNABLE ADD-DROP FILTER WITH AN ACTIVE RESONATOR. PCT Application No. PCT/US2014/041877 claims the benefit of U.S. Provisional Application No. 61/834,113 filed Jun. 12, 2013, entitled TUNABLE ADD-DROP FILTER WITH AN ACTIVE RESONATOR.

The contents of all aforementioned U.S. patents, U.S. patent applications, U.S. provisional patent applications, and PCT applications are hereby incorporated by reference herein in their entirety.

STATEMENT REGARDING FEDERALLY SPONSORED RESEARCH & DEVELOPMENT

This invention was made with government support under grant 0954941, DMR0907467, and 1264997 awarded by the National Science Foundation and grant W911NF-12-1-0026 awarded by the U.S. Army Research Office ARMY/ARO. The government has certain rights in the invention.

BACKGROUND

This technology relates generally to sensing micro and nanoscale particles, and more particularly, to nanoscale sensing and wave sensing/detection using micro-resonators.
Micro-Resonator and Fiber Taper Sensor System Interest in nanoparticle detection and characterization techniques has increased with the increasing awareness of the potential benefits and risks of the continuously generated byproduct or massively synthesized nano-particles. Nano-particles of special interests range from biological agents and virions to specially synthesized semiconductor, metal, and polymer nanoparticles. Detection and characterization of biological agents and virions is important for biodefense applications and early detection of pandemic outbreaks, while detection and characterization of synthesized nanoparticles is important for a broad range of applications in nanotechnology.

At least some known particle detection systems use conventional microscopic techniques which, despite their high sensitivity and resolution, may not be suitable for field measurements due to their expensive and bulky constructions, long processing times, and the necessity of pretreatment (labeling with fluorescent dyes, etc.) of the particles. Further, at least some known optical particle counters use light scattering measurements to allow field measurements and detect and count individual particles or groups of particles. These counters generally require off-axis detectors for the collection of the scattered light, bulky configurations, and relatively sophisticated signal processing components.

There is a growing interest for nanoparticle detection using nano and micro-scale sensors, which, with relatively high sensitivity, also have the potential for in-situ sensing. Some nano/micro-scale sensors detect particles by monitoring resonance frequency changes caused by additional effective mass of binding particles, while resonator-based micro/nano-optical resonator sensors rely on either resonance frequency shift or mode splitting due to changes in the effective polarizability of the resonator system upon particle binding. Optical devices fundamentally rely upon interactions between light and the matter being detected. The more increase in light to matter interaction new phenomena can be detected because of higher resolution and as a result new functionalities of these sensors can be developed. For micro-resonators interactions increase because light circulates in a resonator multiple times with minimal loss.

Photonic technologies on one hand have brought about new concepts in materials and devices such as photonic crystals and meta materials, and, on the other hand, brought about the realization and testing of century-old well known theories such as quantum theory, plasmonics and whispering galleries which have been enjoying many benefits of recent developments in enabling technologies and fabrication techniques. Since its first explanation in acoustic regime by Lord Rayleigh in London's St Paul's Cathedral, Whispering Gallery Mode (WGM) phenomenon has been explored in various optical structures for a variety of applications, opening unprecedented and unforeseen directions in optical sciences.

Resonator-based sensors have shown to detect and count individual nanoparticles having a radius as small as radius 30 nanometers (nm). This high sensitivity is attributed to the resonance-enhanced interaction between the particle and the evanescent tail of the light field due to tight light confinement and extended interaction time provided by the resonator. These sensors generally require a fiber taper to couple the light into and out of the resonator from a tunable laser, whose wavelength is continuously scanned to monitor the changes in the resonance modes, thus making these highly compact and sensitive sensors relatively expensive.

An optical cavity, also called an optical resonator, is an arrangement of minors that forms a standing wave cavity resonator for light waves. Optical cavities are a major component of lasers, surrounding the gain medium and providing feedback of the laser light. Light confined in the cavity reflects multiple times producing standing waves for certain resonant frequencies. The standing wave patterns produced are called "modes". Longitudinal modes differ only in frequency while transverse modes differ for different frequencies and have different intensity patterns across the cross-section of the beam. Constructive or destructive interference between multiple reflections between two or more reflecting surfaces can occur. Resonance Condition 2 nL=mλ.

To understand how optical ring resonators work, one must first understand the optical path length difference (OPD) of a ring resonator. This is given as follows for a single-ring ring resonator:

$$OPD=2\pi r n_{eff}$$

where r is the radius of the ring resonator and $n_{eff}$ is the effective index of refraction of the waveguide material. Due to the total internal reflection requirement, $n_{eff}$ must be greater than the index of refraction of the surrounding fluid in which the resonator is placed (e.g. air). For resonance to take place, the following resonant condition must be satisfied:

$$OPD=m\lambda_m$$

where $\lambda_m$ is the resonant wavelength and m is the mode number of the ring resonator. This equation means that in order for light to interfere constructively inside the ring resonator, the circumference of the ring must be an integer multiple of the wavelength of the light. As such, the mode number must be a positive integer for resonance to take place. As a result, when the incident light contains multiple wavelengths (such as white light), only the resonant wavelengths will be able to pass through the ring resonator fully.

The quality factor of an optical resonator can be quantitatively described using the following formula:

$$\text{Quality Factor: } Q = 2\pi \frac{\text{stored energy}}{\text{energy lost per cycle}}$$

The quality factor is useful in determining the spectral range of the resonance condition for any given ring resonator. The quality factor is also useful for quantifying the amount of losses in the resonator as a low Q factor is usually due to large losses.

WGMRs are a type of optical cavity resonator but they do not have mirrors (i.e., mirror-less cavities). WGMRs can support two counter-propagating modes at the same resonance frequencies. Unless these counter-propagating modes are coupled strongly to each other (for example by scattering via defect centers, scatterers or structural inhomogeneities), the wave inside a WGMR is a travelling wave. When the counter propagating modes are coupled to each other, they form a standing wave mode. Interaction strength in a microresonator is a function of the spectral Quality Factor (Q) and Spatial Volume (V), which will define the energy density within the cavity. It is desirable to have a high Q, while maintaining a smaller mode volume V.

Whispering-gallery waves, (i.e. whispering-gallery modes), are a type of wave that can travel around a concave surface. Whispering-gallery waves exist for light and sound waves. While they propagate light and sound waves (i.e., any type of waves), they form patterns called modes. Optical whispering-gallery-modes have been produced in microscopic glass spheres, micro-disks, micro-toroid, micro-bottle, and similar structures, for example, with applications in lasing and sensing. In such structures, the light waves are almost perfectly guided by optical total internal reflection, leading to Q factors in excess of $10^{10}$ being achieved. Whispering Gallery Mode Resonators (WGMRs) resonate, i.e. have a tendency to oscillate with greater amplitude at some frequencies more so than at others, at certain frequencies. Frequencies at which the response amplitude is a relative maximum are known as the system's resonant frequencies, or resonance frequencies. At these frequencies, even small periodic driving forces can produce large amplitude oscillations, because the system stores energy.

Whispering-gallery-mode (WGM) micro-resonators with their high quality factor, Q, and small mode volume, V, are known to enhance light-matter interactions and have extraordinary sensitivities to changes and perturbations in their structure or proximity. They have been of great interest for sensing biomarkers, DNA, and medium-size proteins at low concentrations, as well as for detecting viruses and nanoparticles at single-particle resolution. A particle or molecule entering the mode volume of a resonator or binding onto its surface induces a net change in the polarizability of the resonator-surrounding system and perturbs its optical properties. This manifests itself as a shift of the resonance frequency, broadening of the resonance linewidth, or formation of a doublet via mode splitting depending on the interaction strength and the scattering and absorption properties of the binding particle or the molecule.

In WGM sensors, the fundamental limit of sensitivity is determined by Q/V, which quantifies the strength of the interaction between the particle and the cavity field. Thus, it can be improved by decreasing V or increasing Q. One can increase Q by compensating for the losses and decrease V by shrinking the size of the WGM resonator (WGMR). However, decreasing the resonator size below a critical value inevitably increases bending losses and eventually decreases Q. Instead, hybrid systems combining high-Q WGMs with highly confined (small-V) localized plasmons have been demonstrated, achieving detection of single proteins and very small viruses. Q enhancement of WGM resonances by compensating losses via optical gain has also been demonstrated in silica micro-toroids doped with rare-earth ions such as erbium (Er3+) and ytterbium (Yb3+). Resonators with optical gain are referred to as active resonators.

Optical whispering-gallery-mode resonators (WGMRs) have emerged as promising platforms for label-free detection of nano-objects. The ultimate sensitivity of WGMRs is determined by the strength of the light-matter interaction quantified by quality factor/mode volume, Q/V, and the resolution is determined by Q.

The less energy lossed during light circulation within the resonator, the higher the Quality factor. The Electric Field in the cavity can be defined by:

$$E(t) = E0\exp\left(i\omega t - \frac{\omega}{2Q}t\right) \Rightarrow$$

$$|E(\omega)|^2 \propto \frac{1}{(\omega - \omega 0) + (\omega 0/2Q)^2} \Rightarrow$$

Linewidth of a resonance: $\Delta\omega = \omega_0/Q$

Quality Factor $Q = \omega_0/\Delta\omega$

To improve the sensitivity and the precision of detection, WGMRs have been either doped with rare-earth ions to compensate for losses and increase Q; or plasmonic resonances have been exploited for their superior field confinement and lower V. In addition to rare-earth ions, previous whispering gallery mode (WGM) micro-laser based particle detection methods utilized quantum dot(s) or optical dye(s) as dopant(s) into the WGM resonator. Use of dopants make the fabrication process complicated (i.e., one has to find ways of doping the resonators), costly (rare-earth ions, quantum dots and dyes are expensive, and new fabrication processes add to the cost) and introduce biocompatibility issues.

For example, silica is a biocompatible material; however, rare-earth-ions are not biocompatible. Therefore, doping silica WGM resonator with a rare-earth-ion destroys biocompatibility. Moreover, each rare-earth ion, quantum dot or optical dye can be used only for a specific wavelength band (each has its own pump laser wavelength band and emission band). For each different wavelength band of operation a different rare-earth ion and a different pump laser should be used. The benefit of ultra-high Q silica micro-cavities can be seen by examining the cavity power build-up factor.

$$B = \frac{P_{cav}}{P_{in}} = \frac{\lambda Q}{2\pi^2 nD}$$

And the cavity photon lifetime:

$$\tau = \frac{Q}{\omega}$$

$Q=1\times10^8$, $D=50$ μm, $V_m=650$ μm$^3$ => $B=1.1\times10^5$
$P_{in}=1$ mW => $P_{cav}$~110 W, $I_{cav}$~2.5 GW/cm$^2$,
$\tau$~100 ns, # of round trip~$2\times10^5$.

Recent advances in fabrication techniques and material sciences have helped to achieve Whispering Gallery Mode Resonators (WGMRs) with ultra-high-quality (Q) factors and nano/micro-scale mode volumes (V), which in turn have enabled novel applications and devices such as ultra-low threshold on-chip micro-lasers, narrowband filters and modulators for optical communication, high performance optical sensors achieving label free detection at single-particle resolution, cavity opto-mechanics, and quantum electrodynamics. The Q factor or quality factor is a dimensionless parameter that describes how under-damped an oscillator or resonator is, or equivalently, characterizes a resonator's bandwidth relative to its center frequency. Higher Q indicates a lower rate of energy loss relative to the stored energy of the oscillator, i.e., the oscillations die out more slowly.

When such a WGMR is optically pumped above lasing threshold, the resultant laser has a narrower linewidth than the cold cavity and thereby improves the detection limit and sensitivity beyond what can be achieved by the passive (no optical gain-providing mechanism) or by the active resonator below the lasing threshold. However, fabricating WGM-plasmon hybrids and active WGMRs with dopants introduces additional processing steps and costs. For example, WGM-plasmon hybrids require preparation and adsorption of plasmonic nano-structures onto the resonator surface, and active resonators suffer from the fact that most rare-earth ions are not biocompatible and that for each different wavelength band of operation a different rare-earth ion and a different pump laser should be used. It is desirable to accomplish label free real-time detection and sensing of nano-scale particles with minimum assumptions surrounding shape, RI, viscosity, or thermal characteristics. It is desirable that the sensing system would be highly accurate and have high resolution with a single particle and with a small sample size with a large dynamic range and that is able to work in an air or aqueous environment. Various system and method for leveraging the favorable characteristics of WGMRs continue to emerge. The subject matter of this application addresses applications of these favorable characteristics.

Detection of Nano-Scale Particles with a Self-Referenced and Self-Heterodyned Raman Micro-Laser With recent progress in nanotechnology, nanoparticles of different materials and sizes have been synthesized and engineered as key components in various applications ranging from solar cell technology to the detection of biomolecules. Meanwhile, nanoparticles generated by vehicles and industry have become recognized as potential threats to health and environment. Microscopy and spectroscopy techniques have played central roles in single nanoparticle/molecule detection. However, their widespread use has been limited by bulky and expensive instrumentation, long processing time, and/or the need for labeling. Light scattering techniques, while suitable for label-free detection, are hindered by the extremely small scattering cross-sections of single nanoparticles.

Interest in nanoparticle detection and characterization techniques has increased with the increasing awareness of the potential benefits and risks of the continuously generated byproduct or massively synthesized nano-particles. Nanoparticles of special interests range from biological agents and virions to specially synthesized semiconductor, metal, and polymer nanoparticles. Detection and characterization of biological agents and virions is important for biodefense applications and early detection of pandemic outbreaks, while detection and characterization of synthesized nanoparticles is important for a broad range of applications in nanotechnology.

At least some known particle detection systems use conventional microscopic techniques which, despite their high sensitivity and resolution, may not be suitable for field measurements due to their expensive and bulky constructions, long processing times, and the necessity of pretreatment (labeling with fluorescent dyes, etc.) of the particles. Further, at least some known optical particle counters use light scattering measurements to allow field measurements and detect and count individual particles or groups of particles. These counters generally require off-axis detectors for the collection of the scattered light, bulky configurations, and relatively sophisticated signal processing components.

There is a growing interest for nanoparticle detection using nano and micro-scale sensors, which, with relatively high sensitivity, also have the potential for in-situ sensing. Some nano/micro-scale sensors detect particles by monitoring resonance frequency changes caused by additional effective mass of binding particles, while resonator-based micro/nano-optical resonator sensors rely on either resonance frequency shift or mode splitting due to changes in the effective polarizability of the resonator system upon particle binding. Resonator-based sensors have shown to detect and count individual nanoparticles having a radius as small as radius 30 nanometers (nm). This high sensitivity is attributed to the resonance-enhanced interaction between the particle and the evanescent tail of the light field due to tight light confinement and extended interaction time provided by the resonator. These sensors generally require a fiber taper to couple the light into and out of the resonator from a tunable laser, whose wavelength is continuously scanned to monitor the changes in the resonance modes, thus making these highly compact and sensitive sensors relatively expensive.

Optical whispering-gallery-mode resonators (WGMRs) have emerged as promising platforms for label-free detection of nano-objects. The ultimate sensitivity of WGMRs is determined by the strength of the light-matter interaction quantified by quality factor/mode volume, Q/V, and the resolution is determined by Q. To date, in order to improve the sensitivity and the precision of detection, WGMRs have been either doped with rare-earth ions to compensate for losses and increase Q; or plasmonic resonances have been exploited for their superior field confinement and lower V. In addition to rare-earth ions, previous whispering gallery mode (WGM) micro-laser based particle detection methods utilized quantum dot(s) or optical dye(s) as dopant(s) into the WGM resonator. Use of dopants make the fabrication process complicated (i.e., one has to find ways of doping the resonators), costly (rare-earth ions, quantum dots and dyes are expensive, and new fabrication processes add to the cost) and introduce biocompatibility issues.

For example, silica is a biocompatible material; however, rare-earth-ions are not biocompatible. Therefore, doping silica WGM resonator with a rare-earth-ion destroys biocompatibility. Moreover, each rare-earth ion, quantum dot or optical dye can be used only for a specific wavelength band (each has its own pump laser wavelength band and emission band). For each different wavelength band of operation a different rare-earth ion and a different pump laser should be used.

Whispering-gallery-mode (WGM) micro-resonators with their high quality factor, Q, and small mode volume, V, are known to enhance light-matter interactions and have extraordinary sensitivities to changes and perturbations in their structure or proximity. They have been of great interest for sensing biomarkers, DNA, and medium-size proteins at low concentrations, as well as for detecting viruses and nanoparticles at single-particle resolution. A particle or molecule entering the mode volume of a resonator or binding onto its surface induces a net change in the polarizability of the resonator-surrounding system and perturbs its optical properties. This manifests itself as a shift of the resonance frequency, broadening of the resonance linewidth, or formation of a doublet via mode splitting depending on the interaction strength and the scattering and absorption properties of the binding particle or the molecule.

In WGM sensors, the fundamental limit of sensitivity is determined by Q/V, which quantifies the strength of the interaction between the particle and the cavity field. Thus, it can be improved by decreasing V or increasing Q. One can increase Q by compensating for the losses and decrease V by shrinking the size of the WGM resonator (WGMR). However, decreasing the resonator size below a critical value inevitably increases bending losses and eventually decreases Q. Instead, hybrid systems combining high-Q WGMs with highly confined (small-V) localized plasmons have been demonstrated, achieving detection of single proteins and very small viruses. Q enhancement of WGM resonances by compensating losses via optical gain has also been demonstrated in silica micro-toroids doped with rare-earth ions such as erbium ($Er^{3+}$) and ytterbium ($Yb^{3+}$). Resonators with optical gain are referred to as active resonators.

When such a WGMR is optically pumped above lasing threshold, the resultant laser has a narrower linewidth than the cold cavity and thereby improves the detection limit and sensitivity beyond what can be achieved by the passive (no optical gain-providing mechanism) or by the active resonator below the lasing threshold. However, fabricating WGM-plasmon hybrids and active WGMRs with dopants introduces additional processing steps and costs. For example, WGM-plasmon hybrids require preparation and adsorption of plasmonic nano-structures onto the resonator surface, and active resonators suffer from the fact that most rare-earth ions are not biocompatible and that for each different wavelength band of operation a different rare-earth ion and a different pump laser should be used. A better system and method for leveraging the favorable characteristics of WGMRs is needed.

Loss Engineering to Improve System Functionality and Output

Loss can be a problem in any physical system, and in particular loss can be a problem in photonic system devices and laser system devices. Optical communication or particle detection systems are a few examples of physical systems that experience problems with loss. Controlling and reversing the effects of loss in a physical system and providing sufficient gain to overcome losses can pose a challenge with any physical system, particularly in optical systems. This is especially true for laser based optical systems, for which the losses need to be overcome by a sufficient amount of gain to reach a lasing threshold.

Dissipation is ubiquitous in nature; and is essentially in all physical systems, and dissipation can be described by a non-Hermitian Hamiltonian featuring complex eigenvalues whose imaginary part may be associated with dissipation and featuring non-orthogonal eigenstates. Dissipation is the result of an inevitable and irreversible process that takes place in physical systems including chemical, electrical, optical, fluid flow, thermodynamic, photonic, plasmonic laser and other physical systems. A dissipative process is a process in which energy (internal, bulk flow kinetic, or system potential) is transformed from an initial form or state to a final form or state, where the capacity of the final form to do mechanical work or to perform the intended purpose is less than that of the initial form.

Opto-Mechanical System and Method Having Chaos Induced Stochastic Resonance and Opto-Mechanically Mediated Chaos Transfer Chaotic dynamics has been observed in various physical systems and has affected almost every field of science. Chaos involves hypersensitivity to initial conditions of the system and introduces unpredictability to the system's output; thus, it is often unwanted. Chaos theory studies the behavior and condition of dynamical deterministic systems that are highly sensitive to initial conditions. Small differences in initial conditions (such as those due to rounding errors in numerical computation) yield widely diverging and random outcomes for such dynamical systems. This happens even though these systems are deterministic, meaning that their future behavior is fully determined by their initial conditions, with no random elements involved. In other words, the deterministic nature of these systems does not make them predictable. This behavior is known as deterministic chaos, or simply chaos.

Again, chaos is usually perceived as not being desirable. Therefore, using chaos, for example, to induce stochastic resonance in a physical system has not been significantly explored. Stochastic resonance is a phenomenon where a signal that is normally too weak to be detected by a sensor, can be boosted by adding white noise to the signal, which contains a wide spectrum of frequencies. The frequencies in the white noise corresponding to the original signal's frequencies will resonate with each other, amplifying the original signal while not amplifying the rest of the white noise (thereby increasing the signal-to-noise ratio which makes the original signal more prominent). Further, the added white noise can be enough to be detectable by the sensor, which can then be filtered out to effectively detect the original, previously undetectable signal. Stochastic resonance is observed when noise added to a system changes the system's behavior in some fashion. More technically, SR occurs if the signal-to-noise ratio of a nonlinear system or device increases for moderate values of noise intensity. It often occurs in bistable systems or in systems with a sensory threshold and when the input signal to the system is "sub-threshold". For lower noise intensities, the signal does not cause the device to cross the threshold, so little signal is passed through it. For large noise intensities, the output is dominated by the noise, also leading to a low signal-to-noise ratio. For moderate intensities, the noise allows the signal to reach threshold, but the noise intensity is not so large as to swamp it. Stochastic resonance can be realized in chaotic systems, however, given the perceived undesirable nature of chaos, chaos induced stochastic resonance has not been significantly explored.

One type of physical system where chaotic oscillations can occur is that of opto-mechanical resonators. Micro- and nano-fabricated technologies, which have enabled the creation of novel structures in which enhanced light-matter interactions result in mechanical deformations and self-induced oscillations via the radiation pressure of photons are one type of opto-mechanical resonator. Suspended mirrors, whispering-gallery-mode (WGM) microresonators (e.g., microtoroids, microspheres, and microdisks), cavities with a membrane in the middle, photonic crystals zipper cavities are examples of such opto-mechanical systems where the coupling between optical and mechanical modes have been observed. These have opened new possibilities for fundamental and applied research. For example, they have been proposed for preparing non-classical states of light, high precision metrology, phonon lasing and cooling to their ground state. The nonlinear dynamics originating from the coupling between the optical and mechanical modes of an opto-mechanical resonator can cause both the optical and the mechanical modes to evolve from periodic to chaotic oscillations. However, again, chaos has been perceived to be undesirable in such systems.

Opto-mechanical chaos and the effect on an opto-mechanical system is a relatively unexplored area. Despite recent progress and interest in the involved nonlinear dynamics, optomechanical chaos remains largely unexplored experimentally. Further advancement is needed for the utilization and leveraging of chaos to induce stochastic resonance in optomechanical systems, which can advance the field and could be useful for high-precision measurements, for fundamental tests of nonlinear dynamics and other industrial applications.

Further, in the past few years exciting progress has been made surrounding novel devices and functionalities enabled by new discoveries and applications of non-Hermitian physics in photonic systems. Exceptional points (EPs) are non-Hermitian degeneracies at which the eigenvalues and the corresponding eigenstates of a dissipative system coalesce when parameters are tuned appropriately. EPs universally occur in all open physical systems and dramatically affect their behavior, leading to counterintuitive phenomena such as loss-induced lasing, unidirectional invisibility, PTsymmetric lasers, just to name a few of the phenomena that have raised much attention recently. For example, a work on PT-symmetric microcavities and nonreciprocal light transport published in Nature Physics, 10, 394-398 (May 2014) has received broad media coverage and scientific interest, and has been cited several times by researchers coming from various fields, including optics, condensed matter, theoretical physics, and quantum mechanics.

Tunable Add-Drop Filter with an Active Resonator

Optical add-drop filters (ADFs) have been utilized in applications ranging from optical communication (e.g., modulators, multiplexers, and switches) to optical sensing. These devices typically include two waveguides and a filter. For communication applications, it is important that ADFs have high add-drop efficiencies, low crosstalk, filter tunability to select different wavelengths to add and/or drop, and even different bandwidths. In at least some known systems, Bragg gratings, photonic crystal structures, and whispering gallery mode (WGM) ring resonators have been used as filter components in ADFs. With their micro-scale size, ultra-high quality (Q) factor (which translates into narrow bandwidth), and large free spectral range, WGM resonators have emerged as a relatively attractive candidate for ADFs. However, in addition to fabrication challenges, two problems encountered by at least some known ADFs including WGM resonators are the non-unitary add-drop efficiencies and differences in the efficiencies and crosstalks of the add and drop channels.

Accordingly, current technologies may suffer from significant crosstalk and low drop efficiency, resulting in relatively high losses. Furthermore, at least some known ADFs are not optically tunable. Rather, in at least some known ADFs, bandwidth and frequency tuning may be performed by varying a refractive index of a polymer coating of the WGM resonator, or by directly heating the resonator.

BRIEF SUMMARY

Micro-Resonator and Fiber Taper Sensor System

The technology as disclosed uses mode splitting or frequency shift methods for particle sensing. Particle selectivity can be based on a polarization measurement which can be performed on each detected particle with single-shot measurement. Also, it is possible to develop portable and on chip sensors based on micro-resonator technology.

Use of a polarizer to operate on a laser can provide for greater mode selection and optimize performance.

Mode splitting in high-Q WGM resonators is an alternative to resonance-frequency-shift method and has been demonstrated to yield label-free and highly sensitive detection of particles with radii as small as 30 nm with single particle resolution. Mode splitting occurs due to the coupling of counter-propagating doubly degenerate WGMs via the scattering of light from a sub-wavelength scatterer entering the resonator mode volume. This modal coupling lifts the degeneracy and creates two standing wave modes whose resonance frequencies and linewidths differ by $$2|g|=-\alpha f^2(r)\omega/V \text{ and}$$

$$2\Gamma_R=-\alpha^2 f^2(r)\omega^4/(3\pi v^3 V), \text{ respectively.}$$

Here, the polarizability a is defined as $\alpha=4\pi R^3 (n^2-n_e^2)/(n^2+2n_e^2)$ for a single particle of radius R and refractive index n in the surrounding medium of refractive index ne, $f^2(r)$ is the normalized mode distribution, v is the speed of light in the medium, and $\omega=2\pi c/\lambda$ is the angular frequency of the resonant, $\lambda$ and c being the wavelength of WGM before splitting and the speed of light in vacuum, respectively. Polarizability of a scatterer is calculated as $\alpha=-(\Gamma/g)(\lambda/n_e)(3/8\pi^2)$ from which one can estimate the size. Advantages of mode splitting method over the resonance-frequency-shift method are the accurate estimation of the size regardless of the location of the particle in the resonator mode volume and the robustness of the mode splitting spectra against interfering perturbations (e.g., laser and detector noises, temperature fluctuations which uniformly affect the resonator).

Mode splitting can be leveraged in air where it is easier to satisfy the mode splitting resolvability criterion $2|g|>\Gamma+(w/Q)$ as well as in aqueous environments. Mode splitting in aqueous environments allow for diverse applications, such as bio-chemical and bio-molecular sensing, detection and characterization of nanoparticles in liquid solutions.

One implementation of the technology is a particle sensing apparatus including a processor and a memory having data representative of plurality of polarizability values for a plurality of common air pollutants and the memory can have a selection algorithm. The technology can include a tunable laser, a mode-splitting based whispering gallery mode micro-resonator, and a coupled waveguide configured to transition the tunable laser in and out resonance modes. A photodetector can be configured to detect a laser signal output at an output port of the coupling waveguide and said photodetector having a detector output signal representative of the detected laser signal output. The processor can be configured to process the selection algorithm to analyze a transmission spectrum of the detector output signal, thereby deriving a detected polarizability value and selecting a matching polarizability value from the plurality of polarizability values.

One implementation of the technology can include a particle sensing apparatus including a tunable micro-laser, a mode splitting based whispering gallery mode micro-resonator and a coupling waveguide configured to transition the tunable laser in and out resonance modes. The combination can be embedded in a gas permeable encapsulation material. A photodetector can be configured to detect a laser signal output at an output port of the coupling waveguide and said photodetector configured to detect one or more of a resonance shift in a transmission spectrum and change in the mode pattern and said photo detector configured to output a signal indicative of the presence of a gas if one or more of a resonance shift in a transmission spectrum and change in the mode pattern is detected.

One implementation of the technology can include a particle sensing apparatus including a processor and a memory having data representative of plurality of speckle pattern changes for a plurality of common external perturbations and the memory can have a selection algorithm stored thereon. The technology can include a mode splitting based whispering gallery mode micro-resonator and a coupled tapered waveguide connected to a multimode fiber. A photodetector can be configured to detect an output signal at an output port of the coupled waveguide and said photodetector can be configured to detect a speckle pattern. The processor can be configured to process the selection algorithm to analyze a transmission spectrum of the detector output signal, thereby deriving a detected speckle patter change and selecting a matching speckle pattern change from the various speckle pattern changes.

On implementation of the technology can include a particle sensing apparatus including an ultra-narrow linewidth micro-laser, a mode-splitting based whispering gallery mode micro-resonator, and a coupled tapered waveguide configured to transition the ultra-narrow linewidth micro-laser laser in and out resonance modes. The whispering gallery mode micro-resonator can have a functionalized surface selected from one or more of an antibody bound on the surface, where said antibody is configured to bind with an antigen and a chemical configured to bind with a molecule. A photodetector can be configured to detect an output signal at an output port of the coupled waveguide and said photodetector configured to detect a frequency shift indicative of change in refractive index due to the functionalized surface.

One implementation of the technology can include an opto-electronic board including a laser source, data-acquisition card/function, detectors, polarization controller that can be connected to optical resonators to form a compact/portable resonator system. Such a system can be used for various applications including the one noted above. Examples include portable sensors, compact optical filters, a reference to lock and stabilize a laser with broad linewidth, and a portable laser source. Through an analog to digital converter, wireless signals can be generated and received by consumer products, such as laptops and phones.

For each of the implementations herein, where a coupling waveguide is referred, any comparable coupling medium can be utilized including, fiber tip, tapered fiber, angled polished fiber and even a free space medium for coupling light to a resonator. Coupling efficiency with tapered fibers can reach values as high as 99%. However, achieving this coupling and maintaining it for long durations require active stabilization and precise alignment with nano-positioning systems, because coupling conditions are prone to environmental perturbations (e.g., air flow and mechanical vibrations). This significantly limits the practical use of fiber-taper-coupled WGMRs. Alternative to evanescent coupling techniques is fabricating asymmetric WGMRs such as spiral, stadium, ellipsoid, quadrupole and limaco. There are also studies with well-known symmetric WGMRs, such as microspheres, micro-disks and micro-toroids, where circular symmetry is lifted by introducing controlled deformations either after the WGMRs are fabricated or during lithographic patterning.

Free-space coupling into and directional emission from deformed/asymmetric resonators are possible due to the dynamic tunneling between the co-existing chaotic and regular WGM modes, which help the light to escape from or couple into the resonator along the direction of deformation. Coupling of free space light into such resonators still remains as a challenge, mostly because it relies significantly on precise alignment of the focused free-space light on the cavity edge along the direction of deformation, which require optical and mechanical systems with high angular and translational resolution. These unavoidably make the system bulky and difficult to move out of the lab environment. Moreover, with the exception of a few studies, such cavities suffer from significant Q degradation as the degree of deformation is increased.

The technology as disclosed herein can utilize in lieu of a traditional waveguide a coupling medium such as a system and method for interfacing an optical cavity resonator, including a Whispering Gallery Mode micro-resonator, and free space light with cavity enhanced Rayleigh scattering. A system and method to couple light into whispering gallery micro-cavities/micro-resonators is disclosed.

The technology as disclosed uses scatterer induced coupling to interface free space light to whispering gallery modes of a micro-cavity. The technology establishes an interface between the free space light and the WGMs of resonators. This interface is formed by directly depositing nano-scatterers or nano-particles onto the WGMR. As demonstrated by testing, each of the nano-particles deposited on the resonator surface effectively act as a nano-coupler to couple free space light into WGMs without additional bulk optical components and precise alignment processes. One test configuration disclosed herein demonstrates lasing in an Ytterbium (Yb3+) doped silica micro-toroid.

The nano-scale interface between the micro-scale WGMR and the free-space light field utilizes cavity-enhanced Rayleigh scattering. The hybrid micro-resonator-nanoparticle system, as disclosed, enables the collection of a large fraction of the scattered light into the cavity mode via Purcell enhancement, and has the ability to harvest even weak light fields. The rate of spontaneous emission depends partly on the environment of a light source. This means that by placing the light source in a special environment, the rate of spontaneous emission can be modified. There is an enhancement of spontaneous emission rates of atoms when they are matched in a resonant cavity, which can generally be referred to as the Purcell Effect.

The nano-coupler scheme as disclosed brings together and leverages on various fundamental elements, which can include the following. First, the coupling of an emitter to a cavity mode enhances its spontaneous emission rate by increasing the local density of the modes, implying that the emitter will emit mostly into the cavity modes and with a much faster rate than in a vacuum. This enhancement is proportional to Q/V and is known as a Purcell enhancement factor. Second, a subwavelength particle (i.e., the nano-coupler) can be treated as an oscillating dipole, with the dipole moment induced by the electric field of the incident light, radiating into the surrounding space (i.e., Rayleigh scattering).

For the micro-resonator, there is no difference between the light coming from an emitter placed in proximity to the micro-resonator and the light transmitted via scattering from a nanoparticle illuminated by a free-space incident light. Thus, Purcell enhancement should take place leading to collection of the weak scattered-light into the cavity of the WGMR. Third, when a nano-particle is placed in close proximity to a micro-resonator and the nano-particle interacts with the evanescent field of the micro-resonator, light scattering back into the WGM occurs and also to the free-space reservoir modes takes place. Here, the Purcell effect manifests itself again by enhancing the coupling of the scattered light back into the degenerate WGMs (i.e., over 95% of the scattered light is coupled back). Fourth, nano-scatterers placed on the micro-resonator disrupt, i.e. break, its rotational symmetry thus open a channel for coupling light in and out of WGMs.

In previous schemes, resonators are intentionally deformed to break circular symmetry to enable free-space coupling of carefully aligned focused light, which comes with bulky size and alignment issues that hinder the realization of compact WGMR applications. The technology as disclosed herein using nano-couplers based on cavity enhanced Rayleigh scattering from nano-scatterer(s) on resonator surface provides as system and method that addresses these issues. A whispering gallery micro-laser is demonstrated through testing, disclosed herein, by free-space optical pumping of an Ytterbium doped silica micro-toroid via scatterers. This technology scheme will not only expand the range of applications enabled by WGMRs, but will also provide a possible route to integrate them into solar powered green photonics.

Detection of Nano-Scale Particles with a Self-Referenced and Self-Heterodyned Raman Micro-Laser The invention is a micro-laser based nano-scale object detection system and method using frequency shift and/or mode splitting techniques. The system and method can provide highly sensitive detection of nanoparticles with a self-referenced and self-heterodyned whispering-gallery Raman micro-laser.

As indicated in application Ser. No. 13/460,170 Entitled SYSTEMS AND METHODS FOR PARTICLE DETECTION, Filed Apr. 30, 2012, which is incorporated herein in its entirety by reference, and for which this application is a continuation-in-part, in one aspect, a particle detection system is provided. The particle detection system can include at least one tapered optical fiber, a light source configured to transmit light through the at least one tapered optical fiber, a photodetector configured to measure a characteristic of the light being transmitted through the at least one optical fiber, and a computing device coupled to the photodetector and configured to determine whether a nanoparticle is present within an evanescent field of the at least one tapered optical fiber based on the measured light characteristic. In another aspect, a method for detecting nanoparticles is provided. The method includes transmitting light through a tapered optical fiber, measuring a characteristic of the light being transmitted through the tapered optical fiber, and determining whether a nanoparticle is present within an evanescent field of the tapered optical fiber based on the measured light characteristic. In yet another aspect, a method of assembling a particle detector is provided. The method includes coupling a tapered optical fiber to a light source. The light source is configured to transmit light through the tapered optical fiber. A photodetector is coupled to the tapered optical fiber, wherein the photodetector is configured to measure a characteristic of the light being transmitted through the tapered optical fiber. A computing device is coupled to the photodetector. The computing device is configured to determine whether nanoparticles are present within an evanescent field of the tapered optical fiber based on the measured light characteristic.

The technology as disclosed and claimed herein demonstrates enhanced detection of single nano-particle induced mode splitting in a silica WGMR via Raman gain-assisted loss compensation and WGM Raman micro-laser. Raman gain is optical gain (e.g. amplification) arising from stimulated Raman scattering. Raman gain can occur in transparent solid media (e.g. optical fibers), liquids and gases under the influence of intense pump light, and is used in Raman amplifiers and Raman lasers. The technology as disclosed herein can be implemented utilizing a micro-toroid WGMR constructed of a silica material. However, instead of a WGMR, the technology can be implemented with photonic crystals, and further instead of a micro-toroid configuration, the technology can be implemented using a micro-ring, micro-sphere, micro-disk, micro-bottle or other configuration. Also, instead of silica, silicon, titanium or other materials having comparable characteristics in key areas can be used. Its magnitude depends on the optical frequency offset between pump and signal wave, to some smaller extent on the pump wavelength, and on material properties. Compared with laser gain (e.g. in rare-earth-doped gain media), Raman gain requires higher pump intensities and/or longer interaction lengths, has substantially different saturation characteristics, and a gain spectrum which depends on the wavelength of the pump light.

The nonlinear response of a transparent optical medium to the optical intensity of light propagating through the medium is very fast, but not instantaneous. In particular, a non-instantaneous response is caused by vibrations of the crystal (or glass) lattice. When these vibrations are associated with optical phonons, the effect is called Raman scattering. When e.g. two laser beams with different wavelengths (and normally with the same polarization direction) propagate together through a Raman-active medium, the longer wavelength beam (called the Stokes wave) can experience optical amplification at the expense of the shorter wavelength beam. In addition, lattice vibrations are excited, leading to a temperature rise. The Raman gain for the longer wavelength beam can be exploited in Raman amplifiers and Raman lasers. The Raman gain can be substantial if the Stokes shift corresponds to a frequency difference of several terahertz.

In the Raman scattering process, one pump photon is converted into one lower-energy signal photon, and the difference of photon energies is carried away by a phonon (a quantum of the lattice vibrations). In principle, it is also possible that an already existing phonon interacts with a pump photon to generate one higher-energy photon, belonging to an anti-Stokes wave at a shorter wavelength. That process, however, is usually weak, particularly at low temperatures. When the intensity of the generated Stokes wave becomes sufficiently high, that wave may again act as the pump for a further Raman process. Particularly in some Raman lasers, it is possible to observe several Stokes orders (cascaded Raman lasers). Raman scattering can also occur within the broad optical spectrum of, e.g. effectively shifting the spectral envelope of the pulse towards longer wavelengths. Some typical Raman-active media are solid-state media such as glass fibers or certain crystals, e.g. barium nitride=$Ba(NO_3)_2$, various others such as $KGd(WO_4)_2$=KGW and $KY(WO_4)_2$=KYW, and synthetic diamond.

In particular, the use of the Raman micro-laser provides a dopant-free, self-referenced, and self-heterodyned scheme with a detection limit ultimately determined by the thermos-refractive noise. Notably, the technology as disclosed herein has been demonstrated to detect and count individual nanoparticles with polarizabilities down to $3.82\times10-6$ $\mu m^3$ by monitoring a heterodyne beat-note signal, without using plasmonic effects, passive or active stabilization, or frequency locking. The interference between two independent beams of light is often referred to as heterodyne detection. This level of sensitivity is achieved without exploiting plasmonic effects, external references, or active stabilization and frequency locking. Single nanoparticles are detected one at a time; however, their characterization by size or polarizability can be obtained by an ensemble of measurements and statistical averaging. A beat note is a signal with the difference of the optical frequencies.

The self-heterodyne method is a heterodyne technique, which can be used to measure the linewidth (width of the optical spectrum) of a laser, particularly a single-frequency laser. One portion of the laser beam can be sent through a long optical fiber which provides some time delay. Another portion is sent through an acousto-optic modulator, which is driven with a constant frequency (typically some tens of megahertz) and shifts all the optical frequency components by that frequency. Both beams are finally superimposed on a beam splitter, and the resulting beat note (centered at the acousto-optic modulator frequency) is recorded with a photodetector (typically a photodiode). From this signal, the laser linewidth can then be calculated.

The present technology as disclosed provides a dopant-free scheme, which retains the inherited biocompatibility of silica and can have widespread use for sensing in biological media. The Raman laser and operation band of the sensor can be tailored for the specific sensing environment and the properties of the targeted materials by changing the pump laser wavelength. This scheme also opens the possibility of using intrinsic Raman or parametric gain for loss compensation in other systems where dissipation hinders progress and limits applications.

There is an increasing demand for new technologies to detect small molecules, nano-particles, and airborne species. In the past decade there is an increase in the number of label-free detection techniques with varying levels of sensitivities. Techniques relying on electrical conductance, light scattering and interferometry, surface and localized plasmonic resonance, nano-mechanical resonators, and optical resonances have been demonstrated.

The technology as disclosed herein utilizes a fundamentally different physical process to increase Q/V and thereby the fundamental sensitivity limit, as well as the detection limit. Instead of embedding rare-earth ions as the gain medium in a silica micro-toroid resonator, the technology as disclosed leverages the Raman gain in silica to achieve loss compensation and highly sensitive nanoparticle detection. The technology as disclosed does not require any dopant or additional fabrication complexities.

The technology as disclosed demonstrates Raman gain-induced Q enhancement (linewidth narrowing via loss compensation), Raman gain-enhanced detection of mode splitting in the transmission spectra, and splitting in Raman lasing for single nanoparticle detection and counting. As demonstrated by test results, the technology as disclosed can detect NaCl nanoparticles of radii 10 nm that have smaller polarizabilities than polystyrene and gold nanoparticles of the same size. This level of sensitivity can be achieved without using plasmonic enhancement or any laser stabilization or noise cancelation schemes. However, integrating plasmonics and stabilization techniques into the technology scheme will further enable significant improvement in the sensitivity and detection limit.

The approach utilized by the technology as disclosed replaces the traditional rare-earth ion-doped WGM micro-resonator/micro-laser with WGM silica Raman micro-resonator/micro-laser for mode splitting-based nanoparticle detection realizes various fundamental improvements. The technology as disclosed realizes an intrinsically self-referenced (i.e., no need for an external reference to eliminate or suppress thermal drifts and laser noise) and self-heterodyned sensor (i.e., nanoparticle-induced splitting of a Raman lasing line creates a doublet that when detected by a photodetector generates a beatnote signal whose frequency corresponds to the amount of mode splitting).

The technology further realizes a higher sensitivity and a lower detection limit at single-particle resolution using WGMRs pumped below the lasing threshold (i.e., active resonators have much narrower linewidth and better sensitivity than a passive resonator) or above the lasing threshold (i.e., microlaser). The technology as disclosed also realizes a dopant-free low-threshold WGM micro-resonator/microlaser for sensing applications, which retains the inherent biocompatibility of silica. The technology realizes faster detection due to the elimination of the need for scanning the wavelength of a tunable laser around a resonance to obtain the amount of splitting.

A WGM sensor with significantly lower cost can be achieved because the technology as disclosed eliminates the need for narrow linewidth tunable lasers and does not require dopants or plasmonic structures (i.e. in silica micro-toroids, Raman lasing with a fundamental linewidth as narrow as 4 Hz has been reported, which is reported to be much narrower than the commercially available tunable lasers). The technology also realizes the ability to use the same WGMR as a micro-laser with emission in different spectral bands just by changing the wavelength of the pump laser or by using a broadband pump.

In WGM micro-lasers with rare-earth-ion dopants, one should not only change the dopant but also the pump to obtain emission in different spectral windows. However, the present technology exploits the Raman gain, which enables one to operate the same WGMR at different wavelengths and loosens the requirement of a specific wavelength for pump lasers. The technology also introduces a method, which can be used to estimate the size of particles—this method can assign an average size to an ensemble of particles. WGM sensors can benefit from this in various ways, as demonstrated by the test data provided herein.

Stimulated Raman scattering is a nonlinear optical process that provides optical gain in a broad variety of materials. The Raman process generates photons at a frequency that is up- or down-shifted (anti-Stokes or Stokes) from the frequency of the incident photons by an amount equivalent to the frequency of an internal oscillation of the material system, such as vibration, rotation stretching, or translation. Raman gain has found many applications in biology, material science, sensing, environmental monitoring, optical communication, laser science, and spectroscopy.

However, in many of the materials, such as silica, silicon, and $CaF_2$, Raman gain is very small (of the order of $10^{-13}$ m/W), requiring high-intensity pump lasers to drive the system above its lasing threshold. This is overcome by field confinement and resonant enhancement in waveguides and resonators.

Raman lasing has been observed in silicon waveguide cavities, silicon waveguides within fiber ring cavities, silicon photonic crystal cavities, and WGMRs such as silicon micro-ring, silica microspheres, silica micro-toroids, glycerol-water droplets, and CaF2 disks. However, the technology as disclosed herein implements a different approach than previously seen by using Raman gain or Raman lasing for loss compensation to enhance optical detection capabilities at single-particle resolution.

WGM micro-toroidal silica resonators are ideally suited for Raman laser applications because they can be mass fabricated on a silicon chip such that different spectral bands can be covered on a single chip. They have high Q and micro-scale V, which make it easier to achieve high intra-cavity powers to enhance nonlinear effects and obtain low threshold lasing ($P_{threshold} \sim V/Q^2$). They are also compatible with optical fibers and can be readily integrated into existing optical fiber networks. The Raman gain spectra for silica is given in FIG. 10C, Inset, which depicts that Raman gain takes place within a band of 5-30 THz with the highest gain at about 10-15 THz away from the pump frequency. This translates to 15-23 nm for a pump in 660-nm band, 33-51 nm for a pump in 980-nm band, 74-113 nm for a pump in 1,450-nm band, and 85-130 nm for a pump in the 1,550-nm band, suggesting that the spectral band where Raman gain contributes is pump wavelength-dependent. This broad spectrum of Raman gain is due to the rapid dephasing of phonons. In addition to the spectral band to which it contributes, the Raman gain itself is wavelength dependent and varies inversely with wavelength. For a pump with wavelength 1.55 µm, the peak Raman gain $g_R \sim 10^{-13}$ m/W of silica occurs for a shift of 13.2 THz, whereas for a pump of 526 nm the peak Raman gain of silica is reported as $1.49 \times 10-13$ m/W at a shift of 10.1 THz.

As demonstrated by testing, the technology as disclosed utilizing fabricated silica WGM micro-resonators in toroidal shapes showed Raman gain and Raman lasing and thereby demonstrated nanoparticle detection using silica micro-toroid resonators both below and above the Raman lasing threshold. As demonstrated, below the lasing threshold, mode splitting in the transmission spectra can be used for detection; and above the lasing threshold, heterodyning of split laser lines can be used, and beat frequency can be monitored. Testing of the technology demonstrated that NaCl particles can be detected at 10 nm. As noted previously, the configuration of the technology does not rely on plasmonic effects and do not use active or passive stabilization or frequency locking techniques. Therefore, those skilled in the art will readily recognize the improvement over prior systems and techniques for particle detection.

There is a demand for micro or nanoscale sensors with high sensitivity and lower detection limits, to detect, count and identify nano-scale objects (including but not limited to nanoparticles, aerosols, biomolecules, viruses, virions, etc.) one-by-one in an environment (including but not limited to air, water, serum, blood, saliva, urine etc.). It is also key that these sensors are biocompatible so that they can be used in a biological medium. Simplified signal processing and fabrication techniques are also important. The particle detection sensor should be versatile in the sense that it should be able to operate it at different wavelength bands, and in different medium and environments. The present technology as disclosed herein addresses these concerns.

These and other advantageous features of the present invention will be in part apparent and in part pointed out herein below.

Loss Engineering to Improve System Functionality and Output

The invention is a technology comprising steering parameters of a physical system to the vicinity of an exceptional point (EP), which teaches a novel system and method for engineering loss into a system to improve system functionality.

Loss can be a problem in any physical system, and in particular photonic system devices and laser system devices. The present technology provides a new approach to reverse the effect of loss, and control for example optical responses, as well as responses of other physical systems. Controlling and reversing the effects of loss in a physical system and providing sufficient gain to overcome losses can pose a challenge with any physical system. This is especially true for laser based optical systems, for which the losses are typically overcome by providing a sufficient amount of gain to reach the lasing threshold. The present technology as disclosed and claimed can turn losses into gain by steering the parameters of a physical system, such as an optical system, or other type of physical system, to the vicinity of an exceptional point (EP), in which a non-Hermitian degeneracy is observed when the eigenvalues and the corresponding eigenstates of a physical system coalesce.

Within the domain of real parameters the exceptional points (EP) are the points where eigenvalues switch from real to complex values. EP is a point where both eigenvalues and eigenvectors merge. An exceptional point can appear in parameter dependent physical systems. They describe points in an at least two dimensional parameter space at which two (or more) eigenvalues and their corresponding eigenstates become identical (coalesce). EPs are involved in quantum phase transition and quantum chaos, and they produce dramatic effects for optical system multichannel scattering, specific time dependence and more. In nuclear physics they are associated with instabilities and continuum problems. EPs are spectral singularities and they also affect approximation schemes.

In physics, operators appear in quantum theory in the form of a Hamiltonian. Usually this Hamiltonian is Hermitian and has purely real eigenvalues, which are associated with a measurable energy. This is a sufficient description of a closed quantum system. A very effective description of open quantum systems interacting with an environment is often possible in terms of non-Hermitian Hamiltonians. These non-Hermitian operators possess in general complex eigenvalues. Due to their non-Hermiticity they may exhibit exceptional points. The imaginary part of an eigenvalue is interpreted as a decay rate of the corresponding state. The present technology as disclosed utilizes these characteristics and the effects around EP to manage the loss of a physical system.

By way of illustration, in a system of two coupled whispering gallery-mode silica microcavities, the EP transitions are manifested as the loss-induced suppression and revival of lasing. Below a critical value, adding loss to the system annihilates an existing Raman laser. Beyond this critical threshold, however, with the present technology as disclosed, the lasing recovers despite the increasing loss, in stark contrast to what one would expect from conventional laser theory. The results exemplify the counterintuitive features of non-Hermitian physics and present an innovative system and method for reversing the effect of loss. Contrary to expectations, introducing loss into a physical system, such as an optical system, can enhance physical processes rather than suppressing them.

One implementation of the present technology as disclosed can be used to manage loss within a microcavity resonator based optical system, where the total overall intracavity field intensity is increased to engineer an optical response of the system by engineering the loss of one of the subsystems (or parameters) of a system of coupled optical microcavities. The various implementations of the technology as disclosed provided loss induced recovery, as demonstrated by (1) loss-induced suppression and revival of Raman laser intracavity field intensity in silica resonators, and (2) nonlinear thermal response of the system. Various optical physical systems and their applications using the technology as disclosed will be described herein for illustration of industrial utility and applicability, however, the technology as disclosed can be utilized with other physical systems without departing from the scope of the technology as disclosed.

Onto-Mechanical System and Method Having Chaos Induced Stochastic Resonance and onto-Mechanically Mediated Chaos Transfer The technology as disclosed herein includes a system and method for chaos transfer between multiple detuned signals in an optomechanical resonator where at least one signal is strong enough to induce optomechanical oscillations and where at least one signal is weak enough that it does not induce mechanical oscillation, optical nonlinearity or thermal effects and where the strong and weak signal follow the same route, from periodic oscillations to quasi-periodic and finally to chaotic oscillations, as the power of the strong signal is increased. The technology as disclosed and claimed uses optomechanically-induced Kerr-like nonlinearity and stochastic noise generated from mechanical backaction noise to create stochastic resonance. Stochastic noise is internally provided to the system by mechanical backaction.

With the present technology as disclosed and claimed herein, opto-mechanical systems demonstrate coupling between optical and mechanical modes. Chaos in the present technology has been leveraged a powerful tool to suppress decoherence, to achieve secure communication, and to replace background noise in stochastic resonance, which is a counterintuitive concept that a system's ability to transfer information can be coherently amplified by adding noise. The technology as disclosed and claimed herein demonstrates chaos-induced stochastic resonance in an opto-mechanical system, and the opto-mechanically-mediated chaos transfer between two optical fields such that they follow the same route to chaos. These results will contribute to the understanding of nonlinear phenomena and chaos in opto-mechanical systems, and may find application in chaotic transfer of information and for improving the detection of otherwise undetectable signals in opto-mechanical systems.

The nonlinear dynamics originating from the coupling between the optical and mechanical modes of an opto-mechanical resonator can cause both the optical and the mechanical modes to evolve from periodic to chaotic oscillations. These periodic to chaotic oscillations can find use in applications such as random number generation and secure communication as well as chaotic optical sensing. In addition, the intrinsic chaotic dynamics of a nonlinear system can replace the stochastic process (conventionally an externally-provided Gaussian noise) required for the stochastic resonance, which is a phenomenon in which the presence of noise optimizes the response of a nonlinear system leading to the detection of weak signals.

The technology as disclosed and claimed and the various implementations demonstrate opto-mechanically-mediated transfer of chaos from a strong optical field (pump) that excites mechanical oscillations, to a very weak optical field (probe) in the same resonator. The present technology demonstrates that the probe and the pump fields follow the same route, from periodic oscillations to quasi-periodic and finally to chaotic oscillations, as the pump power is increased. The chaos transfer from the pump to the probe is mediated by the mechanical motion of the resonator, because there is no direct talk between these two largely-detuned optical fields. Moreover, this is the first observation of stochastic resonance in an opto-mechanical system. The required stochastic process is provided by the intrinsic chaotic dynamics and the opto-mechanical backaction.

As discussed above, stochastic resonance is encountered in bistable systems, where noise induces transitions between two locally-stable states enhancing the system's response to a weak external signal. A related effect showing the constructive role of noise is coherence resonance, which is defined as stochastic resonance without an external signal. Both stochastic resonance and coherence resonance are known to occur in a wide range of physical and biological systems, including electronics, lasers, superconducting quantum interference devices, sensory neurons, nanomechanical oscillators and exciton-polaritons. However, to date they have not been reported in an opto-mechanical system. The technology as disclosed and claimed herein demonstrates chaos-mediated stochastic resonance in an opto-mechanical microresonator.

The technology as disclosed and claimed including the various implementations and applications demonstrate the ability to transfer chaos from a strong signal to a very weak signal via mechanical motion, such that the signals are correlated and follow the same route to chaos, which opens new venues for applications of opto-mechanics. One such direction would be to transfer chaos from a classical field to a quantum field to create chaotic quantum states of light for secure and reliable transmission of quantum signals. The chaotic transfer of classical and quantum information in such micro-cavity-opto-mechanical systems demonstrated here is limited by the achievable chaotic bandwidth, which is determined by the strength of the opto-mechanical interaction and the bandwidth restrictions imposed by the cavity. Quantum networks for long distance communication and distributed computing require nodes which are capable of storing and processing quantum information and connected to each other via photonic channels.

Recent achievements in quantum information have brought quantum networking much closer to realization. Quantum networks exhibit advantages when transmitting classical and quantum information with proper encoding into and decoding from quantum states. However, the efficient transfer of quantum information among many nodes has remained as a problem, which becomes more crucial for the limited-resource scenarios in large-scale networks. Multiple access, which allows simultaneous transmission of multiple quantum data streams in a shared channel, can provide a remedy to this problem. Popular multiple-access methods in classical communication networks include time-division multiple-access (TDMA), frequency division multiple-access (FDMA), and code-division multiple-access (CDMA).

In a CDMA network, the information-bearing fields a1 and a2, having the same frequency $\omega_c$, are modulated by two different pseudo-noise signals, which not only broaden them in the frequency domain but also change the shape of their wavepackets. Thus, the energies of the fields a1 and a2 are distributed over a very broad frequency span, in which the contribution of $\omega_c$ is extremely small and impossible to extract without coherent sharpening of the $\omega_c$ components. This, on the other hand, is possible only via chaos synchronization which effectively eliminates the pseudo-noises in the fields and enables the recovery of a1 (a2) at the output a3 (a4) with almost no disturbance from a2 (a1). This is similar to the classical CDMA. Thus, this protocol can be referred to as q-CDMA.

The nonlinear coupling between the optical fields and the Duffing oscillators and the chaos synchronization to achieve the chaotic encoding and decoding could be realized using different physical platforms. For example, in opto-mechanical systems, the interaction Hamiltonian can be realized by coupling the optical field via the radiation pressure to a moving mirror connected to a nonlinear spring. Chaotic mechanical resonators can provide a frequency-spreading of several hundreds of MHz for a quantum signal, and this is broad enough, compared to the final recovered quantum signal, to realize the q-CDMA and noise suppression. Chaos synchronization with a mediating optical field, similar to that used to synchronize chaotic semiconductor lasers for high speed secure communication, would be the method of choice for long-distance quantum communication. The main difficulty in this method, however, will be the coupling between the classical chaotic light and the information-bearing quantum light. The present technology provides a solution to this coupling challenge.

One can increase the chaotic bandwidth by using waveguide structures which have larger bandwidths than cavities. Moreover, the presence of chaos-mediated stochastic resonance in opto-mechanical systems illustrates not only the nonlinear dynamics induced by the opto-mechanical coupling, but also illustrates the use of stochastic resonance to enhance the signal-processing capabilities to detect and manipulate weak signals. The technology as disclosed and claimed herein can be extended to micro/nano-mechanical systems where frequency-separated mechanical modes are coupled to each other, e.g., acoustic modes of a micromechanical resonator or cantilevers regularly spaced along a central clamped-clamped beam. Generating, transferring and controlling opto-mechanical chaos and using it for stochastic resonance makes it possible to develop electronic and photonic devices that exploit the intrinsic sensitivity of chaos.

This work has two aspects: First, optomechanical oscillations induce chaos on a pump strong field. Then the detuned probe is affected and it also follows the same route to chaos. One can say optomechanically-induced chaos transfer between optical fields and modes. Second, is the stochastic resonance, independent of the optomechanically-induced chaos transfer between optical fields and modes. Here the pump induces mechanical oscillations, which then induce chaotic behavior and the stochastic noise via back-action. Then a probe feels a nonlinear system with stochastic noise, and as a result it is signal-to-noise ratio first increases with increasing pump power and then decreases.

Further, one technology disclosed herein is a micro resonator operating close to an EP where a strong chirality can be imposed on an otherwise non-chiral system, and the emission direction of a waveguide-coupled micro laser can be tuned from bidirectional to a fully unidirectional output in a preferred direction. By directly establishing the essential link between the non-Hermitian scattering properties of a waveguide-coupled whispering-gallery-mode (WGM) micro resonator and a strong asymmetric backscattering in the vicinity of an EP, allows for dynamic control of the chirality of resonator modes, which is equivalent to a switchable direction of light rotation inside the resonator. This enables the ability to tune the direction of a WGM micro laser from a bidirectional emission to a unidirectional emission in the preferred direction: When the system is away from the EPs, the resonator modes are non-chiral and hence laser emission is bidirectional, whereas in the vicinity of EPs the modes become chiral and allow unidirectional emission such that by transiting from one EP to another EP the direction of unidirectional emission is completely reversed. Such an effect has not been observed or demonstrated before.

Moreover, the ability to controllably tune the ratio of the light fields propagating in opposite directions on demand is achieved—the maximum impact is reached right at the EP, where modes are fully chiral. To achieve this highly nontrivial feature, the system leverages the use of the fact that the out-coupling of light via scatterers placed outside the resonator leads to an effective breaking of time-reversal symmetry in its interior. Such a system opens a new avenue to explore chiral photonics on a chip at the crossroads between practical applications and fundamental research. WGM resonators play a special role in modern photonics, as they are ideal tools to store and manipulate light for a variety of applications, ranging from cavity-QED and optomechanics to ultra-low threshold lasers, frequency combs and sensors. Much effort has therefore been invested into providing these devices with new functionalities, each of which was greeted with enormous excitement. Take here as examples the first demonstrations to detect ultra-small particles; to observe the PT-symmetry phase transition with an associated breaking of reciprocity; to observe the loss-induced suppression and revival of lasing at exceptional points; or the measurement based control of a mechanical oscillator. By explicitly connecting the features of resonator modes with the intriguing physics of EP, the system adds a new and very convenient functionality, which is a benefit all the fields where these devices are in use.

Controlling the emission and the flow of light in micro and nanostructures is crucial for on chip information processing. The system as disclosed imposes a strong chirality and a switchable direction of light propagation in an optical system by steering it to an exceptional point (EP)—a degeneracy universally occurring in all open physical systems when two eigenvalues and the corresponding eigenstates coalesce. In one implementation a fiber-coupled whispering-gallery-mode (WGM) resonator, dynamically controls the chirality of resonator modes and the emission direction of a WGM microlaser in the vicinity of an EP: Away from the EPs, the resonator modes are non-chiral and laser emission is bidirectional. As the system approaches an EP the modes become chiral and allow unidirectional emission such that by transiting from one EP to another one the direction of emission can be completely reversed. The system operation results exemplify a very counterintuitive feature of non-Hermitian physics that paves the way to chiral photonics on a chip.

Tunable Add-Drop Filter with an Active Resonator

In one embodiment, an add-drop filter for transmitting at least one signal is provided. The add-drop filter includes at least two optical waveguides capable of carrying the at least one signal, and at least one active resonator coupled between the optical waveguides, wherein the at least one active resonator provides gain that counteracts losses for the at least one signal.

In another embodiment, an optical communication system is provided. The optical communication system includes an add-drop filter for transmitting at least one signal, the add-drop filter including at least two optical waveguides capable of carrying the at least one signal, and at least one active resonator coupled between the optical waveguides, wherein the at least one active resonator provides gain that counteracts losses for the at least one signal. The optical communication system further includes a gain stimulation device coupled to the add-drop filter, the gain stimulation device configured to provide a gain stimulation signal that excites a gain medium of the at least one active resonator.

In yet another embodiment, a method of transmitting at least one signal through an add-drop filter is provided. The method includes directing the at least one signal into the add-drop filter, wherein the add-drop filter includes at least two optical waveguides, and at least one active resonator coupled between the optical waveguides, and providing, using the at least one active resonator, gain that counteracts losses for the at least one signal as the at least one signal is transmitted through the add-drop filter.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIGS. 6A, 6B, and 6C are an illustration of one implementation of the technology for microresonator based acoustic imaging;

FIGS. 10A, 10B, and 10C are an illustration of one implementation of the technology, and a setup for measuring detection sensitivity, and a graphical illustration of the transmission spectra;

FIGS. 13A, 13B, and 13C are a graphical illustrations of detection of scatterer-induced mode splitting using Whispering Gallery Mode Raman lasing;

FIGS. 18A, 18B, 18C, 18D, and 18E are illustrations of the effect of increasing loss on resonances;

FIGS. 20A, 20B, 20C, and 20D are illustrations of loss-induced enhancement of intracavity field intensities and thermal nonlinearity in the vicinity of an exceptional point;

FIG. 23A is a view of the microtoroid illustrating the mechanical motion induced by optical radiation force;

FIG. 23B is a typical transmission spectra obtained by scanning the wavelength of a tunable laser with a power well-below (red) and above (blue) the mechanical oscillation threshold;

FIG. 23C is a typical electrical spectrum analyzer (ESA) trace of the detected photocurrent below the mechanical oscillation threshold;

FIG. 24A through 24C are phase diagrams of the pump fields in periodic (left), quasi periodic (middle), and chaotic (right) regimes;

FIG. 24D through 24F is phase diagrams of the probe fields in periodic (left), quasi periodic (middle), and chaotic (right) regimes;

FIG. 24G is a Bifurcation diagram of the pump fields;

FIG. 24H is a Bifurcation diagram of the probe fields;

FIG. 25A is Maximal Lyapunov exponents for the pump (blue) and the probe (red) fields as a function of the pump power;

FIG. 25B is an illustration of the spectral response of a Bandwidth broadening of the probe as a function of the pump power;

FIG. 25C is a typical spectra obtained for the probe at different pump powers;

FIG. 25D is a typical spectra obtained for the probe at different pump powers;

FIG. 25E is a typical spectra obtained for the probe at different pump powers;

FIGS. 34A through 34B is a mean interspike interval and its variation calculated from the output signal in the probe mode;

FIGS. 34C through 34D is a mean interspike interval and its variation obtained in the numerical simulation of stochastic resonance with input weak probe;

FIGS. 34E through 34F is a mean interspike interval and its variation obtained in the numerical simulation of coherence resonance in our system without input weak probe;

FIGS. 37A and 37B illustrate Controlling directionality and intrinsic chirality of whispering-gallery-modes;

FIGS. 38A, 38B, 38C, 38D, and 38E illustrate Scatterer-induced mirror-symmetry breaking at an EP;

FIGS. 41A and 41B illustrate experimentally obtained mode spectra as the relative phase angle $\beta$ between the scatterers was varied;

FIGS. 44A, 44B, 44C, and 44D illustrate weights of CW and CCW components in the eigenmodes as the relative phase difference β between the two nanoscatterers is varied;

Figure 1:
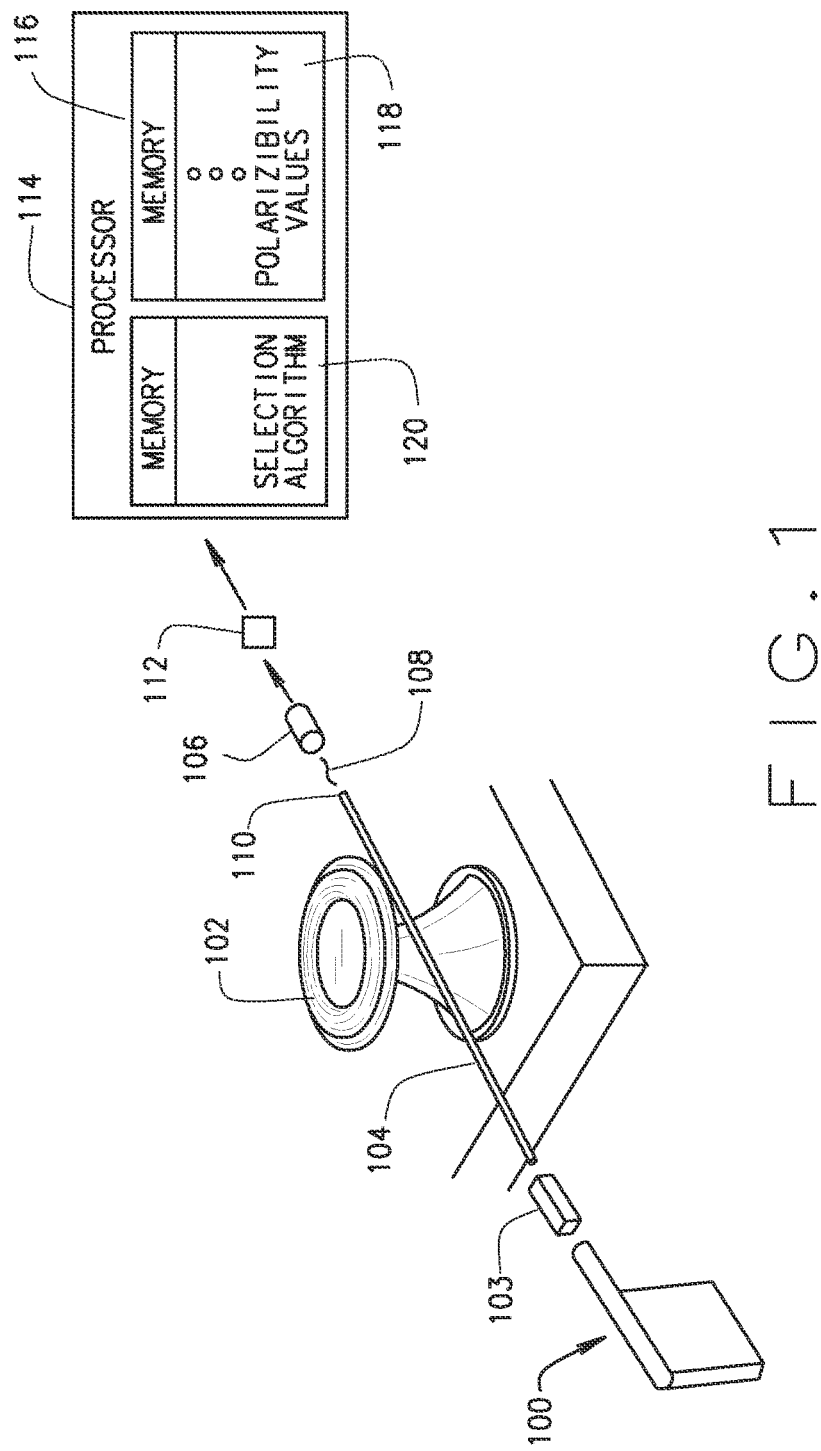
FIG. 1 is an illustration of a sensor for air quality measurement.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

Micro-Resonator and Fiber Taper Sensor System

According to the embodiment(s) of the present invention, various views are illustrated in FIGS. 1-9 and like reference numerals are being used consistently throughout to refer to like and corresponding parts of the invention for all of the various views and figures of the drawing. Also, please note that the first digit(s) of the reference number for a given item or part of the invention should correspond to the FIG. number in which the item or part is first identified.

One implementation of the present technology comprising a micro-resonator and fiber taper based system teaches an apparatus and method for sensing particles. By way of background, particle binding splits a WGM into two spectrally shifted resonance modes, forming a self-referenced detection scheme. This technique provides superior noise suppression and enables extracting accurate size information in a single-shot measurement. Our technology as disclosed requires neither labelling of the particles nor information on their presence in the medium, providing an effective platform to study nanoparticles at single particle resolution.

Detecting single sized nanoparticles can be accomplished by leveraging mode-splitting, in a WGM resonator. Counting and sizing of individual nanoparticles as small as 30 nm in radius using scattering induced mode-splitting of a WGM in an ultra-high-Q microtoroid is possible. The demonstrated higher level of sensitivity and resolution can be attributed to two standing wave modes (SWM) formed after the adsorption of a particle, share the same resonator and experience the same noise. This allows a self-referencing detection system more immune to noise than the resonance shift based sensing schemes. The linewidths of the SWMs and the amount of mode splitting allow extracting the accurate size information regardless of where the particle is adsorbed, therefore enabling single-shot size measurement. The approach assists in realization of on-chip detection and sizing systems with single particle resolution.

After the first particle is deposited, SWMs are formed, which is confirmed by the mode-splitting (double resonances) in the transmission spectra. The consecutive particle depositions lead to changes in both the amount of splitting and the linewidths of the resonances. Discrete steps of various heights can be resolved indicating that individual nanoparticle adsorption events are resolved. Each adsorbed particle causes redistribution of previously established field; thus the height of each discrete step depends on the positions of the particles relative to the SWMs.

The underlying mechanism responsible for single-particle induced mode-splitting can is explained as follows: A nanoparticle in the evanescent field of WGMs acts as a light scatterer. Subsequently, a portion of the scattered light is lost to the environment creating an additional damping channel, while the rest couples back into the resonator and induces coupling between the two counter-propagating WGMs, whose degeneracy is lifted. This creates SWMs that are split in frequency. The SWMs redistribute themselves according to particle location: The symmetric mode (SM) locates the particle at the anti-node while the asymmetric mode (ASM) locates it at the node.

Consequently, the significantly perturbed SM experiences frequency shift and linewidth broadening. The strength of coupling g is quantified by the doublet splitting g=πδ, where δ is the detuning of SM from ASM, and the additional linewidth broadening is quantified as $\Gamma_R=\pi|\gamma_1-\gamma_2|$ where $\gamma_1$ and $\gamma_2$ represent the linewidths of the split modes. In a regime where the particle is considerably smaller than light wavelength λ, the particle-WGM interaction induces a dipole moment in the particle. This dipole is represented by the polarizability $\alpha=4\pi R^3(\varepsilon_p-\varepsilon_m)/(\varepsilon_p+2\varepsilon_m)$ with $\varepsilon_p$ and $\varepsilon_m$ denoting dielectric permittivity's of the particle and the medium, respectively.

The parameters g and $\Gamma_R$ are given as $g=-\alpha f^2(r)w_c/2V_c$ and $\Gamma_R=-g\alpha w_c^3/3\pi v^3$ where $w_c$ is the angular resonant frequency, f(r) designates normalized mode distribution, $V_c$ is the mode volume, and $v=c/\sqrt{\varepsilon_m}$ with c representing the speed of light. Consequently, we can derive the particle size from $$\alpha=-(3\lambda^3/8\pi^2)(\Gamma_R/g)$$

where $\Gamma_R$ and g can be measured from the transmission spectrum. Since the value of $\Gamma_R/g$ is independent of the particle position on the resonator, it gives the technique presented here a big advantage over schemes using resonance spectral shift, which is affected by particle positions. If $\varepsilon_S<\varepsilon_m$ ($\varepsilon_S>\varepsilon_m$), SM experiences a red (blue)-shift with respect to ASM.

For implementation of the technology, tunable lasers in the 670 nm and 1450 nm wavelength bands can be used. Their wavelengths can be linearly scanned around the resonance wavelength of the micro-resonator. The real-time transmission spectra can be obtained by a photodetector followed by an oscilloscope. This enables a real time monitoring of the transmission spectrum on the oscilloscope. The experimental set-up can consists of a differential mobility analyzer (DMA) system for size classification of nanoparticles, a nozzle for depositing nanoparticles onto the microtoroid, and a taper-fiber coupled resonator system. PLC: Polarization controller.

The details of the invention and various embodiments can be better understood by referring to the figures of the drawing. Referring to FIG. 1, an illustration of an air quality measurement system is illustrated. Miniature sensors can be utilized for air-quality measurements. The technology relates to a particle monitoring system on a chip with WGM resonators using mode splitting or frequency shift methods. Particle selectivity can be based on a polarization measurement which can be performed on each detected particle with single-shot measurement. An opto-electronic board including a laser source, data-acquisition card/function, detectors, polarization controller can be connected to an optical resonator to form a compact/portable resonator system. Such a system can be used for various applications. Examples include portable sensors, compact optical filters, a reference to lock and stabilize a laser with broad linewidth, and a portable laser source. Through an analog to digital converter, wireless signals can be generated and received by consumer products, such as laptops and phones.

A specific example is that polarizability values can be characterized in a series of experiments with common pollutants of air, and can form a database for each pollutant. In operation when a particle is detected and its polarizability is estimated, a code can use a mode selection algorithm to match the particle with one of the possible candidates in the database.

The system can include a tunable laser 100, a WGM resonator 102 and a coupling waveguide 104 to bring the laser in and out of the resonance modes. The tunable laser 100 can be a semiconductor laser (DFB or FP laser diodes), GaN or similar LED on-chip light source, or an on-chip WGM microlaser whose wavelength can be finely tuned by temperature control or by controlling the driving current. A polarization controller 103 can polarize the laser signal. A photoreceiver 106 (or a photodetector) can be used to detect the laser signal 108 at the output port 110 of the coupling waveguide 104. The output from the photoreceiver 106 is further processed 112 to extract the information of the light transmission from the resonator 102. A code can be used to analyze the transmission spectra to derive the polarizability values of the particles.

One implementation of the technology is a particle sensing apparatus, which includes a processor 114 and a memory 116 having data representative of plurality of polarizability values 118 for a plurality of common air pollutants. The memory can also have a selection algorithm 120 for analyzing output signals and finding matching data. The technology can include a tunable laser 100 and a mode-splitting based whispering gallery mode micro-resonator 102. The technology can include a coupled waveguide configured to transition the tunable laser in and out resonance modes.

A photodetector 106 can be included and can be configured to detect a laser signal output at an output port of the coupling waveguide and said photodetector can transmit a detector output signal representative of the detected laser signal output. The processor can be configured to process the selection algorithm to analyze a transmission spectrum of the detector output signal, thereby deriving a detected polarizability value and selecting a matching polarizability value from the plurality of polarizability values.

One implementation of the technology utilizing a micro-resonator and fiber taper based sensing system can include a portable sensor for volatile gas detection. Regarding one implementation of the technology, optical sensors using evanescent waves to interrogate the presence of analytes on the sensor surface or in the surrounding environment typically rely on detecting effective refractive index change. In order to detect very low concentration or minute amount of analytes using optical sensors, long waveguide lengths (exceeding cm) are typically required in order to accumulate a detectable phase shift.

This would also require significant amount of samples that may not be readily obtainable in many sensing applications. To address this problem, sensors based on optical micro-cavities can be used. Such sensors can offer a unique advantage by reducing the size of the device by orders of magnitude, without sacrificing the interaction length by virtue of the high quality (Q) factor resonances, thereby significantly reducing the amount of sample needed for the detection. The resonance effect provides an effective long interaction length for the sensor to achieve sufficient sensitivity.

Also typical bio-sensing experiment requires that the devices can handle aqueous analytes. Therefore fluidic handling capability can be a part of the sensor platform. High quality-factor microsphere cavities using Whispering gallery mode (WGM) resonances have been demonstrated to respond to a monolayer of protein adsorption, however integration with fluidic system is very challenging and typically requires fluidic chambers much larger than the active device element.

Figure 2:
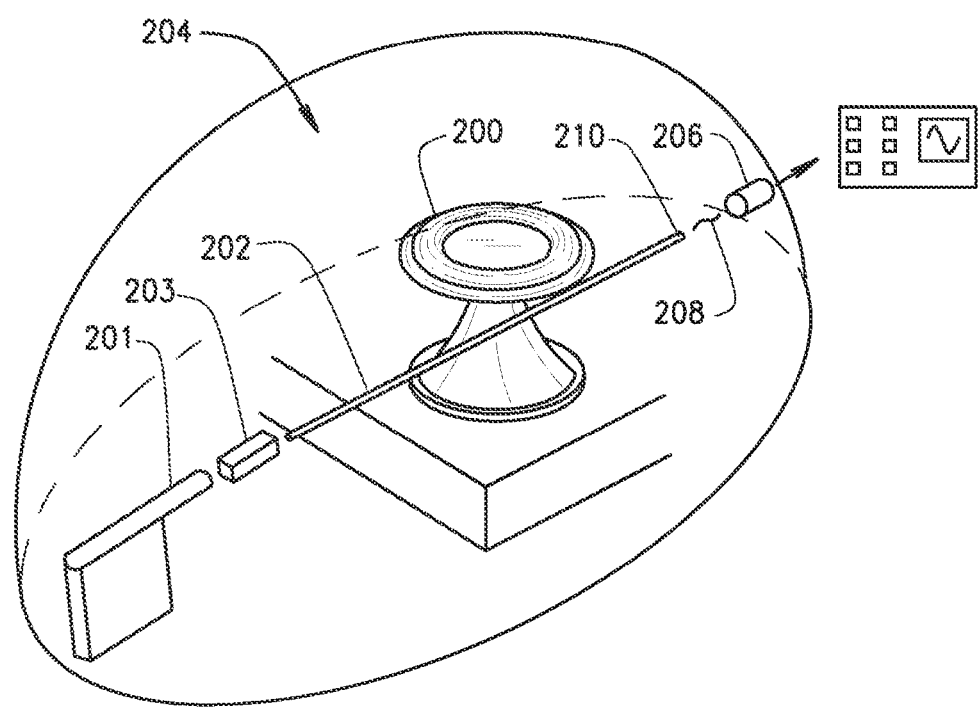
FIG. 2 is an illustration of a sensor for detection of gas.

With the above introduction, referring to FIG. 2, one implementation of the technology can include a resonator 200 and the coupling waveguide 202 that can be embedded into a packaging material 204 (such as Polydimethylsiloxane (PDMS), zeolite (microporous aluminosilicate minerals), etc.) through which certain volatile gas (fluorobenzene, methyl chloride, butane, Heptene, CO, radon, and natural gas (hydrogen sulfide, mercaptan), explosives (TNT, nitrate), etc.) can permeate. A polarizer 203 can polarize the laser signal. Once the gas penetrates through the packaging materials 204 and approaches the resonator 200, the effective refractive index experienced by light in the resonant mode changes. Subsequently a resonance shift in the transmission spectrum or a change in the mode pattern of the resonator will be observed, which indicates the presence of the gas. The portable sensors can appear in different forms, such as wrist band, fiber stem, sensor network connected by optical fibers. The system may also have a particle or gas collection and purging unit, which will sample the air and then blow it onto the resonator.

One implementation of the technology is a particle sensing apparatus including a tunable micro-laser 201 and a mode splitting based whispering gallery mode micro-resonator 200 and a coupling waveguide 202 configured to transition the tunable laser 201 in and out of resonance modes. All of which can be embedded in a gas permeable encapsulation material 204, such as for example PDMS or zeolite.

A photodetector 206 can be included that is configured to detect a laser signal output 208 at an output port 210 of the coupling waveguide 202 and said photodetector 206 configured to detect one or more of a resonance shift in a transmission spectrum and change in the mode pattern and said photo detector configured to output a signal indicative of the presence of a gas if one or more of a resonance shift in a transmission spectrum and change in the mode pattern is detected.

One implementation of the technology utilizing a microresonator and fiber taper based sensing system can include a mobile device based monitoring of fiber speckle patterns for portable sensors to image resonator mode patterns with a mobile device's camera for sensing. Speckle patterns and the mode patterns are highly sensitive to external perturbations. In a multimode fiber spectrometer, the interference between the guided modes creates a wavelength-dependent speckle pattern, providing the required spectral to-spatial mapping. The contrast of this speckle pattern is found to depend on the spectral width and shape of the optical source, allowing the use of contrast as a measure of the laser linewidth. As opposed to using only the statistical property of the speckle such as the contrast, one implementation of the technology demonstrates that by recording the entire speckle patterns at different wavelengths, a multimode fiber can be used.

For example, in one implementation of the technology the resonance shift of a resonator due to a binding analyte or change of refractive index can be directly monitored by monitoring the changes in the mode pattern. Similarly speckle patterns formed in tapered waveguides (i.e., fiber tapers processed from single mode fibers) connected to a multimode fiber can change due to any external perturbation, such as binding analyte, refractive change, pressure variations, temperature fluctuation, etc. These changes in the speckle patterns can be directly monitored by CMOS cameras 314 available in smart phones.

An adapter can be attached to the phone for stabilization of the system and for making use of the imaging function of the smart phone. There can be an app which will process the images taken to provide information on the speckle or mode pattern changes and relate to the parameter of interests (resonance shift, the correlation time, contrast of speckle patterns).

Figure 3:
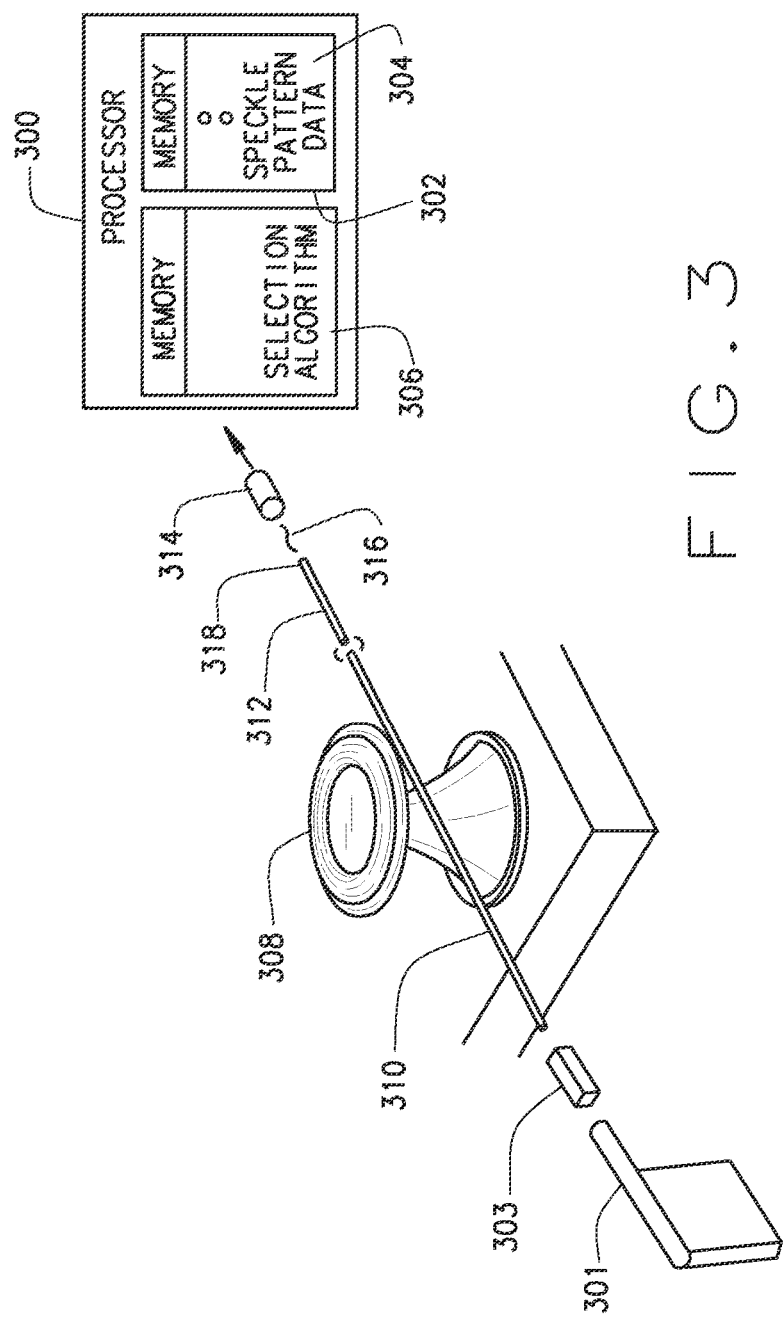
FIG. 3 is an illustration of a mobile device utilized for monitoring a speckle pattern.
Figure 4A:
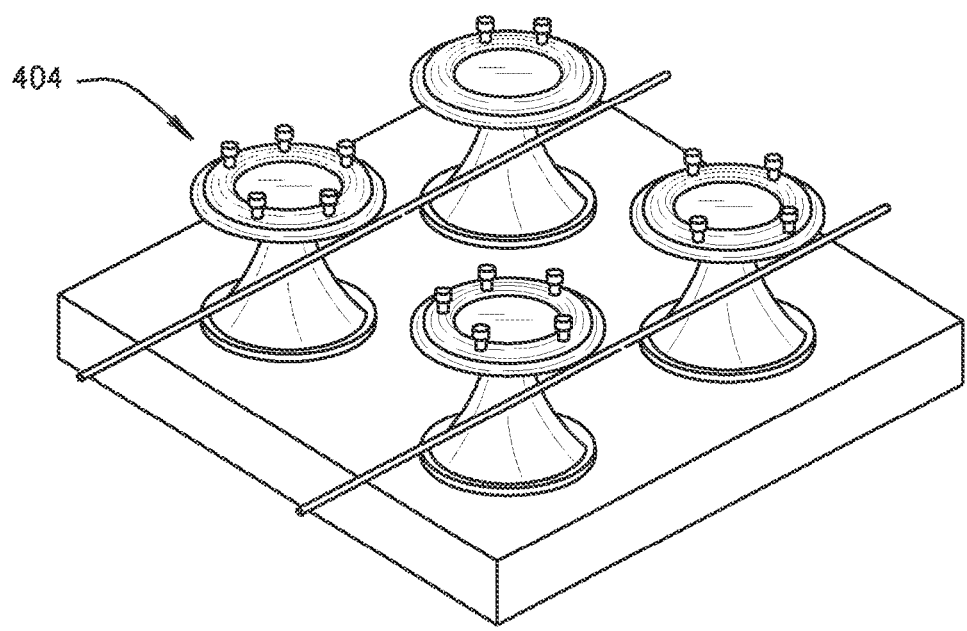
FIGS. 4A, 4B, 4C and 4D are illustrations of systems utilizing a multicolor ultra-narrow linewidth laser.
Figure 4B:
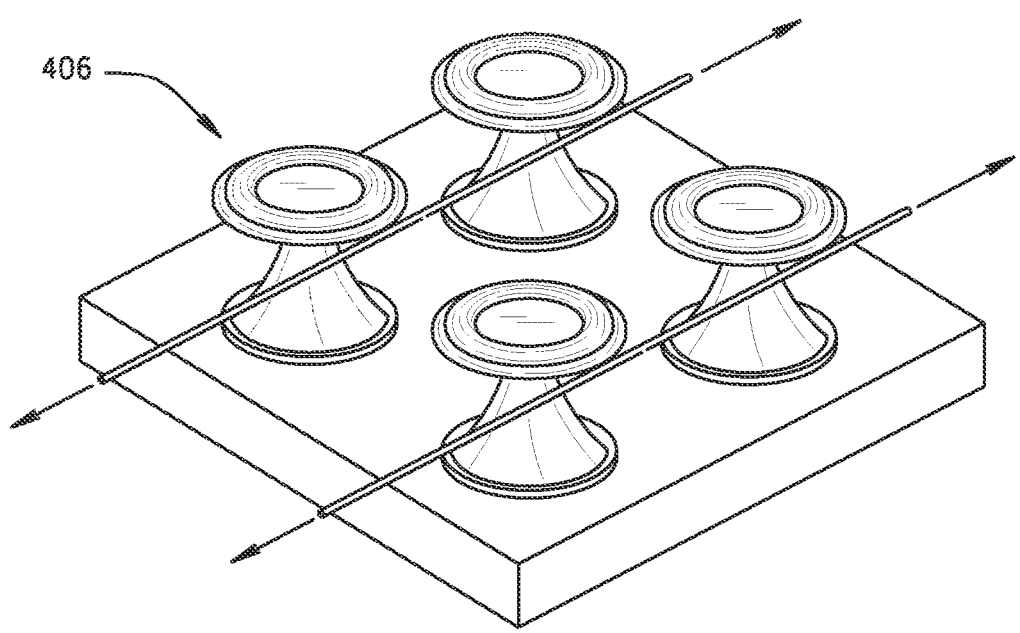
Figure 4C:
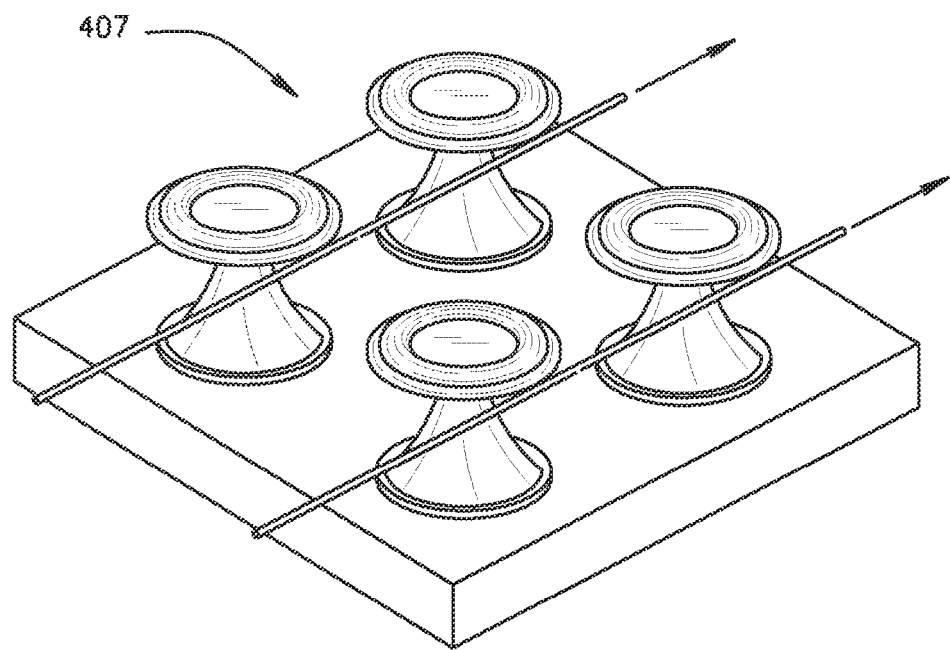
Figure 4D:
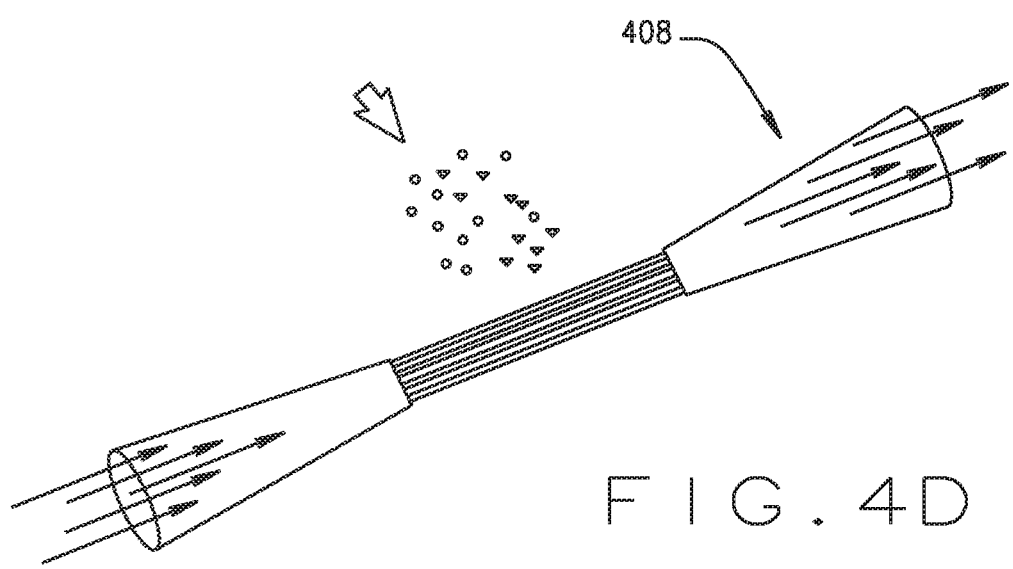

Referring to FIG. 3, one implementation of the technology is a particle sensing apparatus including a processor 300 and a memory 302 having stored thereon data representative of plurality of speckle pattern changes 304 for a plurality of common external perturbations. The memory 302 can have stored thereon a selection algorithm 306. The technology can include a mode splitting based whispering gallery mode micro-resonator 308 and a coupled tapered waveguide 310 connected to a multimode fiber 312. A photodetector 314 can be configured to detect an output signal 316 at an output port 318 of the coupled waveguide and said photodetector configured to detect a speckle pattern. A laser 301 through a polarization controller 303 can drive the signal.

The processor 300 can be configured to process the selection algorithm to analyze a transmission spectrum of the detector output signal, thereby deriving a detected speckle patter change and selecting a matching speckle patter change from the plurality of speckle pattern changes.

Referring to FIGS. 4A, 4B, 4C, and 4D, one implementation of the technology is a particle sensing apparatus including, an on-chip multi-color ultra-narrow linewidth laser for spectroscopy, holography, sensing and imaging. Multiple micro-lasers emitting light at different wavelengths are shown. The optical gain used to generate lasing signals can come from rare-earth ions, nonlinear effects, such as stimulated Raman scattering process, quantum dots, and dyes. By tailoring the composition of the gain materials, we can adjust the lasing wavelength, i.e., color, of the micro-lasers.

A lasing signal with ultra-narrow linewidth can be generated when sufficient pump light is coupled into the microresonator. The ultra-narrow-linewidth lasers can serve as light sources for spectroscopy, holography and imaging. These multi-color ultra-narrow linewidth lasers can also serve as source light for passive resonators, which will be multifunctional miniature sensors for temperature, pressure, humidity, gas and particle sensing.

They can also be used as multifunctional miniature sensors because the frequency of the lasing signal shifts due to changes in the local environment, such as temperature changes, pressure fluctuation, humidity variations, and analyte binding, etc. The aforementioned changes in the environments can trigger changes in the refractive index of the lasing mode. The working principle of the microlaser based sensor relies on the fact that any disturbance that can trigger changes in the effective refractive index of the lasing mode is manifested as frequency shift in the lasing signal, which can be measured as sensing signal indicating changes in the environment.

For biosensing applications, selectivity can be achieved by functionalization of the resonator surface with antibodies that can bind with targeting antigens or chemicals that can capture targeting molecules. For one implementation of the technology multiple micro-resonators can be fabricated on the same chip 404. The surface of each resonator can be functionalized with particular antibodies to capture specific antigens. The presence of a specific antigen in the test solution will be indicated by a change in the transmission spectrum of the micro-resonator triggered by a binding event between the antigen and antibody which is already bound to the resonator surface. The surface of each resonator can also be functionalized with particular chemicals that are sensitive to variation in temperature, humidity, or pressure of the environments. The change in the aforementioned conditions can trigger a resonance shift in the transmission spectrum of a particular resonator, which is functionalized with the chemicals that are sensitive to variation in the condition that induce the change For yet another implementation of the technology, multiple micro-resonators and micro-lasers can be mixed on the same chip 406. In such a system, the ultra-narrow linewidth light generated from the micro-lasers serve as light sources for the passive micro-resonators 407 for sensing applications. Also, multiple fiber tapers can be bundled together 408 to form a multi-function sensing system. Each fiber taper can be functionalized with particular chemicals that can bind with specific molecules or proteins for bio/chemical sensing applications. The fiber tapers can also be functionalized with particular chemicals that are sensitive to variation in temperature, humidity, or pressure of the environments. The light signal transmitted through the fiber tapers will be the sensing signal analyzed by a code to trace back changes in the environments.

The linewidth of a laser determines its temporal coherence. The narrower the linewidth the longer the temporal coherence. Temporal coherence is a measure of the ability of the light to perform interference, thus longer coherence time is crucial for a number of applications, including holography, interferometry, Doppler velocimetry and ranging, heterodyne mixing.

In Doppler velocimetry, a laser light shines on a moving object and the reflected light is detected. The change in the frequency of the incident and the detected light is the Doppler shift which is dependent on the velocity of the target. If the incident light has poor coherence, the detected light will have a broader spectrum, limiting the accuracy of measuring the Doppler velocity. Thus, the narrower the linewidth, the longer the coherence length and therefore the better the accuracy of measurement.

In holography, the temporal coherence length (the linewidth of the laser) determines the maximum depth of the object in a reflection hologram. Holography is based on the interference between light beams. Thus long coherence length enables taking holograms of large bodies, which require greater depth of field. Both the light reflected from the near part of the body, and the light reflected from the far part of the body, will still be coherent with the reference beam.

Narrow linewidth lasers are also needed in coherent and heterodyne detection where light reflected off a target or emitted from a source is mixed with light from another laser to create a fringe pattern. If the laser has narrow linewidth the photons from the laser will maintain fixed frequency and phase relationship for the time needed to hit the target and return in order to have proper contrast in the fringe pattern.

Microcavity lasers that we fabricate have ultra-narrow linewidths which mean that the lasers have ultra-long coherence lengths. By suitably choosing the dopant, we can obtain multicolor emission from a single microcavity (2 or 3 different colors are within reach in our lab). For example, combined doping of thulium, neodyium and erbium together with a large bandwidth LED pump, may enable lasing in the blue, red, green as well as infrared frequencies. These emissions are collected by a fiber and directed to the object, medium or target surface to be recorded. The interference patterns of the reflected light from the target and the reference light can be detected by a CCD or CMOS camera simultaneously for each color and further processed to reconstruct the images on a PC.

In a different system, a series of microcavities each doped with a different rare-earth-ion or gain medium can be used. Emissions from each of the microcavity will have a different color. These can be combined in a fiber, divided into a reference and object beam using fiber couplers. The object beam is then carried in the fiber waveguide to illuminate a target surface. The light reflected from the target and that of the reference are recorded then on a CCD and processed to reconstruct image.

Such a system with the availability of multiple colors of laser emission with ultra-narrow linewidths will help to get better resolution and imaging as well as improved depth. The system will be portable and can be implemented/installed in scenarios where power and space budgets are limited, and better resolution and maximum depth of object are required.

Based on the above, one of the implementation of the technology is a particle sensing apparatus including an ultra-narrow linewidth micro-laser 410. The technology can also include a mode-splitting based whispering gallery mode micro-resonator 412 and a coupled tapered waveguide 414 configured to transition the ultra-narrow linewidth micro-laser in and out of resonance modes. The whispering gallery mode micro-resonator can have a functionalized surface 416 selected from one or more of an antibody bound on the surface. The antibody can configured to bind with an antigen and a chemical configured to bind with a molecule. A photodetector 418 can be configured to detect an output signal 420 at an output port 422 of the coupled waveguide and said photodetector configured to detect a frequency shift indicative of change in refractive index due to the functionalized surface.

The particle sensing apparatus can include the functionalized surface and can be selected from one or more of a chemical that is sensitive to a variation in temperature, humidity, or pressure. The coupled tapered waveguide surface can be functionalized with a waveguide chemical configured for one or more of binding to a molecule, sensing variation in temperature, sensing a variation in humidity and sensing a variation in pressure. A dopant can also be applied to the surface of a micro-resonator thereby configured to enable lasing in multiple colors.

Such a system will also enable to extract multiple parameters about the sensing area. For example, a hologram recording the sample undergoing concentration and temperature changes can provide both the concentration and temperature variations of the sample if multiple colors are used.

Figure 5:
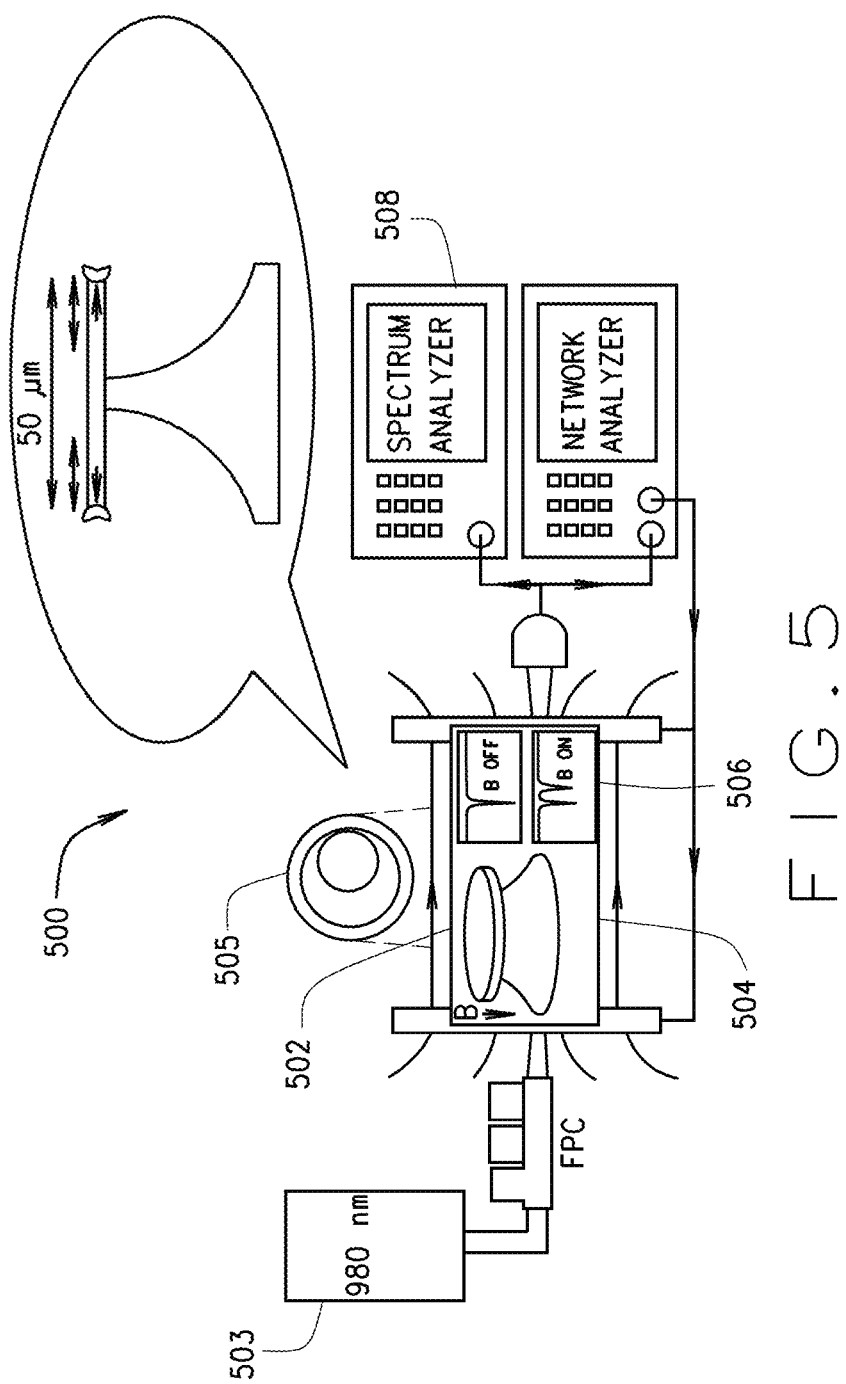
FIG. 5 is an illustration of micro-resonator based magnetometer.

Various wave sensors can also be accomplished utilizing the technology as disclosed including IR, magnetic, radiation and acoustic waves. FIG. 5 illustrates a WGM microresonator based magnetometer 500 using a piece of magnetic sensitive material, such as for example Terfenol-D 502, can be fabricated on the silicon substrate of a micro-resonator 504. A laser 503 can drive the micro-resonator through a polarizer controller 501. The piece of Terfenol-D or other magnetic material can expand and contract or otherwise react based on the presence of a magnetic field 506 generated by a magnetic field generator 505. Other types of magnetic sensitive material that can be used are Terbium and Neodymium. A change in the spectral transmission can be received by a spectrum analyzer 508 for analysis. In addition to the magnetic material being adhered externally to the top of the micro-resonator, the magnetic material can be applied by doping the micro-resonator with the magnetic material or the entire micro-resonator can be constructed of the material. With no magnetic field the transmission is a Lorentzian dip and a doublet formation under the magnetic field.

Figure 8A:
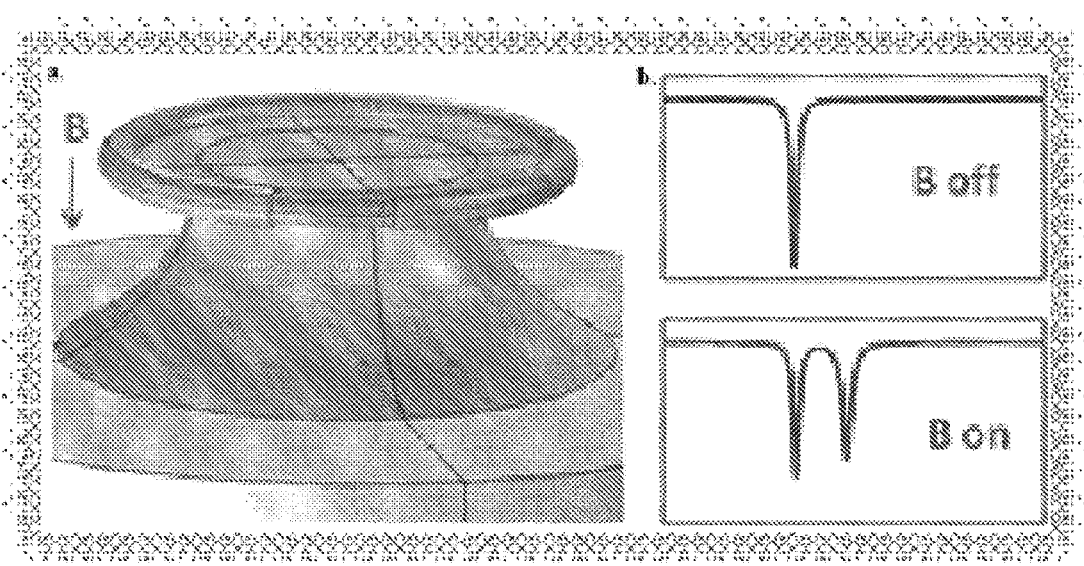
FIGS. 8A and 8B illustrate magnetic field sensitivity versus sensor size.
Figure 8B:
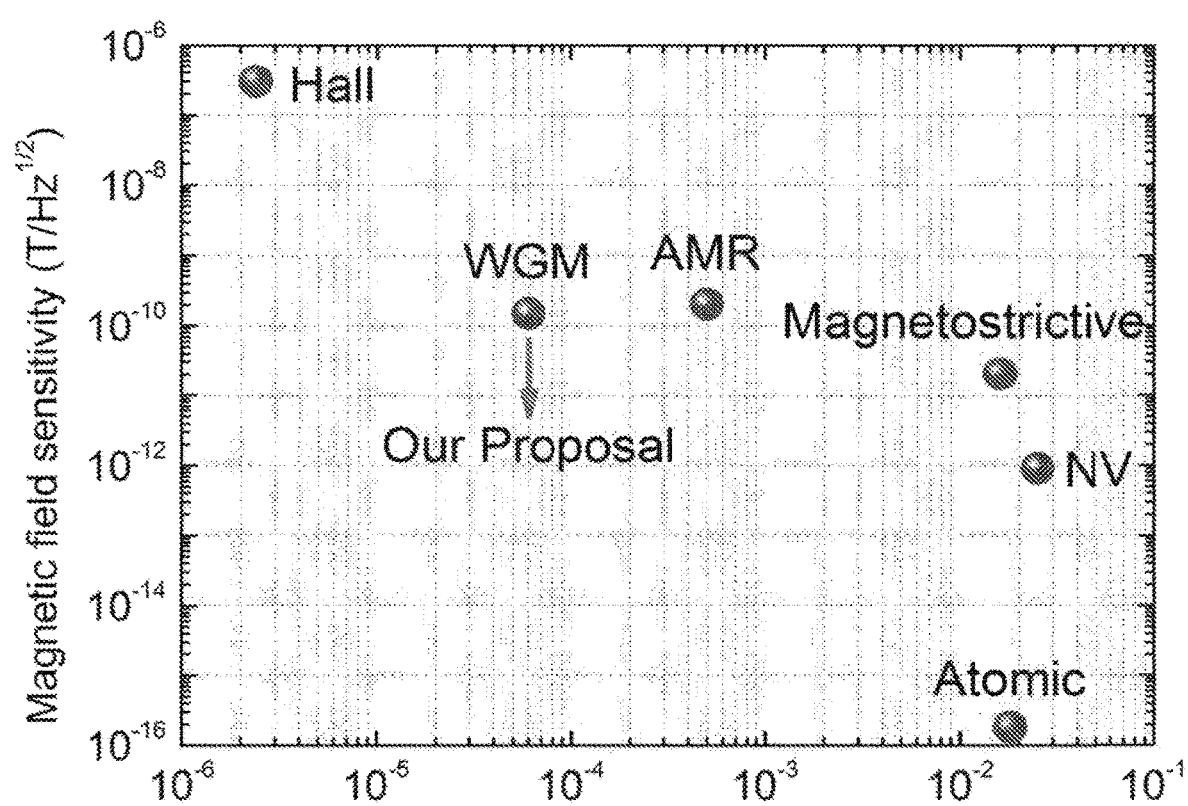

Referring to FIGS. 8A and 8B, as previously discussed, microtoroid whispering gallery mode resonators (WGMRs) are one of the most exquisite platforms for enhancement of light-matter interactions. Strengthening the interaction of a variety of materials with light leads to various applications. With WGMRs, rare earth ions such as $Er^{3+}$ and $Yb^{3+}$ yield ultralow threshold microlasers, Rayleigh scatterers provide single particle sensitivity and even optically inactive materials like silica can generate a sub-milliwatt Raman laser. Therefore, it is only instinctive to expect highest yield from a magneto-optic material when incorporated within a microtoroid WGMR. Here the technology as disclosed presents an on-chip microtoroid resonator coated with a $Tb^{3+}$ doped sol-gel layer to perform magnetic-field sensing. Terbium doping in silica is a well-established method for creating magneto-optic effect based optical isolators and other devices. Although other magneto-optic materials such as garnets or polymers provide larger Verdet constants, they are inadequate for integration and design as stand-alone photonic devices however silica microtoroid WGMRs are suitable devices for coating with polymers or doping with $Tb^{3+}$ ions as indicated in the previous section. Since the magneto-optic effect is dependent on the optical path length, high quality factor WGMRs with finesses of 10,000 are superior to the existing technologies.

By dip coating microtoroids in an $Er^{3+}$ doped sol-gel solution, annealing for 10 hours and later reflowing with a $CO_2$ laser an ultra-low threshold (34 µW) Erbium microlaser is demonstrated. This result shows that with the exact same procedure, Terbium doped sol-gel coated silica microtoroid WGMRs can be created to achieve ultra-high magnetic sensitivities. With silica toroidal WGMRs one is not restricted with the use of silica and silicon. As demonstrated coating of silica WGMRs with polydimethylsiloxane (PDMS) for compensating thermal refraction in silica where the quality factors were only decreased from $10^7$ to $10^6$. Recently, with regioregular polyalkylthiophenes Verdet constants as high as $10^5$ (°/Tm) have been reported. Combining the compatibility of silica with polymer coatings and the developments in magneto-optic polymers, a magnetic sensor is designed which has capabilities eclipsing that of the existing optical magnetic sensors. From sensitivity, stability, reliability to compact device design and cost our device outperforms the state of the art technologies.

The magnetic sensing theory is based on gyrotropic mode splitting. Mode splitting in WGM resonators has been demonstrated as a single nanoparticle sensing method. According to this method, a nanoparticle adsorbed on the surface of a silica microtoroid WGMR lifts the degeneracy of the modes propagating in the opposite directions. The degeneracy breaking then leads to creation of standing wave modes and from there the nanoparticle size or refractive index can be obtained. The method for detecting magnetic fields relies on a similar approach. The degeneracy lifting is achieved by asymmetric changes in the refractive index of the magneto-optic material instead of a nanoparticle adsorbing on the surface. With a known Verdet constant, the method predicts the magnetic fields causing the gyrotropic splitting.

A Terbium doped silica sol-gel or a magneto-optic polymer coated silica microtoroid under uniform magnetic field will have an anisotropic permittivity tensor with non-diagonal terms $$\varepsilon = \begin{matrix} \varepsilon & ig & 0 \\ -ig & \varepsilon & 0 \\ 0 & 0 & \varepsilon \end{matrix}$$

where $\varepsilon$ is the permittivity of silica without magnetic field and g is the gyrotropic constant from Terbium doped silica or a magneto-optic polymer, which can be expressed as $$g = \frac{V\lambda n |B_{ext}|}{180°}$$

where V is the Verdet constant, $\lambda$ is the wavelength, n is the refractive index and $B_{ext}$ is the external magnetic field.

With $B_{ext}$ the refractive index of the coated layer is modified and the effective refractive index for CW and CCW modes can be found by $n_{eff} = (n^2 \pm g)^{1/2}$. Sensitivity to changes in the refractive index of a medium that experiences the evanescent field of a WGMR is on the order of several 100 nm per refractive index unit (RIU). A WGM at 1500 nm band with a quality factor of $10^8$ will then be able to sense changes in the refractive index as small as $10^{-7}$. A magneto-optic coating with a Verdet constant of $10^3$ (°/Tm) on a silica WGMR, will also detection of magnetic fields as small as several pT. Note that, the magneto-optic effect here is a non-reciprocal phase shift which essentially can be realized as a frequency splitting between the clockwise (CW) and the counterclockwise (CCW) propagating modes due to the asymmetric permittivity of the medium. Once the degeneracy of the two modes is lifted, the CW and CCW modes couple and create a standing wave mode which embodies as a doublet in the transmission. The amount of splitting then is a function of the gyrotropic constant g and therefore the magnetic field that needs to be sensed.

Although theorized, a gyrotropic mode splitting in WGM resonators have not been demonstrated so far. The device will be the first demonstration of gyrotropic mode splitting in WGMRs. Eliminating the thermal and mechanical noises which hinder the practicality of WGMRs by a self-referencing mode splitting method, our device will not only achieve an unprecedented sensitivity, but will also be reliable and stable. The device fabrication is only based on well-established technologies which will allow mass production of cost-effective and micro-scale magnetic sensors to be used in aerospace applications.

Further, it should be noted that when radiation from photons impinge on a surface, the momentum of photons change, which generates radiation pressure applied to the surface. This process can be explained by newton's Second and Third Law. Therefore, by coupling magnetic-field-induced strain of a magnetostrictive material to the mechanical vibration of an opto-mechanical micro-resonator, a resonator opto-mechanical magnetometer can be achieved.

Ultrahigh-sensitive magnetic field sensors are indispensable components for a wide range of applications, such as geology, archaeology, mineral exploration, medicine, defense, and aerospace. Taking aerospace for example, magnetometers are essential elements for obtaining spacecraft altitude coordinates by measuring the geomagnetic field; another example is satellites to study magnetic space explosions. The current state-of-the-art of ultrahigh-sensitive magnetometry is achieved by Superconducting Quantum Interference Devices (SQUIDs), which enable detection of single electron spin. However, operation at liquid-He atmosphere temperatures limits the real applications especially for aerospace. Magnetometers capable of room temperature operation offer significant advantages both in terms of operational costs and range of applications. The state-of-the-art is atomic magnetometers which achieve impressive sensitivities as low as 160 pT $Hz^{-1/2}$. Recently, rapid progress has also been developed on NV center based magnetometers. Sensitivities as low as 0.9 pT $Hz^{-1/2}$ has been achieved. However, the atomic magnetometers remain limited to centimeter size scales. On the other hand, HV center based magnetometers need a centimeter-size test system, which hinders the potential application in biology, medicine, and especially aerospace.

Due to the $1/r^3$ decay of magnetic dipolar fields, sensor size is a critical parameter to further improve the sensitivity of sub-femto-tesla magnetometers. Thus, a number of technologies have developed to achieve a higher sensitivity together with a smaller sensor size. Here, we briefly review the magnetic field sensitivities and sizes for various available sensors at room temperature, as shown in FIG. 8B. Among them, the whispering gallery mode (WGM) microcavity based optomechanical magnetometer operating in the 100 pT range is a probable candidate for the aerospace application to balance the size (including the coupling system) and the sensitivity. The optical WGM micro-cavity-based magnetometer is particularly suited for space and aeronautics applications for the following reasons. First the micron-dimension size together with pT $Hz^{-1/2}$ sensitivity is the best choice for the aerospace application, which can be seen clearly from FIG. 8B. On the other hand, the optical magnetometer offers the intrinsic advantage of low electromagnetic interference and thus isolates the electronic measurement noise comparing with electronic magnetometers considering the complex electromagnetic environment in outer space. However, the sensitivity of the WGM based optomechanical magnetostrictive magnetometer is still far away from the state-of-art, limited by the poor coupling of the magnetostrictive material (Terfenol-D) to the optical cavity (microtoroid) due to the space separation of the magnetostrictive material and the cavity.

Here, the technology as disclosed presents to use high-Q WGM resonators coated with terbium doped sol-gel layer that is responsive to magnetic field for magnetic sensing. The presented use has several advantages over WGM optomechanical based magnetometer. First, the presented use is based on the Faraday Effect, which is more reliability than magnetostrictive magnetometer, since the latter is also sensitive to the mechanical vibration and temperature drift, but the former is not. Second, the sensitivity of terbium doped WGM based magnetometer will be much higher than optomechanical magnetostrictive magnetometer because of not only the highest Verdet constants in terbium doped silica glasses but also the higher coupling between the terbium and cavity mode. Third, the fabrication method (spin coating) of our devices is much more repeatable and suitable for flow production. Last but not least, the extreme temperature drift in outer space can be compensated by suitable polymer coating in our case.

FIG. 8B illustrates magnetic field sensitivity versus sensor size (including coupling system) for various available sensor techniques (blue points) at room-temperature, including Hall-magnetometers (Hall), whispering gallery mode resonator based magnetometers (WGM), anisotropic magnetoresistance magnetometers (AMR), magnetostrictive magnetometers, NV center based magnetometers (NV), and atomic magnetometers (atomic).

In one implementation of the technology shown in FIGS. 6A, 6B, and 6C, a microresonator based photo acoustic imaging can be achieved. A micro-resonator 600 and coupled waveguide 602 can be place in water 604 or other acoustically comparable medium. An ultrasound transducer 606 can coupled to the medium 604 to induce an acoustic signal 608. The micro-resonator can be powered by a laser 610 through a polarization controller 612. The acoustic signal can be detected by a signal analyzer 614 in the optical resonance amplitude 616 of the micro-resonator.

Figure 7A:
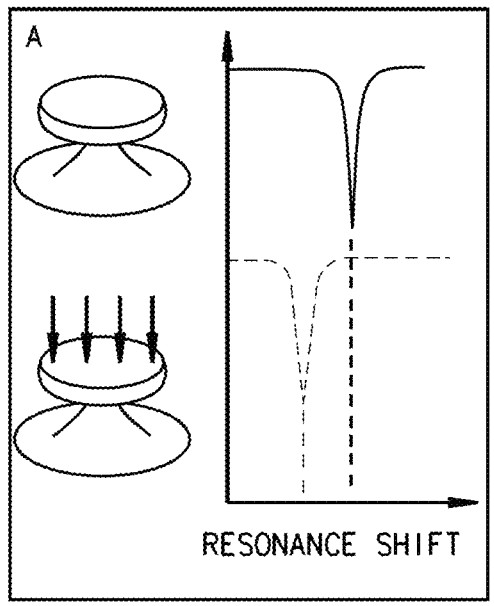
FIGS. 7A and 7B and 7C are illustrations of microresonator based sensor performance aspects.
Figure 7B:
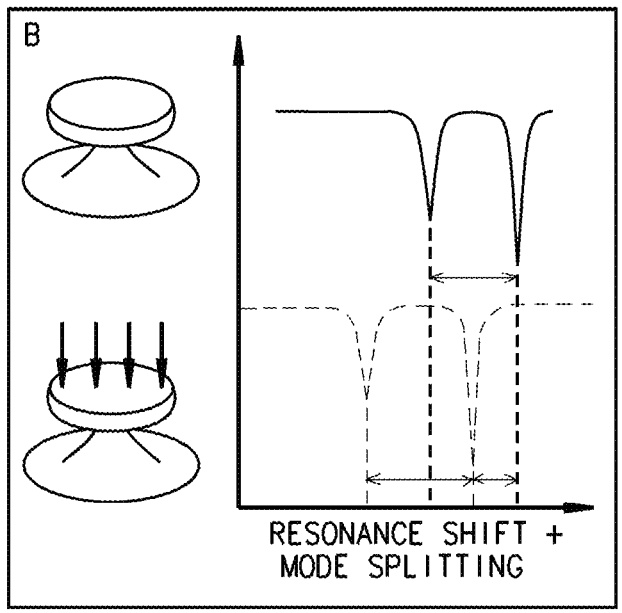
Figure 7C:
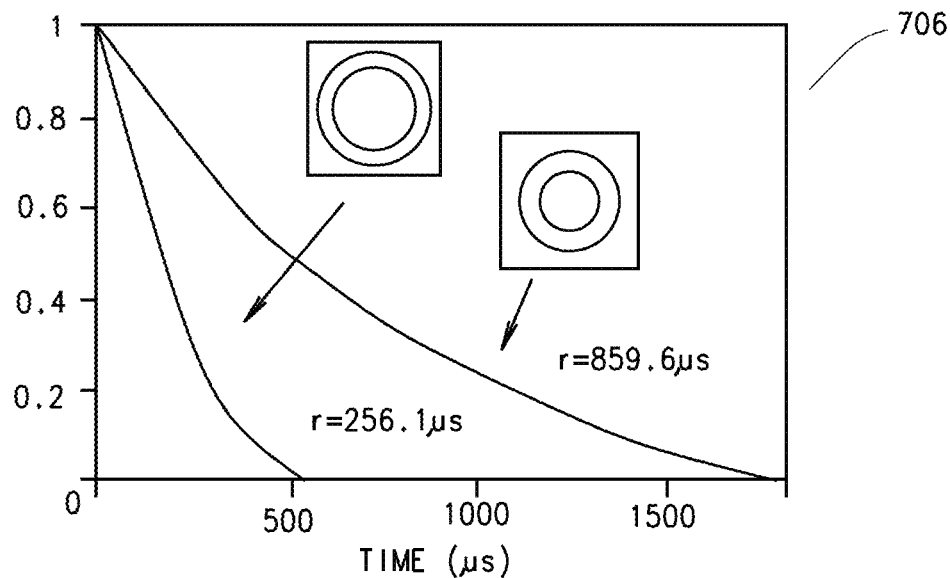

Referring to FIGS. 7A and 7B and 7C, in yet another implementation of the technology, a micro-resonator based sensor for thermal imaging can be achieved. Through thermo-optic effect, a resonant wavelength (frequency) shifts when a thermally isolated resonator is illuminated by infrared radiation, which can be used for thermal imaging. Thermal relaxation time measurements 706 reveal that the smaller pillar size leads to a longer thermal relaxation time.

Referring to FIG. 7A, an illustration of a spectral shift is provided. A single resonance mode experiences red-shift upon IR irradiation. Referring to FIG. 7B, an illustration of mode splitting is provided. Single resonance mode splits into two due to intra-cavity back scattering from an IR responsive scattering center (purple circle). IR irradiation leads to not only spectral shift in the split modes but also a change in mode splitting.

Techniques in thermal sensing using resonators (e.g., mechanical resonators including cantilevers, plasmonic devices, optical resonators) relies on monitoring the spectral shift of a single resonance mode (See FIG. 7A) either directly by scanning a tunable laser line around a resonance wavelength or indirectly by measuring the changes in the transmitted power of a laser operating at the 3-dB point of the resonance. Lack of a reference in this approach hinders discriminating the perturbations of interest, such as IR induced thermal changes, from irrelevant local or global interfering perturbations, because spectral shift of a single resonance is also very sensitive to laser intensity and frequency fluctuations, detector noise, and other environmental disturbances such as dust or nano-scale objects entering the resonator mode volume. Thus, detecting a resonance shift does not necessarily imply a thermal signal. Consequently, one cannot discriminate spectral shifts induced by IR irradiation from that induced by non-IR sources, such as thermal fluctuations of the background.

However, the technology as disclosed introduces mode splitting in active and passive WGM optical resonators as a novel self-referencing technique for detecting perturbations in or in close proximity to the resonator. In this approach, a single resonance mode splits into two spectrally shifted resonance modes with different resonance linewidths (See FIG. 7B). The required information is then extracted by comparing the spectral properties of the split modes. Since both of the split modes reside in the same resonator, they are affected similarly by common noises such as those originated from laser intensity and frequency fluctuations, coupling distance fluctuations or any jitter or noise that affects the resonator uniformly. This helps to minimize, if not eliminate, the effect of interfering perturbations by using one mode as a reference for the other. Therefore, due to its self-referencing feature, the mode splitting approach generates more sensitive and reliable sensing signals. On the other hand, the splitting signal is very sensitive to even trace amount of changes in the optical, physical or chemical properties of the scatterers in the resonator mode volume. This provides a way to monitor IR radiation using IR sensitive and responsive scatterers within the mode volume.

Referring to FIGS. 9A, 9B, 9C and 9D, Whispering gallery mode (WGM) resonators have been used to achieve high sensitivity single nanoparticle/molecule sensors. But most experiments are based on monitoring the changes in resonance spectra induced by the particle/molecule. A tunable laser is thus required to generate the spectrum and achieve the real-time operation. Although very good sensitivity and particle sizing is achieved, these requirements place significant hindrance on miniaturizing the system and lowering the cost. Here a technique that only relies on power measurements is described. This method monitors the power change of resonance enhanced reflection by nanoparticles in a microresonator. Although the basic idea of probing the reflected light has been previously reported in literatures through the configuration of add-drop filter, experiments on real-time detection have not been demonstrated. In this proof-of principle experiment we used a tunable laser, however methods are available to replace it with a laser diode which can be thermally locked to a resonance.

Figure 9A:
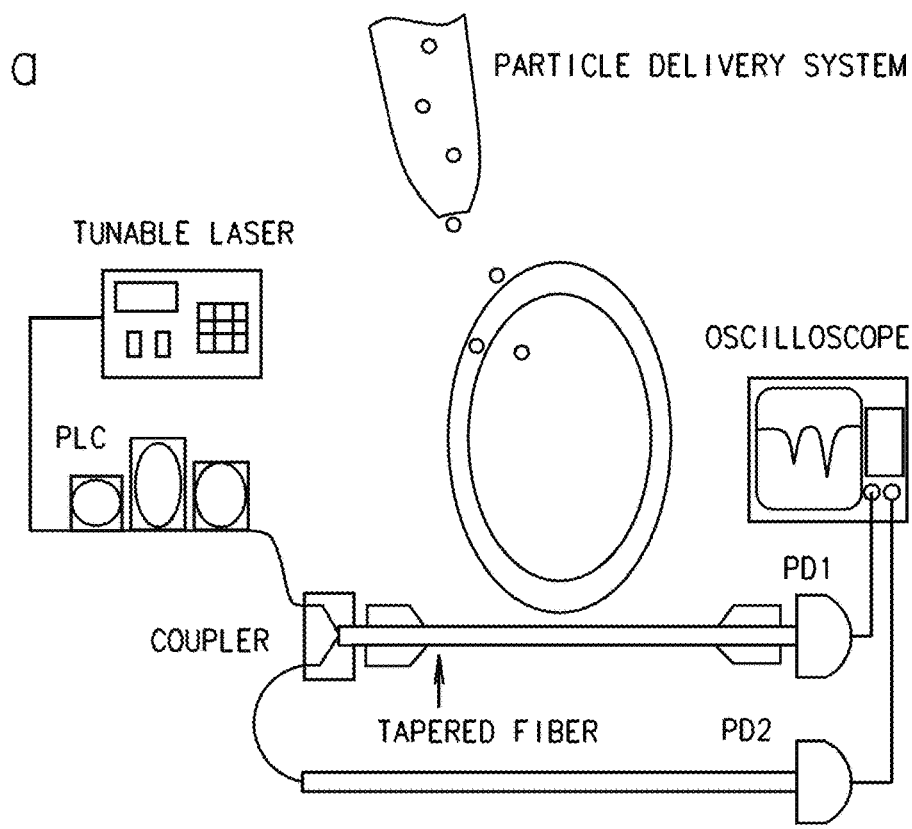
FIGS. 9A, 9B, 9C, and 9D are illustrations of Whispering gallery mode (WGM) resonators used to achieve high sensitivity single nanoparticle/molecule sensors.

One may even use a broadband light source, such as LED, since no wavelength information is needed in the scheme. Scattering centers on a microresonator such as nanoparticles can induce mode splitting. It effectively couples the two counter propagating modes. Therefore the power in the original forward propagating direction is coupled into the backward direction. It allows us to receive light in the back-reflection port. FIG. 9A describes the experiment setup. Initially when there are no particles on the microtoroid, only the counter clock-wise (CCW) mode exists and PD2 doesn't receive light. When particles are adsorbed onto the surfaces of the microtoroid, they scatter light into the clock-wise (CW) mode and subsequently the light is coupled back to the fiber taper in the back-reflection direction. This process can be monitored by PD2 in real-time.

Figure 9B:
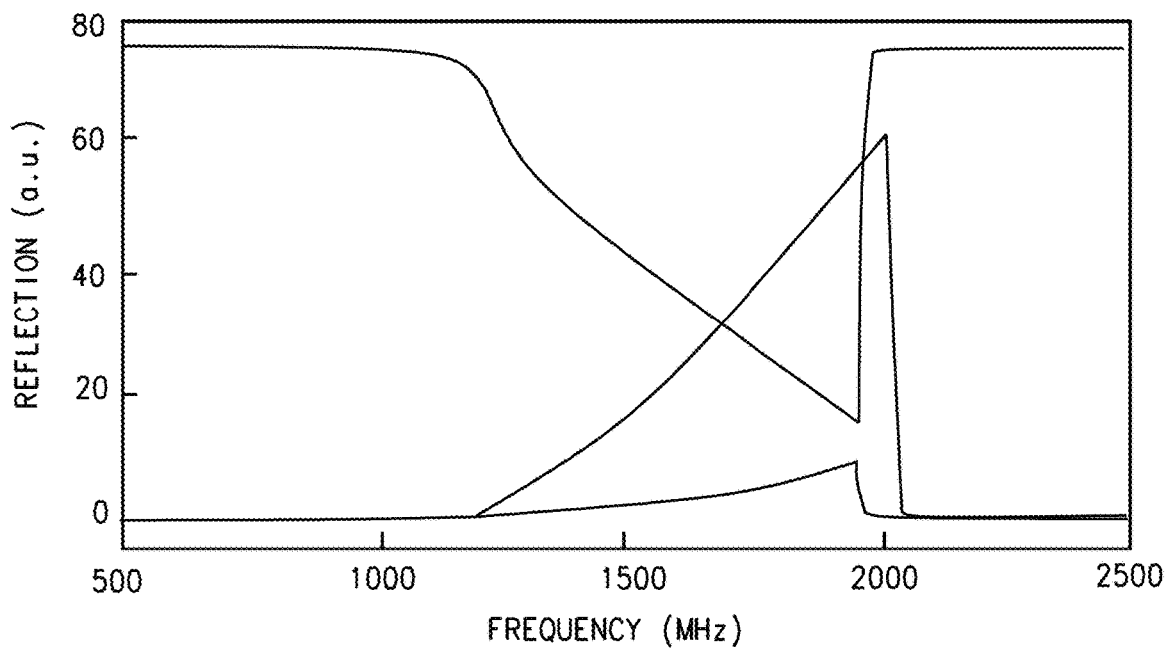

Referring to FIG. 9A, the experiment setup for back-reflection based nanoparticle detection includes a particle delivery system as described above. Referring to FIG. 9B, transmission and reflection spectra are compared at the time of 50 s and 100 s after particle deposition started. The triangular shapes of the spectra are due to opto-thermal heating of the microresonator during wavelength up-scanning.

A microresonator free of contaminations (scattering centers) should create a dark background to observe particle induced reflection, whose detection limit is constrained by the noise and sensitivity of the photo-detector. Considering two polystyrene (PS) particles with radii of R=40 nm and R=5 nm, and a resonator with Q factor of $10^8$ and mode volume of 200 mm$^3$, in the former case, mode splitting is observable and the reflected power is 250 mW with 1 mW of input power. In the latter case, no mode splitting or spectral shift is visible and but the reflected power is about 28 nW, enough for a photo-detector to measure. From these examples one can predict that in an optimized setting, this scheme has the potential to detect much smaller particles than all the demonstrated optical resonator sensing methods. For example if we consider an input power of 10 mW and a photo-detector sensitivity of 1 nW, one can detect a PS particle as small as R=1:6 nm, using a microtoroid with Q=$2\times10^8$. Using the system described in FIG. 1$a$, we first conduct the experiments with PS particles of R=50 nm. The microtoroid we used in this test has Q factors of about $5\times10^6$. The input laser power is about 5 mW. Due to the strong on-resonance pumping, the spectra exhibit triangular shapes due to the heating of resonator material and red-shift of resonance during wavelength up-scanning.

Figure 9C:
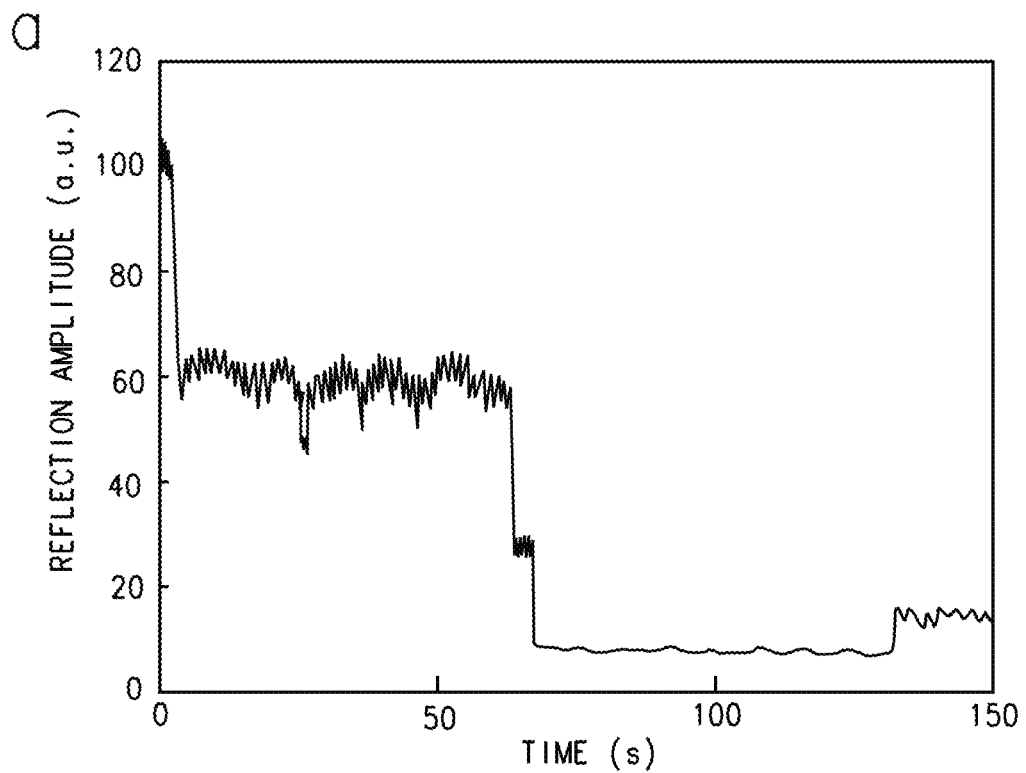
Figure 9D:
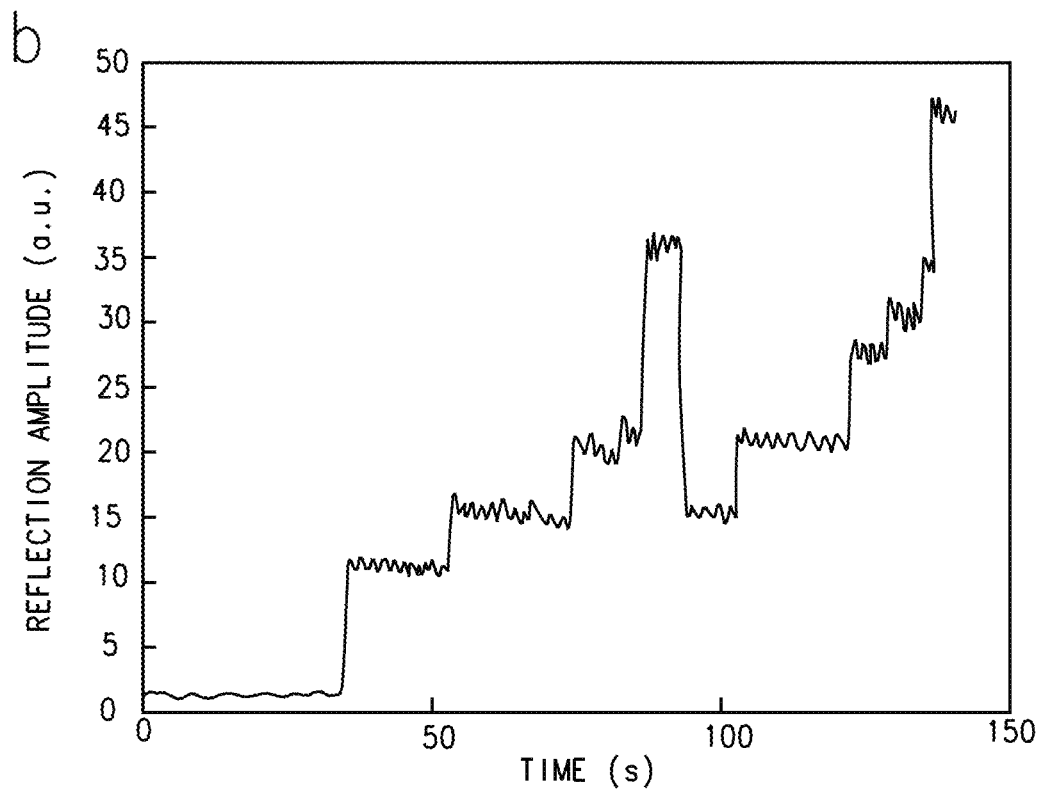

FIG. 9B depicts the captured transmission and reflection spectra at 50 and 100 seconds after particle delivery starts. Four discrete changes are seen in the first 150$s$, signaling four particle binding events. Note that in this specific test, the microtoroid sample has a relatively large initial reflection before any particle binding due to contamination. The consecutively deposited particles may increase or decrease the reflection amplitude as suggested in, depending on the particle location. For a clearer presentation we plot the reflection amplitude vs. time in FIG. 9C, where the four discrete changes are shown clearly. To further test the sensitivity of the scheme, we tested with R=20 nm Sodium Chloride (NaCl) nanoparticles (n ¼ 1:52). The results are shown in FIG. 9B. The Q factor of the microtoroid in this test is about $2\times10^7$. In summary, technology as disclosed presents the theory and proof-of-principle experiments for detecting nanoparticles using the reflection mode in a microresonator. Unprecedented sensitivity could be achieved using this scheme, as indicated by both calculations and the results in the initial tests (FIGS. 9C and 9D). By further optimizing the experimental conditions, particle size range below 5 nm will be within reach.

The various implementation examples shown above illustrate a micro-resonator sensing system. A user of the present technology may choose any of the above implementations, or an equivalent thereof, depending upon the desired application. In this regard, it is recognized that various forms of the subject sensor system could be utilized without departing from the scope of the present invention.

Detection of Nano-Scale Particles with a Self-Referenced and Self-Heterodyned Raman Micro-Laser One embodiment of the present technology comprising whispering gallery mode resonator based nano-particle detection teaches a system and method for effectively detecting nano-sized particles. The details of the technology as disclosed and various implementations can be better understood by referring to the figures of the drawing. Referring to FIG. 10A, a diagram of one implementation of the photo-detection system is provided with a photodiode (PD) array monitor and optical spectral analyzer (OSC) setup is shown. A wavelength division multiplexer (WDM) can be utilized to multiplex the wavelengths of the output from the waveguide prior being sensed by the photodiodes. A computer can be used to receive the results. The micro-toroids used can be 40 μm in major diameter and 8 μm in minor diameter. An optical microscope image (the upper left inset of the diagram) of a typical resonator that can be used is shown in FIG. 10A. External cavity lasers with polarization controlled (PC) emission in the 660-, 980-, 1,450-, and 1,550-nm band can be used as pump lasers. A tapered fiber coupling (FC) can be utilized as a waveguide. Optical spectra of the pump and the resulting Raman laser can be measured by an optical spectrum analyzer with 0.1-nm resolution in order to monitor and verify the intended performance. To obtain the transmission spectra of the resonators in different bands, the lasers can be scanned repeatedly through a frequency range of 30 GHz around a single WGM and the transmitted power can measured.

FIG. 10B shows a typical resonance spectra obtained for a silica micro-toroid in the 1,450-nm pump band and 1,550-nmRaman gain band. The quality factors of these resonance modes are $4\times10^7$ and $3.5\times10^7$, respectively. Referring to FIG. 1, one implementation of a demonstration setup and measurement method is shown. FIG. 10A provides on implementation of a setup of the technology as disclosed for Raman gain-enhanced detection of single nanoparticles using mode splitting. A differential mobility analyzer (DMA) with a nozzle can be used to deposit nanoparticles into the mode volume of the resonator one by one. However, other devices and methods can be utilized to introduce nano-particles to the particle detection device. In practice, air sample collectors can be utilized, where the collectors will sample the air and purge it onto the resonator. Also a sensor using the technology as disclosed can be placed in an environment with light coupling in and out and the system can wait until a particle falls on it. One need not employ DMA for this. Also, the micro-resonator based technology as disclosed can be used in an array such that a plurality of the sensors systems are connected to each other and can be distributed in an environment. The array of a plurality of resonators can be configured on a single chip and can be spatially separated among many resonators monitoring the environment.

Also, nano-particles can also be introduced to the particle detection device simply by a nano-particles movement, unaltered by the technology as disclosed, either in free-space, a gas or liquid. The micro-resonator can be placed in one or more of a free air, gas or liquid environment containing a nano-particle and positioned such that the nano-particle can be introduced to the micro-resonator. Light from a pump laser can coupled to the WGM of a micro-toroid resonator by a fiber-taper coupler (FC). The residual pump, Stokes photons, and the Raman laser can be out-coupled from the resonator with the same fiber taper.

A silicon chip with silica micro-toroids can be placed on a 12D nano-positioning stage to precisely tune the distance between the fiber taper and the micro-toroid. A fiber polarization controller (PC) can be used to change the polarization state of the pump laser to maximize the coupling efficiency. The pump light and the Raman laser light (probe light in case of below lasing threshold operation) can be separated from each other using a wavelength division multiplexer (WDM) and detected with photodetectors (PD) connected to an oscilloscope (OSC). The top view of a fiber-taper-coupled silica micro-toroid resonator taken by an optical microscope is provided as an inset in the upper left of FIG. 10A. FIG. 10B provides transmission spectra of the silica micro-toroid obtained in the 1,450-nm and 1,550-nm bands at low optical power. The resonances in these bands are separated from each other by 11.67 THz, which lies within the Raman gain spectra given in FIG. 10C, as insets.

FIG. 10C provides a transmission spectra obtained for the system with the pump operating in the 1,450-nm band and Raman gain and the laser in the 1,550-nm band when the wavelength of the pump laser (top line) is scanned in time. The saw-tooth like waveform is due to the thermal broadening of the resonance line. Moving along the saw-tooth-like form in time, more pump light is coupled into the resonator, and the cavity power build-up is sufficient to produce Raman gain and lasing can be achieved as seen in the increased signal in the transmission obtained in the 1,550-nm band (bottom line). As seen in the graphical inset of FIG. 10C, the Raman process and the Raman gain spectra for silica, the Raman gain is provided within a band of 5-30 THz away from the pump light.

A differential mobility analyzer (DMA) can be utilized accompanied by a nozzle to deposit nanoparticles onto the WGMR. Nano-particles can be carried out from their colloidal solution using a collision atomizer. After the evaporation of the solvent in poly-disperse droplets, the solid particles can be neutralized to maintain a well-defined charge distribution. Then they can be sent to the DMA, which classifies them according to their electrical mobility. The output slit of the DMA allows only the particles within a narrow range of sizes to exit and land on the WGMR via the nozzle. The flow rate and the concentration of the colloidal solution can be set low to ensure deposition of particles one by one. Transmission spectra obtained for the pump in the 1,450-nm band and the Raman signal in the 1,550-nm band as the pump wavelength was scanned are given in FIG. 10C. As a result of the high Q and strong pump power, the cavity power build-up in the pump mode becomes so high that a strong thermal broadening is clearly seen in the 1,450-nm band as the wavelength of the pump laser was up-scanned from shorter to longer wavelengths. This thermal broadening helped the pump light to stay on resonance long enough to achieve Raman gain and Raman lasing in the 1,550-nm band.

The technology as disclosed therefore demonstrates that Raman gain in silica can be used to compensate for a portion of the optical losses in a micro-toroid and thereby improve the sensitivity of the mode-splitting technique. It is known that WGMRs support two counter-propagating modes (clockwise, CW and counterclockwise, CCW) at the same resonance frequency co, and that a scattering center (e.g., a nanoparticle a virus, or a molecule) can lift this degeneracy, leading to the splitting of the single resonance mode into two modes, by mediating a scattering-induced coupling between the CW and CCW modes.

Mode splitting can then be resolved in the transmission spectra of the WGMR if the amount of splitting $2g=-\alpha f^2\omega/V$ is larger than the total loss of the system, quantified by the strict condition $|2g|>\Gamma+\omega/Q$ for well-resolved mode-splitting. Here f is the field distribution of the WGM, $\alpha=4\pi R^3 (n_p^2-1)/(n_p^2+2)$ is the polarizability of the particle of radius R and refractive index $n_p$ with the surrounding medium as air, $\Gamma=(8/3)g\pi^2\alpha/\lambda^3$ is the additional loss induced by the scatterer, and $\omega/Q$ is the linewidth of the resonance (quantifying loss before the scatterer is introduced).

For very small particles we have $\Gamma<<\omega/Q$, thus the strict condition reduces to $2g>\omega/Q$. In practice, satisfying this strict condition is in general difficult, and the split modes overlap with each other. In principle, splittings as small as $\omega/NQ$ can be resolved, where N is a number in the range 10-50 depending on the system and signal processing capabilities. The dependence of 2 g on $f^2$ and $\alpha$ implies that if the overlap between the mode field and the scatterer is not high enough or if the particle is too small the induced mode splitting may be so small that it cannot be resolved within the background noise. In such cases, providing optical gain to increase the Q and hence to reduce the linewidth of the resonance will help to resolve the mode splitting.

Figure 11A:
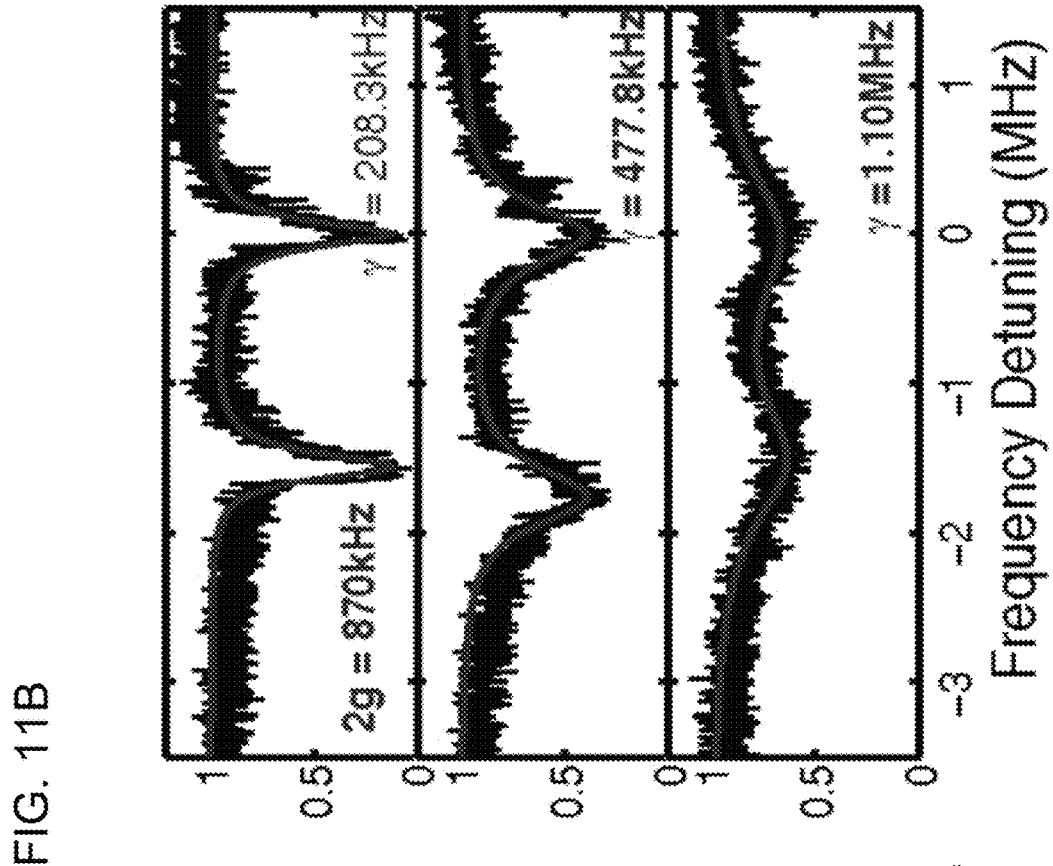
FIGS. 11A and 11B are a graphical illustration of a normalized transmission spectra of a Raman gain-enhanced detection.

Referring to FIGS. 2A and 2B, graphical illustrations of Raman gain-enhanced detection of scatterer-induced mode splitting are provided. One implementation of the technology can be performed by a pump-and-probe method. A pump laser operating in the 1,450-nm band can be used to provide Raman gain in the probe band of 1,550 nm. As the pump power is increased, Raman gain increases from bottom to top in FIGS. 11A and 11B, where the spectra in the bottom panels were obtained when the pump was turned off (no gain). The power of the probe laser is set at 1.2 µW and 2.0 µW in FIGS. 11A and 11B, respectively, and thermal broadening is not seen for the probe mode in the 1,550-nm band. Referring to FIG. 11A, initially there is unseen mode splitting in the transmission spectra (Bottom, pump is off), which becomes visible (Top, pump power was 151 µW) due to the narrowing of resonance linewidth as the pump power was increased. As reflected in the middle graph the pump power is 87 µW, which is enough to induce linewidth narrowing for the probe mode but not sufficiently high to help resolve the splitting. Note that at these high pump powers there is thermal broadening in the 1,450-nm band.

Figure 11B:
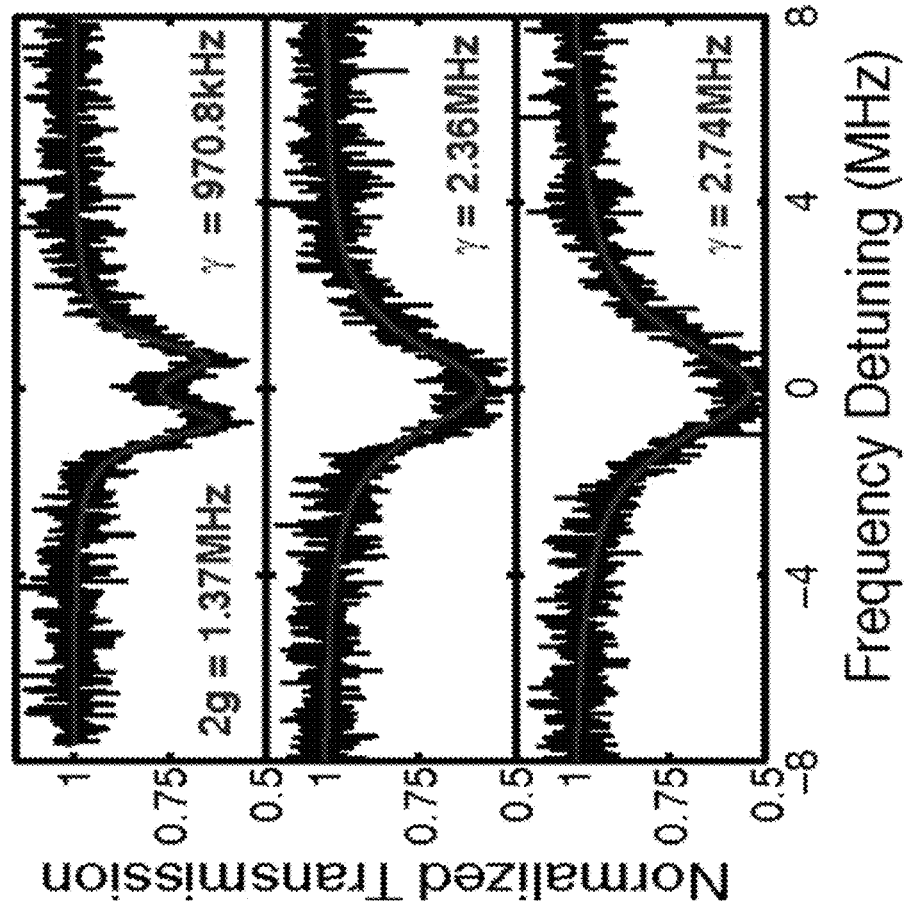

Referring to FIG. 11B, initially mode splitting (Bottom, pump was off) is barely seen, but becomes much clearer and well-resolved (Middle and Top, pump power was set as 69 µW and 97 µW, respectively) as the pump power is increased. Moreover, the split resonances become deeper, implying that the provided Raman gain, which compensates intrinsic losses of the resonator, moves the taper-resonator systems from the under coupling regime to closer to the critical coupling regime. Note that the distance between the resonator and the taper can be kept fixed, thus there is no change in the coupling loss. In FIGS. 11A and 11B, test data obtained for the transmission spectra is provided, and the best theoretical fit to the experimental data is provided. γ denotes the linewidth of resonance modes and is obtained from the fitting curve.

Two sets of test data help to verify the present technology as disclosed in that the Raman gain-assisted Q enhancement via loss compensation and hence improved detection of mode splitting. The test intentionally included inducing a small mode splitting using a fiber tip such that mode splitting could not be resolved by a low-Q resonance in the 1,550-nm band. When pumping the silica micro-toroid using a laser in the 1,450-nm band, the transmission spectrum can be monitored in the 1,550-nm band by a probe laser whose power is set so low that no thermal broadening is observed in the transmission spectra. As the pump power is increased, generated Stokes photons compensated for the losses, leading to narrowing of the linewidth of the resonance (See FIGS. 2A and 2B) in the probe band. As a result, initially unobservable mode splitting becomes clear (See FIG. 11A).

In another demonstration of the technology, the position of the fiber tip can be adjusted in the mode volume such that it introduces a very small amount of mode splitting. The taper resonator system can be set to the under coupling regime so that the features of the mode splitting are barely seen when there is no pump. When the pump laser is turned on and its power is increased, a clear mode splitting of 1.5 MHz is observed in the transmission spectrum. This is an indication of the enhancement of the Q of the probe mode in the 1,550-nm band. Also observed is that the gain shifted the taper-resonator system from an under coupling regime to close-to-critical coupling. This can be understood as follows. In the under coupling regime, coupling losses quantified by $\kappa_{ext}$ is much smaller than the intrinsic losses $\kappa_0$ (i.e., $\kappa_0 \gg \kappa_{ext}$). During the test the distance between the fiber taper and the resonator is kept fixed, thus $\kappa_{ext}$ stayed the same. The induced gain reduced $\kappa_0$ and brought it closer to $\kappa_{ext}$, and thus shifted the system from an under coupling regime to critical coupling where $\kappa_0 = \kappa_{ext}$.

This is reflected in the transmission spectra as a transition from a close-to-unity transmission to close-to-zero transmission at resonance and better resolution in detecting the splitting (See FIG. 11B). The system can move from one coupling regime to another in at least two different ways, including keeping $\kappa_0$ fixed and varying $\kappa_{ext}$ via tuning the distance between the resonator and the fiber-taper; or by keeping $\kappa_{ext}$ constant (i.e., taper-resonator distance is fixed) and varying $\kappa_0$, which can be done either by introducing extra losses or by compensating the losses. The system as disclosed demonstrated the second approach.

Once the pump power exceeds a threshold value, lasing can be observed at frequencies shifted relative to the pump frequency. By fine tuning the pump power and the taper resonator coupling strength, single and multimode lasing can be obtained in the same micro-toroid. Therefore, one skilled in the art can conclude that a single WGMR can be used to generate lasing at different colors covering a large range of the spectrum and hence can be used for optical detection and sensing in all bands as indicated (See FIGS. 12A, 12B, 12C, and 12D).

Figures 12A, 12B, 12C, 12D:
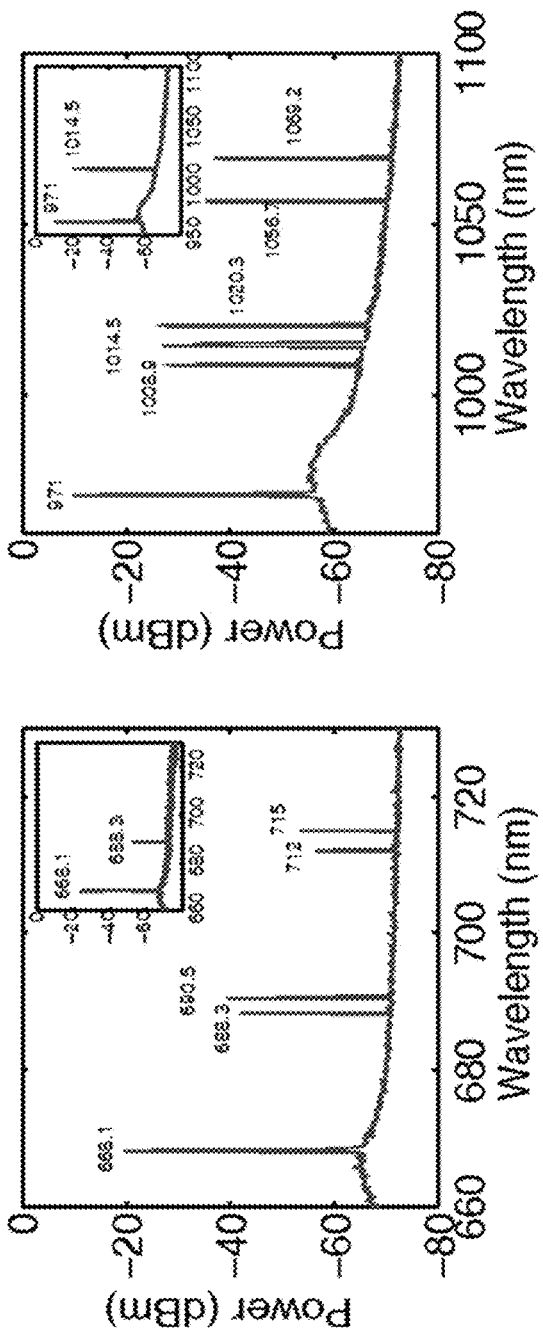
FIGS. 12A, 12B, 12C, and 12D are a graphical illustration of an emission spectra of Raman lasing at different bands.

Referring to FIGS. 12A, 12B, 12C, and 12D, emission spectra are shown of Raman lasing obtained in the same silica micro-toroid resonator at different bands of the spectrum covering visible to near-IR. The pump lasers can operate in various bands as indicated in FIG. 12A—660-nm, FIG. 12B—980-nm, FIG. 12C—1,450-nm and FIG. 12D 1,550-nm bands. Higher-order cascaded Raman Stokes lasing can be seen in all of the spectra. The single-mode operation of the Raman lasers can be obtained by tuning the pump power and the coupling condition.

The lowest lasing thresholds demonstrated by the test data are 147.2 µW for the 1,550-nm pump, 169.5 µW for the 1,450-nm pump, 92.1 µW for the 980-nm pump, and 79.3 µW for the 660-nm pump. At much higher pump powers the test data shows that the spectra evolved from single mode (FIGS. 12A, 12B, 12C, and 12D, Insets) to a spectrum with multiple Raman lasing peaks separated by the free spectral range, as well as cascaded Raman lasing lines separated by the Raman shift. The first-order Raman lasing in the resonator serves as the pump for the second order Raman lasing, so multiple second-order Raman lasing lines for the pumps can be observed in the bands of 660 nm, 980 nm, and 1,450 nm.

The ability to operate the same WGM sensor in different spectral bands has specific industrial applicability. It is noted that optical losses associated with the operating medium (i.e., aqueous solution, serum, air, etc.) are wavelength-dependent. Light sources and WGM resonances in the near-Infra-Red (near-IR) and IR bands are not preferable for operation in water due to strong absorption. Shifting the operating wavelength to the visible band minimizes losses, leading to higher Q and easy excitation of WGM lasing. Due to the pump wavelength dependence of the Raman gain, the same dopant-free resonator can be used in many different media for lasing and sensing applications by choosing the proper pump wavelength and WGM.

It is also noted that loss induced by a binding particle scales as $R^6/\lambda^4$, where R is the radius of the particle and $\lambda$ is the wavelength of the light. Thus, operating the sensors in longer wavelengths will help to minimize particle-induced losses and enable detecting and characterizing larger particles. The same Raman WGM sensor can still be operated at shorter wavelengths for detecting smaller particles whose detection is limited mostly by the resonance linewidth. Thus, WGM sensors using Raman gain will have a larger operating range.

When using the technology as disclosed, different resonances and lasing modes in the same resonator can have different spatial field distributions; therefore, their responses to a binding particle/molecule/protein are different. A nanoparticle inducing splitting or frequency shift in one lasing mode may not be able to induce a resolvable splitting in a different lasing mode in the same WGM micro-laser. Therefore, the ability to have multiple wavelength lasing can avoid missing a binding nanoparticle/molecule or decrease the probability of a binding particle's going undetected. Thus, having lasing in the same resonator at multiple wavelengths will help to improve detection efficiency and decrease the number of binding events gone undetected. Raman gain allows multi-wavelength lasing in different bands and is suitable for various applications.

The present technology leverages a Raman process, which allows one to generate lasing at many different spectral bands, which without the present technology is not presently a commercially available laser. For situations in which there exists no laser covering the bands where a particle has its maximum absorption or scattering cross-section, a Raman micro-laser can be very useful to detect and discriminate particles by monitoring their responses (absorption, scattering, etc.) to light at different wavelengths. Similarly, in situations where high absorption of a binding particle at a specific wavelength band significantly degrades Q, interfering with lasing conditions or even preventing lasing, Raman gain can be useful because one can time the operation wavelength far from the absorption band of the particles. Thus, the ability to work at different spectral bands with the same WGM sensor using Raman gain may help one choose the proper operating band according to the properties of the particle/molecule/analyte and the surrounding, as well as to use specific wavelength dependent responses of the particles/molecules and the medium for improving the operating range, detection efficiency, and sensitivity. Therefore, the present technology as disclosed has specific industrial applicability.

The generation of a beat-note signal due to scatterer induced mode splitting can be confirmed by introducing a nanofiber tip into the mode volume of a Raman WGM micro-laser and monitoring the self-heterodyne beat-note signal in response to its position (See FIGS. 13A, 13B, and 13C). Referring to FIGS. 13A, 13B, and 13C, detection of scatterer-induced mode splitting using WGM Raman lasing in two different bands in the same silica micro-toroid is graphically illustrated. A nano-fiber tip introduced into the mode volume of the resonator can be used to simulate scatterers within the mode volume. Test data is graphically illustrated to correspond with the pump laser in the 980-nm and 1,450-nm bands. Referring to FIG. 13A, Optical spectra of Raman lasers with pumps at 980-nm (Upper) and 1,450-nm (Lower) bands is illustrated.

Referring to FIG. 13B, change in the beat-note signal (See Inset Graph In FIG. 13B) and its frequency obtained using fast Fourier transform (FFT) when the nanofiber tip was within the mode volume is illustrated. Referring to FIG. 13C, changes in the beat-note frequency can be observed as the fiber tip repeatedly enters and exits the mode volume, each time at a different position and with different effective tip size in the mode volume. The responses of the lasing modes at different bands are different. Splitting of the lasing modes (beat-note frequency) may increase or decrease depending on how the scatterers are distributed within the mode volume of each mode. Splitting may increase or decrease for both lasing modes in different bands or may decrease for one lasing mode and increase for the other lasing mode.

Using different lasing lines in the same resonator reveals that the beat-note signal and its frequency are not only affected by the size of the nano-fiber within the mode volume but also by its spatial overlap with the fields of the lasing lines. At a fixed location of the nanofiber, the amount of splitting experienced by Raman lasers at different spectral bands is different (See FIGS. 13A, 13B, and 13C). Splitting may increase or decrease for all lasing modes in different bands or may decrease for some lasing modes but increase for the others. The amount of change in the splitting is different for different lasing modes. This is attributed to the facts that the spatial overlap between the nanofiber and the fields of different lasing modes are different and that mode splitting scales inversely with the wavelength. The present technology as disclosed provides measurements at multiple wavelengths or spectral bands, which enable detecting scattering centers (e.g., nanofiber) that could have gone undetected if only a single lasing mode were used.

Testing of the technology as disclosed evaluated the performance of the WGM Raman micro-laser and the mode-splitting method to detect nanoparticles with single-particle resolution. The technology can be tested using Au, polystyrene (PS), and NaCl nanoparticles. As discussed previously above, particle binding to the WGM micro-laser led to the splitting of a lasing line into two, which eventually gave a self-heterodyne beat-note signal when mixed at a photodetector. The beat-note frequency corresponds to the amount of splitting. Each consecutive nanoparticle binding event leads to a discrete change in the beat-note frequency. The frequency may increase or decrease depending on the location of each particle with respect to the field distribution of the lasing modes and the position of the particle with respect to previously deposited particles in the mode volume.

Figure 14A:
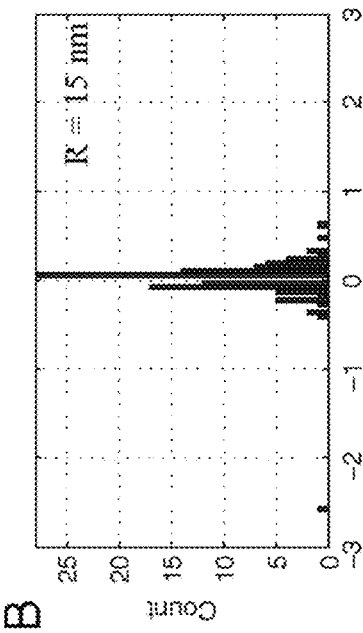
FIGS. 14A, 14B, 14C, 14D, 14E, and 14F are a graphical illustration of detection of NaCl nano-particles using the scatter induced splitting of WGM Raman laser.
Figure 14B:
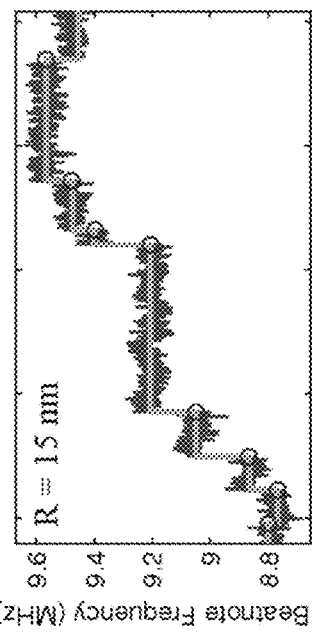
Figure 14C:
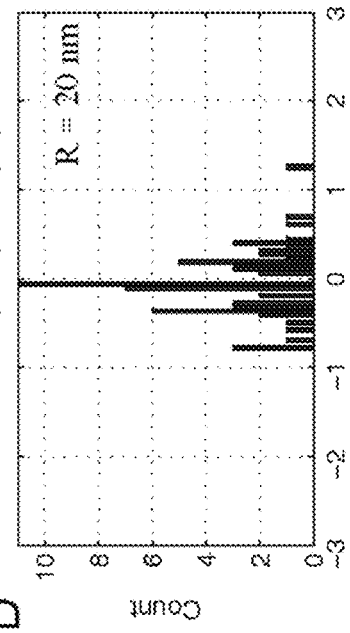
Figure 14D:
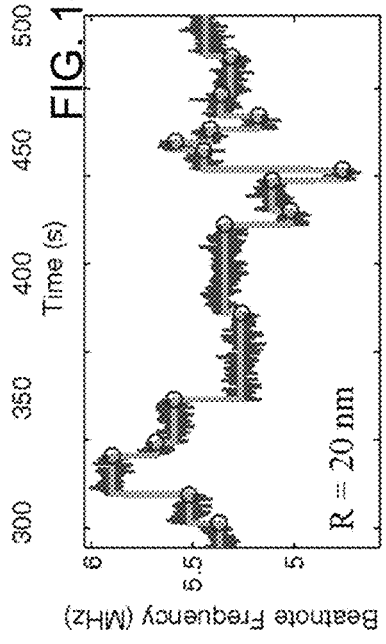
Figure 14E:
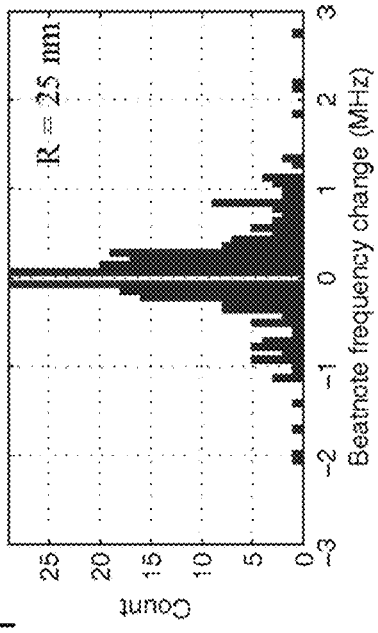
Figure 14F:
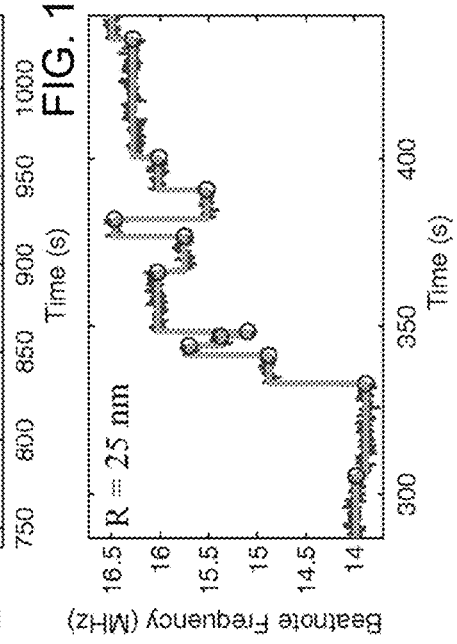

Referring to FIGS. 14A, 14B, 14C, 14D, 14E, and 14F, a graphical illustration of data is provided demonstrating detection of NaCl nanoparticles using the scatterer-induced splitting of WGM Raman laser. Each discrete upward or downward jump in the beat-note frequency spectra corresponds to a binding event of one nanoparticle with radius R=15 nm (FIG. 14A), R=20 nm (FIG. 14C), and R=25 nm (FIG. 14E). Histograms of the beat frequency changes for each nanoparticle binding event for NaCl nanoparticles of size R=15 nm (FIG. 14B), R=20 nm (FIG. 14D), and R=25 nm (FIG. 14F), which demonstrates a correlation between the size of the particle and the width (SD or rms) of the distribution.

FIGS. 14A, 14B, 14C, 14D, 14E, and 14F graphically illustrates the change in beat frequency and hence the splitting of the lasing mode as NaCl nanoparticles of size R=15 nm (FIG. 14A), 20 nm (FIG. 14C), and 25 nm (FIG. 14E) are continuously deposited onto the WGM Raman laser. With each particle binding event, a discrete up or down jump in the beat frequency can be observed. The histograms shown in FIGS. 14B, 14D, and 14F reveal that the larger the particles, the wider the distribution of the changes in the beat-note frequency. To estimate the reproducibility of the measured beat-note frequency, nanoparticle deposition can be stopped at some point, while continuously measuring beat frequency for an extended duration.

Figure 15B:
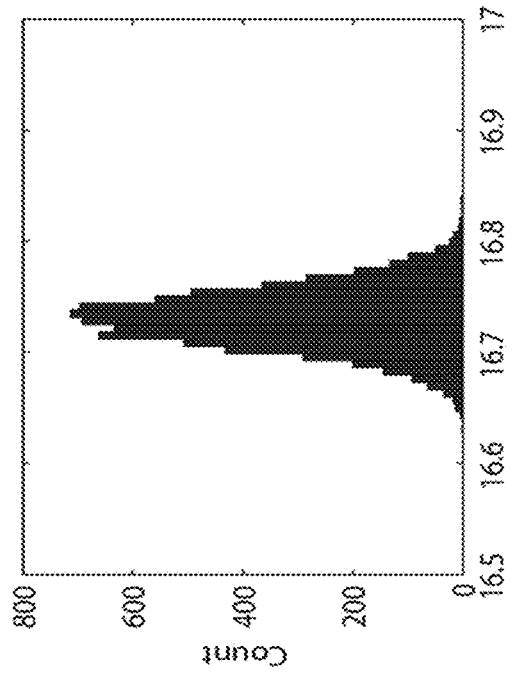
FIGS. 15A, 15B, 15C, and 15D are a graphical illustration of noise analysis measuring beat note frequency.
Figure 15A:
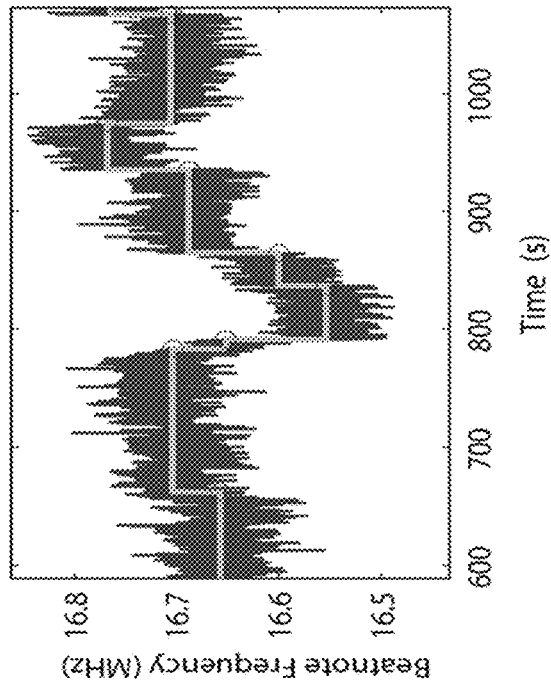
Figure 15D:
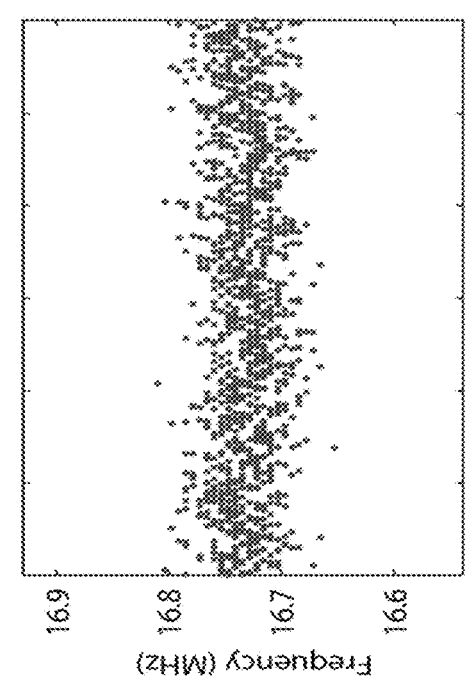
Figure 15C:
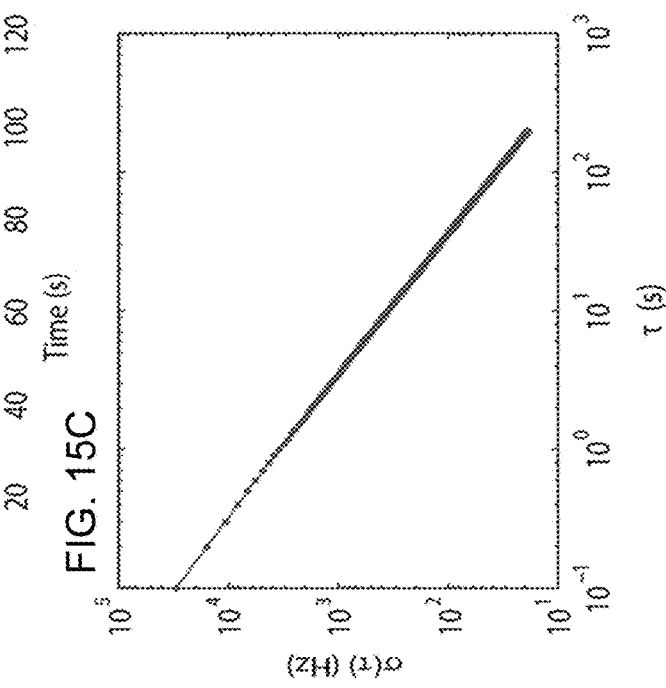

Referring to FIG. 15A, a change in the measured beat-note frequency as a function of time is graphically illustrated. FIG. 15B provides a histogram of the measured beat-note frequency. FIG. 15C provides an Allan deviation (the square root of Allan Variance, which is a measure/estimate of frequency stability due to noise processes) of measured frequency as a function of time. FIG. 15D, provides a beat-note frequency measured for NaCl nanoparticles of size R=10 nm.

Referring to FIGS. 15A and 15B, a depiction is provided of the beat frequency as a function of time and the histogram of measured frequencies, respectively. The measured frequencies stayed within 100 kHz of the mean frequency. Allan deviation can be calculated, which is a commonly used technique to estimate frequency stability. The Allan deviation for the beat frequency can be obtained using segments (integration time) from 0.1 to 200 s. The result is shown in FIG. 15C. FIG. 15D graphically illustrates the measurement results for NaCl nanoparticles of R=10 nm. It is seen that whereas some of the particle-binding events led to resolvable changes in the beat frequency, the changes in some others were not very clear.

The technology as disclosed can resolve the binding events even at the present noise level without any active or passive stabilization procedure. Based on the test data there is detection of the WGM Raman micro-laser down to 10 nm for NaCl particles. This corresponds to a polarizability of $3.82 \times 10^{-6}$ μm3, which is 100-fold smaller than that of the gold nano-rods detected with a silica micro-toroid stabilized using the Pound-Drever-Hall technique.

It should be noted that WGM-type sensors respond to the changes in the effective polarizability; therefore, they measure the polarizability of a particle/molecule entering the mode volume. Size or volume measurement is possible when the refractive index of the nanoparticle is known. Two particles in the same environment having the same volume (size) will have different polarizability if their refractive indexes are different; the one with higher refractive index has higher polarizability. Metallic nanoparticles (e.g., Au, Ag, etc.) with or without plasmonic enhancement have higher refractive index than dielectric particles (e.g., PS, NaCl, KCl, or silica). Thus, with the same sensor and under the same measurement conditions the size of the smallest detectable nanoparticles by plasmonic enhancement is always smaller than the size of the smallest detectable dielectric nanoparticle where plasmonic effects are not valid. Therefore, detecting particles with smaller volume does not necessarily mean better sensitivity.

Figure 16A:
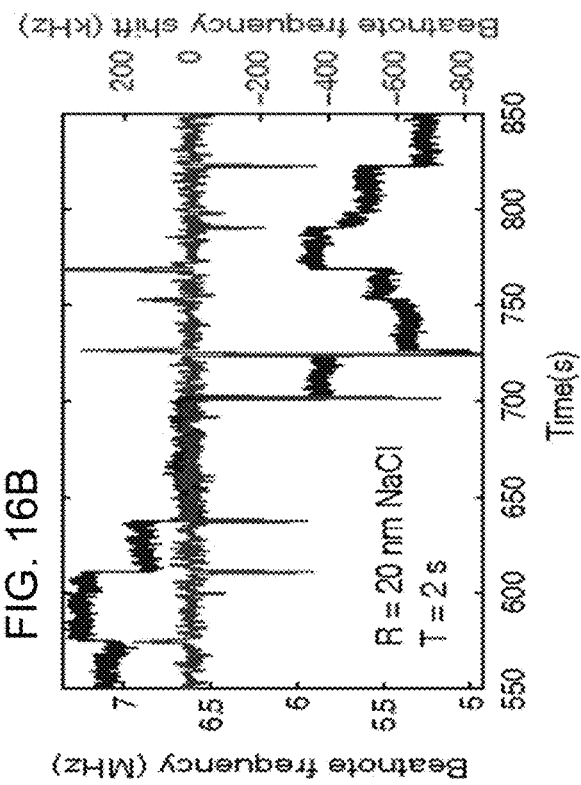
FIGS. 16A, 16B, 16C, and 16D are a graphical illustration of noise analysis measuring beat note frequency.
Figure 16B:
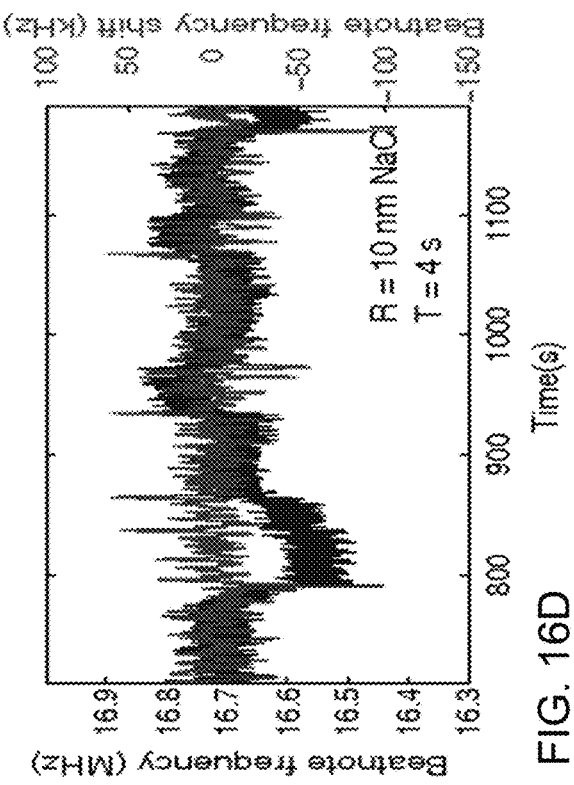
Figure 16C:
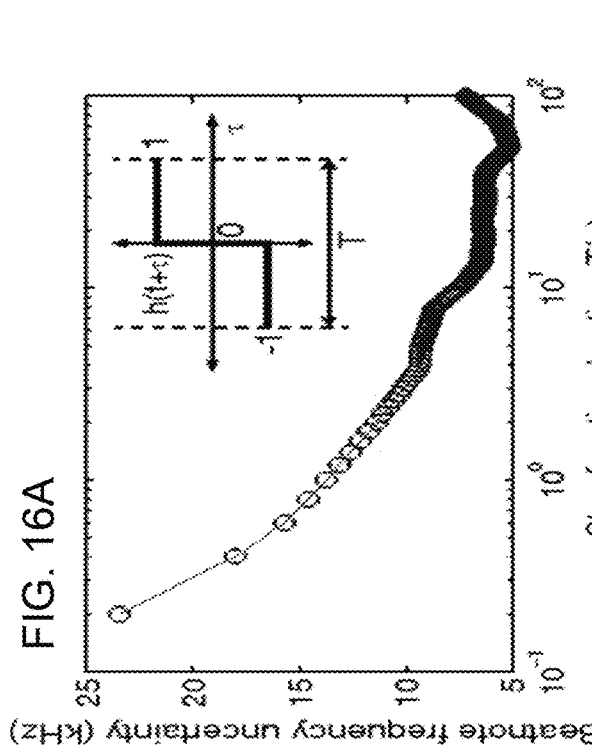

The test data to demonstrate the technology as disclosed provides that the raw noise and hence the sensitivity is at a level of 100 kHz (FIG. 15A), which translates into an SD of 26.4 kHz. To estimate the frequency noise floor (i.e., the uncertainty in the beat frequency) and hence the sensitivity limit, we performed cross-correlation $\delta v(t) = (2/T) \int_{-T/2}^{T/2} v(t) h(t+\tau) d\tau$ between the raw beat-frequency data $v(t)$ and a step function $h(t)$ of duration T (FIG. 16A, Inset).

To demonstrate the noise floor, the particle deposition can be stopped after the first particle binding event and the beat frequency can be monitored over the time window during which the particle flow is stopped. As seen in FIG. 16A, the uncertainty in the beat-frequency change decreases as the duration of the step function increases (i.e., more data is included). The uncertainty observed in the measured beat frequency drops from ~23.5 kHz for T=0.2 s to ~16 kHz for T=0.5 s, reaching a noise floor of 14 kHz for T=1 s. For step functions longer than 4 s the noise floor can be determined by the fluctuations of the coupling conditions. In the case that a binding event takes place within the duration of the step function, the noise floor increases significantly. For similar cases in which binding events take place at random time instants and the arrival times of the particles cannot be controlled, the duration T of the step function should be chosen by taking into account the low-frequency noises.

Referring to FIG. 16, a graphical illustration of a noise analysis is provided. FIG. 16A, illustrates uncertainty in the beat-note frequency as a function of the duration of the step function (Inset of FIG. 16A) used in the cross-correlation. FIGS. 16B-16D, illustrate a beat-note frequency as a function of time for NaCl particles of radius R=20 mu (FIG. 16B), R=15 nm (FIG. 16C), and R=10 nm (FIG. 16D). The curves that graphically illustrate raw data of beat-note frequency as demonstrated by testing are shown in FIGS. 16B, 16C, and 16D. The curves beginning a time T=550 with beat-note above 7 MHz (FIG. 16B); T=300 with beat-note below 8.8 MHz; and T=1200 with beat-note below 16.7 MHz are illustrative of raw data of beat-note frequency. The other curves denote the beat-frequency changes captured by the cross-correlation method using step functions of duration T=2 s, (C) T=2 s, and (D) T=4 s.

FIG. 16 B-D depicts the results of the cross-correlation method together with the raw beat frequency data. Clearly, when the duration of the step function is properly chosen, the cross-correlation method captures the binding events that lead to beat-frequency changes. In FIGS. 16C and 16D, an increase is seen in the raw noise as well as the noise floor at time intervals 343-410 s and 791-837 s, respectively. These correspond to time intervals between consecutive binding events that are clearly resolved by the cross correlation method. The measured noise levels of ~13.2 kHz and ~9.7 kHz, respectively, for T=2 s and T=4 s during these time intervals are clearly higher than the noise floors ~11.4 kHz and ~9.4 kHz estimated from FIG. 16A. The increase in the noise in these intervals can be due to hidden and unresolved binding events that take place between two consecutive resolved detection events, within the duration of the step functions used in the cross-correlation method.

Each discrete change in the beat-note frequency corresponds to a nanoparticle binding and detection event. In order to extract the size or polarizability of each detected nanoparticle directly from these changes, due to the amount of the changes is determined not only by the polarizability of the detected particle but also by its location within the mode volume as well as by its location with respect to previously deposited nanoparticles, statistical analysis can be performed to assign an average polarizability or size to a particle ensemble.

As shown in FIGS. 14A, 14B, 14C, 14D, 14E, and 14F, each discrete change of the beat-note frequency signals a nanoparticle landing in the mode volume. Different heights for the same particle size are due to different amounts of overlaps between the WGM and the detected particles. The distribution of these discrete jumps contains information on the particle size. The larger the particles, the wider the distribution is for beat-note frequency jumps (See FIGS. 14B, 14D, and 14F). The same particle delivery system can be utilized, for example a system that has a nozzle of inner diameter 80 μm and an output air cone covering a much larger area than the micro-toroid resonator can be utilized, and thus its effect on distribution of the particles on the micro-toroid is negligible. One skilled in the art can reasonably conclude from the data that the distributions of particle positions in the resonator mode volume and the shape of the distribution function for the beat-note frequency jumps are the same for different particle sizes.

Figure 17B:
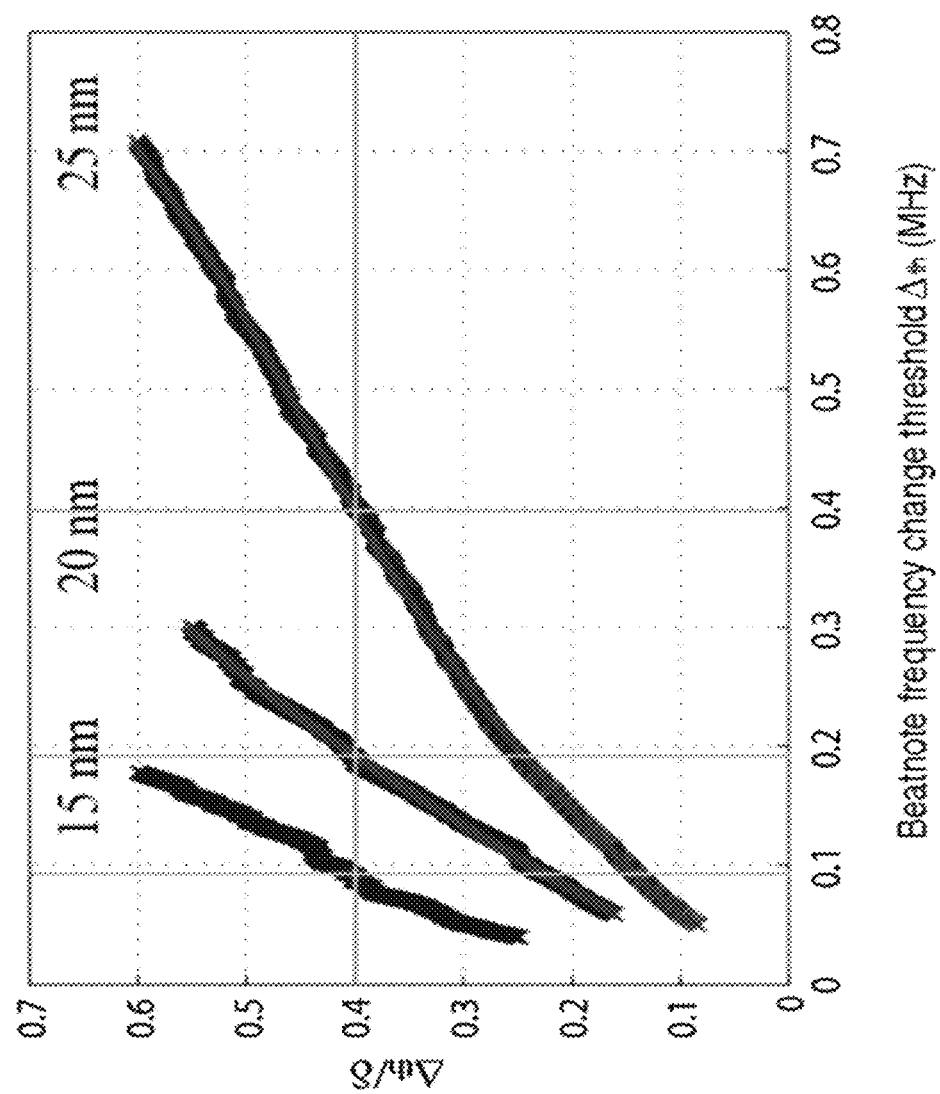
FIGS. 17A and 17B are a graphical illustration of a measurement of an ensemble of nano-particles using scatterer induced beat note frequency changes of a WGM Raman laser.
Figure 17A:
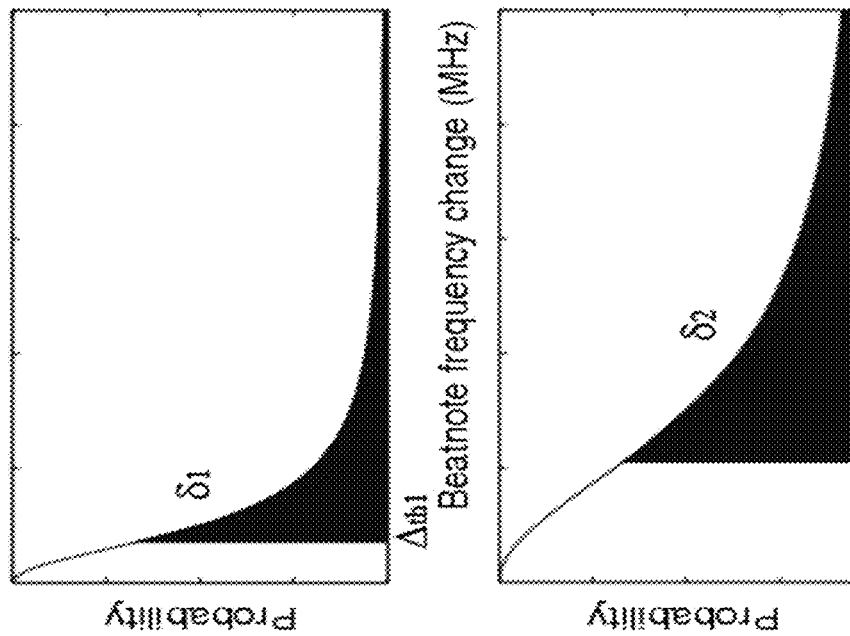

Referring to FIGS. 17A and 17B, a graphical illustration of a measurement of an ensemble of nanoparticles using scatterer induced beat-note frequency changes of a WGM Raman micro-laser is provided. FIG. 17A illustrates the distribution of the discrete changes in Raman laser beat-note frequency. Larger particles induce larger changes with wider distribution. However, the shapes of beat-note frequency-change distributions are the same. FIG. 17B illustrates the relations between $\Delta_{th}/\delta$ and $\Delta_{th}$ for detected NaCl particles of radii 15, 20, and 25 nm (from left to right). At the same $\Delta_{th}/\delta$ ratio, the corresponding $\Delta_{th}$ value gives the estimated width of the distribution of beat-note frequency changes.

To extract the size information, the rms (denoted as δ here) of the beat-note frequency changes that are above a threshold value $\Delta_{th}$ can be calculated. For different particle sizes, the distributions of the beat-frequency changes follow the same statistical model, and thus the ratio $\Delta_{th}/\delta$ should be equal when $\Delta_{th}$ is at the same position with respect to each distribution (See FIG. 17A). Therefore, by plotting $\Delta_{th}/\delta$ for different $\Delta_{th}$ values, one can estimate the effective width of the respective jump distributions.

FIG. 17B shows the curves of $\Delta_{th}/\delta$ versus $\Delta_{th}$ for three different sizes of NaCl particles. By comparing the scaling of the horizontal axis for all three cases, the ratio of the widths of the distributions can be extracted. This suggests that by using measurement results from an ensemble of particles with known sizes one can use a referencing scheme to assign an average size to a given ensemble of particles. For the reference ensemble and the ensemble of the particle of interest, one first obtains $\Delta_{th1}/\delta_1$ and $\Delta_{th2}/\delta_2$, respectively, as a function of $\delta_1$ and $\delta_2$ from the measured data, and then finds $\Delta_{th1}$ and $\Delta_{th2}$, which satisfy $\Delta_{th1}/\delta_1 = \Delta_{th2}/\delta_2$.

In FIG. 17, $\Delta_{th1}/\delta_1 = \Delta_{th2}/\delta_2 = 0.4$ is utilized. The discrete jump heights are related to particle polarizability, which is proportional to $R_3$, therefore one can estimate the size ratio between the reference ensemble and the ensemble of the particles of interest using $\Delta_{th1}/\Delta_{th2} = (R_1/R_2)3$. Using this method, the size ratios among the three different ensembles of NaCl particles can be estimated to be 30.6: 39.3: 50.0, which represent less than 3% error compared with nominal values.

As demonstrated by the test results of the technology as disclosed, Raman gain in silica WGMRs can be used to compensate losses, to enhance Q, and to enable gain-enhanced detection and characterization of nanoparticles at single nanoparticle resolution using the mode splitting method. When the Raman gain in the WGMR is below lasing threshold, loss compensation increases Q and hence enables detection of smaller splitting. When the WGMR is pumped above lasing threshold, split lasing modes induced by a binding particle leads to a beat-note frequency that changes abruptly with each binding event. By monitoring the changes in the beat-note frequency one can count the number of particles binding to the sensor. Multiple measurements and histograms can be used to assign an average polarizability to the ensemble of detected particles in order to extract polarizability. In both of the cases, mode splitting provides a self-referencing scheme immune to laser frequency noise and thermal drift of resonances. This is an intrinsic property of the present technology as disclosed, in contrast to other schemes where external reference interferometers are used to subtract the probe laser noise by offline signal processing or noise was minimized by frequency stabilization techniques.

It is noted herein that when the particles are deposited onto the resonator they may or may not fall onto a location that overlaps with the spatial mode of the WGM. Particles that do not land on the mode volume may go undetected. For a particle landing on a location within the mode volume, particle polarizability (or size) and the intensity of the WGM field at the location of the particle are the parameters for determining the amount of change in mode splitting. A large particle overlapping with a weak field may cause smaller splitting than a smaller particle overlapping with a stronger field.

Although the test data demonstrating the technology as disclosed, as presented herein, has been performed in a dry environment, recent demonstrations of particle induced mode splitting and WGM Raman lasing in a liquid environment imply that the techniques developed here can be extended to loss compensation of these devices in a liquid environment and bio-sensing in biological fluids. Moreover, similar to what has been demonstrated here for a silica micro-toroid (Raman gain in silica for loss compensation and for improving the detection limit of WGM resonators), Raman gain in materials that are used to fabricate photonic crystals, plasmonic and metamaterial structures, and as well as other types of WGMRs can also be used to compensate for losses and enhance their performance by eliminating the drawbacks associated with dopants. For example, Raman gain in silicon can be used for loss compensation in silicon micro-rings and silicon photonic crystal structures. The technology as disclosed can be extended to parametric gain in silica and other materials for loss compensation.

The technology as disclosed that is a dopant-free loss compensation technique can have applications in other photonic devices and can be effectively used to improve their performance and enhance the sensitivity and the detection limits of sensors based on resonance effects. Achieving the detection of nanoparticles down to 10 nm in size and counting them one by one is within the operation of the technology as disclosed. It should be noted that plasmonic effects, laser frequency stabilization, and noise suppression techniques can be integrated into the schemes of the present technology as disclosed to further enhance the sensitivity and lower detection limit.

3. Loss Engineering to Improve System Functionality and Output

One embodiment of the present technology includes steering parameters of a physical system to the vicinity of an exceptional point (EP), which teaches a novel system and method for engineering loss into a system to improve system functionality.

Dissipation is ubiquitous in nature; essentially all physical systems can thus be described by a non-Hermitian Hamiltonian featuring complex eigenvalues and non-orthogonal eigenstates. Dissipation is the result of an inevitable and irreversible process that takes place in physical systems including photonic, chemical, electrical, optical, thermal, fluid flow, thermodynamic and other physical systems. A dissipative process is a process in which energy (internal, bulk flow kinetic, or system potential) is transformed from some initial form to some final form, where the capacity of the final form to do mechanical work or to perform the intended purpose is less than that of the initial form. For example, heat transfer or optical systems are dissipative because it is a transfer of internal energy from one state to another state.

Following the second law of thermodynamics, entropy varies with temperature (reduces the capacity of the combination of the two bodies to do mechanical work), but never decreases in an isolated system. Energy is not lost, however, it can be transformed into a state that is no longer usable for the intended purpose. These processes produce entropy at a certain rate. Important examples of irreversible processes are: heat flow through a thermal resistance, fluid flow through a flow resistance, diffusion (mixing), chemical reactions, electrical current flow through an electrical resistance (Joule heating), and optical waveguide loss.

By way of illustration, thermodynamic dissipative processes are essentially irreversible. They can produce entropy at a finite rate. In a process in which the temperature is locally continuously defined, the local density of rate of entropy production times local temperature gives the local density of dissipated power. A particular occasion of occurrence of a dissipative process cannot be described by a single individual Hamiltonian formalism. A dissipative process requires a collection of admissible individual Hamiltonian descriptions, exactly which one describes the actual particular occurrence of the process of interest being unknown. This includes friction, and all similar forces that result in decoherence—that is, conversion of coherent or directed energy flow into an incoherent, indirected or more isotropic distribution of energy.

Although the technology as disclosed herein can be utilized to manage system loss for any physical system, the detailed description will primarily discuss the technology in the context of optical systems. However, use of the technology in optical systems is one of several applications.

When tuning the parameters of a physical system appropriately, its eigenvalues and the corresponding eigenstates may coalesce, giving rise to a non-Hermitian degeneracy, also called an Exceptional Point (EP). The presence of a nearby EP usually has a dramatic effect on a system's properties, leading to nontrivial physics with unexpected results.

The effect on the operation of a physical system around an EP can be demonstrated by way of experimentation with mechanically-tunable resonators, where effects, such as "resonance trapping", a mode exchange when encircling an EP, and the successful mapping of the characteristic parameter landscape around an EP, are observed. Experimentation also demonstrates how these characteristics can be employed to control the flow of light in optical devices with loss and gain. In particular, waveguides having parity-time symmetry have been managed with the present technology as disclosed, where loss and gain are carefully balanced, with effects like loss-induced transparency, unidirectional invisibility, and reflectionless scattering in a metamaterial being observed.

Experimentation using the technology as disclosed demonstrates that EPs give rise to many intriguing effects when they occur near the lasing regime in the case of laser technology. The lasing regime is a region of operation of a laser where the emissions are orders of magnitude greater. The lasing threshold is the lowest excitation level at which a laser's output is dominated by stimulated emission rather than by spontaneous emission. Below the threshold, a laser's output power rises slowly with increasing excitation. Whereas, above the threshold, the slope of power vs. excitation is orders of magnitude greater. The linewidth of the laser's emission also can become orders of magnitude smaller above the threshold than it is below. When operating in a region above the threshold, the laser is said to be lasing.

Examples of the intriguing effects that EPs include, enhancement of the laser linewidth, fast self-pulsations, coherent perfect absorption of light, and a pump-induced lasing suppression. Realizing such anomalous phenomena can be demonstrated by moving from waveguides to coupled resonators which can trap and amplify light resonantly beyond the lasing threshold. Such devices can be made available and are well known in the art area.

The technology as disclosed herein provides the realization of an unexpected result that is counterintuitive in light of traditional approaches to managing system losses. Introducing loss to a resonator system close to an EP lasing threshold operating condition produces a surprising effect that is contrary to the conventional textbook knowledge on laser operation and managing loss. This has been demonstrated by using a system that consists of two directly-coupled silica microtoroidal whispering-gallery-mode resonators (WGMRs) $\mu R_1$ and $\mu R_2$, each coupled to a different fiber-taper coupler WG1 and WG2 (See FIG. 18A).

An optical cavity, resonating cavity or optical resonator, is an arrangement of mirrors that form a standing wave cavity resonator for light waves. Optical micro cavities confine light at resonance frequencies for extended periods of time. Optical cavities are a major component of lasers that surround the gain medium and provide feedback of the laser light. They are also used in optical parametric oscillators and some interferometers. Light confined in the cavity reflect multiple times producing standing waves for certain resonance frequencies. The standing wave patterns produced are called modes; longitudinal modes differ only in frequency while transverse modes differ for different frequencies and have different intensity patterns across the cross section of the beam. Optical cavities are designed to have a large Q factor meaning a lower rate of energy loss. A beam will reflect a very large number of times with little attenuation. Therefore the frequency line width of the beam is very small compared to the frequency of the laser. However, even these efficient systems suffer with loss and the loss has to be effectively managed.

A more specific example included in the description herein are Whispering gallery waves, which can be produced in microscopic glass spheres or toruses, for example, with applications in lasing. The light waves are almost perfectly guided around by optical total internal reflection, leading to very high Q factors in excess of $10^{10}$. Optical modes in a whispering gallery resonator are however inherently lossy due to a mechanism similar to quantum tunneling. Strictly speaking, ideal total internal reflection does not take place at a curved boundary between two distinct media, and light inside a whispering gallery resonator cannot be perfectly trapped, even under theoretically ideal conditions. Such a loss channel has been known from research in the area of optical waveguide theory and is dubbed tunneling ray attenuation in the field of fiber optics. The Q factor is proportional to the decay time of the waves, which in turn is inversely proportional to both the surface scattering rate and the wave absorption in the medium making up the gallery.

The present technology as disclosed utilizes loss to control a physical system, in this example a whispering gallery mode microresonator, to control absorption loss, scattering loss or any other loss. The technology as disclosed utilizes loss to increase efficiency of a physical system and change the energy distribution within the system. The standing wave patterns or modes can be considered as subsystems within a cavity. The field of different modes can be redistributed more efficiently using the present technology. This is demonstrated by experimentation as disclosed herein.

Traditionally in order to overcome loss, the input gain is increased. When implementing the present technology, the resonance frequencies of the Whispering Gallery Mode Resonators (WGMRs) can be tuned to be the same (zero-detuning) via the thermo-optic effect, and achieve a controllable coupling strength K between the WGMRs in the 1550 nm band by adjusting the inter-resonator distance. The intrinsic quality factors of $\mu R1$ and $\mu R2$ were $Q_{o1}=6.9\times10^6$ and $Q_{o2}=2.6\times10^7$, respectively.

To observe the behavior of the coupled system in the vicinity of an EP the system can be steered parametrically via K and an additional loss $\gamma_{tip}$ induced on $\mu R_2$ by a chromium (Cr)-coated silica-nanofiber $\gamma_{tip}$ (FIGS. 18B and 18C), which features strong absorption in the 1550 nm band. The strength of tip $\gamma_{tip}$ can be increased by enlarging the volume of the nanotip within the $\mu R_2$ mode field, resulting in a broadened linewidth of the resonance mode $\mu R_2$ with no observable change in its resonance frequency. The nanotip thus affects only the imaginary part of the effective refractive index of $\mu R_2$ but not its real part (FIG. 18D).

A small fraction of the scattered light from the nanotip coupled back into $\mu R_2$ in the counter-propagating (backward) direction and leads to a resonance peak whose linewidth is broadened, but the resonance frequency remains the same as the loss is increased (FIG. 18E). The resonance peak in the backward direction is approximately $1/10^4$ of the input field, confirming that the linewidth-broadening and the decrease in the depth of the resonance in the forward direction are due to $\gamma_{tip}$ via absorption and scattering to the environment but not due to back-scattering into the resonator.

In a first set of experiments to demonstrate the technology the $WG_2$ is moved away from $\mu R_2$ to eliminate the coupling between them. The evolution of the eigenfrequencies and the transmission spectra $T_{1\rightarrow 2}$ from input Port 1 to output Port 2 can be observed while continuously adding more loss $\gamma_{tip}$ to $\mu R_2$ while keeping K fixed. In this configuration, losses experienced by $\mu R_1$ and $\mu R_2$ were $\gamma'_1=\gamma_1+\gamma_{c1}$ and $\gamma'_2=\gamma_2+\gamma_{tip}$, respectively, where $\gamma_{c1}$ is the WG1-$\mu R1$ coupling loss, and $\gamma_1$ and $\gamma_2$ including material absorption, scattering, and radiation losses of $\mu R_1$ and $\mu R_2$.

The coupling between the WGMRs leads to the formation of two supermodes characterized by complex eigenfrequencies ($\omega_+=v'_1+iv''_1$ and $\omega_-=v'_2+iv''_2$) given by $\omega_\pm=\omega_O-i\chi\pm\beta$, where $\chi=(\gamma_1'+\gamma_2'')/4$ and $\Gamma=(\gamma_1'-\gamma_2'')/4$, $\beta=\sqrt{K^2-\Gamma^2}$ and $\omega_0$ is the complex resonance frequency of each of the solitary WGMRs.

In the strong coupling regime, quantified by $K>|\Gamma|$ (that is, real $\beta$), the supermodes have different resonance frequencies (that is, mode splitting of $2\beta$) but the same linewidths quantified by $\chi$. This is reflected as two spectrally-separated resonance modes in the measured transmission spectra $T_{1\rightarrow 2}$ [FIG. 19A(i)] and in the corresponding eigenfrequencies [FIG. 19B(i)]. Since the system satisfies $\gamma_1+\gamma_{c1}>\gamma_2$, introducing the additional loss $\gamma_{tip}$ to $\mu R_2$ increases the amount of splitting until $\gamma_1+\gamma_{c1}=\gamma_2+\gamma_{tip}$ (that is, $\gamma'_1=\gamma'_2$) is satisfied [FIGS. 19A(ii) and 19B(ii)].

Figure 19A:
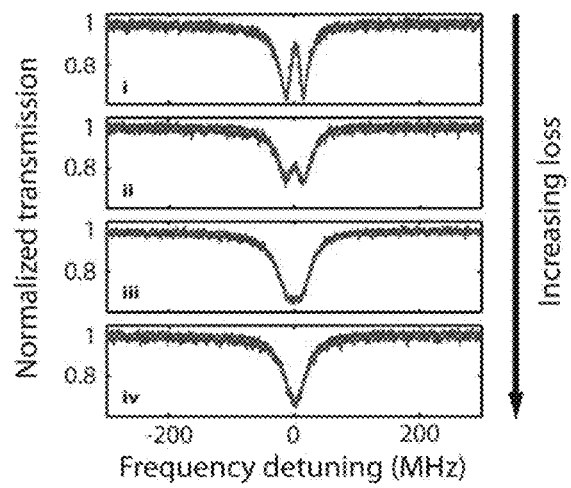
FIGS. 19A, 19B, 19C, and 19D are illustrations of the evolution of the transmission spectra and the eigenfrequencies as a function of loss and coupling strength.

Increasing $\gamma_{tip}$ beyond this point gradually brings the resonance frequencies of the supermodes closer to each other, and finally makes it difficult to resolve the split modes clearly [FIG. 19A(iii)] because the linewidths of the modes become larger than their splitting. This case of overlapping resonances requires an extraction of the complex resonance parameters by fitting the experimental data to a theoretical model in which the set of free parameters is limited due to the inherent symmetry of our setup.

At $\gamma_{tip}=\gamma_{tip}^{EP}$, where K=|Γ|, the supermodes coalesce at the EP. With a further increase in $\gamma_{tip}$, the system enters the weak-coupling regime, quantified by K<|Γ|, where β becomes imaginary, leading to two supermodes with the same resonance frequency but with different linewidths [FIGS. 19A(iv) and 19B(iv)].

Figure 19B:
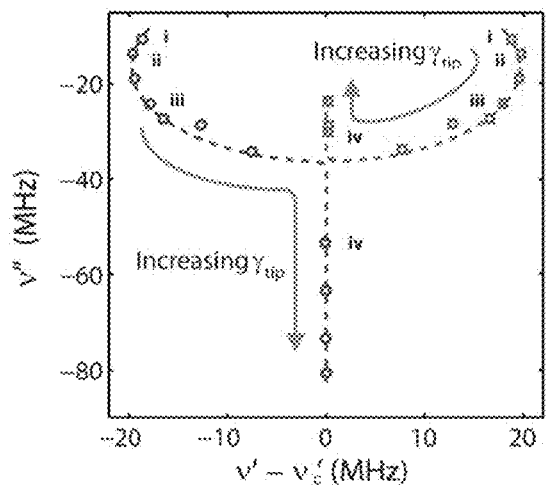

The resulting resonance trajectories in the complex plane clearly display a reversal of eigenvalue evolution (FIG. 19B). The real parts of the two eigenfrequencies of the system first approached each other while keeping their imaginary parts equal until the EP. After passing the EP, their imaginary parts were repelled, resulting in an increasing imaginary part for one of the eigenfrequencies and a decreasing imaginary part for the other. As a result, one of the eigenfrequencies is shifted upwards in the complex plane (and the mode became less lossy) while the other is shifted downwards (and the mode became more lossy).

By repeating the experiments for different K and $\gamma_{tip}$ the eigenfrequency surfaces $\omega_\pm(K, \gamma'_2)$ is obtained. Depicted are both their real and imaginary parts $v'_{1,2}(K, \gamma'_2)$ and $v''_{1,2}(K, \gamma'_2)$ in FIGS. 19C and 19D, respectively. The resulting exhibit a complex square-root-function topology with the special feature that, due to the identical resonance frequencies $\omega_0$ of the solitary WGMRs, a coalescence of the eigenfrequencies can be realized by varying either K or $\gamma_{tip}$ alone, leading to a continuous thread of EPs along what may be called an exceptional line. As expected, the slope of this line is such that stronger K requires higher values of $\gamma_{tip}$ to reach the EP.

A second set of experiments is designed to elucidate and demonstrate the effect of the EP phase transition on the intracavity field intensities. The scheme illustrated in FIG. 18A is used with both $WG_1$ and $WG_2$, and introducing an additional coupling loss $\gamma_{c2}$ to $\mu R_2$ (that is, $\gamma'_2=\gamma_2+\gamma_{tip}+\gamma_{c2}$). Two different cases are tested by choosing different mode pairs in the resonators. In the first case (Case 1), the mode chosen in $\mu R_1$ had higher loss than the mode in $\mu R_2$ ($\gamma_1+\gamma_{c1}>\gamma_2+\gamma_{c2}$). In the second case (Case 2), the mode chosen $\mu R2$ had higher loss than the mode in $\mu R1$ ($\gamma_1+\gamma_{c1}<\gamma_2+\gamma_{c2}$). In both cases, $\gamma_{tip}$ was introduced to $\mu R_2$.

The system is adjusted so that two spectrally-separated supermodes are observed in the transmission spectra $T_{1\to 2}$ and $T_{1\to 4}$ as prominent resonance dips and peaks, respectively, at output ports 2 and 4. No resonance dip or peak is observed at port 3. Using experimentally-obtained $T_{1\to 2}$ and $T_{1\to 4}$ the intracavity fields $I_1$ and $I_2$ are estimated, and the total intensity $I_T=I_1+I_2$ as a function of $\gamma_{tip}$ (FIGS. 20A, 20B, and 20C). Surprisingly, as $\gamma_{tip}$ increases, the total intensity $I_T$ first decreased and then started to increase despite increasing loss. This loss-induced recovery of the intensity is in contrast to the expectation that the intensity would decrease with increasing loss and is a direct manifestation of the EP phase transition.

The effect of increasing $\gamma_{tip}$ on $I_1$ and $I_2$ at $\omega_\pm$ is depicted in FIGS. 20A and 20B for Cases 1&2, respectively. When $\gamma_{tip}=0$, the system is in the strong-coupling regime, and hence the light input at the $\mu R_1$ is freely exchanged between the resonators establishing evenly distributed supermodes. As a result, the intracavity field intensities are almost equal. As $\gamma_{tip}$ is increased, $I_1$ and $I_2$ decreased continuously at different rates until $I_1$ and $I_2$ reached a minimum at $\gamma_{tip}=\gamma_{tip}^{min}$. The rate of decrease is higher for $I_2$ due to increasingly higher loss of $\mu R_2$. Beyond $\gamma_{tip}^{min}$ until the EP is reached at $\gamma_{tip}=\gamma_{tip}^{EP}$, the system remained in the strong-coupling regime, but the supermode distributions are strongly affected by $\gamma_{tip}$, leading to an increase of $I_1$ and hence of $I_T$ while no significant changes are observed for $I_2$. Increasing $\gamma_{tip}$ further pushed the system beyond the EP, thereby completing the transition from the strong-coupling to the weak-coupling regime during, which $I_1$ increased significantly and kept increasing whereas $I_2$ of $\mu R_2$ continued decreasing. This behavior is a manifestation of the progressive localization of one of the supermodes in the less lossy $\mu R_1$ and of the other supermode in the more lossy $\mu R_2$. It can be concluded that the non-monotonic evolution of $I_T$ for increasing values of $\gamma_{tip}$ is the result of a transition from a symmetric to an asymmetric distribution of the supermodes in the two resonators.

The initial difference in the loss contrast between the resonators is reflected in the amount of $\gamma_{tip}$ required to bring the system to the EP. $\gamma_{tip}^{EP}$ is higher for Case 1 than for Case2 depending on the initial loss contrast, even a small amount of $\gamma_{tip}$ may complete the transition from the strong to the weak-coupling regime. Increasing $\gamma_{tip}$ in Case 2 increased $I_T$ to a much higher value than that at $\gamma_{tip}=0$; in Case 1, on the other hand, $I_T$ stayed below its initial value at $\gamma_{tip}=0$.

Finally, as seen in FIG. 20C, the intracavity field intensities at $\omega_\pm$ and $\omega_0$ coincide when $\gamma_{tip}\geq\gamma_{tip}^{EP}$ (i.e., after the EP transition to the weak coupling regime). This is a direct consequence of the coalescence of eigenfrequencies $\omega_\pm$ at $\omega_0$.

Whispering-gallery-mode micro-resonators combine high quality factors Q (long photon storage time; strong resonant power build-up) with micro-scale mode volumes V (tight spatial confinement; enhanced resonant field intensity) and are thus ideal tools in a variety of fields ranging from quantum electrodynamics and optomechanics to sensing. In particular, the ability of WGMRs to provide high intracavity field intensity and long interaction time significantly reduces the thresholds for nonlinear processes and lasing.

Therefore, the demonstrated loss-induced reduction and the recovery of the total intracavity field intensity impacts directly any linear or nonlinear process, including but not limited to the thermal nonlinear response and the lasing threshold of WGMRs. Thermal nonlinearity and the subsequent bistability in WGMRs are due to the temperature dependent resonance-frequency shifts caused by the material absorption of the intracavity field and the resultant heating. In silica WGMRs, this is pronounced as thermal broadening of the resonance line when the wavelength of the laser is scanned from shorter to longer wavelengths. (The laser wavelength is scanned in the same direction as the thermal shift due to the positive thermo-optic coefficient of silica.) This allows the laser to stay on resonance for a large range of detuning.

When the laser is scanned from longer to shorter wavelengths, the effect leads to a thermal narrowing of the resonance line. In a demonstration system under experimentation, thermal nonlinearity is clearly observed in $T_{1\to 2}$ as a shark-fin feature (FIG. 20D). With a high input power of 600 μW, thermal broadening kicked in and made it impossible to resolve the individual supermodes. When the loss is introduced to $\mu R_2$ and gradually increased, thermal nonlinearity and the associated linewidth broadening decreased at first and then gradually recovered (FIG. 20D). This aligns well with the evolution of the total intracavity field as a function of loss.

The effect of the loss-induced recovery of the intracavity field intensity on the Raman lasing in silica microtoroids can be tested. A Raman laser is a specific type of laser in which the fundamental light-amplification mechanism is stimulated Raman scattering. In contrast, most "conventional" lasers (such as the ruby laser) rely on stimulated electronic transitions to amplify light. Raman scattering is the inelastic scattering of a photon and is a nonlinear process in which the frequency of the incident photons is red-shifted or blue-shifted (Stokes or anti Stokes photons) by an amount equivalent to the frequency of the optical phonons present in the material system. When photons are scattered from an atom or molecule, most photons are elastically scattered (Rayleigh scattering), such that the scattered photons have the same energy (frequency and wavelength) as the incident photons.

A small fraction of the scattered photons (approximately 1 in 10 million) are scattered by an excitation, with the scattered photons having a frequency different from, and usually lower than, that of the incident photons. The Raman interaction leads to two possible outcomes: the material absorbs energy and the emitted photon has a lower energy than the absorbed photon (Stokes-Raman Scattering); or the material loses energy and the emitted photon has a higher energy than the absorbed photon (Anti-Stokes).

Raman gain is the optical amplification arising from stimulated Raman scattering. It can occur in transparent solid media like optical fibers, liquids and gases. Its magnitude depends on the optical frequency offset between the light pump and signal wave, and to some smaller extent on the pump wavelength, and on material properties.

Figure 21A:
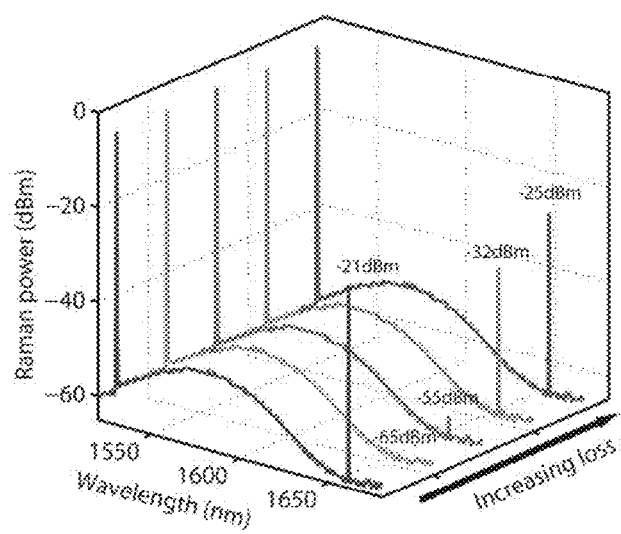
FIGS. 21A and 21B is an illustration of loss-induced suppression and revival of Raman lasing in silica microcavities.
Figure 21B:
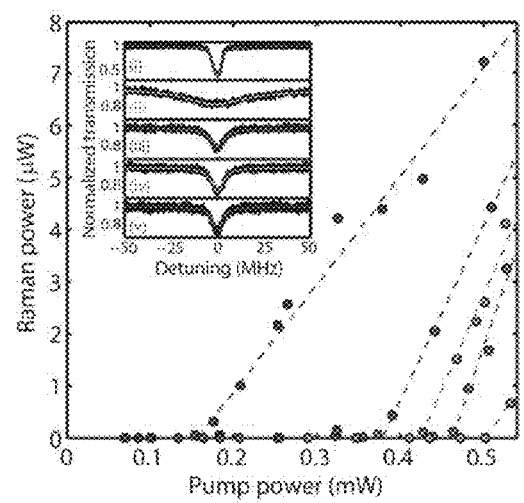

Raman gain $g_R$ in silica takes place in a frequency band 5-40 THz red-shifted from the pump laser with the peak gain occurring at 13.9 THz and 14.3 THz. If the provided Raman gain becomes larger than the losses in a WGMR, Raman lasing sets in. The threshold for Raman lasing scales as $P_{Raman-threshold} \propto V/g_R Q^2$, implying the significance of the pump intracavity field intensity and Q of the modes in the process. With a pump laser in the 1550 nm wavelength band, Raman lasing takes place in the 1650 nm band in silica WGMR. FIGS. 21A and 21B depict the spectrum and the efficiency of Raman lasing in the system. The lasing threshold for the solitary resonator is about 150 µW (FIG. 21B first curve from left to right).

Keeping the pump power fixed, the second resonator is introduced, which has a much larger loss than the first one. This effectively increased the total loss of the system and annihilated the laser (FIG. 21A, fifth curve from left to right). Introducing additional loss $\gamma_{tip}$ to the second resonator helps to recover the Raman lasing, whose intensity increased with increasing loss (FIG. 21A). The lasing threshold of each of the cases depicted can be confirmed as illustrated in FIG. 21A and it is observed that as $\gamma_{tip}$ is increased, the threshold power increased at first but then decreased (FIG. 21B).

These results are contrary to what one would expect in conventional systems, where the higher the loss, the higher the lasing threshold. The technology as disclosed for engineering loss provides an unexpected result. Surprisingly, in the vicinity of an EP, less loss is detrimental and annihilates the process of interest. However, as an unexpected result more loss helps to recover the process. These counterintuitive and unexpected results can be explained by the fact that the supermodes of the coupled system read just themselves as loss is gradually increased. When the loss exceeds a critical amount, the supermodes are mostly located in the system with less loss and thus the total field can build up more strongly. As the results clearly demonstrate, this behavior also affects the nonlinear processes, such as thermal broadening and Raman lasing that rely on intracavity field intensity.

One implementation of the technology as disclosed demonstrates the influence of an EP and the corresponding phase transition on the properties of coupled WGM microresonators by steering the system via coupling strength and additional loss to the vicinity of an EP. One implementation of the technology as disclosed, provides for a loss-induced suppression and revival of thermal nonlinearity and Raman lasing, which results from the evolution of complex eigenvalues in the vicinity of an EP. The technology as disclosed and the specific optical implementation of the technology provides a comprehensive platform for additional applications for leveraging of EPs and opens up new avenues of research on non-Hermitian physical systems and their behavior. The unexpected result also provides schemes and techniques for controlling and reversing the effects of loss in various physical systems, such as in photonic crystal cavities, plasmonic structures, and metamaterials.

Referring to FIGS. 18A, 18B, 18C, and 18D, an illustration is provided for demonstrating one implementation of the technology illustrating the effect of increasing loss on the resonances. The demonstration configuration includes two directly coupled silica microtoroidal whispering gallery mode resonators (WGMRs) $\mu R_1$ and $\mu R_2$ with each coupled to a different fiber taper coupler $WG_1$ and $WG_2$. The demonstration configuration can also have a photodetector (PD), an oscilloscope OSC and an external cavity laser diode ECLD. Optical microscope images (top view) of coupled micro-resonators $\mu R_1$ and $\mu R_2$ are provided, together with the fiber taper coupler $WG_1$ and the Cr nanotip. $a_{in}$: input field at $WG_1$. $a_1$: intracavity field of $\mu R_1$. $a_2$: intracavity field of $\mu R_2$. FIG. 18C provides a scanning electron microscope (SEM) image of the Cr nanotip. FIGS. 1D and 1E provide transmission spectra in the forward (D) and backward (E) directions showing that additional loss broadened the resonance linewidth but did not affect its frequency. Also, backscattering due to the nanotip is very weak (E).

Figure 19C:
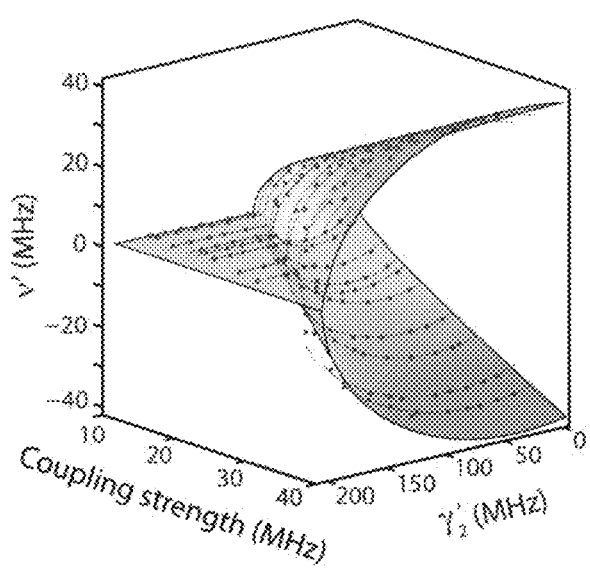
Figure 19D:
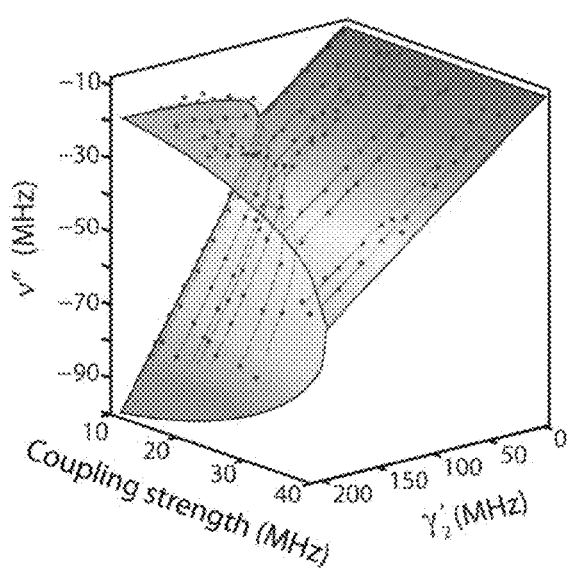

Referring to FIGS. 19A, 19B, 19C, and 19D, an evolution of the transmission spectra and the eigenfrequencies as a function of loss $\gamma_{tip}$ and coupling strength K is provided. FIG. 19A illustrates the transmission spectra $T_{1 \rightarrow 2}$ showing the effect of loss on the resonances of supermodes. The two curves denote the experimental data and the best fit using a theoretical model, respectively. FIG. 19B illustrates the evolution of the eigenfrequencies of the supermode in the complex plane as $\gamma_{tip}$ is increased. v' and v" are the real and imaginary parts of the eigenfrequencies. $v'_c$ is the real part of the eigenfrequencies of uncoupled (solitary) microtoroids. Open circles and squares are the eigenfrequencies estimated from the measured $T_{1 \rightarrow 2}$ using the theoretical model. Dashed lines denote the best theoretical fit to the experimental data. FIGS. 19C and 19D illustrate the Eigenfrequency surfaces in the (K, $\gamma'_2$) parameter space.

Referring to FIGS. 20A, 20B, 20C, and 20D, loss-induced enhancement of intracavity field intensities and thermal nonlinearity in the vicinity of an exceptional point is illustrated. FIGS. 20A and 20B illustrate intracavity field intensities of the resonators at $\omega_\pm$ (from top to bottom—total $I_T$; $I_1$ of $\mu R_1$ and $I_2$ of $\mu R_2$). For FIG. 20A, Case 1, the initial loss of $\mu R_1$ is higher than that of $\mu R_2$, and for FIG. 20B, Case 2, the initial loss of $\mu R_2$ is higher than that of $\mu R_1$. Normalization is performed with respect to the total intensity at $\gamma_{tip}=0$ at EP: Exceptional point. FIG. 20C illustrates total intracavity field intensities $I_T$ at eigenfrequencies $\omega_\pm$ (top) and $\omega_0$ (bottom) for Case 1. Intensities coincide in the weak-coupling regime because it is at the EP and after EP in the weak-coupling regime whereby $\omega_\pm$ coalesces at $\omega_0$. Normalization is performed with respect to the intensity at the exceptional point. FIG. 20D illustrates the effect of loss on nonlinear thermal response (thermal broadening) of the coupled system. Increasing loss first reduces the nonlinear response and then helps to recover it. Circular data points are calculated from the experimentally-obtained transmissions $T_{1\rightarrow2}$ and $T_{1\rightarrow4}$. Curves are from the theoretical model. $\gamma_{tip}$ is introduced to $\mu R_2$, which had more initial loss than $\mu R_1$ when $\gamma_{tip}=0$. Circles in FIGS. 20A, 20B and 20C and squares in FIG. 20C are experimentally-obtained data whereas the lines are from the theoretical model.

FIGS. 21A and 21B illustrate loss-induced suppression and revival of Raman lasing in silica microcavities. FIG. 21A illustrates a Raman lasing spectrum of coupled silica microtoroid resonators as a function of increasing loss. Additional loss initially annihilates the existing Raman laser but then the laser recovers as the loss is increased. FIG. 21B illustrates Raman power output versus incident pump power. As the loss is increased, the lasing threshold is initially increased and then decreased. The inset shows the normalized transmission spectra $T_{1\rightarrow2}$ in the pump band obtained at very weak powers for different amounts of additional loss. Loss increases from top to bottom. The curves of FIG. 21A and FIG. 21B and the inset legend of FIG. 21B coincide and are obtained at the same value of additionally introduced loss.

Figure 22A:
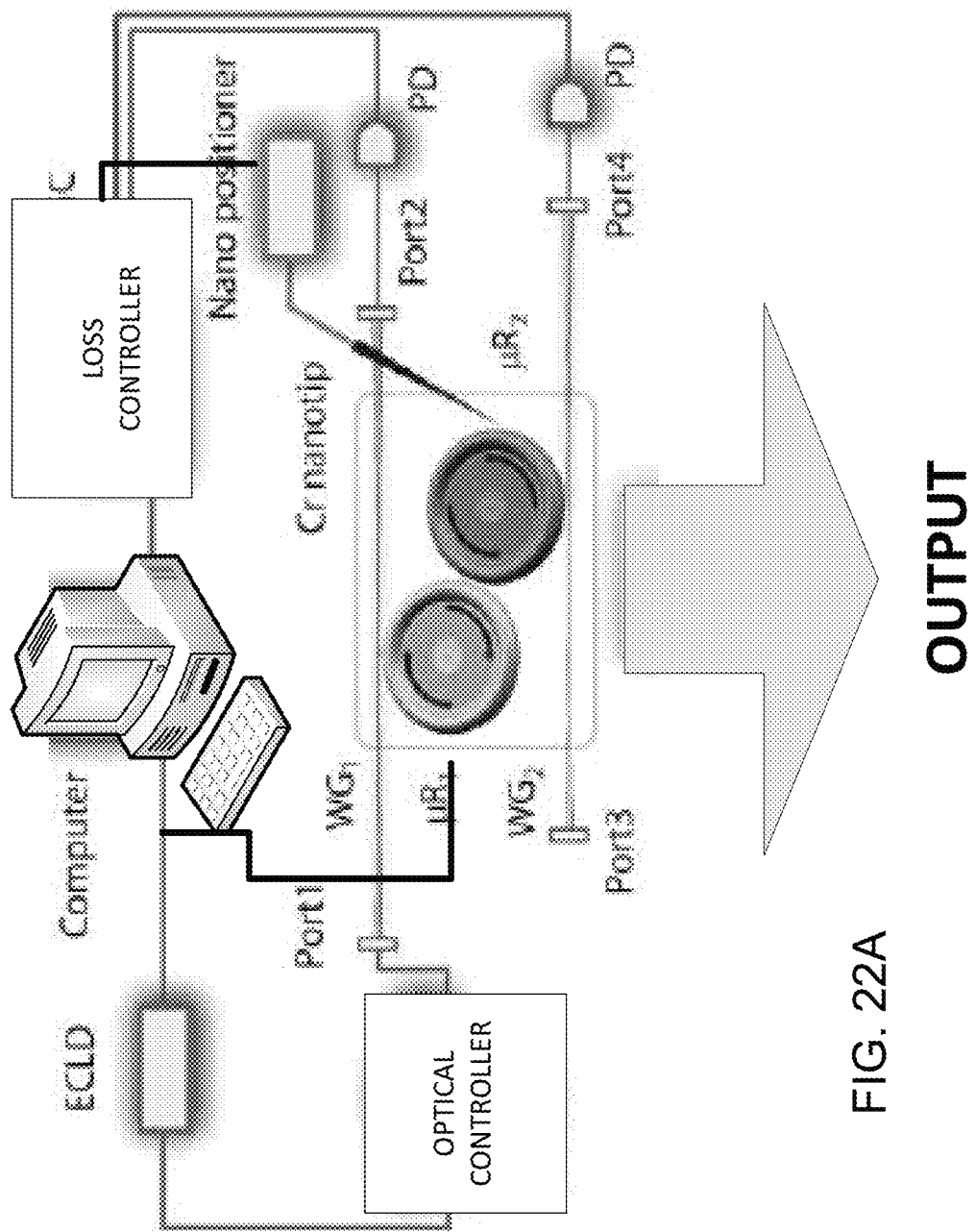
FIGS. 22A and 22B are illustrations of non-Hermitian physical systems implementing the present technology as disclosed.
Figure 22B:
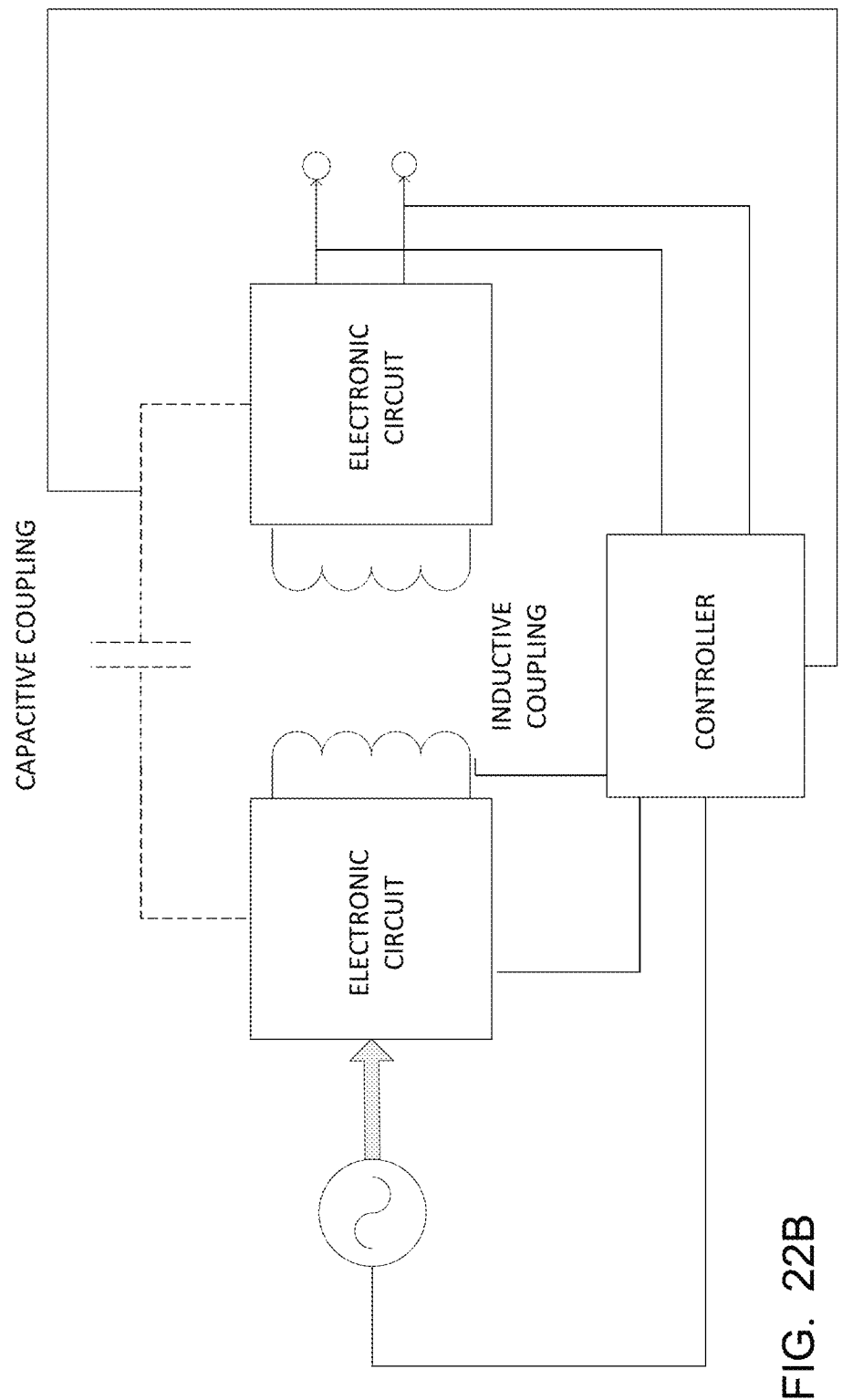

Referring to FIGS. 22A and 22B, two specific implementations of the technology as disclosed is implemented. In FIG. 22A, a microresonator based optical system is illustrated utilizing coupled Whispering Gallery microresonators $WG_1$ and $WG_2$ having modes fields $\mu R_1$ and $\mu R_2$. The technology as disclosed can be implemented utilizing different system configurations. For example, the output from the resonators can be monitored by photo diode sensing devices and the sensed output can be electronically transmitted to a loss controller. The loss controller can engineer loss in various ways including controlling a nano positioner to mechanically control one of the microresonator's positions to vary the coupling strength as described herein. The coupling strength parameter K can be tuned utilizing nano positioner. Alternatively, the loss controller can increase the loss of a selected mode field $\mu R_1$ or $\mu R_2$ to redistribute energy as desired to improve the output. (Loss Controller Operation) Yet another implementation is to provide inputs to an optical controller using Raman spectroscopy techniques to induce loss in particular mode fields about the EP. Various frequency parameters can be tuned to induce the desired loss.

In FIG. 22B, two electronic circuits are illustrated as being coupled together inductively or in the alternative capacitively. A controller can be utilized to tune (change) the inductance or the capacitance in order to vary the inductive or capacitive coupling strength parameter. The controller can also control a variable resistor to induce loss in certain modes fields of the electronic signal. The controller can also monitor the output to determine if the desired gain or loss is obtained.

The various implementations and examples shown above illustrate a method and system for engineering loss to improve the function of a physical system. A user of the present method and system may choose any of the above implementations, or an equivalent thereof, depending upon the desired application. In this regard, it is recognized that various forms of the subject method and system could be utilized without departing from the scope of the present implementation.

The disclosure is not limited to silica WGM resonators. It is valid for resonators of any type or material. For example with silicon resonators, Raman lasing from silicon is also OK. WGM resonator is one implementation described, but the concept is valid for waveguides, fiber networks etc. The examples provided are only for two resonators coupled two each other. In principle there is no limit on the number of subsystems in the non-Hermitian system. It can be a network of resonators or waveguides in different geometries or topologies. For example resonators as a linear chain, or resonators arranges in triangles or rectangular, and lattices. The non-Hermitian system can be a single system but then one can find two modes in this system such that the coupling and loss contrast between these modes can be tuned to bring the system to an EP.

Onto-Mechanical System and Method Having Chaos Induced Stochastic Resonance and onto-Mechanically Mediated Chaos Transfer One implementation of the present technology as disclosed comprising an opto-mechanical system having opto-mechanically induced chaos and stochastic resonance teaches a novel system and method for opto-mechanically mediated chaos transfer between two optical fields such that they follow the same route to chaos. The opto-mechanical system can be utilized for encoding chaos on a weak signal for chaotic encoding that can be used in secure communication. Chaos induced stochastic resonance in opto-mechanical systems are also applicable for use in improving signal detection.

The technology as disclosed and claimed demonstrates generating and transferring optical chaos in an opto-mechanical resonator. The technology demonstrates opto-mechanically-mediated transfer of chaos from a strong optical field (pump) that excites mechanical oscillations, to a very weak optical field (probe) in the same resonator. The technology demonstrates that the probe and the pump fields follow the same route, from periodic oscillations to quasi-periodic and finally to chaotic oscillations, as the pump power is increased. The chaos transfer from the pump to the probe is mediated by the mechanical motion of the resonator, because there is no direct talk between these two largely-detuned optical fields. Moreover, the technology demonstrates stochastic resonance in an opto-mechanical system. The required stochastic process is provided by the chaotic dynamics and the opto-mechanical backaction.

The details of the technology as disclosed and various implementations can be better understood by referring to the figures of the drawing. Referring to FIGS. 23A, 23B, and 23C, a basic configuration of the technology was tested, which included a fiber-taper-coupled WGM microtoroid resonator (FIG. 23A). FIG. 23A is an illustration of a whispering-gallery mode microtoroid opto-mechanical microresonator illustrating the mechanical motion induced by optical radiation force. FIG. 23B illustrates a typical transmission spectra obtained by scanning the wavelength of a tunable laser with a power well below and above the mechanical oscillation threshold. At high powers, thermally induced linewidth broadening and the fluctuation due to the mechanical oscillations kick in. A close up view of the fluctuations in the transmission, obtained at a specific wavelength of the laser, reveals a sinusoidal oscillation at a frequency $\Omega_m$ of the mechanical oscillation.

FIG. 23C illustrates a typical electrical system analyzer (ESA) trace of the detected photocurrent below the mechanical oscillation threshold. The inset shows the spectrum above the threshold. The traces represent the demonstrated data, and the curves are the best fitting. Referring to FIGS. 24A, 24B, 24C, 24D, 24E, 24F, 24G, and 24H, opto-mechanically-mediated chaos generation and transfer between optical fields are represented. Phase diagrams of the pump (FIGS. 24A, 24B, and 24C) and the probe (FIGS. 24D, 24E, and 24F) fields are shown in periodic (FIGS. 24A and 24D), quasi periodic (FIGS. 24B and 24E), and chaotic (FIGS. 24C and 24F) regimes. The phase diagrams were obtained by plotting the first time derivative of the measured output power of the pump (FIGS. 24A, 24B, and 24C) and the probe (FIGS. 24D, 24E, and 24F) fields as a function of the respective output powers. FIGS. 24G and 24H represent bifurcation diagrams of the pump (FIG. 24G) and the probe (FIG. 24H) fields as function of the input pump power. The pump and probe enter the chaotic regime via the same bifurcation route. The ratios of the bifurcation intervals for the pump $a_1/a_2$ and probe $\tilde{a}_1/\tilde{a}_2$ are both 4.5556. The ratio between the width of a tine and the width of one of its two subtines is $b_1/b_2=2.6412$ for the pump and $\tilde{b}_1/\tilde{b}_2=2.8687$ for the probe.

When the power of the pump field is increased, it is observed that the transmitted pump light transited from a fixed state to a region of periodic oscillations, and finally to the chaotic regime through period-doubling bifurcation cascades (see FIGS. 24A, 24B, and 24C). The periodic regime, with only a few sharp peaks, and the quasi-periodic regime, with infinite discrete sharp peaks, in the output spectrum of the pump field. Finally, the whole baseline of the output spectrum of the pump field increased, implying that the system entered the chaotic regime. All these results coincide very well with previous studies.

These phenomena observed for the pump field originate from the nonlinear opto-mechanical coupling between the optical pump field and the mechanical mode of the resonator. Intuitively, one may attribute this observed dynamic to the chaotic mechanical motion of the resonator. However, the reconstructed mechanical motion of the resonator, using the experimental data in the theoretical model, showed that the optical signal was chaotic even if the mechanical motion of the resonator was periodic. Thus, it can be concluded that the reason for the chaotic behavior in the optical field in our experiments is the strong nonlinear optical Kerr response induced by the nonlinear coupling between the optical and mechanical modes.

Simultaneously monitoring the probe field reveals that as the pump power is increased, the probe, also, experienced periodic, quasi periodic, and finally chaotic regimes. More importantly, the pump and probe entered the chaotic regime via the same bifurcation route (FIGS. 24A, 24B, 24C, 24D, 24E, 24F, 24G, and 24H), that is both optical fields experienced the same number of period-doubling cascades, and the doubling points occurred at the same values of the pump power. These features are clearly seen in the phase-space plots (FIGS. 24A, 24B, 24C, 24D, 24E, and 24F) and in the bifurcation diagrams (FIGS. 24G and 24H). The demonstrated data fits very well with bifurcation, in which each periodic region is smaller than the previous region by the factor $a_1/a_2=4.5556$ for the pump and $\tilde{a}_1/\tilde{a}_2=4.5556$ for the probe, and these factors are close to the first universal Feigenbaum constant 4.6692. The ratio between the width of a tine and the width of one of its two sub-tines for the pump is $b_1/b_2=2.6412$, and that for the probe is $\tilde{b}_1/\tilde{b}_2=2.8687$, which are both close to the second universal Feigenbaum constant 2.5029 (two mathematical constants, which both express ratios in a bifurcated non-linear system).

In order to effectively demonstrate the present technology, the probe field is sufficiently weak such that it could not induce any mechanical oscillations of its own, and the large frequency-detuning between the pump field (in the 1550 nm band) and the probe field (in the 980 nm band) assured that there was no direct crosstalk between the optical fields. Thus the observed close relation between the route-to-chaos for the pump and probe fields can only be attributed to the fact that the periodic mechanical motion of the microresonator mediates the coupling between the optical modes via opto-mechanically-induced Ken-like nonlinearity (the induced refractive index change is directly proportional to the square of the field instead of varying in linearity with it), and enables the probe to follow the pump field.

To demonstrate the technology, light from an external cavity laser in the 1550 nm band is first amplified by an erbium-doped fiber amplifier (EDFA) and then coupled into a microtoroid to act as the pump for the excitation of the mechanical modes. Optical transmission spectrum is obtained by scanning the wavelength of the pump laser, which shows a typical Lorentzian lineshape (follows a Fourier transform line broadening function) for low powers of the pump field (FIG. 23B). The quality factor of this optical mode was $10^7$. As the pump power is increased, the spectrum changed from a Lorentzian lineshape to a distorted asymmetric lineshape due to thermal nonlinearity. This helps to keep the pump laser detuned with respect to the resonant line of the microcavity. As a result, radiation-pressure-induced mechanical oscillations take place as reflected by the oscillations imprinted on the optical transmission spectra (FIG. 23B). This then leads to the modulation of the transmitted light at the frequency of the mechanical motion (FIG. 23B, inset). The Rf power versus frequency traces, obtained using an electrical spectrum analyzer (ESA), reveals a Lorentzian spectrum located at $\Omega_m \approx 26.1$ MHz with a linewidth of ~200 KHz, implying a mechanical quality factor of $Q_m \approx 131$, when the pump power is below the threshold of mechanical oscillation (FIG. 23C). For powers above the threshold, the linewidth narrowing is clearly observed (FIG. 23C, inset)

In order to demonstrate the effect of the mechanical motion induced by the strong pump field on a weak light field (probe light) within the same resonator, an external cavity laser with emission in the 980 nm band can be used. The power of the probe laser is chosen such that it does not induce any thermal or mechanical effect on the resonator, i.e., its power is well below the threshold of mechanical oscillations. The transmission spectra of the pump and the probe fields are separately monitored by photodiodes connected to an oscilloscope and an ESA. The probe resonance mode had a quality factor of $6\times 10^6$.

Figure 27:
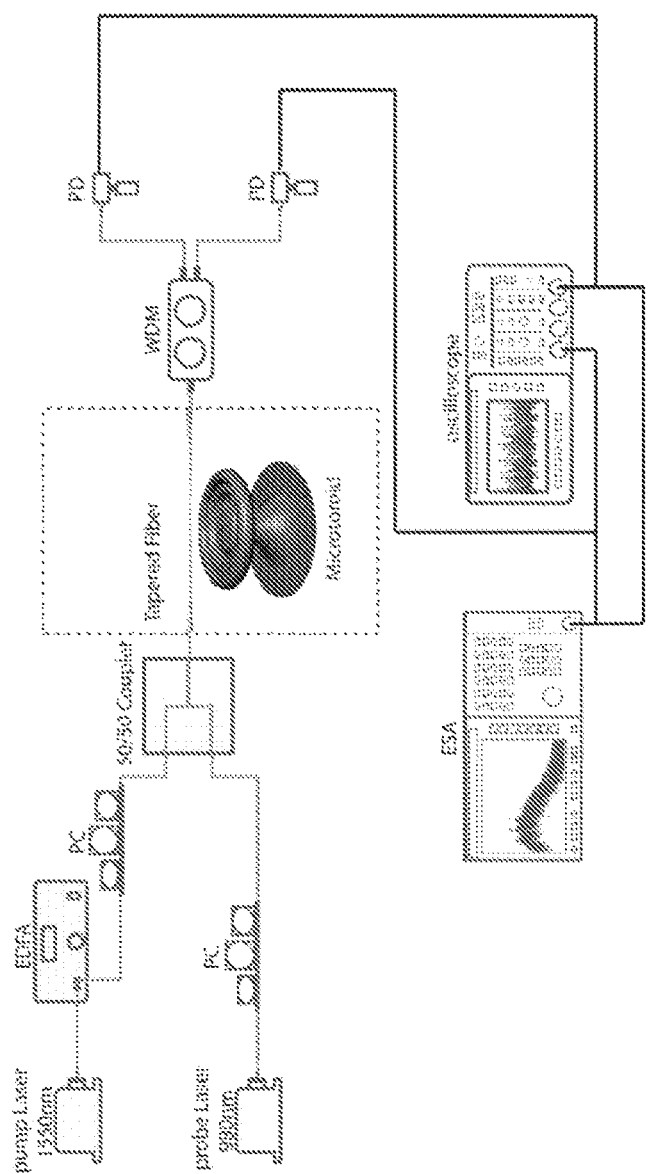
FIG. 27 is a schematic diagram illustration a configuration of the technology under test.
Figures 28A, 28B, 28C, 28D, 28E, 28F:
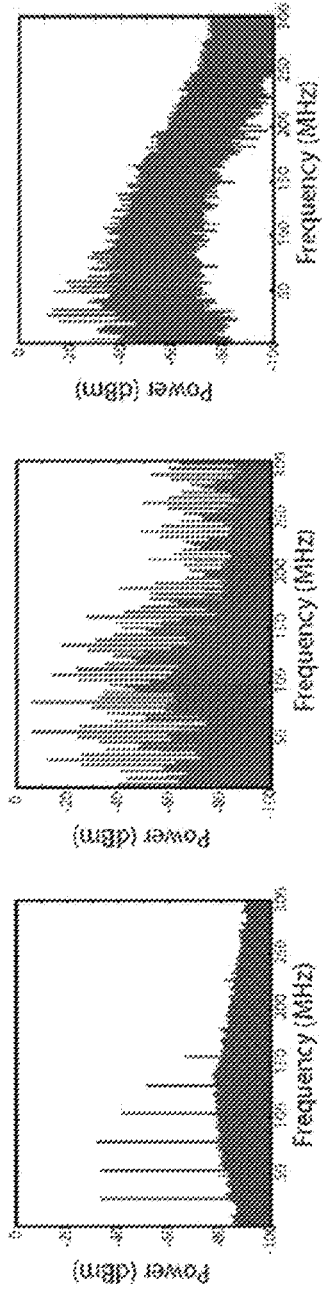
FIG. 28A is demonstration of power spectra for the pump and probe fields at various pump powers corresponding to periodic.
FIG. 28B is a demonstration of power spectra for the pump and probe fields at various pump powers corresponding to quasi-periodic.
FIG. 28C is a demonstration of power spectra for the pump and probe fields at various pump powers corresponding to chaotic regime.
FIG. 28D is a demonstration of power spectra for the pump and probe fields at various pump powers corresponding to periodic.
FIG. 28E is a demonstration of power spectra for the pump and probe fields at various pump powers corresponding to quasi-periodic.
FIG. 28F is a demonstration of power spectra for the pump and probe fields at various pump powers corresponding to chaotic regime.

Referring to FIG. 27, a more detailed schematic diagram is provided of one implementation of the technology being demonstrated, which includes a pump and probe configuration. The pump (1550 nm band) and the probe (980 nm band) fields are coupled into and out of a microtoroid resonator via the same tapered fiber in the same direction. An Erbium-doped fiber amplifier EDFA is utilized for signal amplification. A PC is and a Polarization controller are utilized for control. A wavelength division multiplexer (WDM), a Photodetector for signal detection, and an Electrical spectrum analyzer (ESA) are utilized.

An optical pump field, provided by a tunable External Cavity Laser Diode (ECLD) in the 1550 nm band, is first amplified using an erbium-doped fiber amplifier (EDFA), and then coupled into a fiber, using a 2-to-1 fiber coupler, together with a probe field provided by a tunable ECLD in the 980 nm band. A section of the fiber is tapered, to enable efficient coupling of the pump and probe fields into and out of a microtoroid resonator. The pump and probe fields in the transmitted signals are separated from each other using a wavelength division multiplexer (WDM) and then sent to two separate photodetectors (PDs). The electrical signals from the PDs are then fed to an oscilloscope, in order to monitor the time-domain behavior, and also to an electrical spectrum analyzer (ESA) to obtain the power spectra.

It can be concluded that the intracavity pump and probe fields do not directly couple to each other, and that the probe and pump fields couple to the same mechanical mode of the microcavity with different coupling strengths. The technology demonstrates that in such a situation, the mechanical mode mediates an indirect coupling between the fields. The dynamical equation for the intracavity pump mode coupled to the mechanical mode of the cavity can be written as $$\dot{a}_{pump} = -[\gamma_{pump} - i(\Delta_{pump} - g_{pump}X)]a_{pump} + i\kappa\varepsilon_{pump}(t), \quad (S1)$$

where $a_{pump}$ is the complex amplitude of the intracavity pump field, $\gamma_{pump}$ is the damping rate of the cavity pump mode, $\varepsilon_{pump}(t)$ represents the amplitude of the input pump field, $\kappa$ is the pump-resonator coupling rate, $\Delta_{pump}$ is the frequency detuning between the input pump field and the cavity resonance, X is the position of the mechanical mode coupled to $a_{pump}$, and $g_{pump}$ is the strength of the optomechanical coupling between the optical pump field and the mechanical mode. This equation can be solved in the frequency-domain by using the Fourier transform as $$a_{pump}(\omega) = \frac{-ig_{pump}}{i(\omega - \Delta_{pump}) + \gamma_{pump}} \int_{-\infty}^{+\infty} X(\omega - \omega_1)a_{pump}(\omega_1)d\omega_1 + \frac{i\kappa\varepsilon_{pump}(\omega)}{i(\omega - \Delta_{pump}) + \gamma_{pump}}, \quad (S2)$$

where $a_{pump}(\omega)$, $X(\omega)$, and $\varepsilon_{pump}(\omega)$ are the Fourier transforms of the time-domain signals $a_{pump}(t)$, $X(t)$, and $\varepsilon_{pump}(t)$. Since the dynamics of the mechanical motion X(t) is slow compared to that of the optical mode, the convolution term can be replaced in the above equation by the product $a_{pump}(\omega)X(\omega)$, under the slowly-varying envelope approximation, which then leads to $$\left[1 - \frac{-ig_{pump}}{i(\omega - \Delta_{pump}) + \gamma_{pump}}X(\omega)\right]a_{pump}(\omega) = \frac{-i\kappa\varepsilon_{pump}(\omega)}{i(\omega - \Delta_{pump}) + \gamma_{pump}}. \quad (S3)$$

$X(\omega)$ is in general so small that we have $g_{pump}^2|X(\omega)|^2 \ll (\omega - \Delta_{pump})^2 + \gamma_{pump}^2$. Then using the identity $1/(1-x) \approx 1+x$, for $x \ll 1$, we can re-write Eq. (S3) as $$a_{pump}(\omega) = \left[1 + \frac{-ig_{pump}}{i(\omega - \Delta_{pump}) + \gamma_{pump}}X(\omega)\right]\frac{-i\kappa\varepsilon_{pump}(\omega)}{i(\omega - \Delta_{pump}) + \gamma_{pump}}. \quad (S4)$$

By multiplying the above equation with its conjugate and dropping the linear term of $X(\omega)$, which is zero on average, we can obtain the relation between the spectrum $S_{pump}(\omega) = |a_{pump}(\omega)|^2$ of the optical mode $a_{pump}$ and the spectrum of the mechanical motion $S_x(\omega) = |X(\omega)|^2$ as $$S_{pump}(\omega) = \frac{\kappa^2\varepsilon_{pump}^2}{\gamma_{pump}^2}\chi_{pump}(\omega)\left[1 + \frac{g_{pump}^2}{\gamma_{pump}^2}\chi_{pump}(\omega)S_X(\omega)\right], \quad (S5)$$

$$\text{where } \chi_{pump}(\omega) = \frac{\gamma_{pump}^2}{\gamma_{pump}^2 + (\omega - \Delta_{pump})^2} \quad (S6)$$

is a susceptibility coefficient.

By further introducing the normalized spectrum $$\tilde{S}_{pump}(\omega) = S_{pump}(\omega) - \frac{\kappa^2\varepsilon_{pump}^2}{\gamma_{pump}^2}\chi_{pump}(\omega), \quad (S7)$$

the above equation can be written as $$\tilde{S}_{pump}(\omega) = \frac{\kappa^2\varepsilon_{pump}^2 g_{pump}^2}{\gamma_{pump}^4}\chi_{pump}^2(\omega)S_X(\omega). \quad (S8)$$

A similar equation can be obtained by analyzing the spectrum of the optical mode $a_{probe}$ coupled to the probe field as $$\tilde{S}_{probe}(\omega) = \frac{\kappa^2\varepsilon_{probe}^2 g_{probe}^2}{\gamma_{probe}^4}\chi_{probe}^2(\omega)S_X(\omega), \quad (S9)$$

$$\text{where } \chi_{probe}(\omega) = \frac{\gamma_{probe}^2}{\gamma_{probe}^2 + (\omega - \Delta_{probe})^2}, \quad (S10)$$

$\gamma_{probe}$ is the damping rate of the cavity mode coupled to the probe field, $\varepsilon_{probe}(t)$ represents the amplitude of the input probe field, $\Delta_{probe}$ is the detuning between the input probe field and the cavity resonance, and $g_{probe}$ is the coupling strength between the optical mode $a_{probe}$ and the mechanical mode.

From Eqs. (S8) and (S9), the relation between the normalized spectra $\tilde{S}_{pump}(\omega)$ and $\tilde{S}_{probe}(\omega)$ is obtain as $$\tilde{S}_{probe}(\omega) = G\frac{\chi_{probe}^2(\omega)}{\chi_{pump}^2(\omega)}\tilde{S}_{pump}(\omega), \quad (S11)$$

Where $$G = \frac{\varepsilon_{probe}^2 g_{probe}^2 \gamma_{pump}^4}{\varepsilon_{pump}^2 g_{pump}^2 \gamma_{probe}^4}. \quad (S12)$$

If we assume that the detunings and damping rates of the optical modes are close to each other, i.e., $\Delta_{pump} \approx \Delta_{probe}$ and $\gamma_{pump} \approx \gamma_{probe}$, we have $\chi_{probe}^2(\omega)/\chi_{pump}^2(\omega) \approx 1$, leading to $$\tilde{S}_{probe}(\omega) \approx G\tilde{S}_{pump}(\omega). \quad (S13)$$

This implies that the spectra of the pump and probe fields are correlated with each other. The correlation factor G is mainly determined by the opto-mechanical coupling strengths of the pump and the probe fields as well as the intensities of these fields.

The relation between the spectra of the pump and probe signals shows that the opto-mechanical coupling strengths $g_{pump}$ and $g_{probe}$ of the pump and probe field to the excited mechanical mode determine how closely the probe field will follow the pump field. Clearly, these coupling strengths do not change the shape of the spectrum, and this is the reason why the probe signal follows the pump signal in the frequency domain and enters the chaotic regime via the same bifurcation route, despite the fact that they are far detuned from each other (FIG. 24G, 24H).

When demonstrating the technology, the mechanical motion is excited by the strong pump field, and the probe is chosen to have such a low power that it could not induce any mechanical oscillations. The large pump and probe detuning ensured that there is no direct coupling between them. The fact that both the pump and the probe are within the same resonator that sustains the mechanical oscillation naturally implies that both the pump and the probe are affected by the same mechanical oscillation with varying strengths, depending on how strongly they are coupled to the mechanical mode. The pump and probe spectra (FIGS. 28A, 28B, 28C, 28D, 28E, and 28F) obtained by experimentation under these conditions agree well with the prediction given in Eq. (S13), in the sense that the spectra of the pump and the probe fields become correlated if they couple to the same mechanical mode. The slight differences in phase diagrams obtained in the demonstration (FIGS. 24A, 24B, 24C, 24D, 24E, and 24F) imply that different coupling strengths of the pump and probe to the same mechanical mode, due to the difference in their spatial overlaps with the mechanical mode, affect the trajectories and thus the phase diagrams.

One implementation of the technology as disclosed and claimed is configured to control chaos and stochastic noise. The technology is configured to control chaos and stochastic noise by increasing the pump power (1550 nm band) on the detected pump and the probe signals (980 nm band), on the degree of sensitivity to initial conditions and chaos in the probe. This is accomplished by calculating the maximal Lyapunov exponent (MLE) from the detected pump and probe signals. Lyapunov exponents quantify the sensitivity of a system to initial conditions and give a measure of predictability. They are a measure of the rate of convergence or divergence of nearby trajectories in phase space.

The behavior of the MLE is a good indicator of the degree of convergence or divergence of the whole system. A positive MLE implies divergence and sensitivity to initial conditions, and that the orbits are on a chaotic attractor. If, on the other hand, the MLE is negative, then trajectories converge to a common fixed point. A zero exponent implies that the orbits maintain their relative positions and they are on a stable attractor. The technology demonstrates that with increasing pump power the degree of chaos and sensitivity to initial conditions, as indicated by the positive MLE, first increase and then decreased after reaching its maximum, both for the pump and the probe fields (FIG. 25A). With further increase of the pump, the MLE becomes negative, indicating a reverse period-doubling route out of chaos into periodic dynamics. In addition to the pump power, the pump-cavity detuning and the damping rate of the pump affect the MLE for both the pump and the probe fields.

Referring to FIGS. 25B, 25C, 25D, and 25E, Maximal Lyapunov exponents for the pump (blue) and the probe fields as a function of the pump power is illustrated. The Lyapunov exponents describe the sensitivity of the transmitted pump and the probe signals to the input pump power. Circles and diamonds are the exponents calculated from measured data. The blue and red curves are drawn as eye guidelines. FIG. 25B illustrates bandwidth broadening of the probe as a function of the pump power. Circles denote the demonstrated data and the red curve is the fitting curve. The inset shows the cross-correlation between the pump and probe fields as a function of the pump power for typical spectra obtained for the probe at different pump powers. Power increases from c to e, clearly showing the bandwidth broadening. The corresponding Lyapunov exponents and bandwidths are labelled in FIG. 25A and FIG. 25B.

The bandwidth D of the probe signal increases with increasing pump power (FIGS. 25B, 25C, 25D, and 25E), and the relation between the bandwidth D of the probe signal and the pump power $P_{pump}$ follows the power function $D=\alpha P_{pump}^{1/2}$, with $\alpha=1.65\times 10^8$ Hz/mW$^{1/2}$ (FIG. 25B). This is contrary to the expectation that the less (more) chaotic the signal is, the smaller (larger) its bandwidth is. This can be attributed to the presence of both the deterministic noise from chaos and the stochastic noise from the opto-mechanical backaction. According to Newton's third law, for every action there is always an equal and opposite reaction. With similar inevitability, this time in quantum physics, for every measurement there is always a perturbation of the object being measured. This phenomenon, known as quantum back-action, could now be put to practical use because it can alter the frequency, position, and damping rate of a resonator. For example in an opto-mechanical system, radiation pressure caused by circulating photons create optomechanical oscillations and opto-mechanical dynamics, optomechanical oscillations then back-action on the light (photons) and change their characteristics, inducing noise, shifting their frequency. The system is chaotic for the range of pump power where the maximal Lyapunov exponent is positive (FIG. 25A). For smaller or larger power levels, the system is not in the chaotic regime. Thus, chaos-induced noise is present only for a certain range of pump power.

The effect of opto-mechanical backaction, on the other hand, is always present in the power range shown in FIGS. 25B, 25C, 25D, and 25E, and its effect increases with increasing pump power, where the higher the pump power, the larger the stochastic noise due to backaction (FIG. 25E has more backaction noise than FIG. 25D, which, in turn, has more than FIG. 25C).

In FIG. 25C and FIG. 25E (corresponding to zero or negative maximum Lyapunov exponent), the bandwidth is almost completely determined by the opto-mechanical backaction, with very small or no contribution from chaos. In FIG. 25D, the system is in the chaotic regime, and thus both chaos and the backaction contribute to noise, leading to a larger probe bandwidth in FIG. 25D than in FIG. 25C. At the pump power of FIG. 25E, on the other hand, the system is no more in chaotic. However, backaction noise reaches such high levels that it surpasses the combined effect of chaos and backaction noises of FIG. 25D. As a result, FIG. 25E has a larger bandwidth. Thus, for the present technology, the pump and the probe became less chaotic when the pump power was increased beyond a critical value; however, at the same time their bandwidths increased, implying more noise contribution from the optomechanical backaction. Therefore, the correlation between the pump and probe fields decreased with increasing pump power (FIG. 25B inset).

Figure 26A:
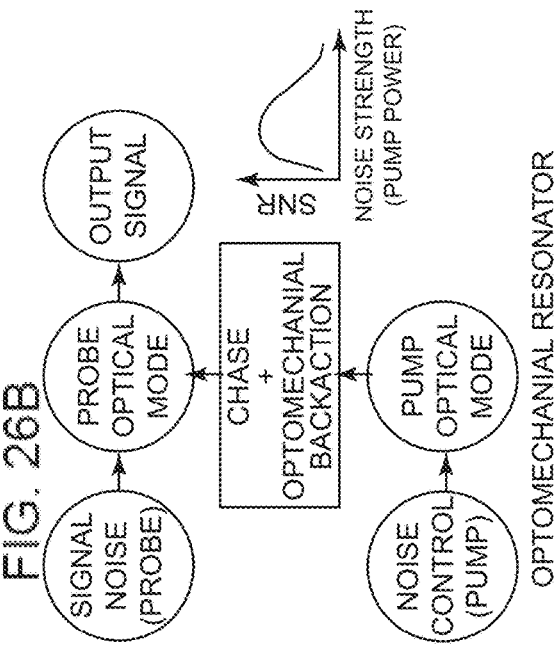
FIG. 26A is Signal-to-noise ratio (SNR) of the probe as a function of the pump power.
Figure 26B:
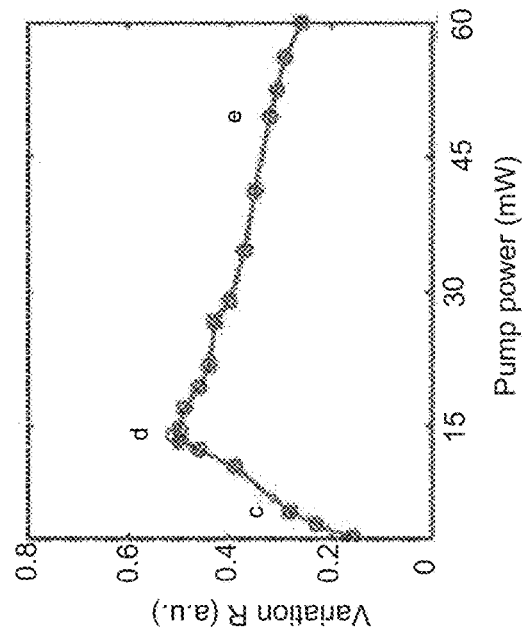
FIG. 26B is An illustration conceptualizing chaos-mediated stochastic resonance in an opto-mechanical resonator.
Figure 26C:
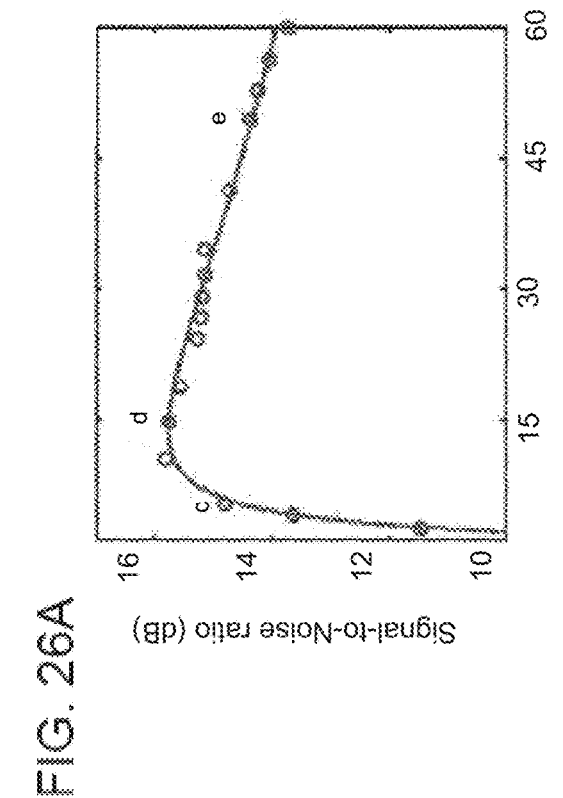
FIG. 26C is an illustration of increasing the pump power first increases the SNR to its maximum and then reduces it—Mean $<\tau>$.
Figure 26D:
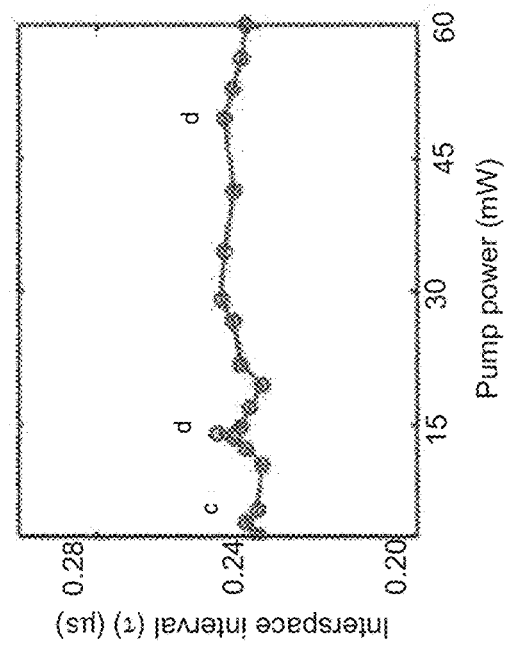
FIG. 26D is an illustration of increasing the pump power first increases the SNR to its maximum and then reduces it, scaled standard deviation R of interspike intervals T.

The technology as disclosed and claimed demonstrates stochastic resonance mediated by opto-mechanically-induced-chaos. Referring to FIGS. 26A, 26B, 26C, and 26D, Opto-mechanically induced chaos-mediated stochastic resonance in an opto-mechanical resonator is illustrated. Referring to FIG. 26A, signal-to-noise ratio (SNR) of the probe as a function of the pump power is illustrated. The solid curve is the best fit to the demonstrated data (open circles). Referring to FIG. 26B, an illustration conceptualizing chaos-mediated stochastic resonance in an opto-mechanical resonator is provided. The mechanical motion mediates the pump-probe coupling and enables the pump field to control chaos, the strength of the opto-mechanical back-action, and the probe bandwidth. Hence, the pump controls the system's noise, where increasing the pump power first increases the SNR to its maximum and then reduces it. FIG. 26C, illustrates a Mean ⟨τ⟩, and FIG. 26D, a scaled standard deviation R of interspike intervals ττ, obtained from experimental data for the probe (open circles) as a function of pump power, exhibiting the theoretically-expected characteristics for a system with stochastic resonance. The data points labelled as c, d and e correspond to the same points indicated in FIGS. 25B, 25C, 25D, and 25E.

The technology as disclosed and claimed herein demonstrates that below a critical value, increasing the pump power increases the signal-to-noise ratio (SNR) of both the probe and the pump fields; however, beyond this value, the SNR decreased despite increasing pump power (FIG. 26A). When the pump is turned off ($P_{pump}$~0 mW), the SNR of the probe signal is −10 dB. The maximum value of the SNR is obtained for the pump power of $P_{pump}$~15 mW. The relation between the pump power and the SNR of the probe is given by the expression $(\varepsilon/P_{pump})\exp(-\beta1\sqrt{P_{pump}})$, with $\varepsilon=0.825$ mW and $\beta=7.4764$ mW$^{1/2}$. Combining the relation between the bandwidth and the pump power with the relation between the SNR and pump power, it is determined that the relation between the SNR and the bandwidth of the probe signal scales as $SNR \propto aD^{-2} \exp(-b/D)$. This expression implies that SNR is not a monotonous function of the bandwidth D (i.e., noise), and that it is possible to increase the SNR by increasing the noise. This effect is referred to as stochastic resonance, which is a phenomenon in which the response of a nonlinear system to a weak input signal is optimized by the presence of a particular level of stochastic noise, i.e., the noise-enhanced response of an input signal. FIG. 26B provides a conceptual illustration of the mechanism leading to chaos-mediated stochastic resonance in our opto-mechanical system.

An observed noise benefit (FIG. 26A) can be described as stochastic resonance if the input (weak signal) and output signals are well-defined. When the technology is demonstrated, the input is given by the weak probe field (in the 980 nm band), and the output is the signal detected in the probe mode at the end of the fiber taper. In the rotated frame, and with the elimination of mechanical degrees of freedom, the optical system is described by a weak periodic input (i.e., the weak probe field) modulated by the frequency of the mechanical mode. The noise required for stochastic resonance can be either external or internal (due to the system internal dynamics). When demonstrating the present technology it is provided by both the opto-mechanical backaction and chaotic dynamics, which are both controlled by the external pump field.

At low pump powers, corresponding to periodic or less-chaotic regimes (i.e., negative or zero Lyapunov exponent), the contribution of the backaction noise is small, and chaos is not strong enough to help amplify the signal. Therefore, the SNR is low. At much higher pump power levels, the system evolves out of chaos. At the same time, the noise contribution to the probe from the opto-mechanical backaction increases with increasing pump power and becomes comparable to the probe signal. Consequently, the SNR of the probe decreases. Between these two SNR minima, the noise attains the optimal level to amplify the signal coherently with the help of intermode interference due to the chaotic map; and thus an SNR maximum occurs. Indeed, resonant jumps between different attractors of a system due to chaos-mediated noise as a route to stochastic resonance and to improve SNR.

The mean ⟨τ⟩ (FIG. 26C) and scaled standard deviation $R=\sqrt{\langle\tau^2\rangle-\langle\tau\rangle^2}/\tau$ (FIG. 26D) of the interspike intervals r of the signals detected during the demonstration of the technology exhibit the theoretically-expected dependence on the noise (i.e., pump power) for a system with stochastic resonance. While ⟨τ⟩ is not affected by the pump power and retains its value of 0.24 μs (the resonance revival frequency of 26 MHz determined by the frequency of the mechanical mode), R attains a maximum at an optimal pump power (i.e., R is a concave function of noise). On the other hand, for a system with coherence resonance, increasing noise leads to a decrease in ⟨τ⟩, and R is a convex function of the noise. It is known that in a system with coherence resonance the positions of the resonant peaks in the output spectra shift with increasing pump power, implying that the resonances are induced solely by noise. The resonant peak in our experimentally-obtained output power spectra, however, was located at the frequency of the mechanical mode, which modulated the input probe field, and its position did not change with increasing pump power (i.e., noise level), providing another signature of stochastic resonance. Thus, it can be concluded that the observed SNR enhancement is due to the chaos-mediated stochastic resonance, and hence the present technology constitutes the first observation of opto-mechanically-induced chaos-mediated stochastic resonance, which is a counterintuitive process where additional noise can be helpful.

The technology as disclosed and claimed demonstrates a bifurcation process and the route to chaos of the probe fields follow the route to chaos of the pump. When under test, the technology demonstrated a mechanical mode with a frequency of around 26 MHz, and the evolution of this mode as a function of the power of the input pump field.

Figure 29A:
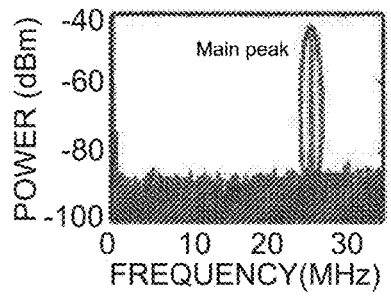
FIG. 29A through 29F are a demonstration of opto-mechanically-induced period-doubling in the pump and probe fields.
Figure 29B:
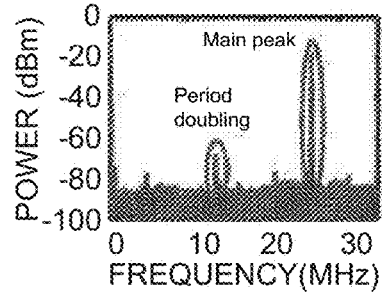

Referring to FIGS. 29A, 29B, 29C, 29D, 29E, 29F, 29G, 29H, 29I, 29J, 29K, 29L, 29M, and 29N, opto-mechanically-induced period-doubling in the pump and probe fields is illustrated. FIG. 29A illustrates test data for the technology under test, and FIG. 29B illustrates the results of numerical simulations showing first and second period-doubling processes for the pump (Lower spectra) and probe (Upper spectra) fields. The technology in one of various implementations as disclosed demonstrates a mechanical mode with a frequency of around 26 MHz, and demonstrates the evolution of this mode as a function of the power of the input pump field. As shown in FIG. 29A, both the pump and probe fields experience a period-doubling bifurcation as the input power of the pump field is increased. When the input pump power is low, the spectra of the pump and probe fields shows a peak at around 26 MHz. When the input pump power is increased above a critical value, a second peak appears just at half frequency of the main peak, i.e., ~13 MHz which corresponds to a period-doubling process. At higher powers, successive period-doubling events occur, leading to peaks located at frequencies of ½$^n$-th of the main peak. For example, the second period-doubling bifurcation leads to frequency peaks at 6.5 MHz for both the pump and the probe fields.

In FIG. 29B, the results of numerical simulations obtained is illustrated by solving the following set of equations $$\dot{a}_{pump}=-[\gamma_{pump}-i(\Delta_{pump}-g_{pump}X)]a_{pump}+i\kappa\varepsilon_{pump}(t), \quad (S14)$$

$$\dot{a}_{probe}=-[\gamma_{probe}-i(\Delta_{probe}-g_{probe}X)]a_{probe}+i\kappa\varepsilon_{probe}(t), \quad (S15)$$

$$\dot{X}=-\Gamma_m X+\Omega_m P, \quad (S16)$$

$$\dot{P}=-\Gamma_m P-\Omega_m X+g_{pump}|a_{pump}|^2, \quad (S17)$$

which describe the evolution of the pump and probe cavity modes and the mechanical mode.

In a simulation, a single mechanical eigenmode with frequency 26 MHz can be considered, similar to what is demonstrated by the technology under test. Here, $\Omega_m$ and $\Gamma_m$ are the frequency and damping rate of the mechanical mode. The probe signal is chosen to be very weak, so that it does not induce mechanical or thermal oscillations. Consequently, the mechanical mode was induced only by the pump field as described by the expression in Eq. (S17). The model explains the observations of the technology. It is clearly seen that the probe field follows the pump field during the bifurcation process.

Figure 29C:
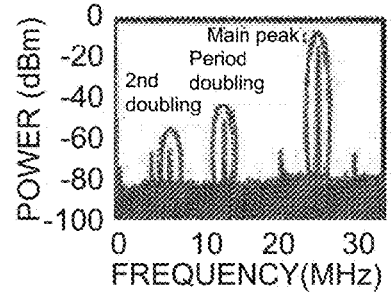
Figure 29D:
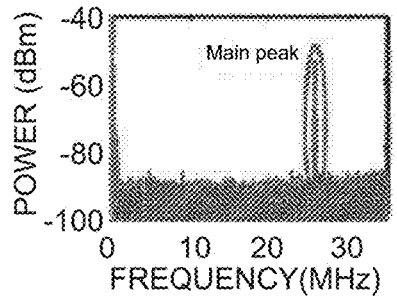
Figure 29E:
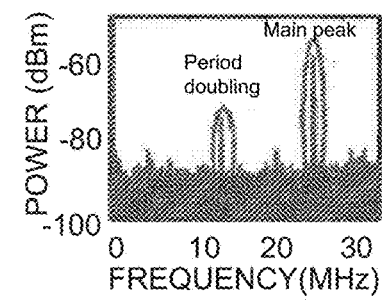
Figure 29F:
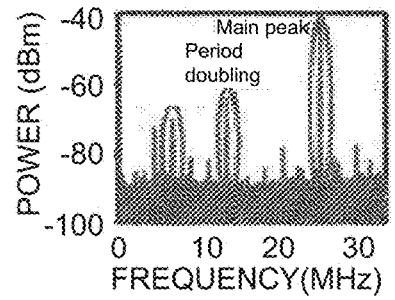
Figure 29G:
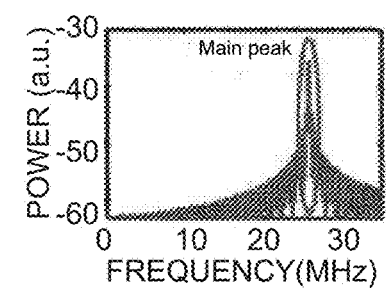
FIG. 29G through 29L are a numerical simulation of opto-mechanically-induced period-doubling in the pump and probe fields.
Figure 29H:
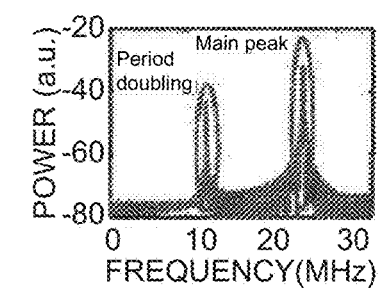
Figure 29I:
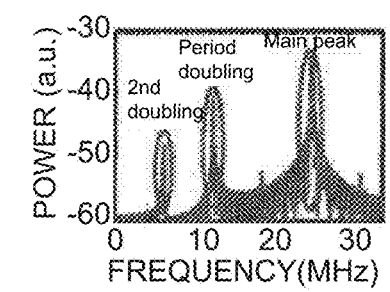
Figure 29J:
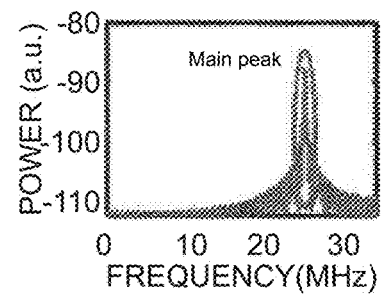
Figure 29K:
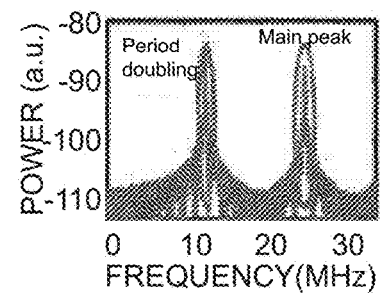
Figure 29L:
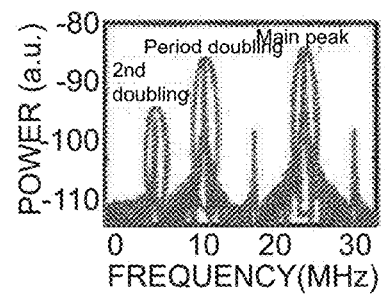

As shown in FIGS. 29A, 29B, 29C, 29D, 29E, 29F, 29G, 29H, 29I, 29J, 29K, and 29L the technology demonstrates the existence of a second mechanical mode with frequency 5 MHz. This mode is excited when the pump power was increased to observe the second period-doubling process. Generally, one may think that this low-frequency mechanical mode would affect the bifurcation process of the 26 MHz mechanical mode, because these two mechanical modes are in the same micro-resonator and thus may couple to each other. However, the technology as disclosed does not demonstrate such a characteristic. Numerical simulations using COMSOL demonstrate that the mechanical modes at 26 MHz and 5 MHz are, respectively, transverse and longitudinal modes (FIGS. 29C, 29D). Thus, they are orthogonal, which implies that there is minimal or no interaction between them.

Figure 29M:
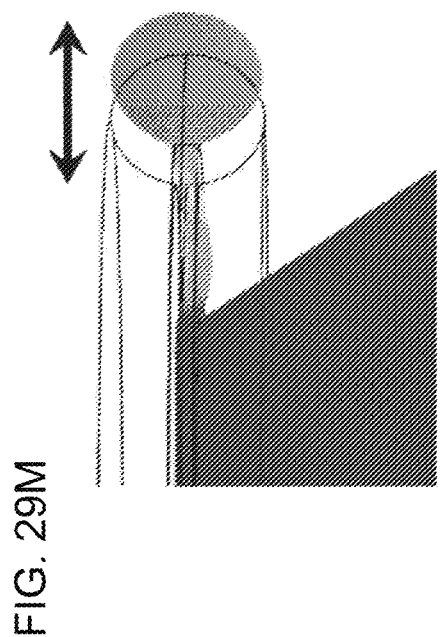
FIG. 29M is an illustration of a mechanical transverse mode in a micro-toroid.
Figure 29N:
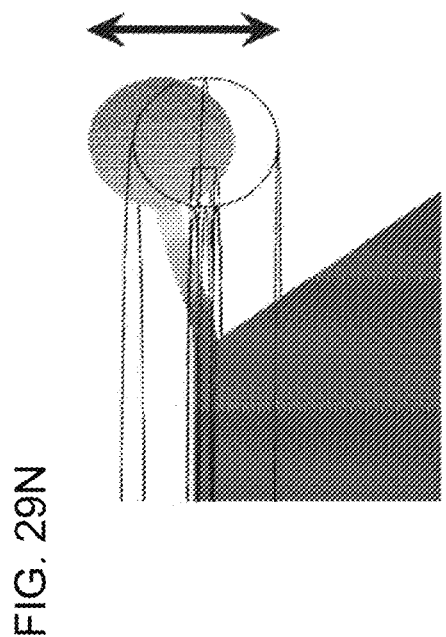
FIG. 29N is an illustration of a mechanical longitudinal mode in a micro-toroid.

Referring to FIGS. 29M and 29N, a COMSOL simulation of the mechanical modes in a microtoroid is illustrated. The mechanical mode with frequency a, 26 MHz is a transverse mode whereas the one with frequency b, 5 MHz is a longitudinal mode. Both of these mechanical modes are observed, with the 5 MHz mode being excited only when the pump power is significantly high that the mode at 26 MHz experiences the second period doubling (FIGS. 29A, 29B, 29C, 29D, 29E, 29F, 29G, 29H, 29I, 29J, 29K, and 29L). The orthogonality of these mechanical modes implies that there is no direct coupling between them.

In order to understand how the co-existence of the pump and probe fields in the same opto-mechanical resonator affect their interaction with the system and with each other, consider the following Hamiltonian $$H = \Delta_{probe} a^\dagger_{probe} a_{probe} + \varepsilon_{probe}(a^\dagger_{probe} + a_{probe}) + \quad\quad (S18)$$
$$g_{probe} a^\dagger_{probe} a_{probe} X + \frac{\Omega_m}{2}(X^2 + P^2) + \Delta_{pump} a^\dagger_{pump} a_{pump} +$$
$$\kappa\varepsilon_{pump}(a^\dagger_{pump} + a_{pump}) + g_{pump} a^\dagger_{pump} a_{pump} X,$$

where the first (fourth) and second (fifth) terms are related to the free evolution of the probe $a_{probe}$ (pump $a_{pump}$) field, and the third (sixth) term explains the interaction of the probe (the pump) field with the mechanical mode X. The last term corresponds to the free evolution of the mechanical mode.

First, consider only the probe field by eliminating the fourth, fifth and sixth terms. In this case, resulting at the Hamiltonian $$H = \Delta_{probe} a^\dagger_{probe} a_{probe} + \kappa\varepsilon_{probe}(a^\dagger_{probe} + a_{probe}) + \quad\quad (S19)$$
$$g_{probe} a^\dagger_{probe} a_{probe} X + \frac{\Omega_m}{2}(X^2 + P^2).$$

By introducing the translational transformation $$\hat{X} = X + \frac{g_{probe}}{\Omega_m} a^\dagger_{probe} a_{probe}, \quad \hat{P} = P, \quad\quad (S20)$$

the Hamiltonian H can be re-expressed as $$H = \Delta_{probe} a^\dagger_{probe} a_{probe} + \kappa\varepsilon_{probe}(a^\dagger_{probe} + a_{probe}) - \quad\quad (S21)$$
$$\frac{g^2_{probe}}{2\Omega_m}(a^\dagger_{probe} a_{probe})^2 + \frac{\Omega_m}{2}(\hat{X}^2 + \hat{P}^2),$$

where we see that the nonlinear interaction between the probe field and the mechanical motion leads to an effective Kerr-like nonlinearity in the optical mode $a_{probe}$, with its coefficient given as $$\mu_{probe} = \frac{g^2_{probe}}{2\Omega_m}, \quad\quad (S22)$$

where $\Omega_m$ is the frequency of the mechanical mode. Equation (S22) implies that the opto-mechanically-induced Kerr-like nonlinearity is dependent on (i) the opto-mechanical coupling between the optical and mechanical modes and (ii) the frequency of the mechanical mode.

Following a similar procedure, we can derive the coefficient of nonlinearity for the case when only the pump field is present. In such a case, resulting in $$H = \Delta_{pump} a^\dagger_{pump} a_{pump} + \kappa\varepsilon_{pump}(a^\dagger_{pump} + a_{pump}) + \quad\quad (S23)$$
$$g_{pump} a^\dagger_{pump} a_{pump} X + \frac{\Omega_m}{2}(X^2 + P^2).$$

By introducing the transformation $$\hat{X} = X + \frac{g_{pump}}{\Omega_m} a^\dagger_{pump} a_{pump}, \quad \hat{P} = P, \quad\quad (S24)$$

the Hamiltonian rewritten as $$H = \Delta_{pump} a^\dagger_{pump} a_{pump} + \kappa\varepsilon_{pump}(a^\dagger_{pump} + a_{pump}) - \quad\quad (S25)$$
$$\frac{g^2_{pump}}{2\Omega_m}(a^\dagger_{pump} a_{pump})^2 + \frac{\Omega_m}{2}(\hat{X}^2 + \hat{P}^2).$$

Thus, the coefficient of the effective Kerr-like nonlinearity in the optical mode $a_{pump}$ becomes $$\mu_{pump} = \frac{g^2_{pump}}{2\Omega_m}, \quad\quad (S26)$$

where $\Omega_m$ is the frequency of the mechanical mode and $g_{pump}$ is the strength of the coupling between the pump and mechanical modes.

Now let us consider the case where both the pump and probe fields exist within the same resonator and they are coupled to the same mechanical mode. In this case, by applying the transformation $$\tilde{X} = X + \frac{g_{probe}}{\Omega_m} a^\dagger_{probe} a_{probe} + \frac{g_{pump}}{\Omega_m} a^\dagger_{pump} a_{pump}, \; \tilde{P} = P, \quad (S27)$$

re-express the Hamiltonian given in Eq. (S18) as $$H = \Delta_{probe} a^\dagger_{probe} a_{probe} + \kappa \varepsilon_{probe}(a^\dagger_{probe} + a_{probe}) - \quad (S28)$$
$$\frac{g_{probe}^2}{2\Omega_m}(a^\dagger_{probe} a_{probe})^2 + \frac{\Omega_m}{2}(\hat{X}^2 + \hat{P}^2) + \Delta_{pump} a^\dagger_{pump} a_{pump} +$$
$$\kappa \varepsilon_{pump}(a^\dagger_{pump} + a_{pump}) - \frac{g_{pump}^2}{2\Omega_m}(a^\dagger_{pump} a_{pump})^2 -$$
$$\frac{g_{pump} g_{probe}}{\Omega_m}(a^\dagger_{probe} a_{probe})(a^\dagger_{pump} a_{pump}).$$

Here the third and seventh terms are the coefficients of the Kerr-like nonlinearity derived earlier for the cases when only the probe or the pump fields exist in the opto-mechanical resonator. The last term, on the other hand, is new and implies an effective interaction between the pump and probe fields, if they both exist in the opto-mechanical resonator.

The dynamical equations of this system can be written as $$\dot{a}_{pump} = -[\gamma_{pump} - i(\Delta_{pump} - g_{pump} X)]a_{pump} + i\kappa \varepsilon_{pump}, \quad (S29)$$

$$\dot{a}_{probe} = -[\gamma_{probe} - i(\Delta_{probe} - g_{probe} X)]a_{probe} + i\kappa \varepsilon_{probe}. \quad (S30)$$

In the long-time limit (i.e., steady-state), we have $\dot{a}_{pump}$, $\dot{a}_{probe} \approx 0$, which leads to $$a_{probe} = \frac{i\kappa \varepsilon_{probe}}{\gamma_{probe} - i(\Delta_{probe} - g_{probe} X)} \approx \quad (S31)$$
$$\frac{i\kappa \varepsilon_{probe}}{\gamma_{probe} - i\Delta_{probe}} + \frac{\kappa \varepsilon_{probe} g_{probe}}{(\gamma_{probe} - i\Delta_{probe})^2} X,$$

$$a_{pump} = \frac{i\kappa \varepsilon_{pump}}{\gamma_{pump} - i(\Delta_{pump} - g_{pump} X)} \approx \quad (S32)$$
$$\frac{i\kappa \varepsilon_{pump}}{\gamma_{pump} - i\Delta_{pump}} + \frac{\kappa \varepsilon_{pump} g_{pump}}{(\gamma_{pump} - i\Delta_{pump})^2} X.$$

If we further eliminate the degrees of freedom of the mechanical mode X from the above equations, then, under the conditions that $\gamma_{pump} = \gamma_{probe}$, $\Delta_{pump} = \Delta_{probe}$, and $g_{pump} = g_{probe}$, we have $$a_{pump} = (\varepsilon_{pump}/\varepsilon_{probe}) a_{probe}. \quad (S33)$$

By substituting this equation into the last term in Eq. (S28), we see that the last term of the Hamiltonian becomes $$\frac{g_{pump} g_{probe}}{\Omega_m}(a^\dagger_{probe} a_{probe})(a^\dagger_{pump} a_{pump}) \rightarrow \quad (S34)$$
$$\frac{g_{pump} g_{probe} \varepsilon_{pump}^2}{\Omega_m \varepsilon_{probe}^2}(a^\dagger_{probe} a_{probe})^2,$$

from which we define the coefficient of nonlinearity as $$\tilde{\mu} = \frac{g_{probe}^2 \varepsilon_{pump}^2}{\Omega_m \varepsilon_{probe}^2}. \quad (S35)$$

It is clear that even a very weak probe field can experience a strong Kerr nonlinearity, and hence a nonlinear dynamics, if the intensity of the pump is sufficiently strong. Thus, the system intrinsically enables an opto-mechanically-induced Ken-like nonlinearity, which helps the optical pump and probe fields interact with each other. It is clear that the strength of the interaction can be made very high by increasing the ratio of the intensity of the input pump field $\varepsilon_{pump}^2$ to that of the input probe field $\varepsilon_{probe}^2$. With the configuration of the technology as tested, the pump field is at least three-orders of magnitude larger than the probe field. Thus the nonlinear coefficient $\tilde{\mu}_{probe}$ given in Eq. (S35) is increased by at least three-orders of magnitude, compared to the nonlinear coefficient $\mu_{probe}$ given in Eq. (S22).

The trajectory of the mechanical motion can be estimated from the demonstration data. The mechanical mode excited in the microtoroid during the demonstration has a frequency of $\Omega_m = 26.1$ MHz and a damping rate of $\Gamma_m = 0.2$ MHz, implying a quality factor of $Q_m \approx 130$ These values are used in the nonlinear opto-mechanical equations to reconstruct the mechanical motion. It is seen that the opto-mechanical resonator experiences a periodic motion (FIG. 37A) even when the detected optical pump field showed chaotic behavior. To explain this, we start from the following equation for the mechanical resonator $$\dot{X} = -\Gamma_m X + \Omega_m P, \quad (S36)$$

$$\dot{P} = -\Gamma_m P - \Omega_m X + g_{pump} I(t), \quad (S37)$$

where P is the momentum of the mechanical mode and $I(t) = |a_{pump}(t)|^2$ is the intensity of the pump with the field amplitude $a_{pump}$.

By introducing the complex amplitude $b = (X + iP)/\sqrt{2}$, Eqs. (S36) and (S37) can be rewritten as $$\dot{b} = -(\Gamma_m - i\Omega_m) b + g_{pump} I(t). \quad (S38)$$

The above equation can be solved in the frequency domain as $$b(\omega) = \frac{g_{pump}}{i(\omega - \Omega_m) + \Gamma_m} I(\omega), \quad (S39)$$

from which we obtain $$S_b(\omega) = |b(\omega)|^2 = \frac{g_{pump}^2}{(\omega - \Omega_m)^2 + \Gamma_m^2} |I(\omega)|^2 = \frac{g_{pump}^2}{\Gamma_m^2} \chi_{b1}(\omega) S_I(\omega), \quad (S40)$$

where $$\chi_{b1}(\omega) = \frac{\Gamma_m^2}{(\omega - \Omega_m)^2 + \Gamma_m^2} \quad (S41)$$

is the susceptibility coefficient induced by the mechanical resonator and $S_I(\omega) = |I(\omega)|^2$ is the spectrum of I(t).

Figure 30B:
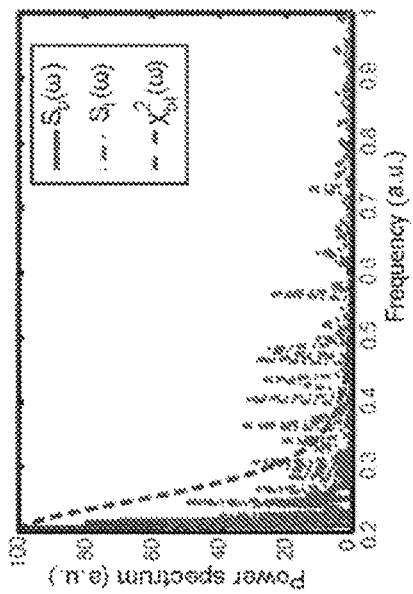
FIG. 30B is an illustration of periodic mechanical motion of the microtoroid resonator when Filtering by the mechanical resonator: the mechanical resonator works as a low-pass filter.
Figure 30A:
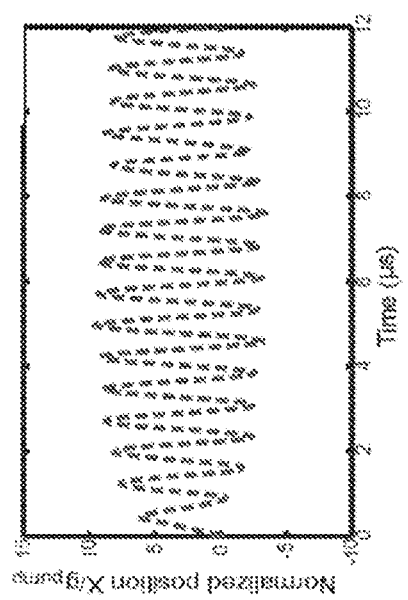
FIG. 30A is an illustration of periodic mechanical motion of the microtoroid resonator when the pump and probe fields are both in the chaotic regime.

As shown in FIG. 30A, the mechanical resonator works similar to a low-pass filter, which filters out the high-frequency components of I(t). In fact, the susceptibility coefficient $\lambda_{b1}(\omega)$ modifies the shape of $S_I(\omega)$ and shrinks the spectrum $S_b(\omega)$ to the low-frequency regime. By such a filtering process, the mechanical motion of the resonator does not experience the high-frequency components typical of chaotic behavior, but instead remains in the periodic-oscillation regime, as shown in the reconstructed motion of the mechanical mode in FIG. 30B. FIGS. 30A and 30B illustrate reconstructed mechanical motion of the microtoroid resonator. FIG. 30A illustrates periodic mechanical motion of the microtoroid when the pump and probe fields are both in the chaotic regime. FIG. 30B illustrates filtering by the mechanical resonator where the mechanical resonator works as a low-pass filter which filters out the high-frequency components in the mechanical modes.

Figure 31A:
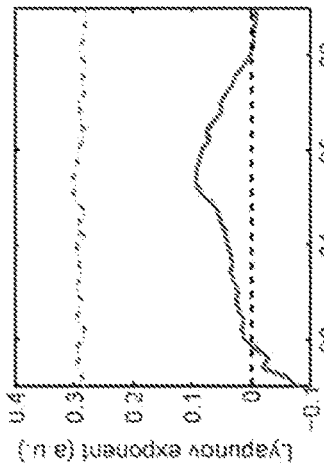
FIG. 31A illustrates the Maximum of the Lyapunov exponent for the pump (red spectra) and probe (blue spectra) fields showing effect of the pump-cavity detuning.
Figure 31B:
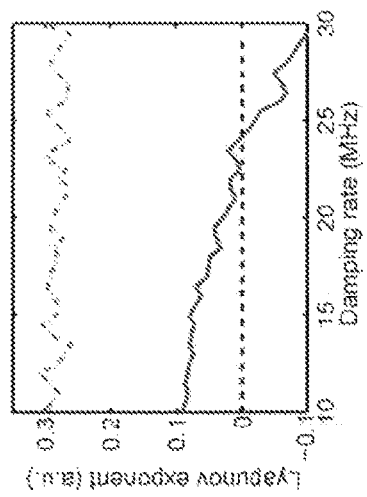
FIG. 31B is illustrates the Maximum of the Lyapunov exponent for the pump (red spectra) and probe (blue spectra) fields showing effect of the probe-cavity detuning on the maximum Lyapunov exponents of the pump and probe fields.

Lyapunov exponents quantify sensitivity of a system to initial conditions and give a measure of predictability. They are a measure of the rate of convergence or divergence of nearby trajectories. A positive exponent implies divergence and that the orbits are on a chaotic attractor. A negative exponent implies convergence to a common fixed point. Zero exponent implies that the orbits maintain their relative positions and they are on a stable attractor. The present technology as disclosed shows how the pump power affects the maximum Lyapunov exponent of the pump and probe fields. In FIGS. 31A, 31B, 31C, and 31D, numerical results are presented regarding the effect of the frequency detuning between the cavity resonance and the pump, frequency detuning between the cavity resonance and the probe, and the damping rates of the pump and probe on the maximum Lyapunov exponent. As seen in FIG. 31A, Lyapunov exponents of the pump and probe fields vary with increasing frequency detuning between the pump and the cavity resonance. As the frequency detuning of the pump increases, Lyapunov exponent increases from negative to positive values, attaining its maximum value at a detuning value of $\Delta_{pump} \approx 0.9 \, \Omega_m$. With further increase of detuning, it decreases and returns back to negative values. Thus, with increasing detuning of the pump from the cavity resonance, the system evolves first to chaotic regime and then gets out of chaos into a periodic dynamics.

Figure 31C:
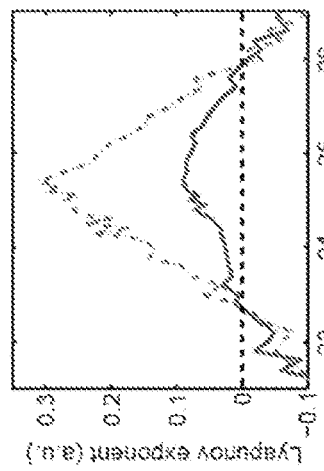
FIG. 31C is an illustration of Maximum of the Lyapunov exponent for the pump (red spectra) and probe (blue spectra) fields showing the effect of the damping rate of the pump.
Figure 31D:
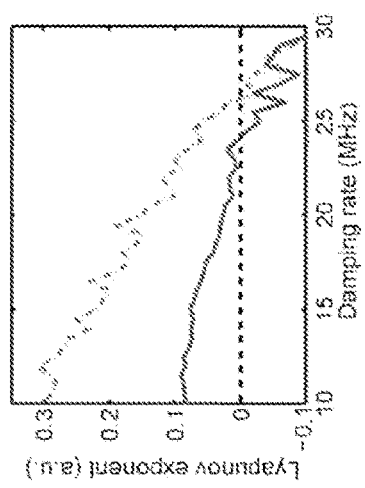
FIG. 31D is an illustration of Maximum of the Lyapunov exponent for the pump (red spectra) and probe (blue spectra) fields showing the effect of damping rate of the probe on the maximum Lyapunov exponents of the pump and probe fields.

This is similar to the behavior observed for the varying pump field. Interestingly, both the pump and probe fields follow the same dependence on the pump-cavity detuning. When examining the effect of probe-cavity detuning (FIG. 31B), It can be determined that varying probe-cavity detuning affects only the maximum Lyapunov exponent of the probe, and the pump Lyapunov exponent is not affected. The reason for this is that in the demonstration of the technology and in these simulations, the power of the probe field is kept sufficiently weak that it does not affect the pump field. A similar trend is seen in the case of varying the damping rates of the pump and probe modes, that is varying the damping rate of the pump affects Lyapunov exponents of both the pump and probe (FIG. 31C) but varying the damping rate of the probe affects only the Lyapunov exponent of the probe (FIG. 31D). FIG. 31C shows that with increasing damping rate the maximum Lyapunov exponent decreases from a positive value down to negative values. This can be explained as follows. Increasing damping rate decreases the quality factor of the resonator which in turn reduces the intracavity field intensity. As a result optomechanical oscillation is gradually suppressed and the degree of the chaos induced by optomechanical interaction decreases.

FIG. 9 illustrates the maximum of the Lyapunov exponent for the pump (Upper spectra) and probe (Lower spectra) fields. FIG. 31A illustrates the effect of the pump-cavity detuning, 31B, the effect of probe-cavity detuning, 31C, the effect of the damping rate of the pump, and for FIG. 31D the effect of damping rate of the probe on the maximum Lyapunov exponents of the pump and probe fields.

In order to further illustrate the stochastic resonance phenomenon, first, focus on the dynamics of the optical mode coupled to the probe field $a_{probe}$. The total Hamiltonian of the optical modes $a_{pump}$, $a_{probe}$, and the mechanical mode can be written as in Eq. (S18). By introducing the translation transformation in Eq. (S27) and getting rid of the degrees of freedom of the mechanical mode and the optical mode coupled to the pump field $a_{pump}$, the Hamiltonian in Eq. (S18) can be re-expressed as $$H = \Delta_{probe} a_{probe}^\dagger a_{probe} + \kappa \varepsilon_{probe}(a_{probe}^\dagger + a_{probe}) - \tilde{\mu}_{probe}(a_{probe}^\dagger a_{probe})^2. \tag{S42}$$

where $\tilde{\mu}_{probe}$ is given in Eq. (S35).

We can see that the nonlinear opto-mechanical coupling leads to an effective fourth-order nonlinear term in the optical mode $a_{probe}$. Introducing the normalized position and momentum operators $$x_{probe} = \frac{1}{\sqrt{2}}\left(a_{probe}^\dagger + a_{probe}\right), \; p_{probe} = \frac{i}{\sqrt{2}}\left(a_{probe}^\dagger - a_{probe}\right), \tag{S43}$$

we write the following dynamical equation by dropping some non-resonant terms and introducing the noise terms:

$$\dot{x}_{probe} = -\gamma_{probe} x_{probe} + \omega_{probe} p_{probe}, \tag{S44}$$

$$\dot{p} = -\Delta_{probe} x_{probe} - \gamma_{probe} p_{probe} + \tilde{\mu}_{probe} x_{probe}^3 + \kappa \varepsilon_{probe}(t) + \xi(t), \tag{S45}$$

where $\xi(t)$ is a noise term with a correlation time negligibly small when compared to the characteristic time scale of the optical modes and mechanical mode of the optomechanical resonator:

$$\langle \xi(t)\xi(t') \rangle = 2D\delta(t-t'), \tag{S46}$$

with D denoting the strength of the noise. Subsequently, we arrive at the second-order oscillation equation $$\ddot{x} + 2\gamma_{probe}\dot{x}_{probe} = -(\Delta_{probe}^2 + \gamma_{probe}^2)x_{probe} + \tag{S47}$$

$$\tilde{\mu}_{probe}\Delta_{probe} x_{probe}^3 + \kappa\Delta_{probe}\varepsilon_{probe}(t) + \Delta_{probe}\xi(t).$$

Under the condition that $\Delta_{probe} \ll \gamma_{probe}$ in the overdamped limit, the above second-order oscillation equation can be reduced to $$\dot{x} = \tag{S48}$$

$$-\frac{\Delta_{probe}^2}{2\gamma_{probe}}x_{probe} + \tilde{\mu}\frac{\Delta_{probe}}{2\gamma_{probe}}x_{probe}^3 + \kappa\frac{\Delta_{probe}}{2\gamma_{probe}}\varepsilon_{probe}(t) + \frac{\Delta_{probe}}{2\gamma_{probe}}\xi(t).$$

If introducing the normalized time unit $\tau = (2\gamma_{probe}/\Delta_{probe})$ t, arriving at $$\frac{d}{d\tau}x_{probe} = -\Delta_{probe}x_{probe} + \tilde{\mu}_{probe}x_{probe}^3 + \kappa\varepsilon_{probe}(\tau) + \xi(\tau). \tag{S49}$$

which is a typical equation leading to the stochastic resonance phenomenon.

The signal-to-noise ratio (SNR) for such a system is given by $$SNR = \frac{\Delta_{probe}^2 \Omega_m^2 \kappa^2 \varepsilon_{probe}^2}{8\sqrt{2}\, D^2 g_{probe}^4} \exp\left(-\frac{\Delta_{probe}^2 \Omega_m}{8 g_{probe}^2 D}\right). \quad (S50)$$

Since the strength of the noise D is related to the pump power $P_{pump}$ by $D = \alpha P_{pump}^{1/2}$, the relation between the SNR and the pump power can be re-written as $$SNR = \frac{\Delta_{probe}^2 \Omega_m^2 \kappa^2 \varepsilon_{probe}^2}{8\sqrt{2}\, \alpha^2 P_{pump} g_{probe}^4} \exp\left(-\frac{\Delta_{probe}^2 \Omega_m}{8 g_{probe}^2 \alpha P_{pump}}\right), \quad (S51)$$

which implies that the SNR is not a monotonous function of the pump power $P_{pump}$ and hence it is possible to increase the SNR by increasing the pump power (i.e., subsequently by increasing the bandwidth D and hence the noise). Following the same procedure one can derive SNR for the pump in a straightforward way.

Figure 32:
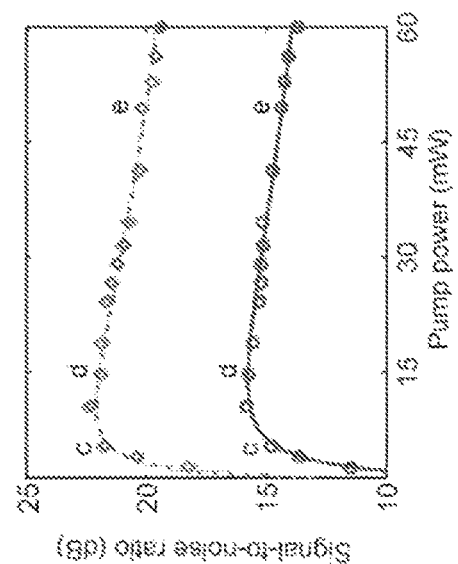
FIG. 32 is an illustration of a signal-to-noise ratio (SNR) for the pump and probe signals.

In FIG. 32, we give the SNR versus pump power for both the probe and pump fields measured in our experiments together with the best fit according to Eq. (S51) for the probe and the similar expression for the pump. Keeping $\varepsilon$ and $\beta$ as free parameters, we found the best fits with $\varepsilon = 0.825$ mW and $\beta = 7.4764$ mW$^{1/2}$ for the probe and with $\varepsilon = 2.6388$ mW and $\beta = 6.47$ mW$^{1/2}$ for the pump.

FIG. 32 illustrates the Signal-to-noise ratio (SNR) for the pump and probe signals. The technology demonstrates a signal-to-noise ratio (SNR) of the probe (blue open circles) and pump (red diamonds) signals as a function of the pump power. Solid curves are the best fits to the experimental data.

As discussed above, stochastic resonance is a phenomenon in which the response of a nonlinear system to a weak input signal is optimized by the presence of a particular level of noise, i.e., the noise-enhanced response of a deterministic input signal. Coherence resonance is a related effect demonstrating the constructive role of noise, and is known as stochastic resonance without input signal. Coherence resonance helps to improve the temporal regularity of a bursting time series signal. The main difference between stochastic resonance and coherence resonance is whether a deterministic input signal is input to the system and whether the induced SNR enhancement is the consequence of the response of this deterministic input. With at least one implementation of the present technology, a weak probe signal, which is modulated by the mechanical mode of the optomechanical resonator at the frequency $\Omega_m = 26$ MHz, acts as a periodic input signal fed into the system. In order to confirm that the observed phenomenon in the technology as demonstrated is stochastic resonance rather than coherence resonance, numerical simulations are performed and compared the results with the present technology demonstration results. The dynamical equations used for numerical simulation are given by $$\dot{a}_{pump} = -[\gamma_{pump} - i(\Delta_{pump} - g_{pump}X)]a_{pump} + i\kappa\varepsilon_{pump}(t) + D_{pump}\xi_{pump}(t), \quad (S52)$$

$$\dot{a}_{probe} = -[\gamma_{probe} - i(\Delta_{probe} - g_{probe}X)]a_{probe} + i\kappa\varepsilon_{probe}(t) + D_{probe}\xi_{probe}(t), \quad (S53)$$

$$\dot{X} = -\Gamma_m X + \Omega_m P, \quad (S54)$$

$$\dot{P} = -\Gamma_m P - \Omega_m X + g_{pump}|a_{pump}|^2 + D_m\xi_m(t), \quad (S55)$$

with parameters $\Delta_{pump}/\Omega_m = \Delta_{probe}/\Omega_m = 1$, $\gamma_{pump}/\Delta_{pump} = 0.1$, $\gamma_{probe}/\Delta_{probe} = 0.1$, $\Gamma_m/\Omega_m = 0.01$, $g_{pump}/\Delta_{pump} = g_{probe}/\Delta_{probe} = 0.1$, $\kappa/\Delta_{pump} = \varepsilon/\Delta_{pump} = 1$, $D_{pump}/\Delta_{pump} = 0.1$, $D_{probe}/\Delta_{probe} = 0.1$, $D_m/\Omega_m = 0.1$. $\xi_{pump}(t)$, $\xi_{probe}(t)$, $\xi_m(t)$ are white noises such that $$E[\xi_i(t)] = 0, E[\xi_i(t)\xi_j(t')] = \delta_{ij}\delta(t-t'), \quad (S56)$$

where E(•) is average over the noise. In the case of stochastic resonance, $\varepsilon_{probe}/\Delta_{probe} = 0.1$, and in the case of coherence resonance $\varepsilon_{probe}/\Delta_{probe} = 0$, to simulate the system with a weak probe input and without the weak probe input, respectively.

Figures 33A, 33B, 33C, 33D, 33E, 33F, 33G, 33H, 33I:
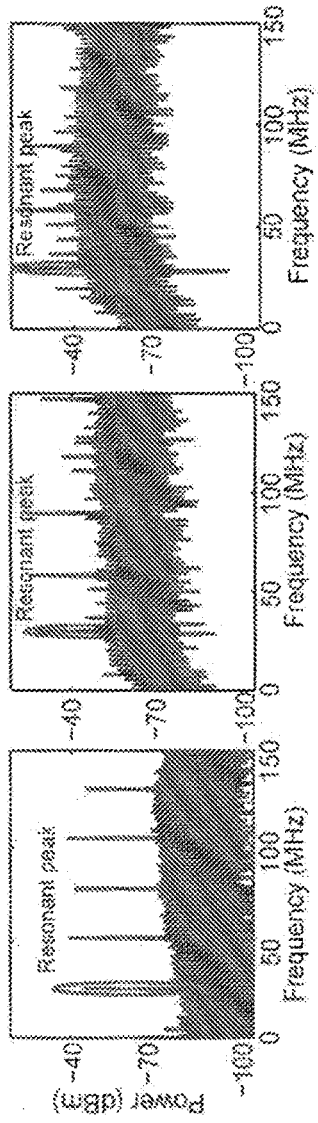
FIGS. 33A, 33B, and 33C are output spectra demonstrating that the spectral locations of the resonance peaks do not change with increasing pump power.
FIGS. 33D, 33E, and 33F are an output spectra obtained in the numerical simulations of stochastic resonance show that the spectral location of the resonance peak stays the same for increasing pump power.
FIGS. 33G, 33H, and 33I are an output spectra obtained in the numerical simulations of coherence resonance which show that the spectral location of the resonance peaks change with increasing pump power.

FIGS. 33A, 33B, 33C, 33D, 33E, 33F, 33G, 33H, and 33I illustrate output spectra obtained in the experiments and in the numerical simulations of stochastic resonance and coherence resonance at various pump powers. FIG. 33A, illustrates an Output spectra obtained in the demonstration testing show that the spectral location of the resonance peak do not change with increasing pump power. FIG. 33B, illustrates an output spectra obtained in the numerical simulations of stochastic resonance show that the spectral location of the resonance peak stays the same for increasing pump power, similar to what was observed in the demonstration testing. FIG. 33C, illustrates an output spectra obtained in the numerical simulations of coherence resonance which show that the spectral location of the resonance peaks change with increasing pump power. From left to the right, the input pump power is increased.

The output spectra obtained from the demonstration of the technology is compared (FIG. 33A) with the results of numerical simulations where the theoretical model introduced above is considered with and without weak probe input to simulate stochastic resonance (FIG. 33B) and coherence resonance (FIG. 33C).

It is seen that in the output spectra obtained from the technology demonstration (FIG. 33A) and the simulations with weak probe input (FIG. 33B), the position of the resonant peaks are not affected by increasing pump power. The spectral position of the resonant peak in the output spectra is fixed at the frequency of the periodic input signal. However, for the case, with no weak probe input, simulating coherence resonance, the positions of the resonant peaks in the output spectra shift with increasing pump power, implying that the resonances are induced by noise. Thus, the behavior of the resonances in the output spectra obtained in the demonstration testing agrees with what one would expect for stochastic resonance, and it is completely different than what one would expect for coherence resonance.

Next, the mean interspike intervals are compared and its scaled standard deviation calculated from the output signal measured in our experiments with the results of numerical simulations of the technology in the one or more implementations disclosed when a weak probe field is used as an input (case of stochastic resonance) and when there is no input probe field (case of coherence resonance). The interspike interval is defined as the mean time between two adjacent spikes in the time-domain output signals, $$\langle \tau \rangle = \lim_{N \to \infty} \frac{1}{N} \sum_{i=1}^{N} \tau_i, \quad (S.57)$$

where $\tau_i$ is the time between the i-th and (i+1)-th spikes. The variation R of the interspike intervals which is defined as the scaled standard deviation of the mean interspike interval is given as $$R = \frac{\sqrt{\langle \tau^2 \rangle - \langle \tau \rangle^2}}{\langle \tau \rangle}. \quad \text{(S.58)}$$

FIGS. 34A, 34B, 34C, 34D, 34E, and 34F illustrate mean interspike intervals and variations for the probe mode. FIG. 34A, illustrates a mean interspike interval and its variation calculated from the output signal in the probe mode obtained in the experiments. FIG. 34B, illustrates a mean interspike interval and its variation obtained in the numerical simulation of stochastic resonance in our system (with input weak probe). FIG. 34C illustrates a mean interspike interval and its variation obtained in the numerical simulation of coherence resonance in our system (without input weak probe). Experimental results agree well with the simulation results of stochastic resonance, and demonstrate a completely different dynamics than the coherence resonance. This implies that the observed phenomenon in the experiments is stochastic resonance.

In FIGS. 34A, 34B, 34C, 34D, 34E, and 34F, the results of the demonstration test for the technology (FIG. 34A) and the numerical simulations for stochastic resonance (FIG. 34B) and for coherence resonance (FIG. 34C) are illustrated. The pump power dependence of $\langle \tau \rangle$ and R obtained for our experimental data and that obtained for the numerical simulation of stochastic resonance agree well, that is in both the experiments and numerical simulations we see that pump power does not affect $\langle \tau \rangle$ much, and R reaches a maximum at an optimal pump power (i.e., R is a concave). From the results of the simulations of coherence resonance, we see that (i) the mean interspike interval $\langle \tau \rangle$ drops gradually with increasing pump power, and (ii) R is a concave function, exhibiting a minimum at an optimal pump power. The very good agreement between what is observed in the technology demonstration testing and the results of the numerical simulations of stochastic resonance in the theoretical model describing the present technology strongly supports that observed in the experiments is stochastic resonance rather than coherence resonance.

The various implementations of chaos induced stochastic resonance in opto-mechanical systems as shown above illustrate a novel system and method for opto-mechanically mediated chaos transfer between two optical fields such that they follow the same route to chaos. A user of the present technology as disclosed may choose any of the above implementations, or an equivalent thereof, depending upon the desired application. In this regard, it is recognized that various forms of the subject of chaos induced stochastic resonance in opto-mechanical system could be utilized without departing from the scope of the present invention.

Chirality lies at the heart of the most fascinating and fundamental phenomena in modern physics like the quantum Hall effect, Majorana fermions and the surface conductance in topological insulators as well as in p-wave superconductors. In all of these cases chiral edge states exist, which propagate along the surface of a sample in a specific direction. The chirality (or handedness) is secured by specific mechanisms, which prevent the same edge state from propagating in the opposite direction. For example, in topological insulators the backscattering of edge-states is prevented by the strong spin-orbit coupling of the underlying material.

Transferring such concepts to the optical domain is a challenging endeavor that has recently attracted considerable attention. Quite similar to their electronic counterparts, the electromagnetic realizations of chiral states typically require either a mechanism that breaks time-reversal symmetry or one that gives rise to a spin-orbit coupling of light. Since such mechanisms are often not available or difficult to realize, alternative concepts have recently been proposed, which require, however, a careful arrangement of many optical resonators in structured arrays. Here we demonstrate explicitly that the above demanding requirements on the realization of chiral optical states propagating along the surface of a system can all be bypassed by using a single resonator with non-Hermitian scattering. The key insight in this respect is that a judiciously chosen non-Hermitian out-coupling of two near-degenerate resonator modes to the environment leads to an asymmetric backscattering between them and thus to an effective breaking of the time-reversal symmetry that supports chiral behavior. More specifically, we show that a strong spatial chirality can be imposed on a pair of WGMs in a resonator in the sense of a switchable direction of rotation inside the resonator such that they can be tuned to propagate in either the clockwise (cw) or the counterclockwise (ccw) direction.

In our experiment we achieved this on-demand tunable modal chirality and directional emission using two scatterers placed in the evanescent field of a resonator. When varying the relative positions of the scatterers the modes in the resonator change their chirality periodically reaching maximal chirality and unidirectional emission at an exceptional point (EP)—a feature which is caused by the non-Hermitian character of the system.

Figure 35C:
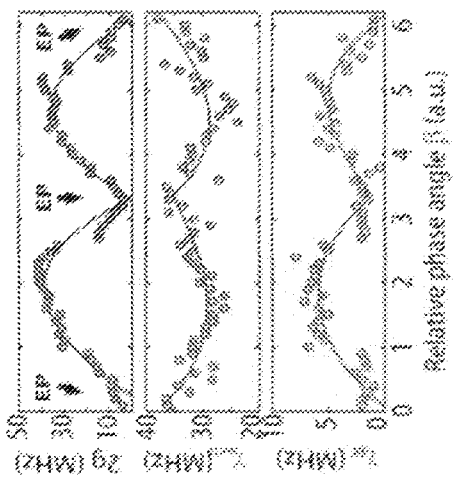
FIGS. 35A, 35B, and 35C illustrate the experimental configuration used in the technology and the effect of scatterers.
Figure 35B:
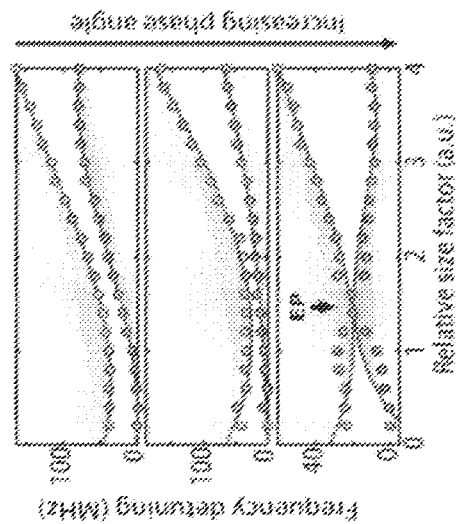
Figure 35A:
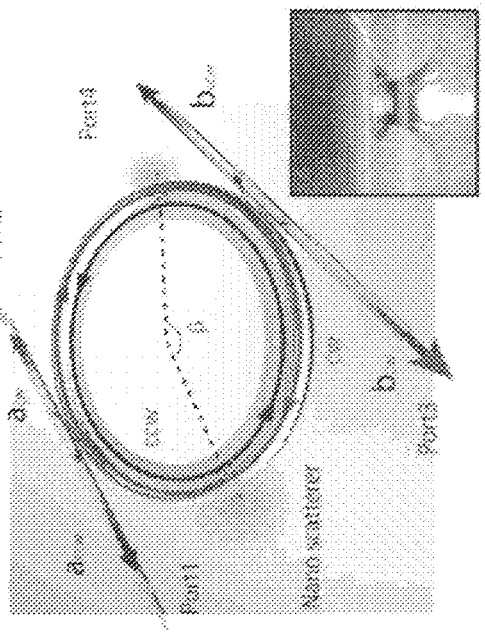

FIGS. 35A, 35B, and 35C illustrate the experimental configuration used in the technology and the effect of scatterers. (A) Illustration of a WGM resonator side-coupled to two waveguides, with the two scatterers enabling the dynamical tuning of the modes. cw and ccw are the clockwise and counterclockwise rotating intracavity fields. $a_{cw(ccw)}$ and $b_{cw(ccw)}$ are the field amplitudes propagating in the waveguides. β: relative phase angle between the scatterers. (B) Varying the size and the relative phase angle of a second scatterer helps to dynamically change the frequency detuning (splitting) and the linewidths of the split modes revealing avoided crossings (top panel) and an EP (lower panel). (C) Effect of β on the frequency splitting 2G, difference $\gamma_{diff}$ and sum $\gamma_{sum}$ of the linewidths of split resonances when relative size of the scatterers were kept fixed (FIGS. 41A, 41B, 42A, 42B, and 43).

Figure 39:
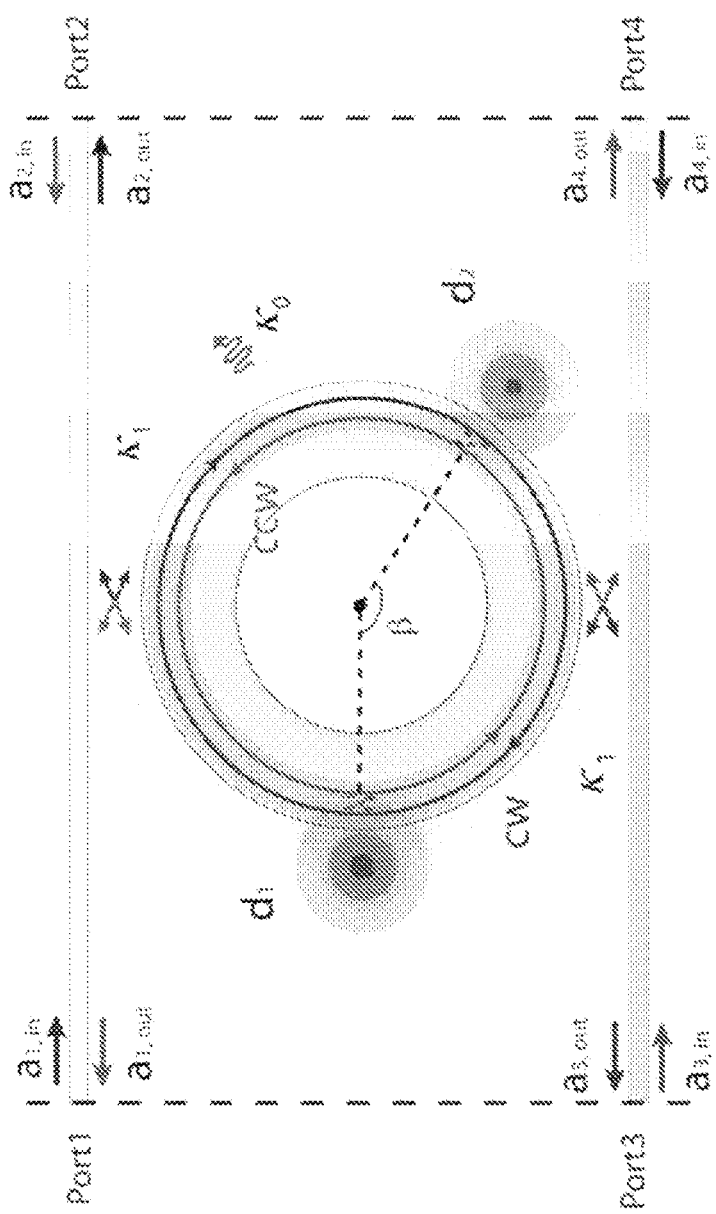
FIG. 39 illustrates Schematic of the setup with the definitions of the parameters and signal propagation directions.

The setup consists of a silica microtoroid WGM resonator that allows for the in- and out-coupling of light through two single-mode waveguides (FIGS. 35A and 39). The resonator had a quality factor Q~3.9×10$^7$ at the resonant wavelength of 1535.8 nm. To probe the scatterer-induced chirality of the WGMs, and to simulate scatterers we used two silica nanotips whose relative positions (i.e., relative phase angle β) and sizes within the evanescent field of the WGMs were controlled by nanopositioners.

First, using only the waveguide with ports 1 and 2 (FIG. 35A), we determined the effect of the sizes and positions of the scatterers on the transmission spectra. With the first scatterer entering the mode volume, we observed frequency splitting in the transmission spectra due to scatterer-induced modal coupling between the cw and ccw travelling modes. Subsequently, the relative position and the size of the second scatterer were tuned to bring the system to an EP (FIGS. 35B, 35C, 41A, 41B, 42A, 42B, and 43) which is a non-Hermitian degeneracy identified by the coalescence of the complex frequency eigenvalues and the corresponding eigenstates. EP acts as a veritable source of non-trivial physics in a variety of systems. Depending on the amount of initial splitting introduced by the first scatterer and β, tuning the relative scatterer size brought the resonance frequencies (real part of eigenvalues) closer to each other, and then either an avoided crossing or an EP was observed (FIGS. 35B, 42A, 42B, and 42). At the EP both the frequency splitting 24G and the linewidth difference $\gamma_{diff}$ of the resonances approach zero, whereas the sum of their linewidths $\gamma_{sum}$ remains finite (FIGS. 35C, 42A, 42B, and 42). An EP does not only lead to a perfect spectral overlap between resonances, but also forces the two corresponding modes to become identical. Correspondingly, a pair of two counter-propagating WGMs observed in closed Hermitian resonators turns into a pair of co-propagating modes with a chirality that increases the closer the system is steered to the EP (FIGS. 44A, 44B, 44C, 44D, 45A, 45B, and 46).

Figures 36B, 36C, 36D:
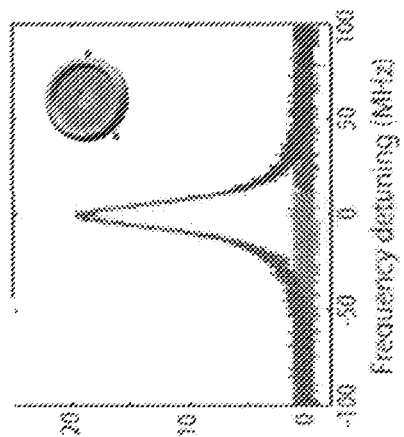
FIGS. 36A, 36B, 36C, 36D, 36E, 36F, 36G, 36H illustrate the experimental observation of scatterer-induced asymmetric backscattering.
Figures 36F, 36G, 36H:
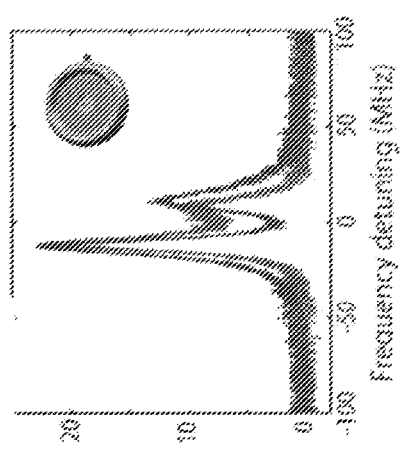

To investigate this modal chirality in detail we used both of the waveguides and monitored the transmission and reflection spectra at the output ports of the second waveguide for injection of light from two different sides of the first waveguide (FIGS. 36A, 36B, 36C, 36D, 36E, 36F, 36G, 36H). In the absence of the scatterers, when light was injected in the cw direction, a resonance peak was observed in the transmission and no signal was obtained in the reflection port (FIG. 36B). Similarly, when the light was injected in the ccw direction, the resonance peak was observed in the transmission port with no signal in the reflection port (FIG. 36F). When only one scatterer was introduced, two split resonance modes were observed in the transmission and reflection ports regardless of whether the signal was injected in the cw or ccw directions (FIGS. 36C and 36G), implying that the field inside the resonator is composed of modes travelling in both cw and ccw directions. When the second scatterer was introduced and its position and size were tuned to bring the system to an EP, we observed that the transmission curves for injections from two different sides were the same but the reflection curves were different (FIGS. 36D and 36H): while the reflection shows a pronounced resonance peak for the ccw input, this peak vanishes for the cw input. The fact that the transmission curves for different input ports are the same follows from reciprocity, which is well-fulfilled in our system. On the other hand, the asymmetric backscattering (reflection) is the defining hallmark of the desired chiral modes, for which we provide here the first direct measurement in a microcavity (FIGS. 25A, 25B, 25C, and 25D, and supplementary text 20).

Referring to FIGS. 36A, 36B, 36C, 36D, 36E, 36F, 36G, 36H, experimental observation of scatterer-induced asymmetric backscattering is illustrated. (A, B) When there is no scattering center in or on the resonator, light coupled into the resonator through the first waveguide in the cw (FIG. 36A, 36B, 36C, 36D) or ccw (FIG. 36E, 36F, 36G, 36H) direction couples out into the second waveguide in the cw or ccw direction and the resonant peak in the transmission is shown with no signal in the reflection (FIGS. 36B and 36F). When a first scatterer is placed in the mode field, resonant peaks are observed in both the transmission and the reflection regardless of whether the light is input in the cw or in the ccw directions (FIGS. 36C and 36G). When a second scatterer is suitably placed in the mode field, for the cw input there is no signal in the reflection output port (FIG. 36D), whereas for the ccw input there is a resonant peak in the reflection (FIG. 36H), revealing asymmetric backscattering for the two input directions. The inset of FIG. 36H compares the two backscattering peaks in FIGS. 36D and 36H. Estimated chirality is −0.86.

Figure 36A:
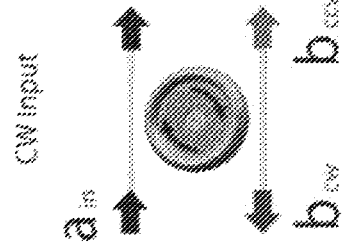
Figure 36E:
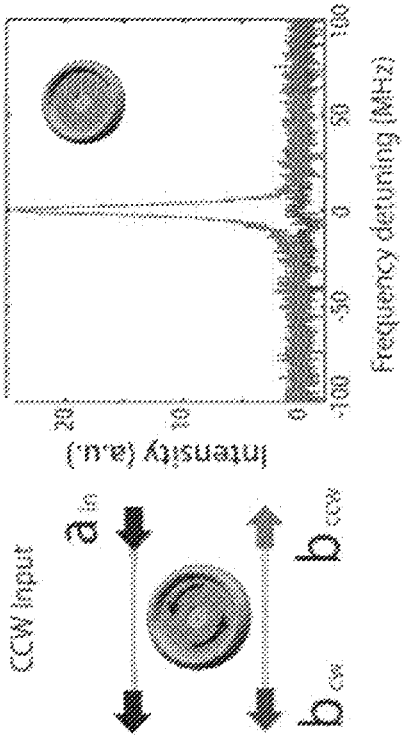

The crucial question to ask at this point is how the "chirality"—an intrinsic property of a mode that we aim to demonstrate—can be distinguished from the simple "directionality" (or sense of rotation) imposed on the light in the resonator just by the biased input. To differentiate between these two fundamentally different concepts based on the experimentally obtained transmission spectra, we determined the chirality and the directionality of the field within the WGM resonator using the following operational definitions: the directionality defined as $D=(\sqrt{I_{bccw}}-\sqrt{I_{bcw}})/(\sqrt{I_{bccw}}+\sqrt{I_{bcw}})$ simply compares the difference of the absolute values of the light amplitudes measured in the ccw and cw directions, irrespective of the direction from which the light is injected (FIGS. 35A, 36A, and 36E). We observed that varying the relative distance between the scatterers changed this directionality, but the initial direction, that is the direction in which the input light was injected, remained dominant (FIG. 37A). The intrinsic chirality of a resonator mode is a quantity that is entirely independent of any input direction and therefore not as straightforward to access experimentally. One can, however, get access to the chirality α through the intensities measured in the used four-port setup as $\alpha=(\sqrt{I_{14}}-\sqrt{I_{23}})/(\sqrt{I_{14}}+\sqrt{I_{23}})$, where $I_{jk}$ denotes the intensity of light measured at the k-th port for the input at the j-th port (FIGS. 35A and 39, supplementary text 19 and 20). Note that to obtain a the reflection intensities obtained for injections from two different sides are compared. The chirality thus quantifies the asymmetric backscattering, similar to what is shown in FIGS. 36D and 36H. If the backscattering is equal for both injection sides ($I_{14}=I_{23}$) the chirality is zero, implying symmetric backscattering and orthogonal eigenstates. In the case where backscattering for injection from one side dominates, the chirality approaches 1 or −1 depending on which side is dominant. The extreme values α=±1 are, indeed, only possible when the eigenvalues and eigenvectors of the system coalesce, that is, when the system is at an EP. By changing the relative phase angle between the scatterers, we obtained quite significant values α≈±0.79 of chirality with both negative and positive signs (FIG. 37B). The strong chiralities observed in FIG. 37B are linked to the presence of two EPs, each of which can be reached by optimizing β such that asymmetric scattering is maximized for one of the two injection directions (FIGS. 40A, 40B, 44A, 44B, 44C, 44D, 45A, 45B, 47A, 47B, 47C, and 47D, and supplementary text 17 and 20).

FIGS. 37A and 37B illustrate the controlling directionality and intrinsic chirality of whispering-gallery-modes. Directionality (FIG. 37A) and chirality (FIG. 37B) α of the WGMs of a silica microtoroid resonator as a function of β between the two scatterers are shown.

FIGS. 38A, 38B, 38C, 38D, and 38E illustrate scatterer-induced minor-symmetry breaking at an EP. In a WGM microlaser with mirror symmetry the intracavity laser modes rotate both in cw and ccw directions and thus the outcoupled light is bidirectional and chirality is zero. The scatterer-induced symmetry breaking allows tuning both the directionality and the chirality of laser modes. FIG. 38A illustrates the intensity of light out-coupled into a waveguide in the cw and ccw directions as a function of β. Regions of bidirectional emission, and fully unidirectional emission are seen. FIG. 38B illustrates the chirality as a function of β. Transitions from non-chiral states to unity (±1) chirality at EPs are clearly seen. Unity chirality regions correspond to unity unidirectional emission regions in FIG. 38A. FIGS. 38C, 38D, and 38E illustrate finite element simulations revealing the intracavity field patterns for the cases labeled as C, D and E in FIG. 38A and FIG. 38B. Results shown in FIGS. 38C, 38D, and 38E were obtained for the same size factor but different β: 2.628 rad for FIG. 38C; 2.631 rad for FIG. 38D; and 2.626 rad for FIG. 38E. $P_1$ and $P_2$ denote the locations of scatterers.

Finally, we addressed the question how this controllably induced intrinsic chirality can find applications and lead to new physics in the sense that the intrinsic chirality of the modes is fully brought to bear. The answer is to look at lasing in such devices since the lasing modes are intrinsic modes of the system. Previous studies along this line were restricted to ultrasmall resonators on the wavelength scale, where modes were shown to exhibit a local chirality and no connection to asymmetric backscattering could be established. Here we address the challenging case of resonators with a diameter being multiple times the wavelength (>50λ), for which we achieved a global and dynamically tunable chirality in a microcavity laser that we can directly link to the non-Hermitian scattering properties of the resonator. In our last set of experiments, we achieved a global and dynamically tunable chirality in a microcavity laser that we can directly link to the non-Hermitian scattering properties of the resonator. We used an Erbium ($Er^{3+}$) doped silica microtoroid resonator coupled to only the first waveguide, which was used both to couple into the resonator the pump light to excite $Er^{3+}$ ions and to couple out the generated WGM laser light. With a pump light in the 1450 nm band, lasing from $Er^{3+}$ ions in the WGM resonator occurred in the 1550 nm band. Since the emission from Erbium ions couples into both the cw and ccw modes and the WGM resonators have a rotational symmetry, the outcoupled laser light typically does not have a pre-determined out-coupling direction in the waveguide. With a single fiber tip in the mode field, these initially frequency degenerate modes couple to each other creating split lasing modes. Using another fiber tip as a second scatterer, we investigated the chirality in the WGM microlaser by monitoring the laser field coupled to the waveguide in the cw and ccw directions. For this situation the parameters α and D from above can be conveniently adapted to determine the chirality of lasing modes based on the experimentally accessible quantities. Note that for the lasing modes chirality and directionality are equivalent as they both quantify the intrinsic dynamics of the laser system. We observed that by tuning the relative distance between the scatterers, the chirality of the lasing modes and with it the directional out-coupling to the fiber can be tuned in the same way as shown for the passive resonator (FIGS. 15A and 15B).

As depicted in FIG. 38A, depending on the relative distance between the scatterers one can have a bidirectional laser or a unidirectional laser, which emits only in the cw or the ccw direction. For the bidirectional case, one can also tune the relative strengths of emissions in cw and ccw directions. As expected, the chirality is maximal (±1) for the relative phase angles where strong unidirectional emission is observed (FIG. 38B), and chirality is close to zero for the angles where bidirectional emission is seen. This confirms that by tuning the system to an EP the modes can be made chiral and hence the emission direction of lasing can be controlled: in one of the two EPs, emission is in the cw and in the other EP the emission is in the ccw direction. Thus, by transiting from one EP to another EP the direction of unidirectional emission is completely reversed: an effect demonstrated for the first time here. The fact that the maximum possible chirality values for the lasing system are reached here very robustly can be attributed to the fact that the non-linear interactions in a laser tend to reinforce a modal chirality already predetermined by the resonator geometry.

Figure 16D:
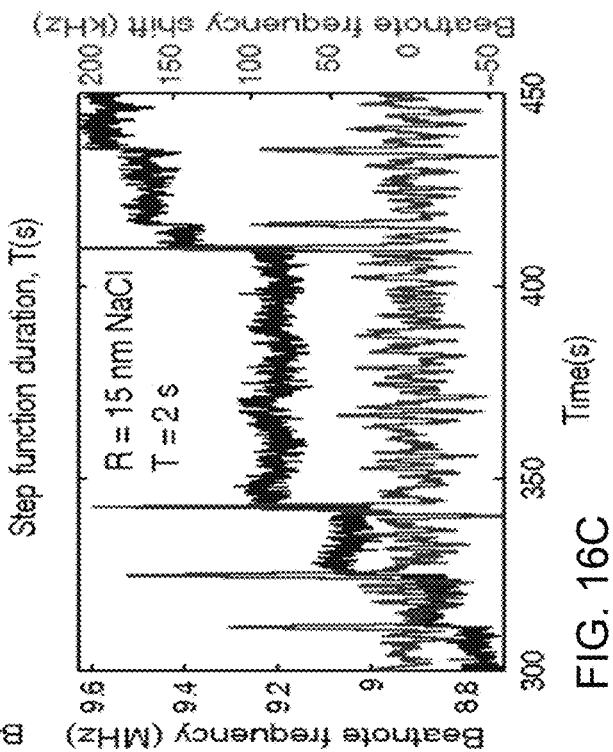

To relate this behavior to the internal field distribution in the cavity, we also performed numerical simulations which revealed that when the intracavity intensity distribution shows a standing-wave pattern with a balanced contribution of cw and ccw propagating components and a clear interference pattern, the emission is bidirectional, in the sense that laser light leaks into the second waveguide in both the cw and ccw directions (FIG. 38C). However, when the distribution does not show such a standard standing-wave pattern but an indiscernible interference pattern, the emission is very directional, such that the intracavity field couples to the waveguide only in the cw or the ccw direction depending on whether the system is at the first or the second EP (FIGS. 16D and 16E). We also confirmed that the presence or absence of an interference pattern in the field distribution is also linked with a bi- or uni-directional transmission, respectively, observed in FIGS. 37A and 37B for the passive resonator (shown in FIGS. 48A, 48B, 48C, 48D, 48E, and 48F).

Summarizing, we have demonstrated chiral modes in whispering-gallery-mode microcavities and microlasers via geometry-induced non-Hermitian mode-couplings. The underlying physical mechanism that enables chirality and directional emission is the strong asymmetric backscattering in the vicinity of an EP which universally occurs in all open physical systems. We believe that our work will lead to new directions of research and to the development of WGM microcavities and microlasers with new functionalities. In addition to controlling the flow of light and laser emission in on-chip micro and nanostructures, our findings have important implications in cavity-QED for the interaction between atoms/molecules and the cavity light. They may also enable high performance sensors to detect nanoscale dielectric, plasmonic and biological particles and aerosols, and be useful for a variety of applications such as the generation of optical beams with a well-defined orbital angular momentum (OAM) (such as OAM microlasers, vortex lasers, etc.) and the topological protection in optical delay lines.

Two-Mode-Approximation (TMA) Model and the Eigenmode Evolution.

In this section we briefly review the two-mode approximation (TMA) model and the eigenmode evolution in whispering-gallery-mode (WGM) microcavities with nanoscatterer-induced broken spatial symmetry, as described briefly in the main text. This will help to understand the basic relationship between asymmetric backscattering of counter-propagating waves and the resulting co-propagation, non-orthogonality, and chirality of optical modes. We furthermore derive how the chirality of a lasing mode can be measured by weakly coupling two waveguides to the system. As a complementary schematic of the setup shown in FIGS. 35A, 35B, 35c, and 39 presents the details of the involved parameters and the input/output signal directions for clarification.

The TMA model used in our analysis was first phenomenologically introduced for deformed microdisk cavities and was later rigorously derived for the microdisk with two scatterers. The main approach is to model the dynamics in the slowly-varying envelope approximation in the time domain with a Schrödinger-like equation.

$$i\frac{d}{dt}\Psi = H\Psi \quad \text{(S.59)}$$

Here $\Psi$, is the complex-valued two-dimensional vector consisting of the field amplitudes of the CCW propagating wave $\Psi_{CCW}$ and the CW propagating wave $\Psi_{CW}$. The former corresponds to the $e^{im\varphi}$ angular dependence in real space, and the latter to $e^{-im\varphi}e^{-im\varphi}$; the positive integer m is the angular mode number. Since the microcavity is an open system, the corresponding effective Hamiltonian, $$H = \begin{pmatrix} \Omega_c & A \\ B & \Omega_c \end{pmatrix} \tag{S.60}$$

is a 2×2 matrix, which is in general non-Hermitian.

FIG. 39 illustrates a schematic of the setup with the definitions of the parameters and signal propagation directions. $a_{j, in}$ ($a_{j, out}$) denotes the input (output) signal amplitude from the j-th port. $\kappa_0$, $\kappa_l$ are the cavity decay rate and the cavity-waveguide coupling coefficient, respectively. $d_1$ ($d_2$) denotes the effective scattering size factor of the first (second) nanoscatterer (corresponding to the spatial overlap between the scatterer and the optical mode), which is varied by changing the distance between the scatterer and the microresonator. The angle $\beta$ denotes the relative phase angle between the scatterers.

The real parts of the diagonal elements $\Omega_c$ are the frequencies and the imaginary parts are the decay rates of the resonant traveling waves. The complex-valued off-diagonal elements A and B are the backscattering coefficients, which describe the scattering from the CW (CCW) to the CCW (CW) travelling wave. In general, in the open system the backscattering is asymmetric, $|A| \neq |B|$, which is allowed because of the non-Hermiticity of the Hamiltonian. The complex eigenvalues of H are, $$\Omega_\pm = \Omega_c \pm \sqrt{AB} \tag{S.61}$$

to which the following complex (not normalized) right eigenvectors are associated, $$\Psi_\pm = \begin{pmatrix} \sqrt{A} \\ \pm\sqrt{B} \end{pmatrix}. \tag{S.62}$$

Figure 40A:
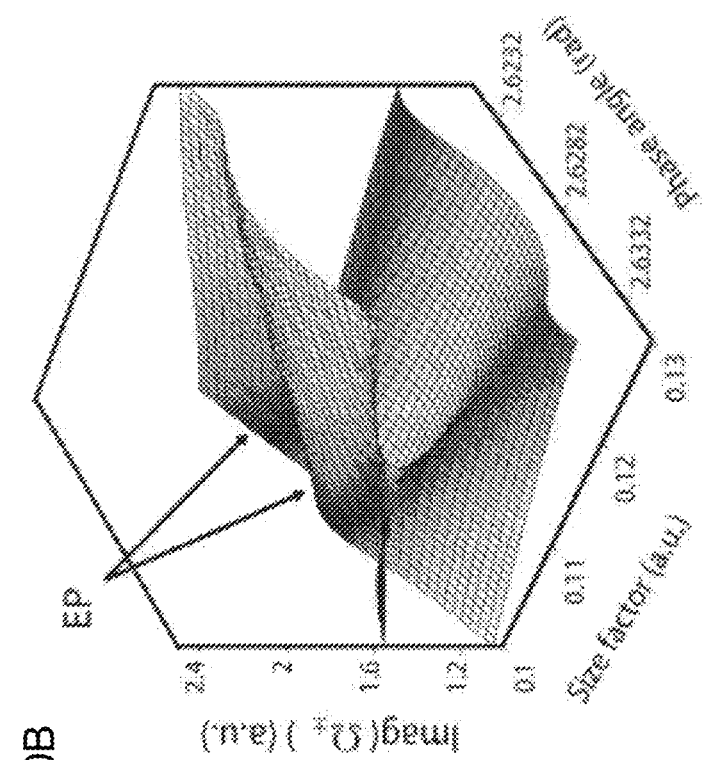
FIGS. 40A and 40B illustrate the eigenmode evolution of the non-Hermitian system as a function of the effective size factor d and the relative phase angle $\beta$ between the scatterers.
Figure 40B:
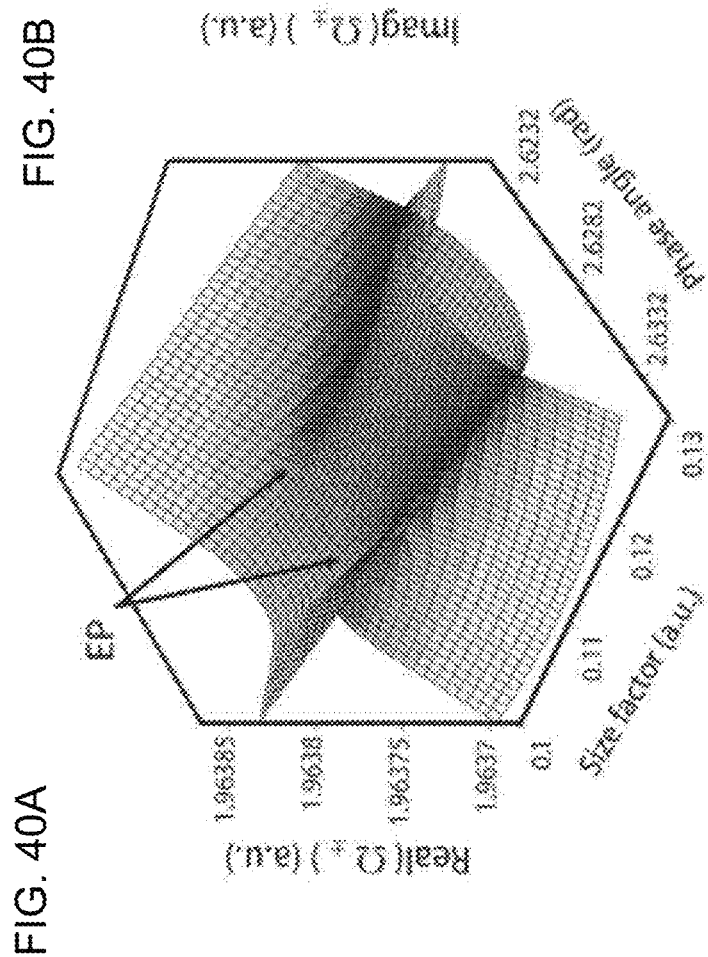

As shown in the text, the asymmetric scattering is closely related with the evolution of the eigenmodes, especially in the vicinity of the exceptional points (EP), where either of the backscattering coefficients A or B is zero and both the eigenvalues (S.61) and the eigenvectors (S.62) coalesce. To verify this interesting feature, we specifically checked the eigenmode evolution in our system both theoretically and experimentally. For the particular case of the WGM microtoroid perturbed by two scatterers the matrix elements of H are determined as follows, $$\Omega_c = \Omega_0 + V_1 + U_1 + V_2 + U_2 \tag{S.63}$$
$$= \omega_c - \frac{\kappa_0 + 2\kappa_1}{2} i + V_1 + U_1 + V_2 + U_2$$

$$A = (V_1 - U_1) + (V_2 - U_2)e^{-2im\beta} \tag{S.64}$$

$$B = (V_1 - U_1) + (V_2 - U_2)e^{2im\beta} \tag{S.65}$$

where $\omega_c$ denotes the intrinsic cavity resonant frequency, and $\kappa_0$ and $\kappa_l$ are the cavity decay rate and the cavity-waveguide coupling coefficient. The quantities $2V_j$ and $2U_j$ are given by the complex frequency shifts for positive- and negative-parity modes introduced by j-th particle (j=1,2) alone. These quantities can be calculated for the single-particle-microdisk system either fully numerically [using, e.g., the finite-difference time-domain method (FDTD), the boundary element method (BEM)], or analytically using the Green's function approach for point scatterers with $U_j$=0. Here we used the finite element method (FEM). In our simplified model $U_j$ is set to zero since $|U_j| \ll |V_j|$. FIGS. 40A and 40B present the evolution of the eigenfrequencies of our system (obtained with FEM simulations) as the phase difference angle $\beta$ and the effective size factor d are tuned. The EPs can be clearly observed where the eigenfrequencies coalesce, as pointed out in both FIGS. 40A and 40B.

FIGS. 40A and 40B illustrate the eigenmode evolution of the non-Hermitian system as a function of the effective size factor d and the relative phase angle $\beta$ between the scatterers. (A) Real part of the eigenmodes $\Omega_\pm$. (B) Imaginary part of the eigenmodes $\Omega_\pm$. Two exceptional points are clearly seen. EP: Exceptional Point.

Experimental observation of an EP by tuning the size and position of two scatterers. In our experiments with a silica microtoroid WGM resonator, we chose a mode for which there was no observable frequency splitting in the transmission spectra before the introduction of the scatterers. We probed the scatterer-induced chiral dynamics of the WGMs, using two silica nanotips whose relative positions (i.e., relative phase angle $\beta$) and sizes within the evanescent field of the WGMs were controlled by nanopositioners (FIGS. 35A, 35B, and 35C). The size ratio of the scatterers was tuned by enlarging the volume of one of the nanotips within the resonator mode field while keeping the volume of the other nanotip fixed.

FIGS. 41A and 41B illustrate experimentally obtained mode spectra as the relative phase angle $\beta$ between the scatterers was varied. $\beta$ increased continuously from (i) to (viii). Mode coalescence is clearly seen in (v). Modes bifurcated again when $\beta$ was increased further (vi-viii). The evolution of the eigenmodes of the system was obtained by coupling two waveguides to the system (FIGS. 35A, 35B, 35C, and 39) and monitoring the transmission spectra (FIGS. 41A and 41B) as the wavelength of a tunable laser was scanned. The two eigenmodes coalesced clearly as the phase difference angle $\beta$ between the $1^{st}$ and the $2^{nd}$ nanoscatterer was varied to the vicinity of the EP but bifurcated again as $\beta$ was further increased. We also checked the evolution of the eigenfrequencies when the effective size of the $2^{nd}$ scatterer was varied at different phase difference angles $\beta$.

Figures 42A, 42B:
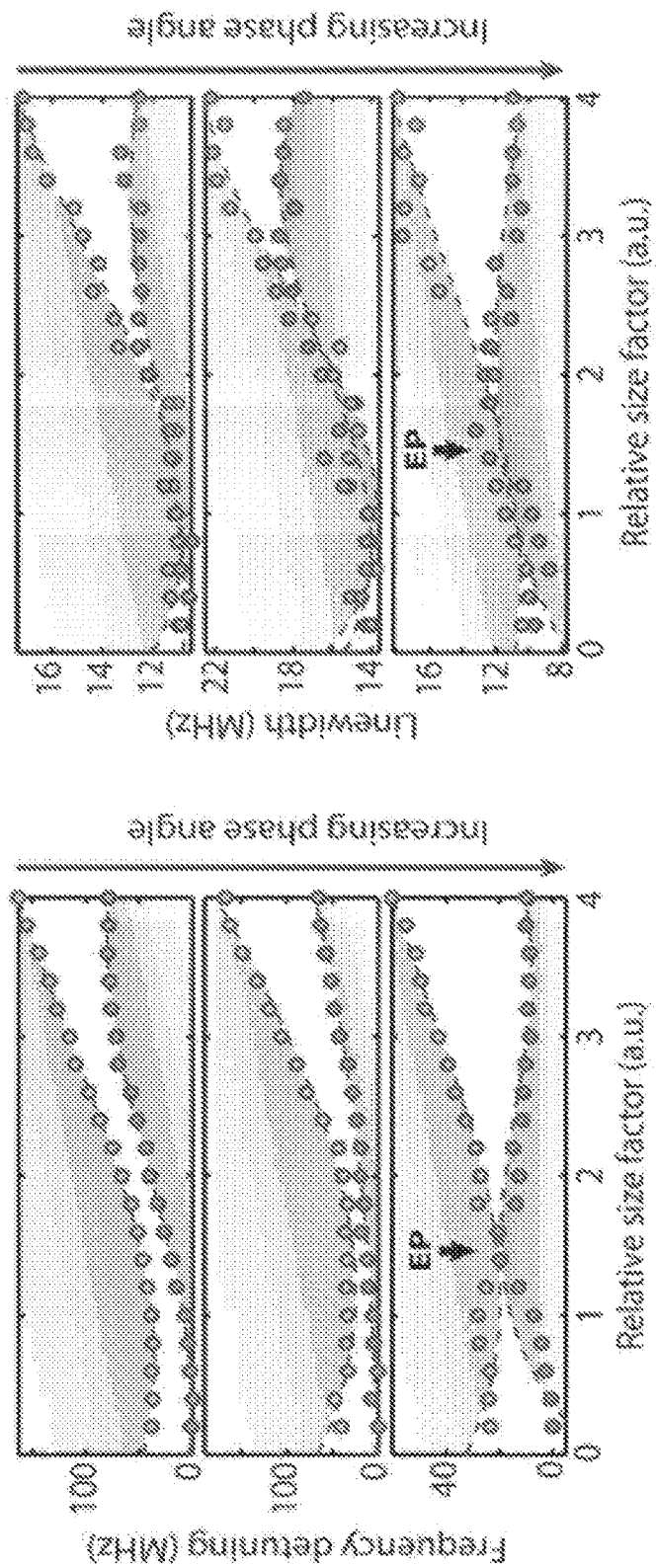
FIGS. 42A and 42B illustrate experimentally obtained evolution of eigenfrequencies as the relative size of the scatterers was varied at different relative phase angles $\beta$.

FIGS. 42A and 42B illustrate experimentally obtained evolution of eigenfrequencies as the relative size of the scatterers was varied at different relative phase angles $\beta$. (A) Difference of the real parts of the eigenfrequencies (frequency splitting or frequency detuning). (B) Imaginary parts (linewidths) of the eigenfrequencies.

Figure 43:
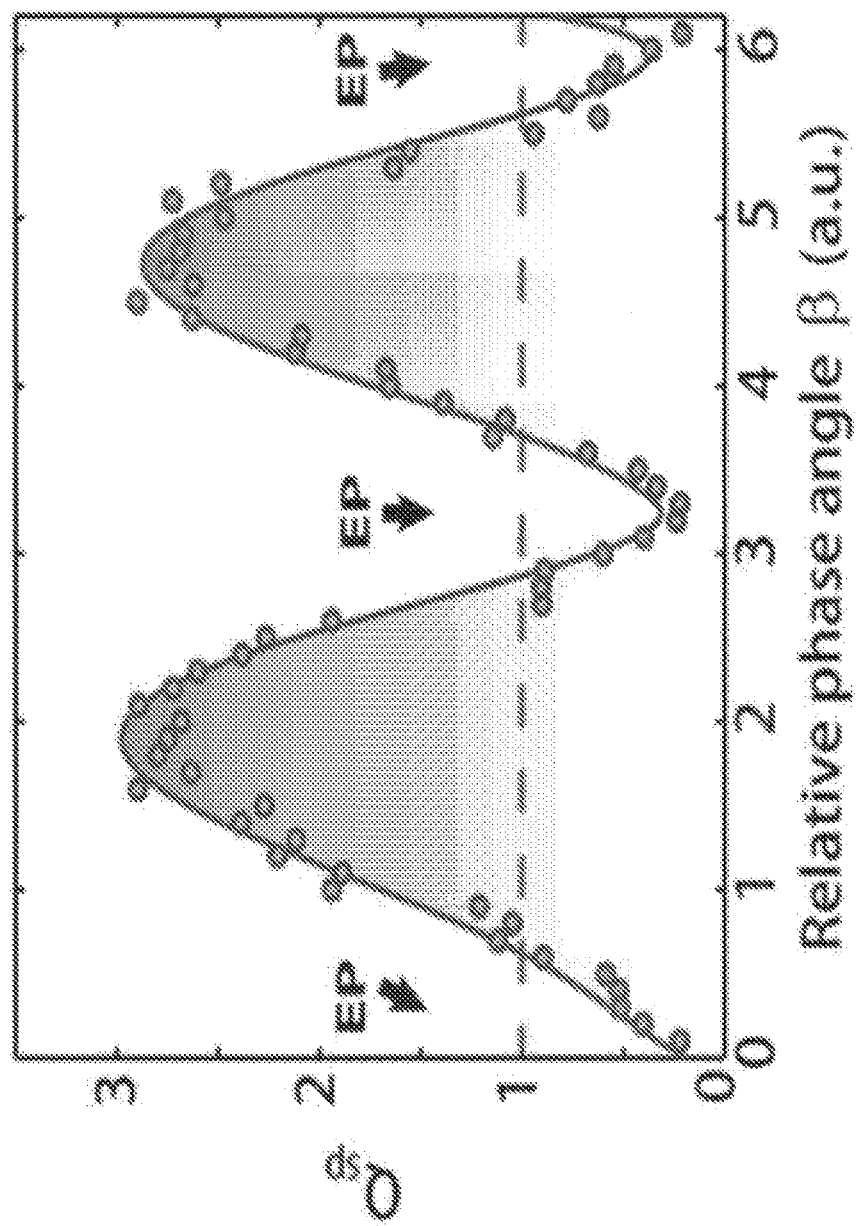
FIG. 43 illustrate experimentally obtained evolution of the splitting quality factor as a function of β for fixed relative size factor.

FIG. 43 illustrates experimentally obtained evolution of the splitting quality factor as a function of $\beta$ for fixed relative size factor. In FIG. 35B of the main text, we presented the evolution of the frequency splitting 24G, linewidth difference diff and the sum $\gamma_{sum}$ of the linewidths of split modes as a function of the relative phase angle $\beta$. In FIGS. 42A, 42B, and 43 we provide more experimental results to further clarify how the relative phase angle $\beta$ and the relative size factor of the scatterers affect the spectra of the split resonance modes and help to drive the system to the vicinity of an EP. FIGS. 42A and 42B depict the evolution of the amount of frequency splitting and the linewidths of the split resonances as a function of the size factor at different values β implying that when the relative size factor is varied, the system can or cannot reach an EP depending on the relative phase angle β between the scatterers: For some values of β, the system experiences avoided crossing. The resolvability of the frequency splitting in a transmission spectrum was previously quantified by the splitting quality factor, which is defined as the ratio of the frequency splitting 2δG to the sum $\gamma_{sum}$ of the linewidths of the split resonances. Experimental results shown in FIG. 43 clearly show that when the resonances coalesce at an EP, the splitting quality factor reaches its minimum.

Emission and chirality analysis for the lasing cavity. As a consequence of the non-Hermitian character of the Hamiltonian the eigenvectors (S.62) are in general not orthogonal. This happens whenever the backscattering is asymmetric, $|A| \neq |B|$, as $\Psi_+^* \cdot \Psi_- = |A| - |B|$. The asymmetric backscattering $|A| \neq |B|$ also implies that both modes have a dominant component that increases the closer the system is steered to the EP (FIGS. 44A, 44B, 44C, and 44D). This corresponds to a dominant propagation direction in real space. We quantify this imbalance by the chirality $$\alpha_{TMA} = \frac{|A| - |B|}{|A| + |B|} \quad (S.66)$$

In contrast to the original definition of the chirality, this chirality parameter also provides information on the sense of rotation not just on its absolute magnitude. For a balanced contribution, $|A| \approx |B|$, the chirality is close to 0. In the case where the CCW (CW) component dominates, $|A| > |B|$, ($|A| < |B|$), the chirality approaches 1 (−1) and both modes become copropagating. It is possible to create a situation of full asymmetry in the backscattering, i.e. $\alpha \to \pm 1$. In this case, either A or B vanishes, while the other component is nonzero 1. Solving the Schrödinger Eq. (S.59), we get the eigenfrequencies of the system Eq. (S.61). The corresponding eigenmodes Eq. (S.62) can be further expressed as $$\Psi_\pm = \Psi_{CCW} \pm \sqrt{B/A} \Psi_{CW} \quad (S.67)$$

In the experiments, the chirality (S.66) of the eigenmodes of the system can be obtained by coupling waveguides to the system (as shown in FIG. 39) and by inducing lasing (e.g., Raman lasing in silica resonators or lasing from Erbium ions in Erbium doped silica resonators) within the system. Using coupled mode theory and the assumption that there is no backscattering of light from the waveguide into the cavity one can relate the amplitudes in the waveguide to the coefficients A and B via $$a_{cw,out} = -\sqrt{\kappa_1} * \Psi_{CW} = -\sqrt{\kappa_1} * \sqrt{B} \quad (S.68)$$

$$a_{ccw,out} = -\sqrt{\kappa_1} * \Psi_{CCW} = -\sqrt{\kappa_1} * \sqrt{A} \quad (S.69)$$

Hence, the chirality of the lasing system can be obtained from the waveguide amplitudes as $$\alpha_{lasting} = \frac{|a_{ccw,out}|^2 - |a_{cw,out}|^2}{|a_{ccw,out}|^2 - |a_{cw,out}|^2} \quad (S.70)$$

where $a_{ccw,out}$ $a_{ccw,out}$ can be either $a_{1,out}$ $a_{1,out}$ or $a_{4,out}$ $a_{4,out}$ and $a_{cw,out}$ can be either $a_{2,out}$ or $a_{3,out}$. The same formula can also be used in full numerical calculations to extract the chirality of the quasi-bound states of the system for comparison to the result of the two-mode approximation of Eq. (S.66).

FIGS. 44A, 44B, 44C, and 44D illustrate weights of CW and CCW components in the eigenmodes as the relative phase difference β between the two nanoscatterers is varied, away from EP and in the vicinity of EP, with two different size factors of the $2^{nd}$ nanoscatterer, according to Eq. (S.67). Evolution of the eigenfrequencies and CW (CCW) weights in the eigenmodes as β is varied for (A) and (B) $V_1=1.5-0.1i$, $V_2=1.0997-0.065i$, and (C) and (D) $V_1=1.5-0.1i$, $V_2=1.4999-0.104i$. Note that for the size factor used in (A) and (B) eigenmodes cannot reach the EP whereas for the size factor used in (C) and (D) the eigenmodes can reach the EP and a strong asymmetric distribution of the CW/CCW weights appears in the vicinity of EP. Insets are the zoom-in plots in the vicinity of EP. In (C) and (D), two EPs are clearly seen.

Chirality analysis and comparison between the lasing and the transmission models. In this section we extend the TMA to describe the transmission of light through waveguide-cavity systems as illustrated in FIG. 39, which is also the setup for the results and the analysis shown in FIGS. 37A and 37B of the main text. We allow for incoming waves from the upper left with amplitude $a_{1,in}$ and from the upper right with amplitude $a_{2,in}$, such that it is possible to couple into the WGMs in either the CW or the CCW directions. Based on coupled mode theory we add a coupling term to Eq. (S.59) and arrive at $$i\frac{d}{dt}\Psi = H\Psi + i\sqrt{\kappa_1}\begin{pmatrix} a_{2,in} \\ a_{1,in} \end{pmatrix} \quad (S.71)$$

with $\kappa_1$ denoting the waveguide-resonator coupling coefficient. The losses due to coupling of the cavity to the waveguides are included in the diagonal elements $\Omega_c$ of the Hamiltonian (S.60). Assuming that there is no backscattering of light between the microcavity and the waveguides (which is justified when the distance between cavity and waveguides is sufficiently large) we derive the outgoing amplitudes in the lower waveguide as $$a_{3,out} = -\sqrt{\kappa_1} * \Psi_{CW} \quad (S.72)$$

$$a_{4,out} = -\sqrt{\kappa_1} * \Psi_{CCW} \quad (S.73)$$

We can choose $\kappa_1$ to be real as we are only interested in the absolute values of $a_{3,out}$ an $a_{4,out}$. For a CW excitation with $a_{1,in}$ at a fixed frequency $\omega_e$ we find from Eqs. (S.72)-(S.73)

$$a_{3,out} = \frac{i\kappa_1(\Omega_c - \omega_e)}{(\Omega_c - \omega_e)^2 - AB} a_{1,in} \quad (S.74)$$

$$a_{4,out} = \frac{-i\kappa_1 A}{(\Omega_c - \omega_e)^2 - AB} a_{1,in} \quad (S.75)$$

Analogously, for a CCW excitation via $a_{2,in}$ we find $$a_{3,out} = \frac{-i\kappa_1 B}{(\Omega_c - \omega_e)^2 - AB} a_{2,in} \quad (S.76)$$

-continued $$a_{4,out} = \frac{-i\kappa_1(\Omega_c - \omega_e)}{(\Omega_c - \omega_e)^2 - AB}a_{2,in} \quad (S.77)$$

The asymmetric backscattering expresses itself here by the fact that the numerator of $a_{4,out}$ in Eq. (S.75) is proportional to A, whereas the numerator of $a_{3,out}$ in Eq.(S.76) is proportional to B. Assuming that the input amplitudes $a_{1,in}$ and $a_{2,in}$ are the same, we find the chirality as defined by Eq. (S.66) in terms of the transmission amplitudes to be $$\alpha_{transmission} = \frac{|a_{4,out}| - |a_{3,out}|}{|a_{4,out}| + |a_{3,out}|} \quad (S.78)$$

where $a_{4,out}$ ($a_{3,out}$) has been obtained by injecting light at port 1 (2). The crucial difference between the formulas for the chirality as measured in the lasing system [Eq. (S.70)] and the formula for the chirality as measured in a transmission experiment [Eq. (S.78)] is that in the former the intensities, $|a|^2$ of the outgoing waveguide modes are used, whereas in the latter only the modulus of the amplitudes, $|a|$, appear.

In order to compare the two different chirality formulas, Eqs. (S.70) and (S.78), we have performed numerical calculations using a finite element method where we have solved the inhomogeneous Helmholtz equation. The calculations were restricted to the transverse magnetic (TM) polarization in two dimensions. The geometry of the system is shown in FIG. 39. The parameters for the waveguides and scatterers have been chosen such that the scatterers perturb the eigenvalues of the system much stronger than the waveguides coupled to the resonator. Therefore, the chirality is determined primarily through the scatterers, similar to the experiment. One of the scatterers had a fixed position, situated at an angle of $\pi/2$ with respect to the waveguides. The second scatterer was situated on the opposite side of the disk and its position was given by the angle $\beta$ between the scatterers. The effective size factor $d_2$ of the second scatterer (which is the spatial overlap between the scatterer and the optical mode) was varied by changing the distance between the scatterer and the resonator. In the calculations the angle $\beta$ was varied between 2.91 and 3.06, and the size factor $d_2$ was varied between 0.01 and 0.04. The waveguides, as well as the microresonator had an effective refractive index of n=1.444. The system was excited by injecting light into the waveguides at any of the ports 1-4 with frequency $\omega_e$, achieved by placing a line source f (y) at the corresponding side of the system (marked by a black dashed line in FIG. 39), which excites only the fundamental mode $f(y, \omega_e)e^{\pm i\beta_x x}$ of the waveguide. Both, the spatial profile $f(y, \omega_e)$ of the fundamental mode, as well as the ropagation coefficient $\beta_x$ were found through matching conditions at the dielectric waveguide interface. The computational domain was truncated by a reflectionless perfectly matched layer, which absorbs all scattered outgoing waves. The incoming and outgoing amplitudes $a_{1-4,\{in,out\}}$ of the waveguide modes were extracted by projecting the solution of the inhomogeneous Helmholtz equation onto the individual (fundamental) waveguide modes.

Figures 45A, 45B:
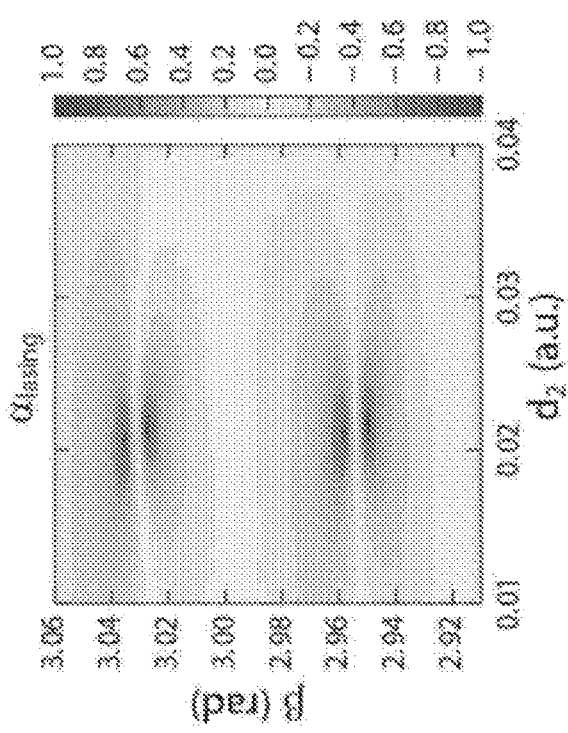
FIGS. 45A and 45B compare the chirality as determined from the eigenvalue calculations for the lasing cavity with the chirality as determined from the transmission calculations.

In FIGS. 45A and 45B the chirality as determined from the eigenvalue calculations for the lasing cavity is compared with the chirality as determined from the transmission calculations. The chirality is obtained under variation of the two positional parameters $(d_2, \beta)$ of the second scatterer. We chose to vary two parameters in order to be able to exactly reach the exceptional points where the chirality features an absolute maximum, i.e. $\alpha=\pm 1$. In the parameter range shown in FIGS. 45A and 45B, two pairs of EPs are depicted where each pair features two EPs of opposite chirality. The pattern of EP pairs is roughly repetitive when extending the scanned interval of angle $\beta$ as long as the scatterer does not come close to one of the attached waveguides. In the calculations we observe an excellent agreement between the two chirality definitions such that we can indeed assume that both methods yield a good estimate for the internal chirality of the whispering gallery modes induced by the presence of the two scatterers.

FIGS. 45A and 45B illustrate a comparison of the chirality obtained through a full numerical eigenvalue calculation by Eq. (S.70) (FIG. 45A) and through a full numerical transmission calculation by Eq. (S.78) (FIG. 45B). The dependence of the chirality is plotted with respect to the position of the second scatterer given by both the angle between the scatterers, $\beta$, as well as by the effective size factor, $d_2$. Both formulas yield very similar values for the chirality validating Eqs. (S.70) and (S.78).

Figure 46:
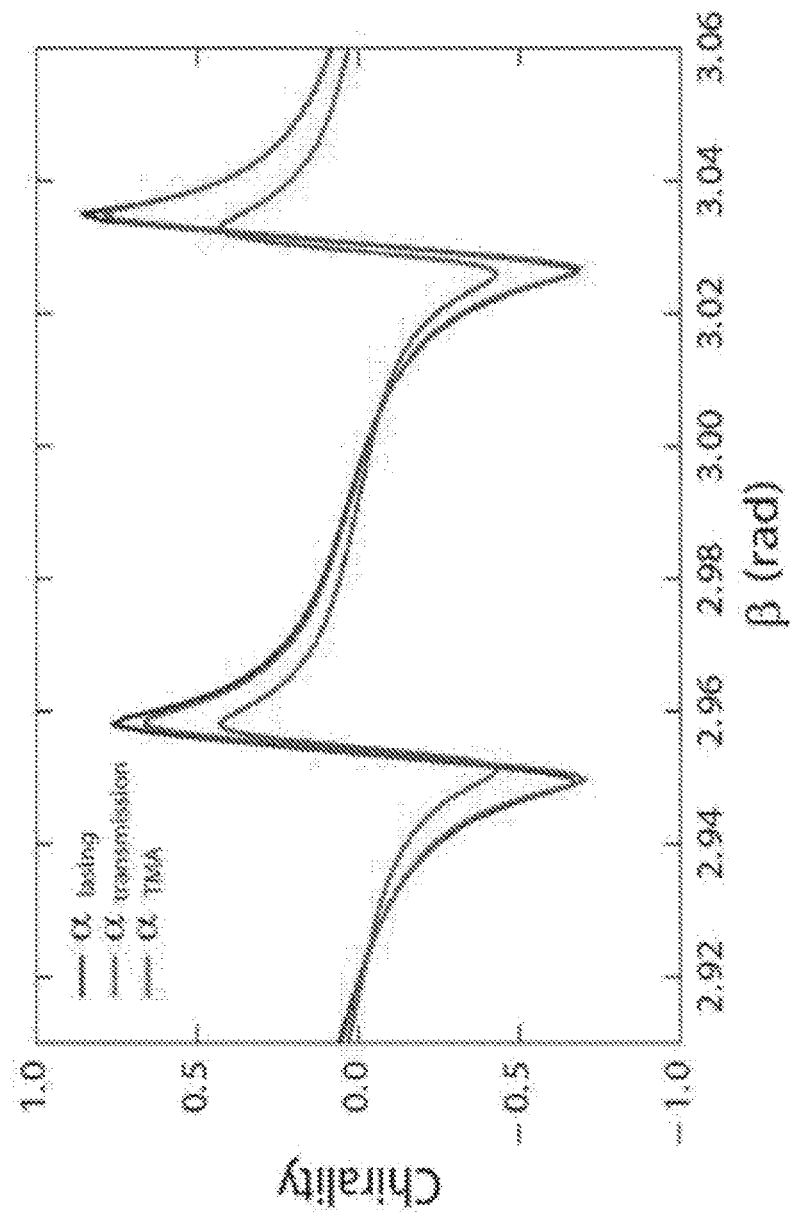
FIG. 46 Comparison of the chirality definitions for α TMA, αlasing and αtransmission.
Figure 47A:
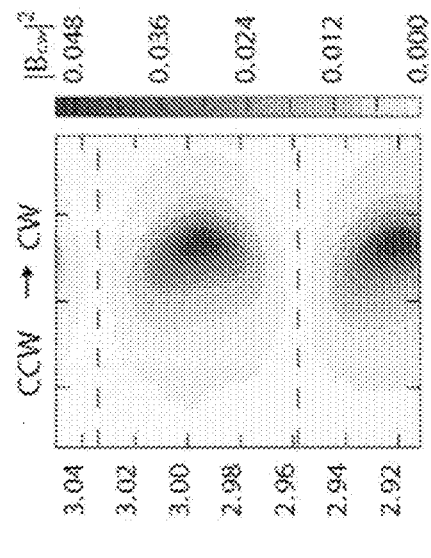
FIGS. 47A, 47B, 47C, and 47D illustrate asymmetric backscattering intensities $|B_{CW/CCW}|^2$ from a CW to a CCW wave [left panel: (A) and (C)] and from a CCW to a CW mode [right panel: (B) and (D)]
Figure 47B:
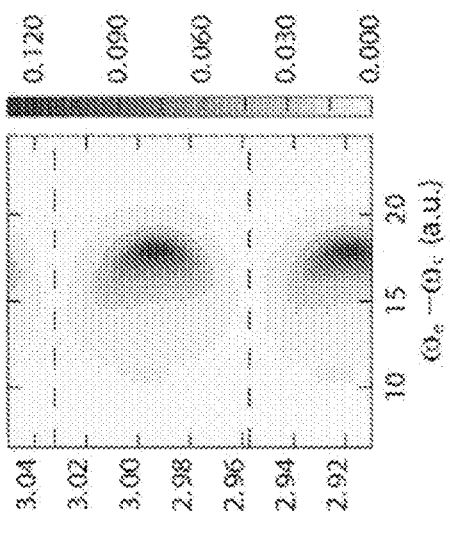
Figure 47C:
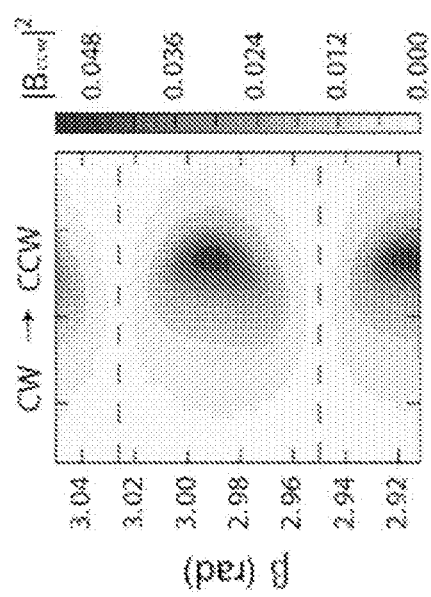
Figure 47D:
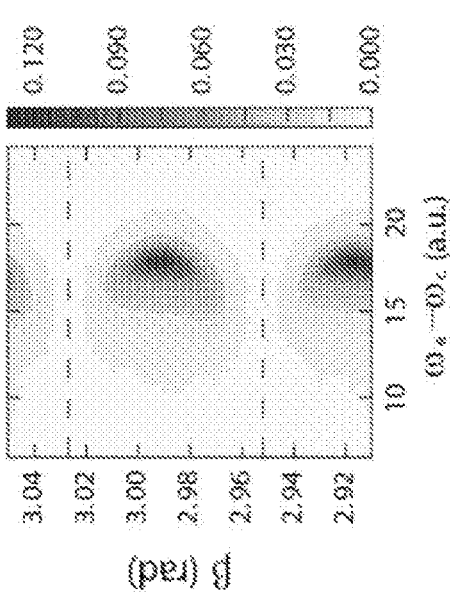

In a next step we explicitly compared the full numerical results to the results from the TMA model. For this, we calculated the parameters A, $\beta$, and $\omega_c$ through separate eigenvalue calculations for each of the scatterers, where no waveguides were attached to the system. The value for the coupling coefficient $\kappa_1$ has been determined from transmission calculations from port 1 to port 3 with no scatterers present. In FIG. 46 the chirality definitions of Eqs. (S.66), (S.70) and (S.78) are compared to each other for the case that the distance of the $2^{nd}$ nanotip is fixed at the same distance as the $1^{st}$ nanotip, i.e. $d_2=0.02$. Similar to FIGS. 45A and 45B we again observe an excellent agreement between the numerical calculations. For the TMA model we find that it correctly predicts the angles at which the chirality becomes minimal/maximal, but the exact values differ. The reason for this is that the TMA model does not include other scattering processes as, for example, from the resonator to the waveguide.

FIG. 46 illustrates a comparison of the chirality definitions for $\alpha_{TMA}$, $\alpha_{lasing}$ and $\alpha_{transmission}$. In the calculations the second scatterer has an effective size factor $d_2=0.02$ and the angle $\beta$ is varied.

FIGS. 47A, 47B, 47C, and 47D illustrate asymmetric backscattering intensities $|B_{CW/CCW}|^2$ from a CW to a CCW wave [left panel: (47A) and (47C)] and from a CCW to a CW mode [right panel: (47B) and (47D)]. The results are obtained from a full numerical transmission calculation using a finite element method [upper panel: (47A) and (47B)], as well as from the TMA model [lower panel: (47C) and (47D)]. Both models yield the same frequencies at which the backscattering intensities peak, but the overall intensities differ from each other since additional scattering processes as from the waveguide to the resonator are not included in the TMA. In each panel the backscattering intensity is shown as functions of the injected frequency detuning $\omega_e - \omega_c$ and the angular position $\beta$ of the second nanotip. Dashed lines mark the local minima of backscattering intensities, corresponding to the chirality maxima and minima. The asymmetric backscattering is shown by the shifted intensity patterns with respect to the angle $\beta$.

The asymmetric backscattering which results in the intriguing chirality behavior in FIG. 46 can also be observed by looking at the normalized backscattering intensity $|B_{CCW}|^2 = |a_{CCW,out}|^2 / |a_{CW,in}|^2$ from the CW to CCW traveling mode and the similarly defined $|B_{CW}|^2$. From Eq. (S.70) it follows that an exceptional point (with an absolute chirality maximum) is reached when either of the backscattering intensities $|B_{CW/CCW}|^2$ is zero. Hence, a chirality maximum (minimum) can be found by minimizing the backscattering intensity $|B_{CCW}|^2$ ($|B_{CW}|^2$). This strategy has also been used in the experiment and the corresponding data is shown in FIGS. 36A, 36B, 36C, 36D, 36E, 36F, 36G, and 36H of the main text. The EPs corresponding to opposite chiralities occur at slightly different angles β, which manifests itself by shifting the two backscattering intensity pattern $|B_{CW/CCW}|^2$ with respect to the angle β as shown in FIGS. 47A, 47B, 47C, and 47D. Here, the angles β at which the backscattering $|B_{CW/CCW}|^2$ becomes minimal are indicated by dashed lines. In addition, both the results for the TMA model and the numerical transmission calculations are plotted. The frequencies at which the backscattering intensities $|B_{CW/CCW}|^2$ peak match very well between the two models; however, the predicted overall intensities differ due to the differences in the models.

Directionality analysis for the biased input case in the transmission model may be estimated in one aspect. As discussed in the main text, the intrinsic chirality is different from the directionality when light is injected into the resonator in a preferred direction such as in the CW or the CCW direction (i.e., we referred to this as the biased input). Our experiments described in the main text revealed that varying the relative distance (relative spatial phase) between the scatterers affects the amount of light coupled out of the resonator into the forward direction (i.e., in the direction of the input) and into the backward direction (i.e., in the opposite direction of the input); however, the amount of light coupled out of the resonator into the forward direction always remains higher than that in the backward direction.

FIGS. 48A, 48B, 48C, 48D, 48E, and 48F illustrate directionality with a biased input (CW) as a function of the relative phase difference between two scatterers (A). Summary of the results obtained in the numerical simulation and the fitting curve using the theoretical model. (B-F), Results of finite element simulations at different relative phase angles β but fixed size factor revealing the intracavity field patterns and output direction in the waveguides. β values are: (B) 2.590 rad; (C) 2.617 rad; (D) 2.625 rad; (E) 2.631 rad; and (F) 2.653 rad. $P_1$ and $P_2$ denote the locations of the scatterers.

Figure 48A:
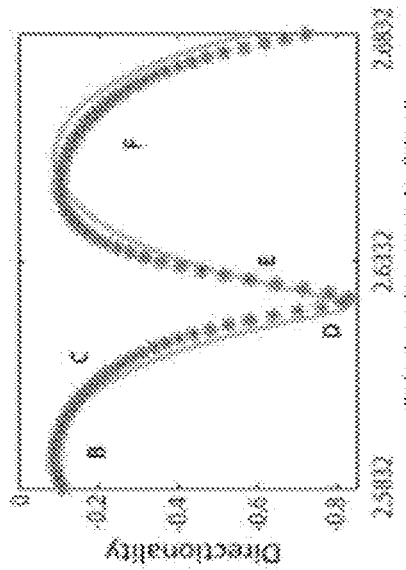
FIGS. 48A, 48B, 48C, 48D, 48E, 48F illustrate directionality with a biased input (CW) as a function of the relative phase difference between two scatterers (A)
Figure 48B:
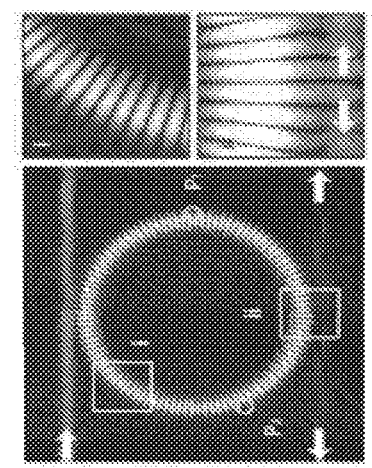
Figure 48C:
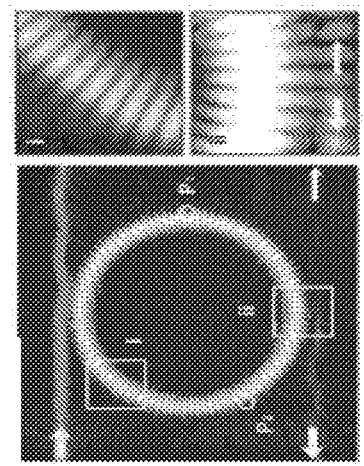
Figure 48D:
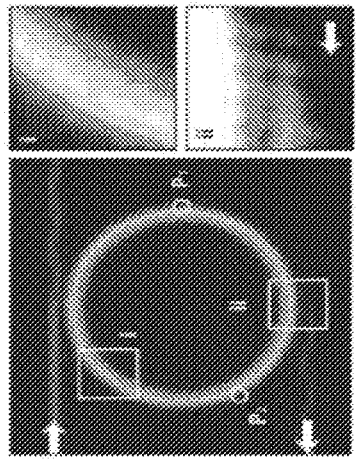
Figure 48E:
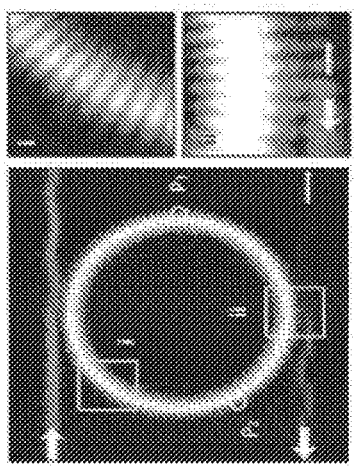
Figure 48F:
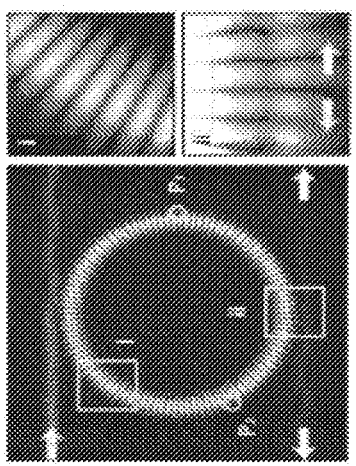

FIGS. 48A, 48B, 48C, 48D, 48E, and 48F depict the results of finite element simulations with COMSOL validating our experimental observations presented in FIGS. 36A, 36B, 36C, 36D, 36E, 36F, 36G, 36H, 37A, and 37B in the main text. It is seen that directionality is always negative taking values between its minimum and maximum values by changing the relative phase angle. Decreasing directionality implies the presence of scattering into the direction opposite to the direction of the injected light. Backward scattering, however, remains always weaker than forward scattering. Simulations reveal that when the intracavity field forms a standing-wave pattern with well-defined nodal lines, light couples out from the resonator in both the cw and ccw directions (FIG. 48B); however, when nodal lines are washed out and the field profile deviates from the standing-wave pattern light couples out from the resonator in the direction of the input (FIG. 48D). A relation between the visibility of the nodal lines (and the standing-wave pattern) and the ratio of the light coupled into cw and ccw directions is clearly seen (FIGS. 48A, 48B, 48C, 48D, 48E, and 48F).

Tunable Add-Drop Filter with an Active Resonator

The systems and methods described herein are directed to an add-drop filter (ADF) that includes an active resonator (e.g., a whispering-gallery-mode (WGM) resonator). In one suitable embodiment, the WGM resonator includes an optically active gain medium such that it is an active resonator. Accordingly, the systems and methods described herein provide an optically controllable ADF. That is, by introducing an optically active gain medium in a WGM resonator, the features and performance of an ADF including the WGM resonator may be optically controlled.

Modern optical communication systems and networks generally require state-of-the-art ADFs, narrowband optical filters, optical routers, and optical modulators. At least some known optical filters suffer from relatively poor linewidths of resonances, as this is limited by an absorption loss of the material used for the filter. To compensate such losses, photons may be provided from a gain medium into the same resonance line of interest. An active resonator with its incorporated optically active gain medium will have resonance lines much narrower than what is achievable with passive resonators (i.e., resonators without an optically active gain medium). At least some known ADFs suffer the same problem that optical filters suffer. Thus, an ADF with active gain medium will have an improved resolution, allowing adding and/or dropping of signals whose wavelengths are spaced relatively closed.

Passive ADFs fabricated using a WGM resonator have add and drop efficiencies smaller than one, due to non-zero intrinsic losses of the resonator and different coupling losses between the resonator and fiber taper waveguides. However, as described herein, introducing gain into a WGM resonator and optically pumping the gain below the lasing threshold not only allows loss compensation to achieve add and drop efficiencies higher than with a passive ADF, but also reduces crosstalk and improves tunability. For example, according to at least some embodiments, an active ADF fabricated using an erbium-ytterbium co-doped microsphere may achieve 100-fold enhancement in the intrinsic quality factor, 3.5 fold increase in drop efficiency, bandwidth tunability of 35 MHz, and a crosstalk of only 2%. In other embodiments, other dopants with similar properties for providing optical gain may be used. Also, in at least some other embodiments, the WGM resonator may be any other WGM resonator, such as a micro-toroid, micro-ring, micro-bubble, or micro-bottle. By providing gain, the systems and methods described herein facilitate achieving a ratio of add and drop efficiencies very close to one, and those efficiencies are higher than those of passive ADFs.

In some embodiments, resonances are provided in both the optical pump band (980 nm) and the emission band (1550 nm—telecommunication band). In one embodiment, when the gain medium is pumped in the 980 nm band (e.g., using an optical pump), emission from the erbium ions into the 1550 nm band compensates a portion of the losses in the system, facilitating resonances with narrower linewidths. The narrower linewidths may be shown by comparing the linewidths of the resonances with and without an optical pump (i.e., when pump is inactive, the ADF works like conventional passive ADF). Accordingly, the active ADF has a much a narrower linewidth than the passive filter, enabling dropping and/or adding signals with wavelengths (or frequencies) very close to each other.

At least some known ADFs have different add and drop efficiencies. Ideally, the add and drop efficiencies are equal to each other. However, this is possible only when losses are completely compensated for. The better the compensation, the closer the add and drop efficiencies. Active ADFs, such as those described herein, address this issue as well.

More specifically, by increasing an optical pump power, the linewidth gets narrower as the losses are compensated more and more. Sufficiently increasing the pump power brings the effective loss relatively close to zero, such that an add-drop efficiency ratio approaches unity. Accordingly, in the embodiments described herein, the add and drop efficiencies are relatively close to each other.

Active ADFs in accordance with the embodiments described herein also demonstrate a reduction in the crosstalk between different ports as compared with passive ADFs. As such, the active ADFs described herein provide reduced crosstalk, similar values of add and drop efficiencies, higher add-drop efficiencies, and more precise tunable bandwidth as compared to passive ADFs. Further, in some embodiments, the drop and add wavelengths in active ADFs with gain medium can be tuned optically. In other embodiments, thermal tuning may be used to tune the add and drop wavelengths.

In some embodiments, an ADF fabricated using a WGM micro-resonator with a doped optically active medium provides higher add and drop efficiencies, reduces crosstalk, helps to obtain similar efficiencies for adding and dropping (i.e., the ratio of add and drop efficiencies approach unity), enables dropping and/or adding signals with smaller wavelength separations, and provides bandwidth tunability. Some of these are performance improvements over ADFs with passive WGM resonators, and others are possible only in an active ADF utilizing an active WGM resonator. Thus, active ADFs are significant tools for use in present and future optical communication networks.

As described herein, in some embodiments, an ADF is provided in which an erbium-ytterbium (Er3+–Yb3+) co-doped microsphere resonator is side-coupled to a pair of tapered fibers. In such ADFs, the optical gain provided by Er3+ ions helps to compensate losses in the resonator, therefore enabling a tunable add-drop bandwidth, efficiency and crosstalk. Further, in this co-doped active resonator, Yb3+ ions are doped to improve the efficiency of the optical pumping of Er3+ ions, and tunability occurs from the ability to tune the optical gain by increasing or decreasing a pump power. Different rare-earth ions can be doped singly or co-doped multiply in any concentration to provide gain at the spectral band of choice or to cover gain in many different bands. Further, as described herein, techniques other than ion doping may be utilized to provide active gain in an ADF.

Figure 49:
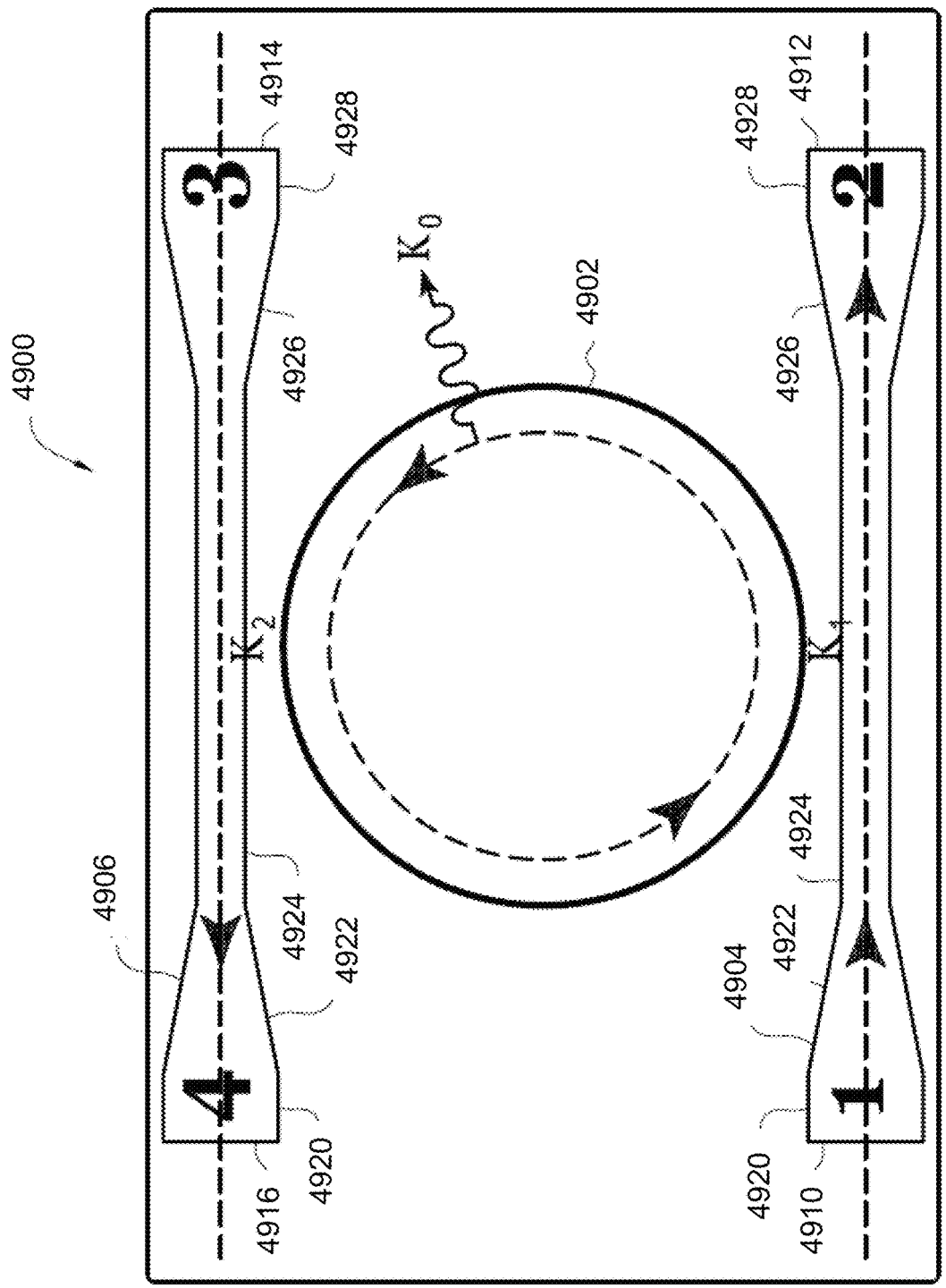
FIG. 49 is a schematic diagram of an exemplary active add-drop filter (ADF)
Figure 50C:
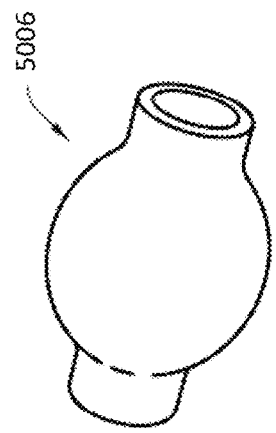
FIGS. 50A, 50B, 50C, 50D, 50E, and 50F are perspective views of exemplary resonators that may be used with the ADF shown in FIG. 49.
Figure 50F:
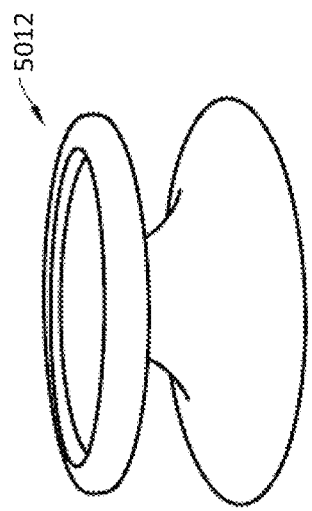
Figure 50B:
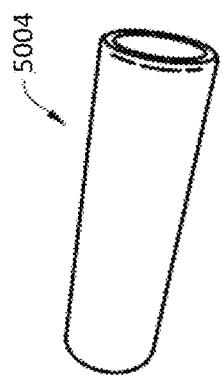
Figure 50E:
Figure 50A:
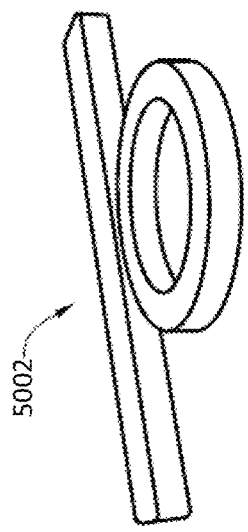
Figure 50D:
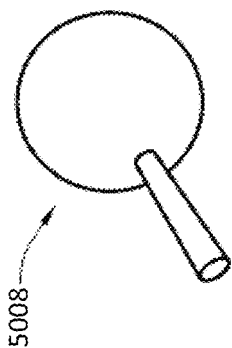

FIG. 49 is a schematic diagram of an active ADF 4900 according to one embodiment. ADF 4900 includes a resonator 4902 optically coupled to a first optical waveguide 4904 and a second optical waveguide 4906. In this embodiment, resonator 4902 is a microsphere, and first and second optical waveguides 4904 and 4906 are tapered optical fibers. Alternatively, resonator 4902 and first and second optical waveguides 4904 and 4906 may be any optical components that enable ADF 4900 to function as described herein. For example, in some embodiments, first and second optical waveguides 4904 and 4906 are planar waveguides that perform equivalently to an actual optical fiber. Further, resonator 4902 is not limited to WGM resonators. That is, gain-induced performance enhancement, as described herein, can be realized in ADFs built using any suitable filter or resonator. For example, photonic crystal cavities suffer from losses that may be compensated by introducing active gain.

ADF 4900 includes an input port 4910, a through port 4912, an add port 4914, and a drop port 4916. In operation, one or more optical signals enter ADF 4900 through input port 4910 and exit ADF 4900 at through port 4912. Further, one or more optical signals may be added through add port 4914 or dropped through drop port 4916.

As noted, first and second optical waveguides 4904 and 4906 are tapered optical fibers in this embodiment. Each of first and second optical waveguides 4904 and 4906 includes a first normal portion 4920, a first tapered portion 4922, a narrow portion 4924, a second tapered portion 4926, and a second normal portion 4928. In first normal portion 4920 and second normal portion 4928, the tapered optical fiber has a first diameter. In narrow portion 4924, the tapered optical fiber has a second diameter smaller than the first diameter. In the exemplary embodiment, each tapered optical fiber has a length of approximately 10 millimeters (mm), and the diameter of narrow portion 4924 is approximately 0.8 micrometers (μm). Alternatively, the tapered optical fibers may have any dimensions and/or characteristics that enable ADF 4900 to function as described herein.

In the exemplary embodiment, each tapered optical fiber is prepared from a standard communication single-mode fiber having a core radius of approximately 4 μm and a cladding radius of approximately 62.5 μm. The standard communication single-mode fiber is heated and pulled above a hydrogen flame to generate the tapered optical fibers. Alternatively, the tapered optical fibers may be prepared using any methods and/or components that enable ADF 4900 to function as described herein.

As will be understood by those of skill in the art, first and second optical waveguides 4904 and 4906 are optically coupled to resonator 4902 at narrow portions 4924. More specifically, as optical signals pass through first tapered portion 4922, the light spreads out into the surrounding area. Accordingly, narrow portion 4924 allows optical signals to couple into and out of resonator 4902.

As shown in FIG. 49, $\kappa_1$ denotes coupling losses between first optical waveguide 4904 and resonator 4902, $\kappa_2$ denotes coupling losses between second optical waveguide 4906 and resonator 4902, and $\kappa_0$ denotes an intrinsic energy decay rate of resonator 4902. The intrinsic energy decay rate will be reduced by any optical gain $\xi$ provided by ADF 4900. Specifically, at resonance, the transmission and drop efficiency of ADF 4900 are given by Equations 1 and 2, respectively:

$$T = \frac{(\kappa_0 - \xi - \kappa_1 + \kappa_2)^2}{(\kappa_0 - \xi + \kappa_1 + \kappa_2)^2} \qquad \text{Equation 1}$$

$$D = \frac{4\kappa_1\kappa_2}{(\kappa_0 - \xi + \kappa_1 + \kappa_2)^2} \qquad \text{Equation 2}$$

To avoid crosstalk, the transmission should be zero at resonance in both adding and dropping conditions. This can be satisfied for add and drop channels simultaneously only when the intrinsic loss of the cavity $\kappa_0$ is zero, which is relatively difficult to achieve, due to the fact that the material or resonator 4902 has a non-zero absorption loss. However, Equation 2 suggests that in order to increase the drop efficiency, the intrinsic losses should be decreased. To achieve this, optical gain can be utilized to compensate for the losses (ideally with $\xi$ substantially equal to $\kappa_0$). Then, by tuning the loss and gain in ADF 4900, one can decrease resonance linewidths, increase drop efficiency, and substantially eliminate the crosstalk.

As noted, in this embodiment, resonator 4902 is a microsphere. More specifically, resonator 4902 may be, for example, an 80 μm diameter silica microsphere fabricated by reflowing the end of a fiber tip with a high power CO2 laser. Alternatively, resonator 4902 may be fabricated using any process that enables ADF 4900 to function as described herein. For example, in some embodiments, resonator 4902 may be fabricated using a semiconductor material.

In this embodiment, gain is provided in ADF 4900 by introducing a gain medium to resonator 4902 and using a pump laser (not shown in FIG. 49) to excite the gain medium. In order to introduce the gain medium, in this embodiment, the silica microsphere is dip-coated with a layer of Er3+–Yb3+co-doped sol-gel silica. In other embodiments, resonator 4902 may be any suitable WGM resonator, and resonator 4902 may be doped using other ion doping methods. For example, the resonator 4902 may be doped using at least one of an ion implantation method in which ions are implanted into the material, a dip-coating method in which resonator 4902 is dipped one or more times into and coated with a sol-gel material having the gain dopants, and/or a direct fabrication method wherein resonator 4902 is fabricated from a sol-gel material already doped with the gain medium.

During operation of ADF 4900, first and second optical waveguides 4904 and 4906 and resonator 4902 are substantially fixed relative to each other. For example, in some embodiments, first and second optical waveguides 4904 and 4906 are mounted to a supporting material (not shown), such as, for example, a glass base. Further, although first and second optical waveguides 4904 and 4906 are shown as substantially straight in FIG. 49, first and second optical waveguides 4904 and 4906 may alternatively be curved, u-shaped, and/or fixed in any shape that enables ADF 4900 to function as described herein.

In one embodiment, ADF 4900 is assembled as follows. Using a nanopositioning system, resonator 4902 is placed between first and second optical waveguides 4904 and 4906 such that one of first and second optical waveguides 4904 and 4906 is very close to the resonator 4902. Then, the other of first and second optical waveguides 4904 and 4906 is pushed close to resonator 4902 using a fiber tip placed on a positioning stage. In some embodiments, once resonator 4902 and first and second optical waveguides 4904 and 4906 are properly positioned, the components of ADF 4900 are secured (i.e., by encasing the components in a thermoplastic material) such that ADF 4900 forms a packaged device. That is, ADF 4900 may be packaged as a "black-box" component that leaves ports 4910, 4912, 4914, and 4916 exposed, but encloses and protects first and second optical waveguides 4904 and 4906 and resonator 4902. Further, one or more components of ADF 4900 may be fabricated using optical lithography and/or semiconductor processes.

FIGS. 50A, 50B, 50C, 50D, 50E, and 50F are perspective views of exemplary WGM resonators that may be used with ADF 4900. For example, a ring resonator 5002 (shown in FIG. 50A), a capillary resonator 5004 (shown in FIG. 50B), a bubble resonator 5006 (shown in FIG. 50C), a microsphere resonator 5008 (shown in FIG. 50D), a disk resonator 210 (shown in FIG. 50E), and/or a microtoroid resonator 212 (shown in FIG. 5F) may be used in ADF 4900. Alternatively, other types of WGM resonators maybe utilized.

Figure 51:
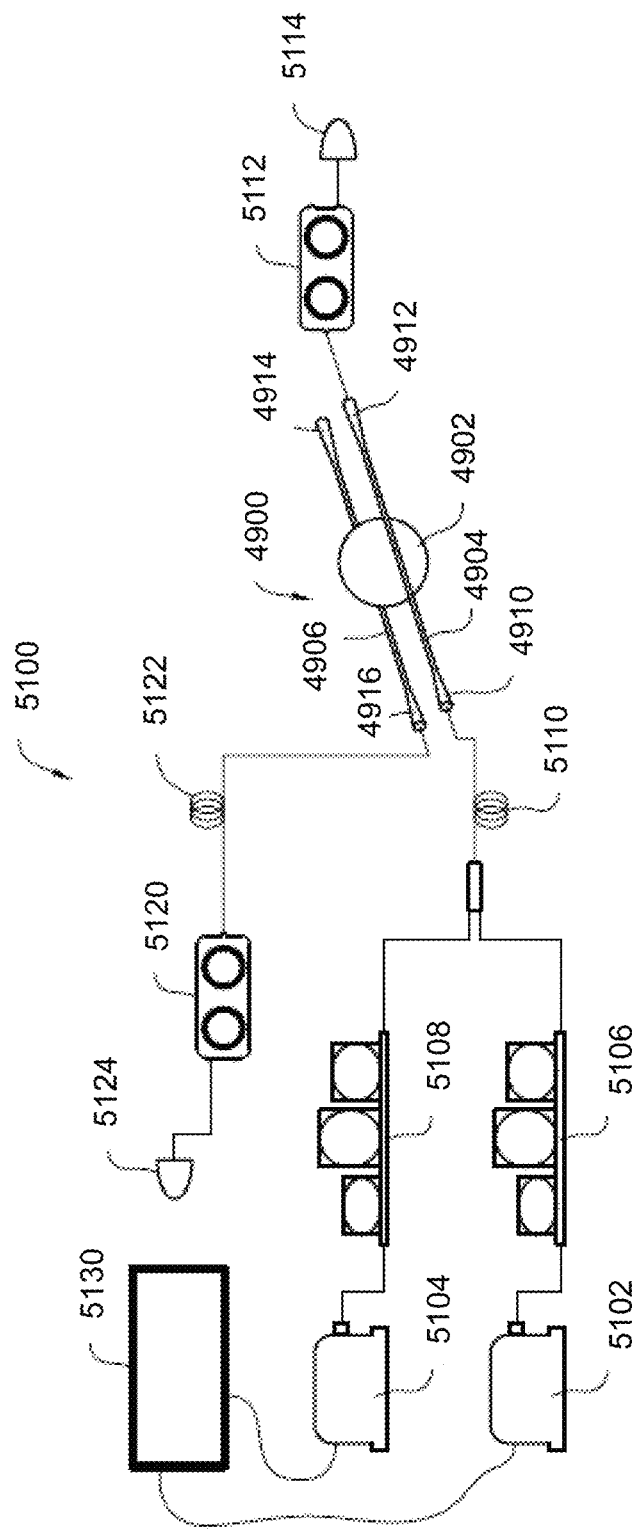
FIG. 51 is a schematic diagram of an exemplary optical communication system that includes the ADF shown in FIG. 49.

FIG. 51 is a schematic diagram of an optical communication system 5100 that includes ADF 4900. System 5100 includes a pump laser 5102 that generates light (also referred to as a gain stimulation signal) to excite the gain medium, and a probe laser 5104 that emits at least one optical signal (i.e., light) to be transmitted through ADF 4900. The light emitted by pump laser 5102 and the light emitted by probe laser 5104 pass through respective polarization controllers 5106 and 5108 and are combined before passing through a first fiber spool 5110 and entering ADF 4900 at input port 4910.

Through port 4912 is coupled to a first filter 5112, which is in turn coupled to a first photodetector 5114. First photodetector 5114 measures a power of the optical signal transmitted through first filter 5112 and the detected power may be output to a computing device (not shown) for further processing. In this embodiment, drop port 4916 is coupled to a second filter 5120 through a second fiber spool 5122. Further, second filter 5120 is coupled to a second photodetector 5124. Second photodetector 5124 measures a power of the optical signal transmitted through first filter 5120 and the detected power may be output to a computing device (not shown) for further processing. In this embodiment, first and second filters 5112 and 5120 are 980 nm to 1550 nm wavelength-division multiplexing filters. Alternatively, first and second filters 5112 and 5120 may be any filters that enable system 5100 to function as described herein.

In this embodiment, a controller 5130 is communicatively coupled to pump laser 5102 and probe laser 5104. Controller 5130 enables a user to control pump laser 5102 and probe laser 5104 (e.g., to optically tune pump laser 5102 and control optical signals emitted by probe laser 5104). Controller 5130 may be a computing device or any other hardware component that enables the user to control pump laser 5102 and probe laser 5104.

In this embodiment, pump laser 5102 emits light in the 980 nm band, and probe laser 5104 emits light in the 1550 nm band. Alternatively, pump laser 5102 and probe laser may emit light in any bandwidths that enables system 5100 to function as described herein. When pumping at around 980 nm, the Erbium ions in resonator 4902 emit light at 1550 nm. This light compensates for a portion of the losses of ADF 4900. The Ytterbium, if present, acts as a sensitizer.

Figure 52:
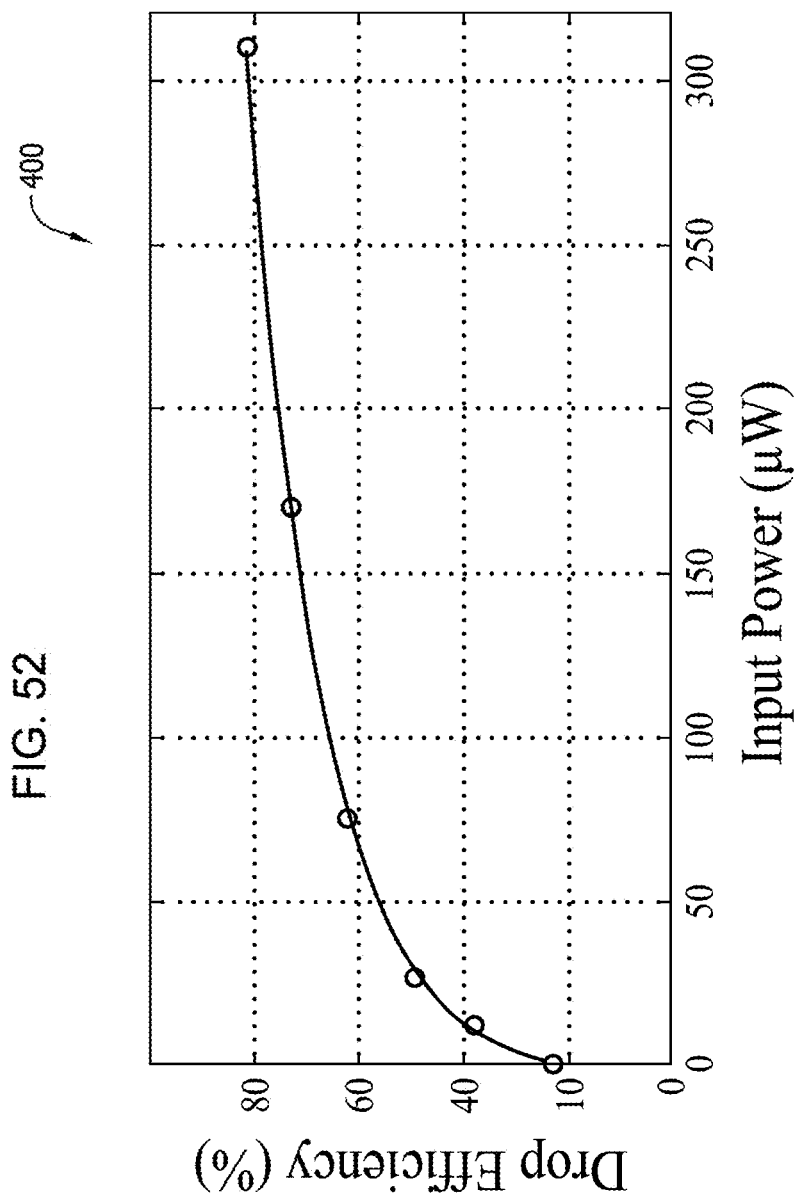
FIG. 52 is a graph plotting experimental data of drop efficiency versus pump power of an optical gain stimulation device.

By changing a power of the signal from pump laser 5102, the level of compensation, and thus the performance of ADF 4900, can be varied. For example, as shown in graph 400 FIG. 52, as an input power of pump laser 5102 increases, the drop efficiency of ADF 4900 (see Equation 2) increases. Accordingly, adjusting the pump power (e.g., using controller 5130) facilitates selectively tuning the performance characteristics of ADF 4900.

Figure 53:
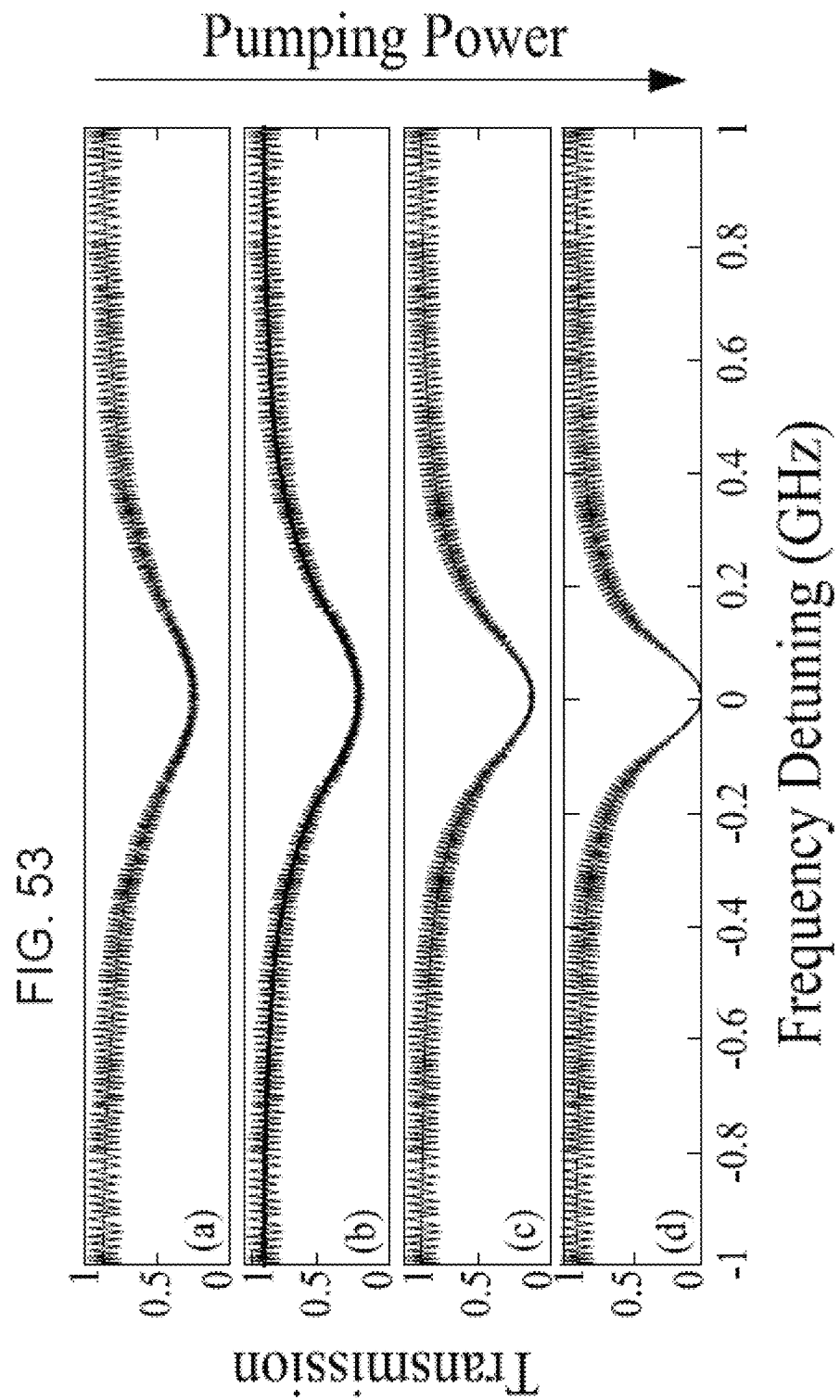
FIG. 53 is a graph plotting experimental data showing the change in transmission as a function of the pump power.

Further, as shown in graph FIG. 53, increasing the pumping power also increases the Q factor of ADF 4900 and decreases the bandwidth, allowing for finer frequency selectivity when adding and dropping optical signals. For example, in some embodiments, by increasing the pump power, the intrinsic Q factor may increase from its initial value of 5.4×106 to 1.1×108, resulting in a bandwidth increase from 38.7 MHz to 72 MHz. Further, as shown by the bottom curve on graph 500, at a sufficiently high pumping power, ADF 4900 will be critically coupled such that all optical signals input into ADF 4900 are coupled into resonator 4902, substantially eliminating any crosstalk.

Although in some embodiments, gain is provided by optically pumping a gain medium, alternatively, alternatively ADF 4900 may provide other types of gain. For example, ADF 4900 may utilize Raman gain, parametric gain, gain generated using quantum dots, gain provided by material properties of resonator 4902, etc. Further, in some embodiments, ADF 4900 may be fabricated from semiconductor materials and electrical pumping may be utilized to provide gain.

Further, although the illustrated embodiments show a single resonator 4902, in some embodiments, ADF 4900 and/or system 5100 includes a plurality of resonators 4902. For example, ADF 4900 may include an array of resonators 4902 and optical waveguides 4904 and 4906 in some embodiments.

In at least some of the embodiments described herein, controlling the optical gain in a WGM resonator-based ADF can be utilized to increase add-drop efficiency and bandwidth, and reduce crosstalk. The ability to tune the optical gain by the pump power also provides tenability. This concept can be used in other types of ADFs based on WGM structures such as microrings, microtoroids, or any other optical resonator with a circular cross-section, as well as photonic crystal structures doped with appropriate gain media.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

As described herein, a machine can operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. For example a computing device can be used to generate an input to steer parameters of a system toward an EP or to introduce loss into a physical system to improve the systems functionality. Further, while only a single machine is illustrated, the term "machine" shall also be taken to include any collection of machines that individually or jointly execute a set (or multiple sets) of instructions to perform any one or more of the methodologies discussed herein.

A computer system can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)) for displaying parameters relating to the performance of the physical system. The computer system can also include an alphanumeric input device (e.g., a keyboard), a cursor control device (e.g., a mouse), a drive unit, a signal generation device (e.g., a speaker) and a network interface device. The controller functions of the systems as illustrated in FIGS. 22A and 22B can be implemented utilizing a modified computing device with the appropriate software modules.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

A micro-chip can include a processor (e.g., a central processing unit (CPU) a graphics processing unit (GPU) or both), a main memory and a static memory, which communicate with each other via a bus. A computer-readable medium or memory on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

Other aspects, objects and advantages of the present invention can be obtained from a study of the drawings, the disclosure and the appended claims.

When introducing elements of the present disclosure or the various versions, embodiment(s) or aspects thereof, the articles "a", "an", "the" and "said" are intended to mean that there are one or more of the elements. It is also noted that the terms "comprising", "including", "having" or "containing" are intended to be open and permits the inclusion of additional elements or steps.

All of the compositions and/or methods disclosed and claimed herein may be made and/or executed without undue experimentation in light of the present disclosure. While the compositions and methods of this disclosure have been described in terms of the embodiments included herein, it will be apparent to those of ordinary skill in the art that variations may be applied to the compositions and/or methods and in the steps or in the sequence of steps of the method described herein without departing from the concept, spirit, and scope of the disclosure. All such similar substitutes and modifications apparent to those skilled in the art are deemed to be within the spirit, scope, and concept of the disclosure as defined by the appended claims.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present disclosure have been described in detail, it will be understood by those skilled in the art that various modifications can be made therein without departing from the spirit and scope of the disclosure as set forth in the appended claims.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim the following:

1. A method for controlling the effects of loss in a non-Hermitian physical system comprising:
   tuning at least one parameter of a non-Hermitian physical system to move the system toward an exceptional point; and
   maintaining the at least one parameter fixed, while introducing additional loss into at least one mode or subsystem of the non-Hermitian physical system until the desired energy distribution is achieved.

2. The method as recited in claim 1, further comprising:
   monitoring at least one mode or subsystem of the non-Hermitian physical system for loss; and
   controlling the introduction of the additional loss to at least one mode or subsystem.

3. The method as recited in claim 2, where the at least one parameter includes a coupling strength.

4. The method as recited in claim 2, where the non-Hermitian physical system is a whispering-gallery-mode (WGM) coupled microcavity based laser optical system.

5. The method as recited in claim 4, where the WGM coupled microcavity based laser optical system includes coupled WGM microresonators configured with a nanopositioner controlled to adjust the coupling strength by varying an inter-resonator distance to thereby steer the microcavity based laser optical system toward the exceptional point, and where at least one of the WGM microresonators includes a nanofiber configured to induce loss.

6. The method as recited in claim 4, where the desired energy distribution achieves a lasing threshold.

7. The method as recited in claim 6, where the laser optical system is a Raman laser optical system.

8. The method as recited in claim 2, where the non-Hermitian physical system includes coupled electronic circuits coupled by one or more of an inductive and capacitive coupling.

9. The method as recited in claim 8, where the coupled electronic circuits includes a controller configured to vary one or more of the inductive and capacitive couplings to thereby steer the coupled electronic circuits toward the exceptional point and where at least one of the coupled electronic circuits is configured to control a variable resistance to induce loss in certain mode fields.

10. A system for controlling the effects of loss in a non-Hermitian physical system comprising:
    a non-Hermitian physical system having at least one parameter being tuned to move the system toward operating about an exceptional point; and
    said at least one parameter being fixed once the system is moved toward the exceptional point while at least one mode or subsystem of the non-Hermitian physical system has additional loss introduced.

11. The system as recited in claim 10, further comprising:
    a sensor for monitoring at least one mode of the non-Hermitian physical system for loss; and
    a controller for controlling the introduction of the additional loss.

12. The system as recited in claim 11, where the at least one parameter includes a coupling strength.

13. The system as recited in claim 11, where the non-Hermitian physical system is a whispering-gallery-mode (WGM) coupled microcavity based laser optical system.

14. The system as recited in claim 13, where the WGM coupled microcavity based laser optical system includes coupled WGM microresonators configured with a nanopositioner controlled to adjust the coupling strength by varying an inter-resonator distance to thereby steer the microcavity based laser optical system toward the exceptional point, and where at least one of the WGM microresonators includes a nanofiber configured to induce loss.

15. The system as recited in claim 14, where a desired energy distribution achieves a lasing threshold.

16. The system as recited in claim 15, where the laser optical system is a Raman laser optical system.

17. The system as recited in claim 12, where the non-Hermitian physical system includes coupled electronic circuits coupled by one or more of an inductive and capacitive coupling.

18. The system as recited in claim 17, where the coupled electronic circuits includes a controller configured to vary one or more of the inductive and capacitive couplings to thereby steer the coupled electronic circuits toward the exceptional point and where at least one of the coupled electronic circuits is configured to control a variable resistance to induce loss in certain mode fields.

* * * * *

UNITED STATES PATENT AND TRADEMARK OFFICE
CERTIFICATE OF CORRECTION

PATENT NO. : 11,131,619 B2
APPLICATION NO. : 15/981228
DATED : September 28, 2021
INVENTOR(S) : Sahin Kaya Ozdemir et al.

It is certified that error appears in the above-identified patent and that said Letters Patent is hereby corrected as shown below:

In the Specification

Column 41, Line 51, delete "resonance frequency co," and insert therefor -- resonance frequency $\omega$ --.

Column 44, Line 43, delete "time the operation" and insert therefor -- tune the operation --.

Column 58, Line 19, delete "Onto-Mechanical System" and insert therefor -- Opto-Mechanical System --.

Column 58, Line 20, delete "onto-Mechanically" and insert therefor -- Opto-Mechanically --.

Column 60, Line 8, delete "Ken-like nonlinearity" and insert therefor -- Kerr-like nonlinearity --.

Column 70, Line 12, delete "Ken-like nonlinearity" and insert therefor -- Kerr-like nonlinearity --.

Column 93, Line 11, delete "provides tenability" and insert therefor -- provides tunability --.

Signed and Sealed this
Eleventh Day of April, 2023

Katherine Kelly Vidal
*Director of the United States Patent and Trademark Office*